US007002532B2

United States Patent

(12) United States Patent
Suyama et al.

(10) Patent No.: US 7,002,532 B2
(45) Date of Patent: Feb. 21, 2006

(54) THREE-DIMENSIONAL REPRESENTATION METHOD AND AN APPARATUS THEREOF

(75) Inventors: Shiro Suyama, Tokyo (JP); Hideaki Takada, Tokyo (JP); Kazutake Uehira, Tokyo (JP)

(73) Assignee: Nippon Telegraph & Telephone Corporation, Tokyo (JP)

( * ) Notice: Subject to any disclaimer, the term of this patent is extended or adjusted under 35 U.S.C. 154(b) by 306 days.

(21) Appl. No.: 10/291,404

(22) Filed: Nov. 12, 2002

(65) Prior Publication Data

US 2003/0067423 A1 Apr. 10, 2003

Related U.S. Application Data

(62) Division of application No. 09/314,072, filed on May 19, 1999, now Pat. No. 6,525,699.

(30) Foreign Application Priority Data

| | | | |
|---|---|---|---|
| May 21, 1998 | (JP) | ................................ | 10/139602 |
| Sep. 17, 1998 | (JP) | ................................ | 10/262804 |
| Oct. 2, 1998 | (JP) | ................................ | 10/280739 |
| Oct. 26, 1998 | (JP) | ................................ | 10/304374 |
| Nov. 17, 1998 | (JP) | ................................ | 10/326931 |
| Mar. 8, 1999 | (JP) | ................................ | 11/060393 |

(51) Int. Cl.
*G09G 5/00* (2006.01)

(52) U.S. Cl. .......................................... 345/6; 345/690

(58) Field of Classification Search ................ 345/6–9, 345/690–693; 359/237

See application file for complete search history.

(56) References Cited

U.S. PATENT DOCUMENTS

| | | | |
|---|---|---|---|
| 3,632,184 | A | 1/1972 | King |
| 3,632,866 | A | 1/1972 | King |
| 4,190,856 | A | 2/1980 | Ricks |
| 4,670,744 | A | 6/1987 | Buzak |

(Continued)

FOREIGN PATENT DOCUMENTS

| | | |
|---|---|---|
| EP | 0785457 A2 | 7/1997 |

(Continued)

OTHER PUBLICATIONS

Masuda, Chihiro, "A Series of Display Technologies, Three-Dimensional Display," 1990, (Published by Sangyo Tosho Kabushiki Kaisha) with English Translation.

(Continued)

*Primary Examiner*—Alexander Eisen
(74) *Attorney, Agent, or Firm*—Finnegan, Henderson, Farabow, Garrett & Dunner, LLP

(57) ABSTRACT

A three-dimensional representation method for generating a three-dimensional image by displaying two-dimensional images on a plurality of image planes located at different depth positions wherein two-dimensional images are generated in which an object to be presented is projected, along the line of sight of an observer, onto the plurality of image planes located at different depth positions as seen from the observer, the brightness levels of the generated two-dimensional images are changed individually for each image plane and the generated two-dimensional images are displayed on the plurality of image planes.

2 Claims, 109 Drawing Sheets

U.S. PATENT DOCUMENTS

| | | | | |
|---|---|---|---|---|
| 4,736,214 | A | | 4/1988 | Rogers |
| 4,985,756 | A | | 1/1991 | Kawabe et al. |
| 5,086,354 | A | | 2/1992 | Bass et al. |
| 5,347,644 | A | * | 9/1994 | Sedlmayr .................... 359/465 |
| 5,363,220 | A | | 11/1994 | Kuwayama et al. |
| 5,479,185 | A | | 12/1995 | Biverot |
| 5,589,980 | A | | 12/1996 | Bass et al. |
| 5,712,721 | A | | 1/1998 | Large |
| 5,790,284 | A | | 8/1998 | Taniguchi et al. |
| 6,054,969 | A | | 4/2000 | Haisma |
| 6,078,423 | A | | 6/2000 | Orr et al. |
| 6,229,561 | B1 | | 5/2001 | Son et al. |
| 6,262,694 | B1 | | 7/2001 | Ishimoto et al. |
| 6,377,229 | B1 | | 4/2002 | Sullivan |
| 6,421,174 | B1 | | 7/2002 | Ooshima et al. |
| 6,593,957 | B1 | * | 7/2003 | Christie ....................... 348/42 |

FOREIGN PATENT DOCUMENTS

| | | | |
|---|---|---|---|
| JP | 09258271 | A | 10/1997 |
| JP | 10048597 | A | 2/1998 |
| JP | 11133449 | A | 5/1999 |
| JP | 2000333211 | A | 2/2000 |
| WO | WO-96/27992 | | 9/1996 |
| WO | WO-98/18039 | | 4/1998 |

OTHER PUBLICATIONS

Copy of Office Action issued by European Patent Office for Application No. 99303917.1, dated Jun. 20, 2005.

* cited by examiner

VIBRATION SCREEN TYPE (A CASE OF THREE-DIMENSIONAL VIRTUAL IMAGE)

(A CASE OF THREE-DIMENSIONAL REAL IMAGE)

THREE-DIMENSIONAL REPRESENTATION METHOD AND AN APPARATUS THEREOF

This is a divisional of application Ser. No. 09/314,072, filed May 19, 1999 now U.S. Pat. No. 6,525,699.

This application is based on Patent Application Nos. 139602/1998 filed on May 21, 1998 in Japan, 262804/1998 filed on Sep. 17, 1998 in Japan, 280739/1998 filed on Oct. 2, 1998 in Japan, 304374/1998 filed on Oct. 26, 1998 in Japan, 326931/1998 filed on Nov. 17, 1998 in Japan and 60393/1999 filed on Mar. 8, 1999 in Japan, the content of which is incorporated hereinto by reference.

BACKGROUND OF THE INVENTION

1. Field of the Invention

The present invention relates to a three-dimensional representation method and an apparatus capable of electronically reproducing a moving picture or video with a reduced amount of information on a three-dimensional image.

2. Description of the Prior Art

A liquid crystal shutter eyeglasses system shown in FIG. 1 is well known as a conventional system which is electrically rewritable, has a small amount of information and can display a three-dimensional video.

The working principle of the liquid crystal shutter eyeglasses system will be explained below.

In this liquid crystal shutter eyeglasses system, a three-dimensional object α1 is shot by cameras (α2, α3) from different directions to generate images (parallactic images) representing the three-dimensional object α1 as viewed from different directions.

The images taken by the cameras (α2, α3) are combined by a video signal converter α4 into a single video signal and fed into a two-dimensional display (for example, CRT display) α5.

An observer α7 views an image on the two-dimensional display α5 by wearing liquid crystal shutter eyeglasses α6.

Here, when the two-dimensional display α5 is displaying an image from the camera α3, the liquid crystal shutter eyeglasses α6 are made opaque on the left side and transparent on the right side. When the two-dimensional display α5 is displaying an image from the camera α2, the liquid crystal shutter eyeglasses α6 are made transparent on the left side and opaque on the right side.

By switching the above operations at high speed, the viewer feels he is watching parallactic images with both eyes because of the after image effect and therefore can see the object three-dimensionally because of binocular parallax.

Further, a volumetric system as shown in FIGS. 2A and 2B has been proposed as one of the conventional systems that are electrically rewritable, have a small amount of information and can display a three-dimensional video.

The working principle of this volumetric system is explained in the following.

In the volumetric type, as shown in FIG. 2B, a three-dimensional object β1 is sampled in the direction of depth as seen from the viewer to generate a set of two-dimensional images β2, which is reproduced in a depth direction on a time division basis on a volumetric three-dimensional display β3 to display a reproduced three-dimensional image β4.

The liquid crystal shutter eyeglasses system shown in FIG. 1, however, has a drawback that because of the required use of the liquid crystal shutter eyeglasses α6, the system, when used for teleconferencing, looks very unnatural.

Further, there are large inconsistencies among binocular parallax, convergence and focusing, which are physiological factors of stereoscopy.

That is, in the liquid crystal shutter eyeglasses system shown in FIG. 1, although the requirements of binocular parallax and convergence are almost met, this system will cause eyestrain because the focal plane is on the display surface.

In the volumetric type shown in FIGS. 2A and 2B, the depth positions of the reproduced three-dimensional object β1 are close to the surfaces on which images are actually displayed, and are also disposed between these surfaces, so that unlike the liquid crystal shutter eyeglasses system, this volumetric system can suppress contradictions among binocular parallax, convergence and focusing.

With the volumetric system, however, because the depth positions of the reproduced images are discrete, it is difficult to reproduce a three-dimensional object located at an intermediate position between the discreet display positions, or a three-dimensional object that varies greatly in the depth direction.

SUMMARY OF THE INVENTION

It is an object of the present invention to provide a three-dimensional representation method and apparatus capable of displaying a video without requiring a viewer to wear glasses.

Another object of the invention is to provide a three-dimensional representation method and apparatus which can suppress contradictions among physiological factors for stereoscopy.

Another object of the invention is to provide a three-dimensional representation method and apparatus which can be electrically erased and programmed.

These and other objects and novel features of the invention will become apparent from the following descriptions in this specification and accompanying drawings.

Representative aspects of the present invention may be briefly summarized as follows.

This invention is characterized by a three-dimensional representation method for generating a three-dimensional image by displaying two-dimensional images on a plurality of image planes located at different depth positions, the method comprising the steps of: generating two-dimensional images by projecting an object to be presented, along the line of sight of an observer, onto a plurality of image planes located at different depth positions as seen from the observer; and changing brightness levels of the generated two-dimensional images individually for each image plane and displaying the generated two-dimensional images on the plurality of image planes.

According to the invention, when the object to be presented is displayed at a depth position close to the observer, the brightness levels of the two-dimensional images displayed on those image planes of the plurality of image planes which are close to the observer may be raised and the brightness levels of the two-dimensional images displayed on the image planes remote from the observer may be lowered. When the object to be presented is displayed at a depth position remote from the observer, the brightness levels of the two-dimensional images displayed on those image planes of the plurality of image planes which are close to the observer may be lowered and the brightness levels of the two-dimensional images displayed on the image planes remote from the observer may be raised.

The two-dimensional images are displayed on the plurality of image planes in such a way that the two-dimensional images overlap each other when the two-dimensional images are viewed from one point on a line which passes through the right and left eyes of an observer, and that an overall brightness level as seen by the observer is equal to the brightness level of the original object to be presented.

According to the invention, the two-dimensional images are arranged to overlap by viewing from one point on the line which passes through the right and left of the observer and the two-dimensional images are enlarged or reduced in the horizontal direction respectively.

According to the invention, the two-dimensional images may be switched successively to generate a three-dimensional moving image.

According to the invention, when the two-dimensional images include a plurality of images of an object moving in a direction of depth and the object is moving toward the observer, the brightness levels of the object images displayed on the plurality of image planes may be progressively raised toward an image plane close to the observer and progressively lowered toward an image plane remote from the observer in synchronism with the successive switching of the two-dimensional images, and when the two-dimensional images include a plurality of images of an object moving in a direction of depth and the object is moving away from the observer, the brightness levels of the object images displayed on the plurality of image planes may be progressively lowered toward an image plane close to the observer and progressively raised toward an image plane remote from the observer in synchronism with the successive switching of the two-dimensional images.

According to the invention, a three-dimensional display may comprise: a first means for generating two-dimensional images by projecting an object to be presented, along the line of sight of an observer, onto a plurality of image planes located at different depth positions as seen from the observer; a second means for displaying the two-dimensional images generated by the first means on the plurality of image planes located at different depth positions as seen from the observer; and a third means for changing brightness levels of the two-dimensional images displayed on the plurality of image planes individually for each image plane.

According to the invention, the second means may comprise: a plurality of two-dimensional displays; and partial reflecting mirrors combined with the plurality of two-dimensional displays except for one two-dimensional display located at the remotest depth position from the observer, the partial reflecting mirrors being adapted to locate images of the two-dimensional displays on the line of sight of the observer.

According to the invention, the second means may comprise: a plurality of two-dimensional displays; and combinations of partial reflecting mirrors and lenses, the partial reflecting mirror and lens combinations being combined with the plurality of two-dimensional displays except for one two-dimensional display located at the remotest depth position from the observer, the partial reflecting mirror and lens combinations being adapted to locate images of the two-dimensional displays on the line of sight of the observer.

According to the invention, the second means may comprise: a plurality of two-dimensional displays; a total reflecting mirror or partial reflecting mirror combined with one of the plurality of two-dimensional displays which is located at the remotest depth position from the observer, the total reflecting mirror or partial reflecting mirror being adapted to locate an image of the one two-dimensional display on the line of sight of the observer; and partial reflecting mirrors combined with the two-dimensional displays except for the one two-dimensional display located at the remotest depth position from the observer, the partial reflecting mirrors being adapted to locate images of the two-dimensional displays on the line of sight of the observers.

According to the invention, the second means may comprise: a plurality of two-dimensional displays; a combination of a total reflecting mirror and a lens or a combination of a partial reflecting mirror and a lens, the combination being combined with one of the plurality of two-dimensional displays which is located at the remotest depth position from the observer, the combination being adapted to locate an image of the one two-dimensional display on the line of sight of the observer; and combinations of partial reflecting mirrors and lenses, the combinations being combined with the two-dimensional displays except for one two-dimensional display located at the remotest depth position from the observer, the combinations being adapted to locate images of the two-dimensional displays on the line of sight of the observer.

According to the invention, the second means may comprise: a plurality of scatter plates capable of controlling a switching between a transmitting state and a scattering state or a plurality of reflection plates capable of controlling the switching between a reflecting state and a transmitting state, the scatter plates or reflection plates being located at different depth positions as viewed from the observer; a plurality of projection type two-dimensional displays for projecting two-dimensional images onto the plurality of scatter plates or the plurality of reflection plates; and a plurality of shutters disposed between the plurality of scatter plates or reflection plates and the plurality of projection type two-dimensional displays, the plurality of shutters being adapted to switch between a transmitting state and a cutoff state in synchronism with the switching between the transmitting state and the scattering state of the plurality of scatter plates or between the reflecting state and the transmitting state of the plurality of reflection plates.

According to the invention, a lens optical system may be disposed between the observer and the plurality of image planes located at different depth positions as seen from the observer.

According to the invention, the second means may comprise a two-dimensional display, an optical system, and a varifocal mirror.

According to the invention, the second means may comprise: a vibration screen which vibrates in the direction of depth; an optical system including a lens; a scanning means for raster-scanning a laser beam; and a laser beam source.

According to the invention, the second means may comprise: an LED display having an LED array; a parallel advancing/rotating device for parallelly advancing/rotating the LED display; and a video feeding device for feeding a video signal to the LED display.

According to the invention, the second means may comprise: a film having a two-dimensional image recorded therein or two-dimensional display; an image transforming optical system having a prism or mirror; and a projection drum.

According to the invention, the second means may successively switch the two-dimensional images generated by the first means to generate a moving three-dimensional image.

According to the invention, when the two-dimensional images generated by the first means include a plurality of images of an object moving in a direction of depth and the object is moving toward the observer, the third means may progressively raise the brightness levels of the object images displayed on the plurality of image planes toward an image plane close to the observer and progressively lower the brightness levels of the object images toward an image plane remote from the observer in synchronism with the successive switching of the two-dimensional images by the second means, and when the object is moving away from the observer, the third means may progressively lower the brightness levels of the object images displayed on the plurality of image planes toward an image plane close to the observer and progressively raise the brightness levels of the object images toward an image plane remote from the observer in synchronism with the successive switching of the two-dimensional images by the second means.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

The present patent application claims the priority from Japanese Patent Application Nos. 139602/1998, 262804/1998, 280739/1998, 304374/1998, 326931/1998 and 60,393/1999 filed with the Japanese Patent Office. The Japanese Patent Application No. 326931/1998 has followed the necessary procedure in claiming the priority in Japan from the Japanese Patent Application No. 139602/1998.

Therefore, embodiments described in this specification use, at paragraphs that contain the same descriptions of the above patent applications, the corresponding paragraph numbers used in these applications. The paragraph numbers used in this specification are assigned with symbols as shown in a table below to distinguish between the applications. It should also be noted that descriptions under the assigned paragraph numbers use different drawing numbers and reference numbers from those of the above patent applications in order to make them distinguishable.

TABLE 1

| Symbol | Application number |
|---|---|
| A | 326931/1998 (including 139602/1998) |
| B | 262804/1998 |
| C | 280739/1998 |
| D | 304374/1998 |

TABLE 1-continued

| Symbol | Application number |
|---|---|
| E | 60393/1999 |
| F | New matters |

Now, by referring to the accompanying drawings, embodiments of the present invention will be described in detail.

Throughout the drawings, parts having the same functions are assigned like reference numbers and their explanations are not repeated.

In the description of the embodiments, a word "plane" on which to put an image is used. This is similar in meaning to an image plane that is often used in optics. Means to realize such an image plane can obviously be realized by combining many optical devices, which include a variety of optical elements, such as lens, total reflecting mirror, partial reflecting mirror, curved mirror, prism, polarizer and wavelength plate, and two-dimensional displays, such as CRT (cathode ray tube), liquid crystal display, LED (light emitting diode) display, plasma display, FED (field emission display), DMD (digital mirror display), projection type display and line drawing type display.

Although this specification deals mainly with a case where a three-dimensional object is represented as two-dimensional images displayed on two planes, it is obvious that the similar effect can be expected when two or more planes are used.

[A-0012]

[Embodiment 1]

Figure 3:
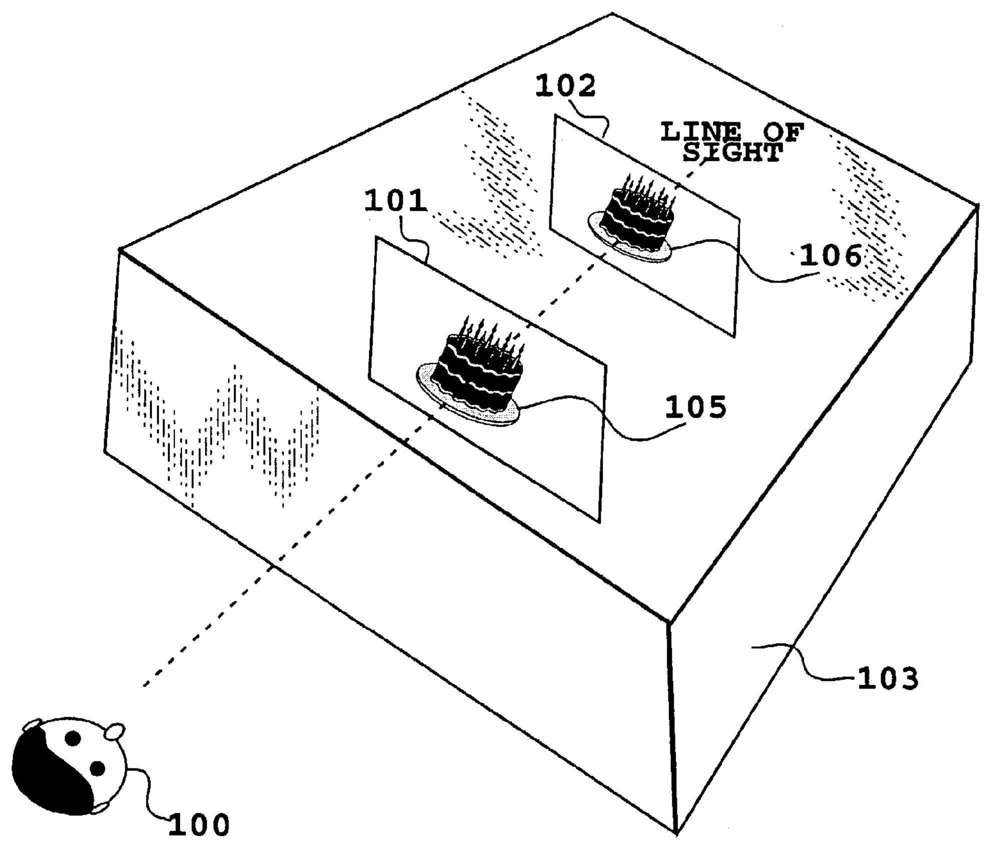
FIG. 3 is a schematic diagram showing the principle of a three-dimensional display according to a first embodiment of the present invention.
Figure 10A:
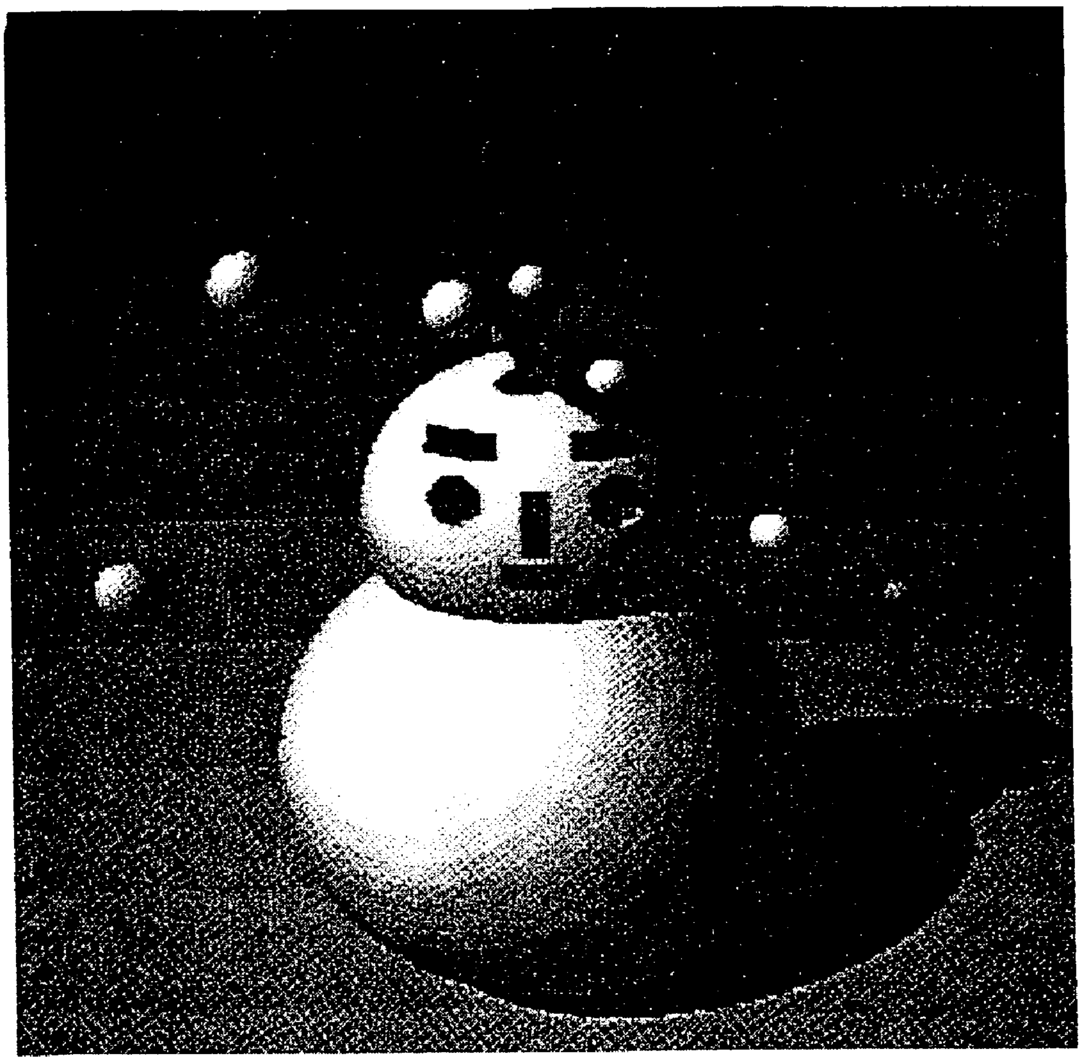
FIGS. 10A and 10B are schematic diagrams showing the principle of a three-dimensional display according to the first embodiment.
Figure 10B:
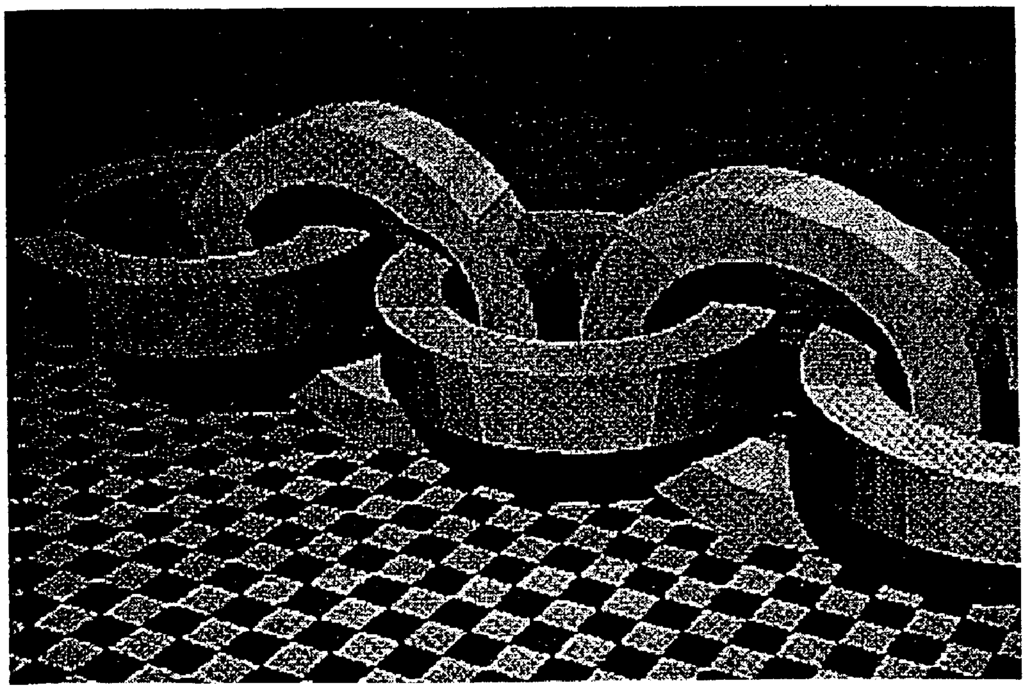

FIG. 3 and FIGS. 10A and 10B are schematic views for explaining the principle of a three-dimensional display according to a first embodiment of the present invention.

As shown in FIG. 3, a plurality of planes, such as planes 101, 102 (plane 101 is closer to the observer 100 than plane 102) are provided in front of an observer 100. To display a plurality of two-dimensional images on these planes an optical system 103 is constructed by using two-dimensional displays and a variety of optical elements (details will be given later).

Examples of the two-dimensional displays may include CRT, liquid crystal display, LED display, plasma display, FED display, projection type display and line drawing type display, and examples of the optical elements may include lens, total reflecting mirror, partial reflecting mirror, curved mirror, prism, polarizer and wavelength plate.

Figure 4:
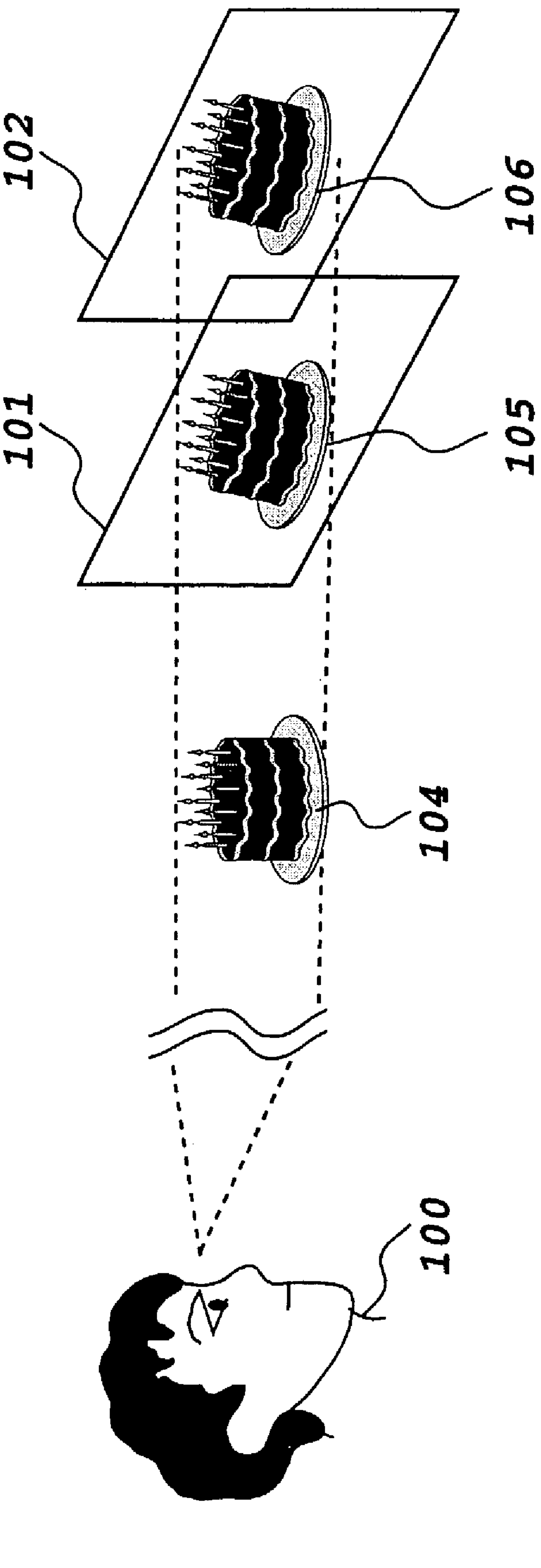
FIG. 4 is a schematic diagram showing the principle of a three-dimensional display according to the first embodiment.

Then, as shown in FIG. 4, a three-dimensional object 104, which is to be presented to the observer 100, is projected onto the planes 101, 102 to generate images 105, 106 (hereinafter referred to as two-dimensional images).

The two-dimensional images can be formed by a variety of ways, which include a technique that uses two-dimensional images formed by photographing the object 104 by camera along the line of sight; a technique that synthesizes a plurality of two-dimensional images shot from different directions; or synthesizing and modeling techniques based on computer graphics.

As shown in FIG. 3, these two-dimensional images 105, 106 are displayed on the planes 101, 102 respectively so that they overlap each other by viewing from one point on the line of which passes through the right and left eyes of the observer 100.

This can be achieved by placing the centers or gravity centers of the two-dimensional images 105, 106 and by controlling a ratio of enlargement/reduction of each image.

[A-0013]

An important point of this embodiment is that, in the apparatus with the above configuration, the brightness of each of the images 105, 106 is changed according to the depth position of the three-dimensional object 104 while keeping constant the overall brightness as seen by the observer 100.

One example method of changing the brightness is explained as follows.

Figure 5:
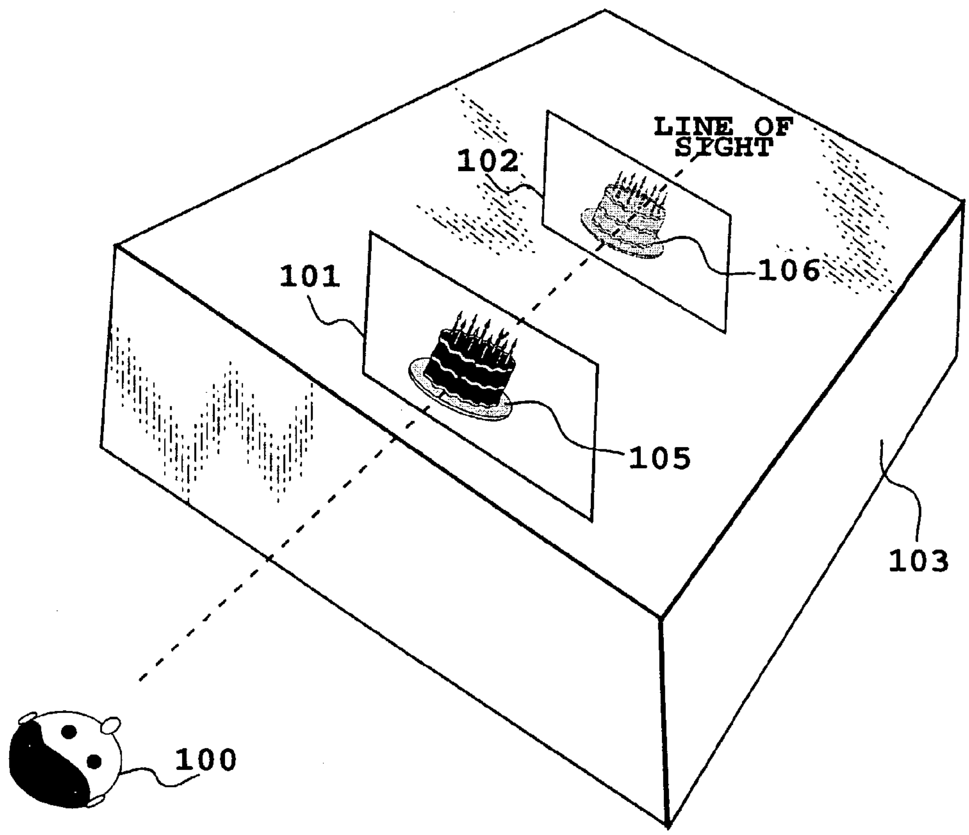
FIG. 5 is a schematic diagram showing the principle of a three-dimensional display according to the first embodiment.

Here, since the drawings are monochrome, in following drawings, a part having high value in brightness is shown with high density except for FIGS. 10A and 10B When for example the three-dimensional object 104 is on the plane 101, the brightness of the two-dimensional image 105 on this plane is set equal to the brightness of the three-dimensional object 104 and the brightness of the two-dimensional image 106 is set to zero, as shown in FIG. 5.

Figure 6:
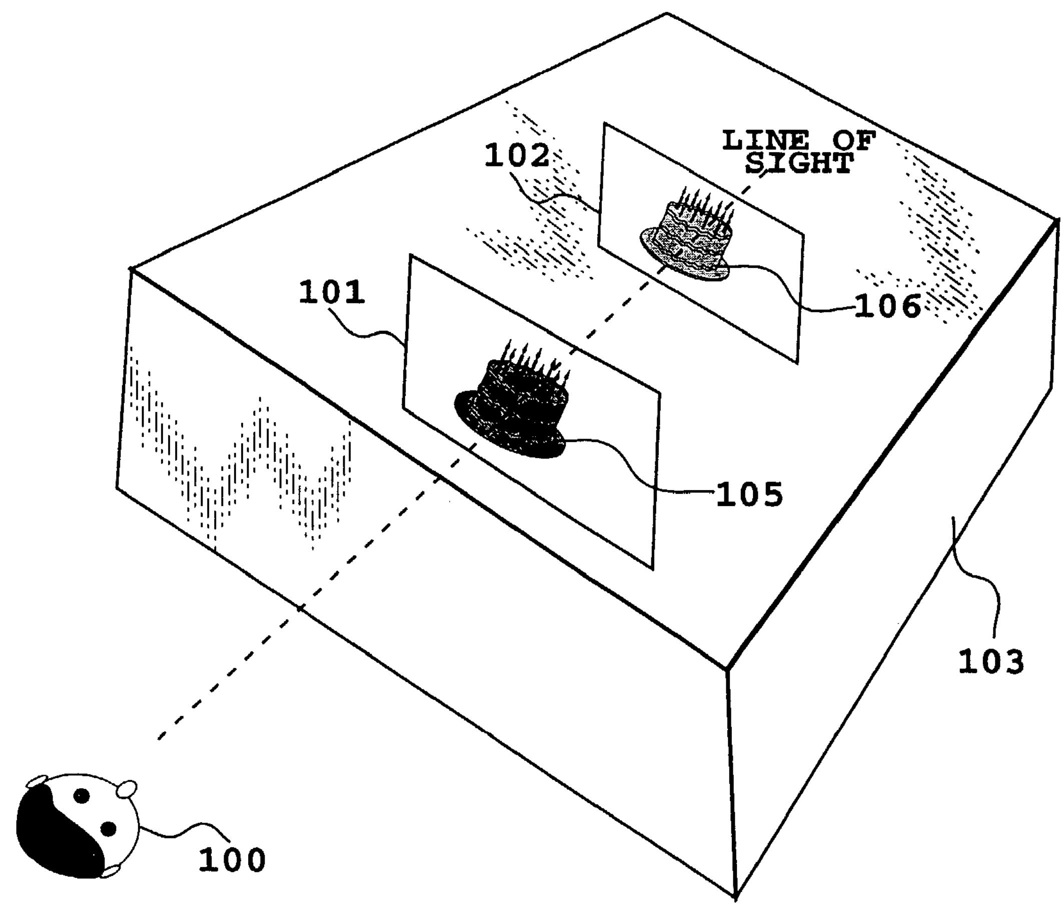
FIG. 6 is a schematic diagram showing the principle of a three-dimensional display according to the first embodiment.

Next, when for example the three-dimensional object 104 is slightly moved away from the observer 100 and is located at a position slightly away from the plane 101 and closer to the plane 102, the brightness of the two-dimensional image 105 is slightly lowered and the brightness of the two-dimensional image 106 is slightly raised, as shown in FIG. 6.

Figure 7:
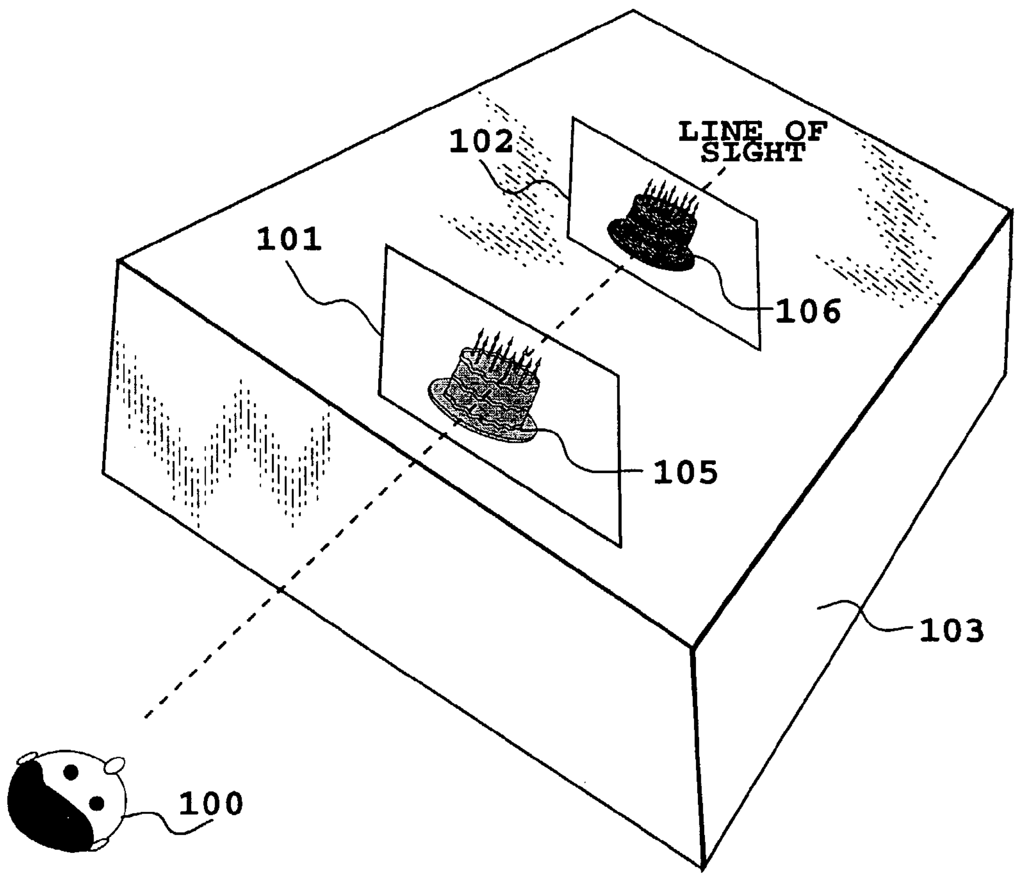
FIG. 7 is a schematic diagram showing the principle of a three-dimensional display according to the first embodiment.

When for example the object 104 is moved further away from the observer 100 and is located at a position further away from the plane 101 and closer to the plane 102, the brightness of the two-dimensional image 105 is further lowered and the brightness of the two-dimensional image 106 is further raised, as shown in FIG. 7.

Figure 8:
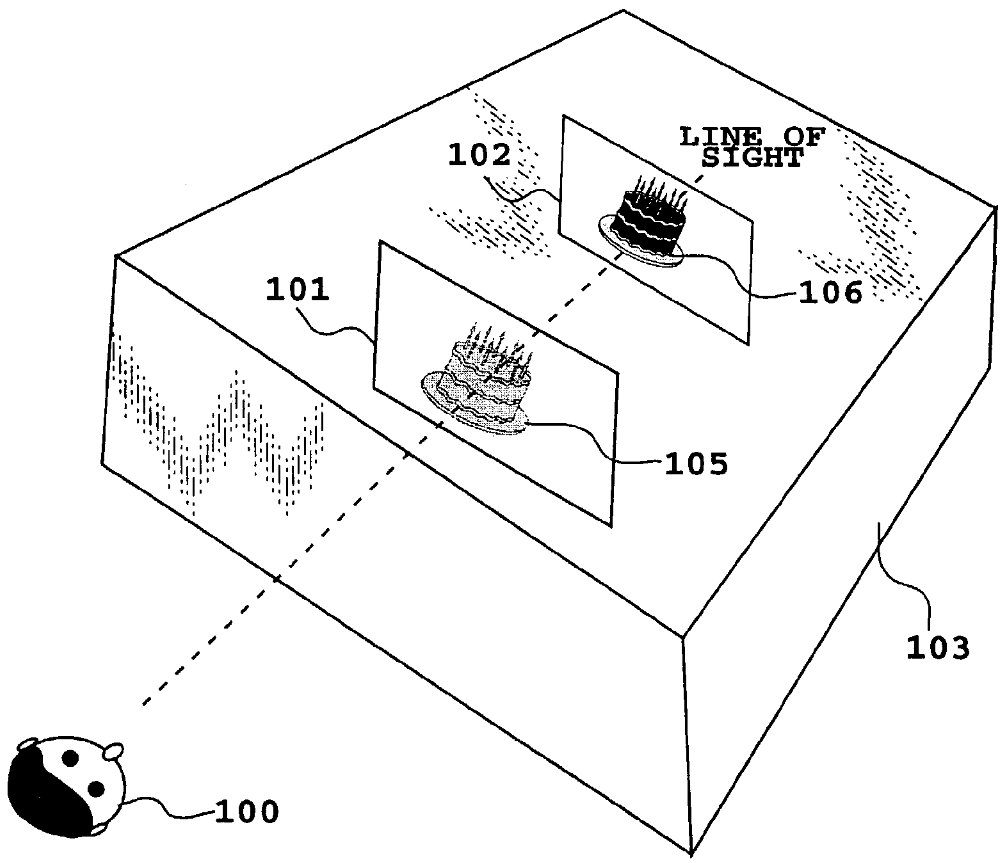
FIG. 8 is a schematic diagram showing the principle of a three-dimensional display according to the first embodiment.

When the object 104 is on the plane 102, the brightness of the two-dimensional image 106 is set equal to the brightness of the object 104 and the brightness of the two-dimensional image 105 is set to zero, as shown in FIG. 8.

By displaying in this manner, the observer 100 is made to feel as if the object 104 is located between the planes 101 and 102 because of observer's physiological or mental factors or optical illusion although what is actually shown to the observer is the two-dimensional images 105, 106.

That is, when for example the two-dimensional images 107, 108 with almost equal brightness are displayed on the planes 101 and 102, the object 104 looks as if it lies near to a middle point between the depth positions of the planes 101, 102.

[A-0014]

Although the above description mainly concerns a method and apparatus which represents the depth position of the entire three-dimensional object 104 by using two-dimensional images displayed on the planes 101, 102, for example, the first embodiment can apparently be used as a method and apparatus for showing the depth of a three-dimensional object itself.

One such example is described below.

First, the outline configuration of a three-dimensional display according to this embodiment is as shown in FIG. 3, in which a plurality of planes, for example planes 101, 102 (plane 101 is closer to an observer 100 than plane 102), are set in front of the observer 100 and in which an optical system 103 is constructed by using, for example, two-dimensional displays and a variety of optical elements to display a plurality of two-dimensional images on these planes (details will be given in third and subsequent embodiments).

Next, the three-dimensional object 104 to be presented to the observer 100 is shot in the direction of the line of sight of both eyes of the observer 100 to generate, for instance, two-dimensional images 105, 106.

These two-dimensional images 105, 106 are, as shown in FIG. 3, displayed on the planes 101 and 102 respectively such that they overlap each other by viewing from the point on the line of which passes through the right and left eyes of the observer.

This can be realized by placing the centers or gravity centers of the two-dimensional images 105, 106 and by controlling a ratio of enlargement/reduction of each image, as described earlier.

Position setting of each image and enlargement/reduction are executed by a computer connected with the two-dimensional display apparatus.

An important point of this embodiment is that, in the apparatus with the above configuration, the brightness of each part of each of the images 105, 106 is changed according to the depth position of each part of the object 104 while keeping constant the overall brightness as seen by the observer 100.

One example method of changing the brightness will be explained by referring to FIGS. 9A and 9B for a case where two display planes are used.

[A-0015]

Figure 9A:
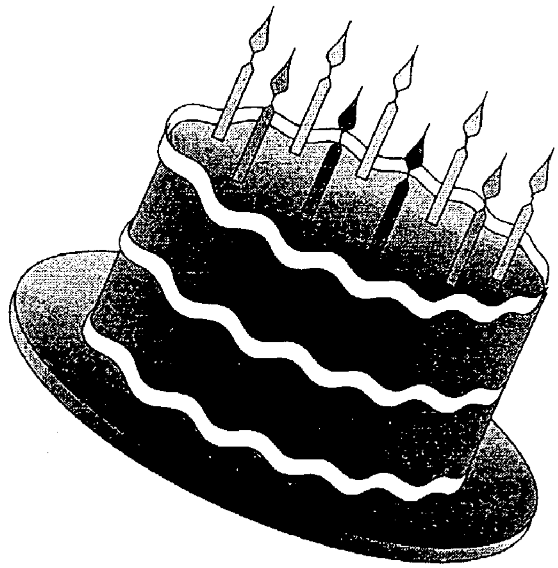
FIGS. 9A and 9B are schematic diagrams showing the principle of a three-dimensional display according to the first embodiment.
Figure 9B:

FIG. 9A represents an example image displayed on a plane close to the observer 100, for example, on the plane 101, and FIG. 9B represents an example image displayed on a plane remote from the observer 100, for example, on the plane 102.

Referring to FIGS. 9A and 9B that show a cake as an object, upper and lower surfaces of the cake (object) are almost flat, except for the candles stuck on the top, the wall surface is cylindrical, and the candles are arranged near the circumference of the upper surface of the cake.

In the two-dimensional images 105, 106 in this case, on the upper and lower surfaces the upper parts represent the remote parts of the cake. On the wall surface, the central part of the wall surface corresponds to the near side of the cake, and as you go from the center toward the left and right, the surface position moves toward the far side. And the central part of the hidden wall surface, which is shown higher than the front wall surface, is located on the far side.

In this case, the brightness on the upper and lower surfaces is progressively changed according to the depth position so that, as shown in FIG. 9A, on a plane close to the observer 100, or the plane 101, a portion close to the observer 100 (a lower part of the two-dimensional image) has a higher brightness level and a portion remote from the observer (an upper part of the two-dimensional image) has a lower brightness level.

Further, on a plane remote from the observer, or the plane 102, the brightness is progressively changed according to the depth position so that, as shown in FIG. 9B, a portion close to the observer (a lower part of the two-dimensional image) has a lower brightness level and a portion remote from the observer (an upper part of the two-dimensional image) has a higher brightness level.

Next, the brightness of the cylindrical portion is also changed progressively according to its depth position so that, on a plane close to the observer 100, or the plane 101, a portion close to the observer 100 (around the center) has a higher brightness level and a portion remote from the observer (the near left and right end) has a lower brightness level, as shown in FIG. 9A.

On a plane remote from the observer 100, or the plane 102, the brightness is changed progressively so that, as shown in FIG. 9B, a portion close to the observer 100 (around the center) has a lower brightness level and a portion remote from the observer (the near left and right end) has a higher brightness level.

By displaying in this manner, the observer 100 is made to feel as if there is a cylindrical cake with almost flat top and bottom surfaces because of observer's physiological or mental factors or optical illusion although what is actually shown to the observer is two-dimensional images.

Although this embodiment has taken as an example a cylindrical object with almost flat top and bottom surfaces, it is apparent that the similar effect can be obtained if the object has other shapes.

[A-0016]

In the embodiment 1, we have explained a case where the brightness of the two-dimensional images displayed on two or more planes are changed while keeping the overall brightness as seen by the observer 100 constant.

However, progressively lowering the overall brightness as seen by the observer 100 toward the rear to emphasize the solidity of the object is a common used technique in computer graphics. It is obvious that the use of this technique also in this invention can promote the effect of the invention. One such example is shown in FIGS. 10A and 10B.

In FIG. 10A, the brightness of the floor is gradually lowered toward the upper part of the Figure to make one feel as if the floor shown at the upper part of the Figure lies remote from the viewer in the depth direction.

In FIG. 10B, the brightness of a chain (circular objects), in addition to the floor, is also lowered progressively toward the left to produce an effect that makes one perceive that the chain on the left side is far in the depth direction.

As the means for calculating the degree of such brightness reduction, there are many methods available, including a method that uses a formula $B'=B\times T0/T$ (T: distance from a viewing point, T0: distance from a viewing point to a reference plane) in calculating the brightness B' that produces the above effect with respect to the object's brightness B.

[A-0017]

It is apparent that the two-dimensional image plane in the embodiment 1 does not have to be a flat plane and can take other forms such as spherical, ellipsoidal or quadratic surfaces, or other complex curved surfaces and produce the similar effect.

Figure 1:
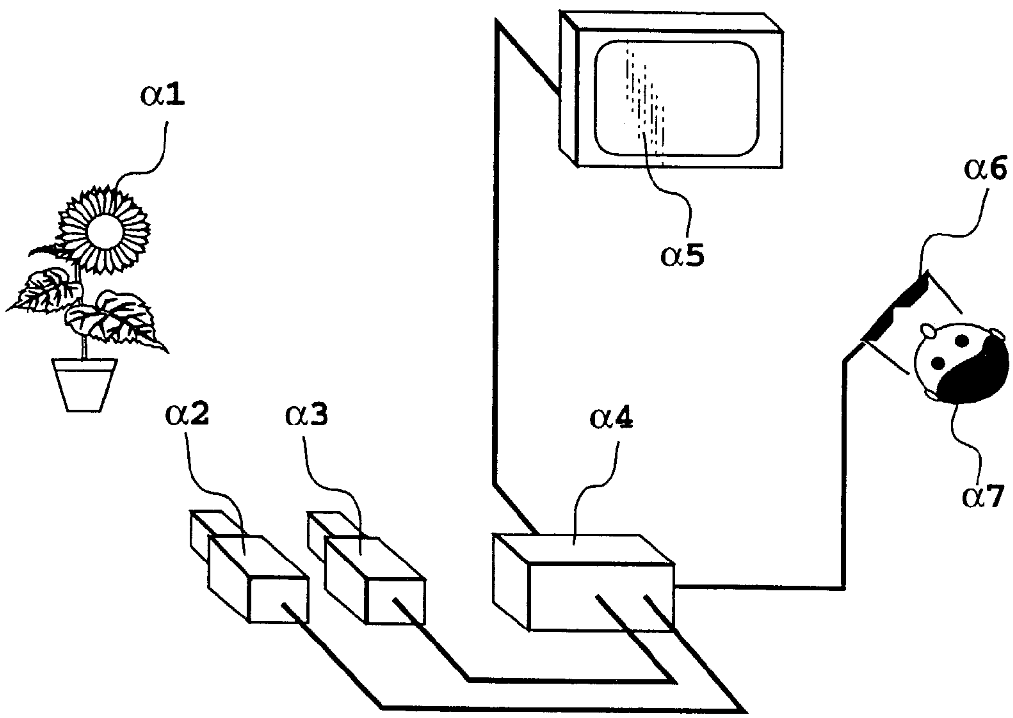
FIG. 1 is a schematic configuration of a conventional three-dimensional display.

In the embodiment 1, because, unlike the conventional method shown in FIG. 1, there are at least two image display planes on the near and far sides of the optical illusion position, contradictions among the binocular parallax, convergence and focusing—the problem experienced with the conventional method—can be suppressed greatly, which in turn is expected to reduce eyestrains.

Since the focus position is fixed at a position where the viewer looks at two or more planes at the same time, the problem of the conventional method is improved greatly.

In this case, it is necessary to determine the depth distances of a plurality of the planes, the depth distances being within the range wherein blurring of the images obtained when the focus point is adjusted at the position of the object to be displayed on the depth direction by viewing from the observer is less is less than one obtained when the focus points are adjusted at the plurality of the planes.

Figure 2A:
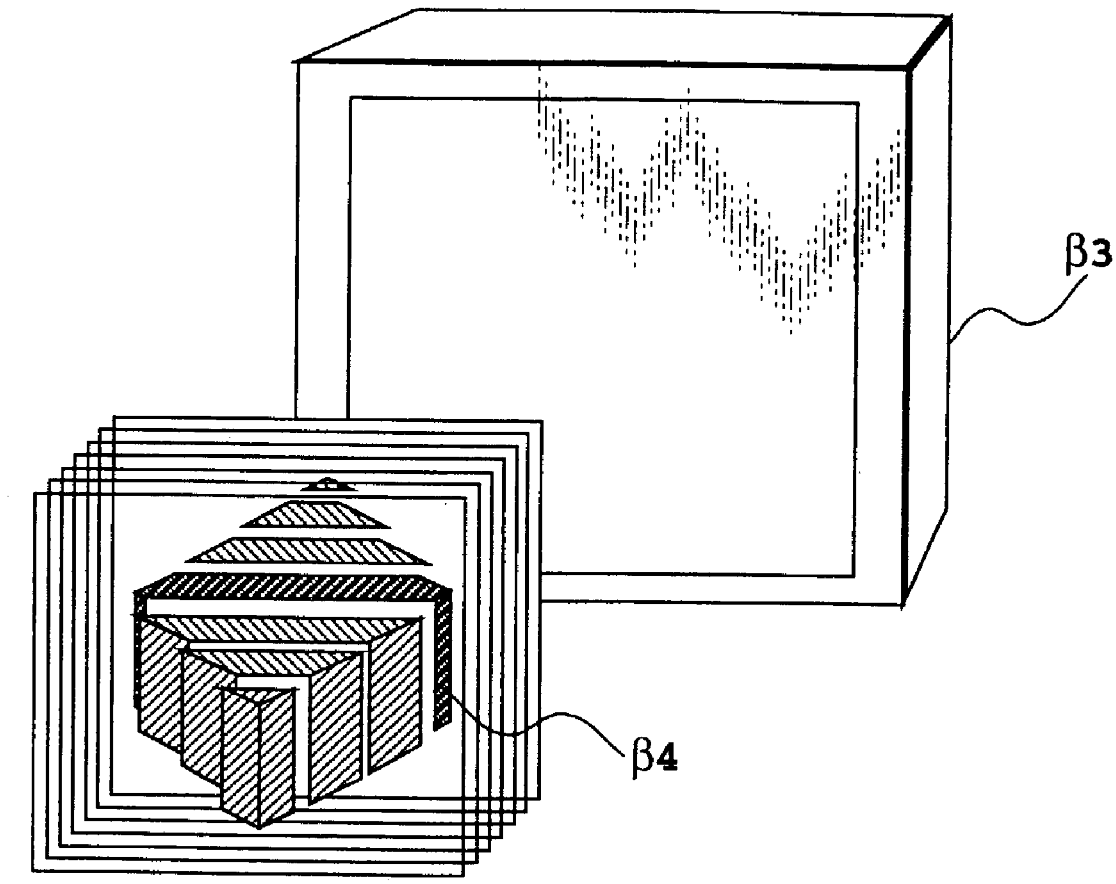
FIGS. 2A and 2B are schematic configurations of another conventional three-dimensional display.
Figure 2B:
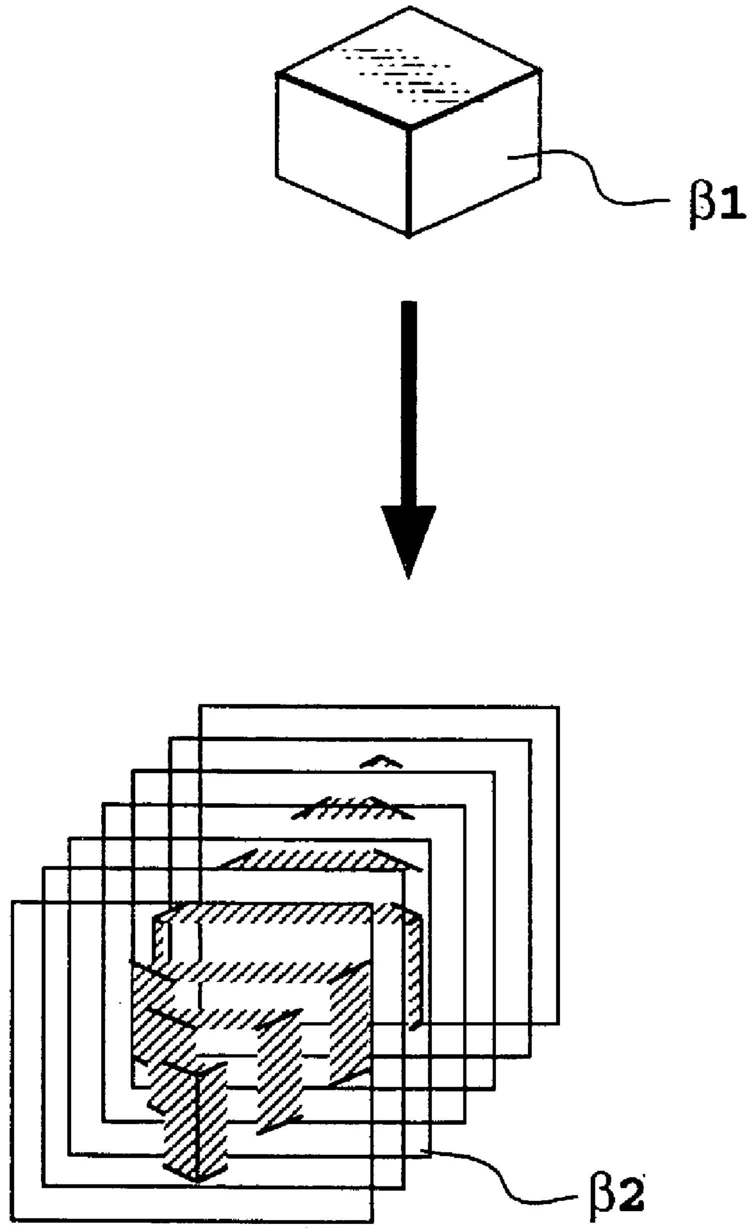

Further, unlike the conventional method shown in FIG. 2, an object that exists at an intermediate position between the image planes, too, looks three-dimensional to the viewer and therefore the system of this embodiment offers the advantage of realistic solidity, not the kind of solidity presented by gathering sheet-divided depths.

Further, because the embodiment 1 can also show an object present between a plurality of planes, it offers the advantage of being able to reduce the amount of data greatly when performing a three-dimensional display.

Further, because the embodiment 1 takes advantage of human physiological or mental factors or optical illusion based only on brightness changes of images, the embodiment does not require the use of a coherent light source such as a laser and facilitates the color stereoscopic image representation.

Further, since this invention does not include mechanical driving parts, it can suitably reduce the weight of and improve the reliability of the apparatus.

The embodiment 1 mainly concerns a case where there are only two planes for displaying two-dimensional images and where an object to be presented to the observer lies between the two planes. It is, however, apparent that the similar configuration can be employed if there are more planes or the object to be presented is located at a different position.

Further, in this embodiment, it is also apparent that a three-dimensional video image can be displayed by successively changing two-dimensional images.

[N]

When the described two-dimensional images are displayed to overlap by viewing from one point on the line which passes through the right and left eyes of the observer, in the case that especially, the one point between the right and left eyes of the observer is used as the point on the line which passes through the right and left eyes of the observer, reliability for obtaining an effect of three-dimensional consciousness is become bigger.

If it says simply, the above effect is obtained in many people or in many cases.

Further, the center point between the right and left eyes of the observer is used as the above one point, it is easy to obtain the above effect and has a merit that a size of double images in the right and left eyes generated by planes O1 and O2 becomes smaller.

It is useful for change a depth or an inclination of the object to be recognized by enlarging or reducing the size of a horizontal direction.

However, variety of the brightness in the two-dimensional images having same colors is described, when a color of the object to be displayed is purple, the object is made by using (mixing) a red display of one plane and a blue display of another plane, the brightness of the two planes being deferent.

This is useful for matching a back ground image with the object in view of color matching when the color of the outline of the object is different from the color of the object itself though each displays provides strange feeling.

For the purpose to obtain the above effect, it is important to have a common area of depth of the distance between planes displaying the above two-dimensional images, the common area being within the range in case that the object is viewed by single eye at the position of the right eye or the left eye.

If there is not common area the obserber feels the object far from the planes.

[A-0018]

[Embodiment 2]

FIGS. 11 to 16 illustrate the principle of a three-dimensional display according to a second embodiment of the present invention.

Figure 11:
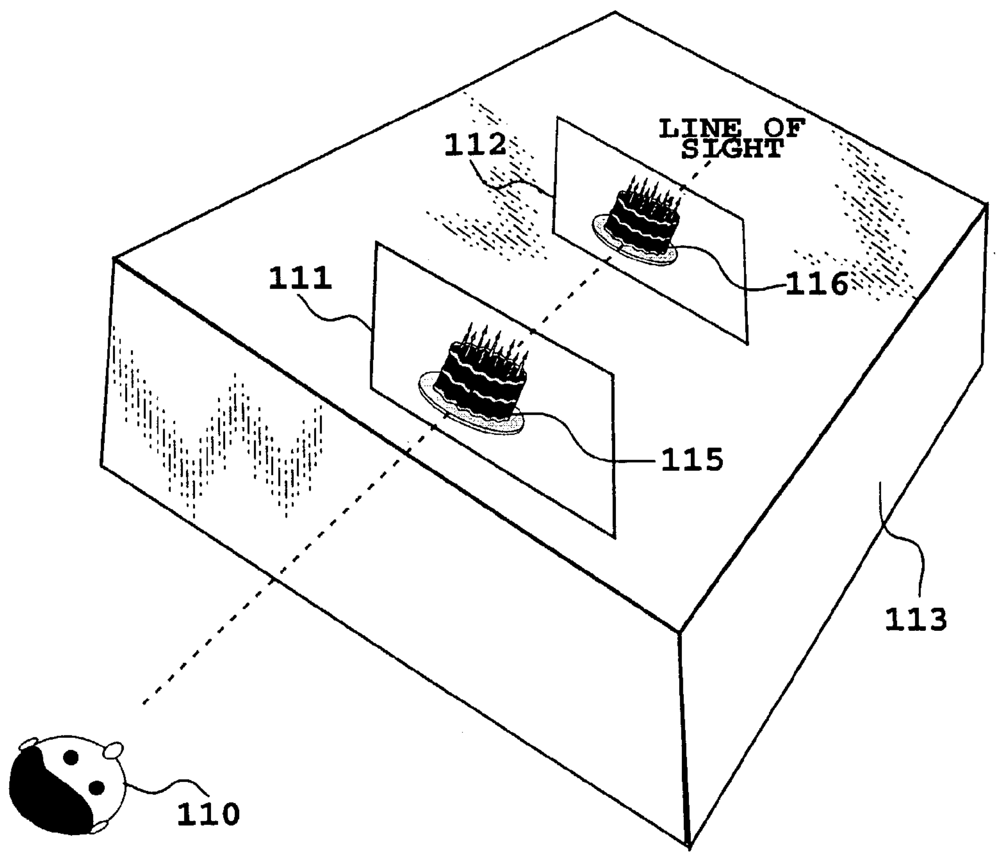
FIG. 11 is a schematic diagram showing the principle of a three-dimensional display according to a second embodiment.

In the three-dimensional display of the second embodiment, as shown in FIG. 11, a plurality of planes, such as planes 111 and 112 (plane 111 is closer to an observer 110 than plane 112), are installed in front of the observer 110 and, to display a plurality of two-dimensional images on these planes, an optical system 113 is constructed by using two-dimensional displays and various optical elements.

Among the possible two-dimensional displays there are CRT, liquid crystal display, LED display, plasma display, FED display, projection type display and line drawing type display. Examples of the optical elements may include lens, total reflecting mirror, partial reflecting mirror, curved mirror, prism, polarizer and wavelength plate.

Figure 12:
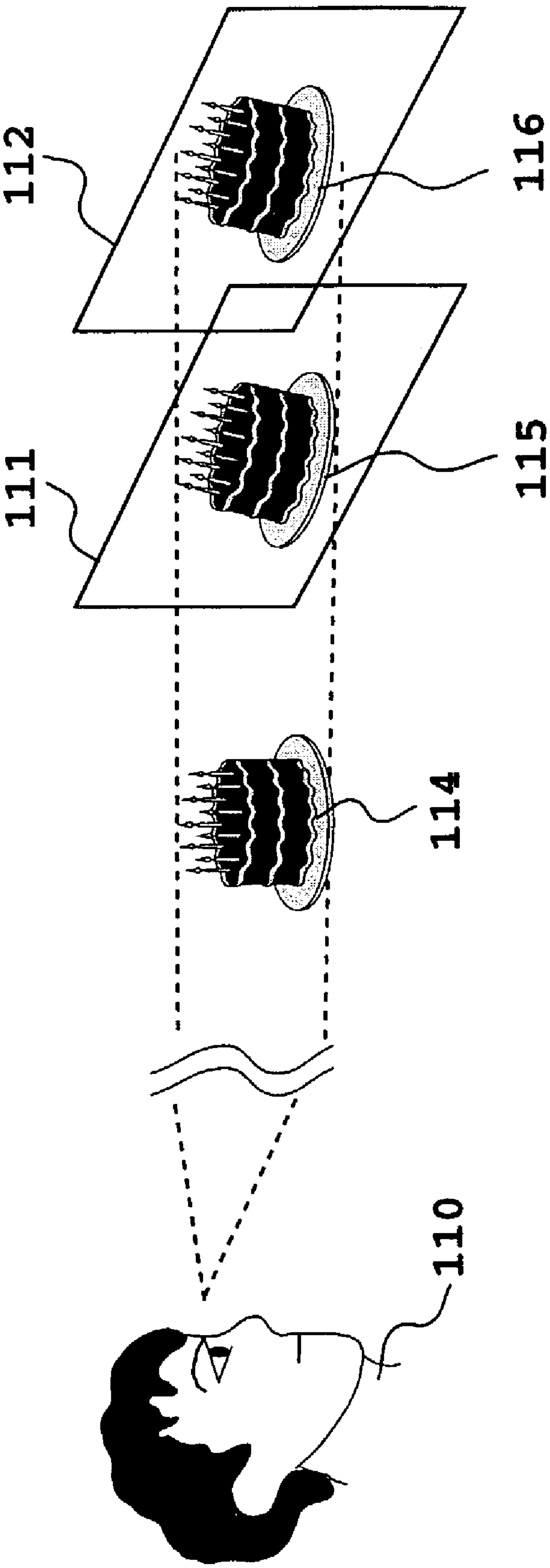
FIG. 12 is a schematic diagram showing the principle of a three-dimensional display according to the second embodiment.

Then, as shown in FIG. 12, a three-dimensional object 114, which is to be presented to the observer 110, is projected onto the planes 111, 112 to generate images 115, 116 (two-dimensional images).

The two-dimensional images 115, 116 can be formed by a variety of ways, which include a technique that uses two-dimensional images formed by photographing the object 114 by camera along the line of sight; a technique that synthesizes a plurality of two-dimensional images shot from different directions; or synthesizing and modeling techniques based on computer graphics.

[A-0019]

As shown in FIG. 11, the two-dimensional images 115, 116 are displayed on the planes 111 and 112 respectively so that they overlap each other on the line of sight of the observer (this can be achieved by locating the centers or gravity centers of the two-dimensional images 115, 116 on the line of sight).

An important point of this embodiment is that the brightness of each image 115, 116 is changed according to a change over time of the depth position of the three-dimensional object 114 while keeping constant the overall brightness as seen by the observer 110.

This is explained by taking an example case where the three-dimensional object 114 moves from the plane 111 to the plane 112 with elapse of time.

Figure 13:
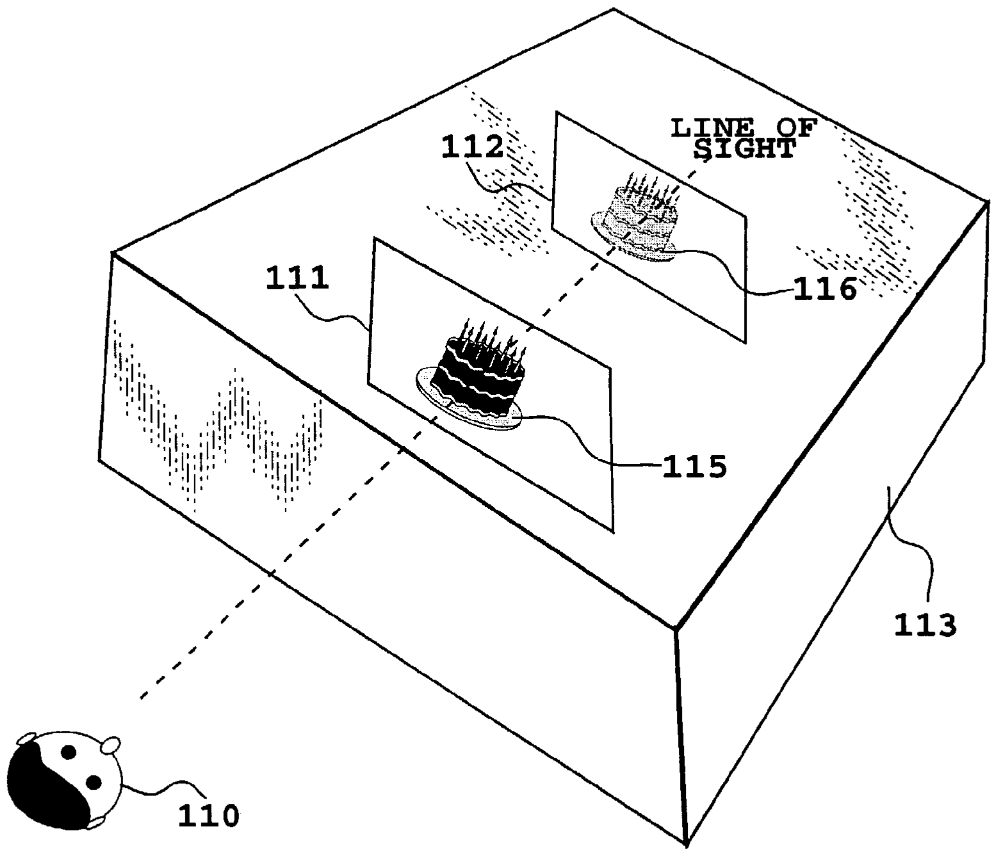
FIG. 13 is a schematic diagram showing the principle of a three-dimensional display according to the second embodiment.

As shown in FIG. 13, when the three-dimensional object 114 is on the plane 111, the brightness of the two-dimensional image 115 on the plane 111 is set equal to that of the three-dimensional object 114 and the brightness of the two-dimensional image 116 on the plane 112 is set to zero.

Figure 14:
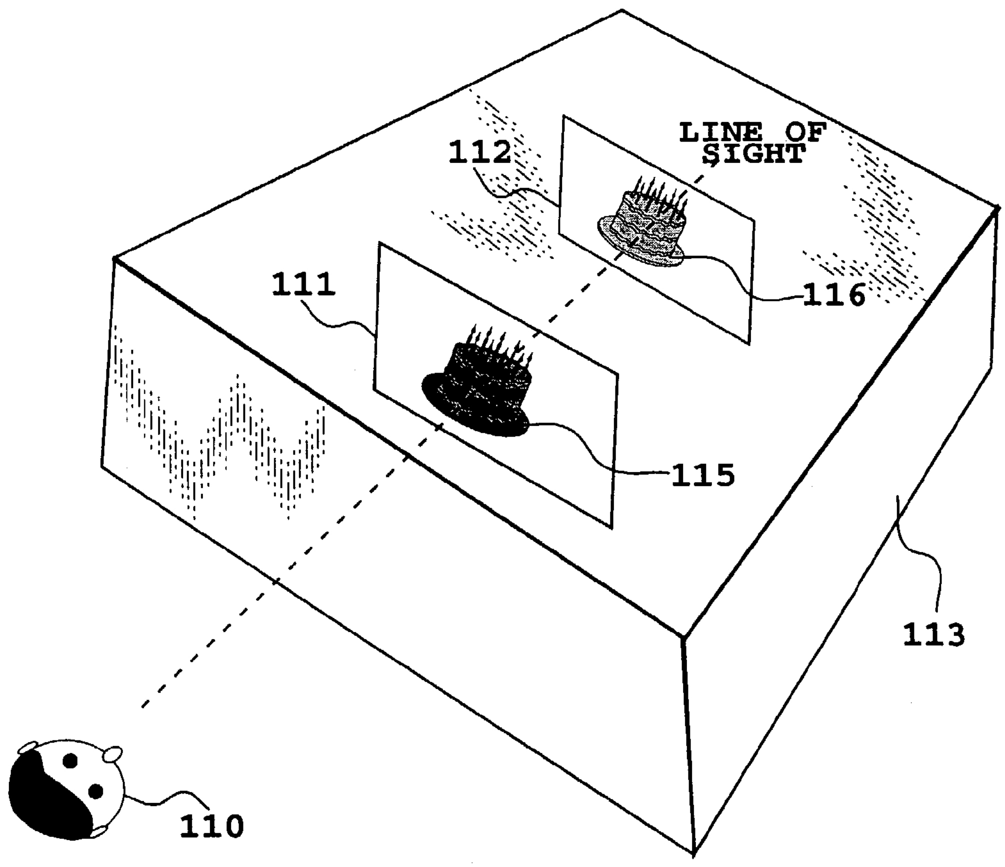
FIG. 14 is a schematic diagram showing the principle of a three-dimensional display according to the second embodiment.

Next, as shown in FIG. 14, when the three-dimensional object 114 progressively moves slightly away from the observer 110 and inches from the plane 111 toward the plane 112 over time, the brightness of the two-dimensional image 115 is lowered slightly over time according to the movement in the depth position of the three-dimensional object 114 and at the same time the brightness of the two-dimensional image 116 is slightly raised over time.

Figure 15:
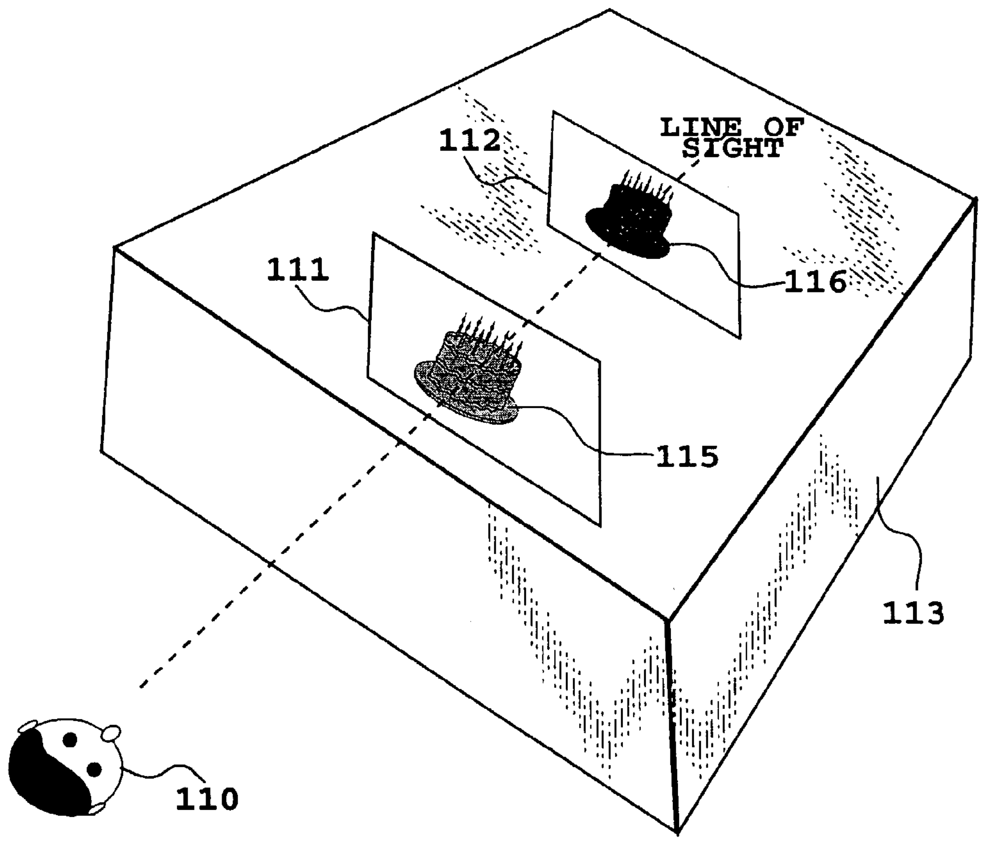
FIG. 15 is a schematic diagram showing the principle of a three-dimensional display according to the second embodiment.

Next, as shown in FIG. 15, when the three-dimensional object 114 moves further away from the observer 110 and inches from the plane 111 further toward the plane 112 over time, the brightness of the two-dimensional image 115 is lowered further over time according to the movement in the depth position of the three-dimensional object 114 and at the same time the brightness of the two-dimensional image 116 is raised further over time.

Figure 16:
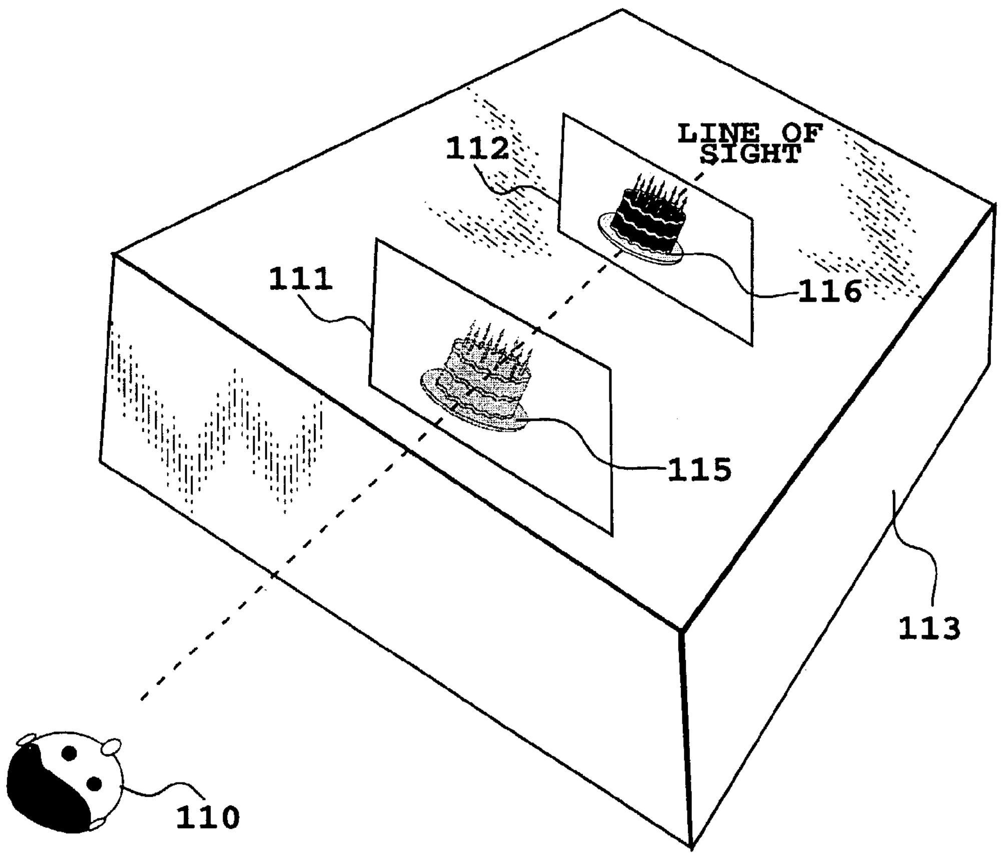
FIG. 16 is a schematic diagram showing the principle of a three-dimensional display according to the second embodiment.

When, as shown in FIG. 16, the three-dimensional object 114 finally reaches the plane 112 over time, the brightness of the two-dimensional image 116 on the plane 112 is changed over time until it becomes equal to the brightness of the three-dimensional object 114 according to the movement in the depth position of the three-dimensional object 114 and at the same time the brightness of the two-dimensional image 115 on the plane 111 is changed over time until it becomes zero.

[A-0021]

By displaying in this manner, the observer 110 is made to feel as if the three-dimensional object 114 moves over time from the plane 111 to the plane 112 in the direction of depth because of observer's physiological or mental factors or optical illusion although what is actually shown to the observer is two-dimensional images 115, 116.

While this embodiment describes a case where the three-dimensional object 114 moves over time from the plane 111 to the plane 112, it is obvious that the similar display effect can also be produced in cases where the object moves from an intermediate depth position between the planes 111 and 112 to the plane 112, where it moves from the plane 111 to an intermediate depth position between the planes 111 and 112, and where it moves from an intermediate position between the planes 111 and 112 to another intermediate position between the planes 111 and 112.

Although this embodiment has described a case where there are only two planes on which to place two-dimensional images and the three-dimensional object 114 to be presented to the observer 110 moves between the two planes, it is obvious that the similar configuration can be employed and the similar effect expected even when the number of two-dimensional image display planes is more than two or when the three-dimensional object being presented moves crossing a plurality of planes.

Although this embodiment has described a case where one three-dimensional object 114 moves between two planes on which two-dimensional images are displayed, it is obvious that when a plurality of three-dimensional objects move, i.e., when the displayed two-dimensional images each include a plurality of object images moving in different directions, the brightness of the object images displayed on the respective display planes needs only to be changed according to the moving directions of the objects and the speeds of their movements.

[A-0022]

[Embodiment 3]

Figure 17A:
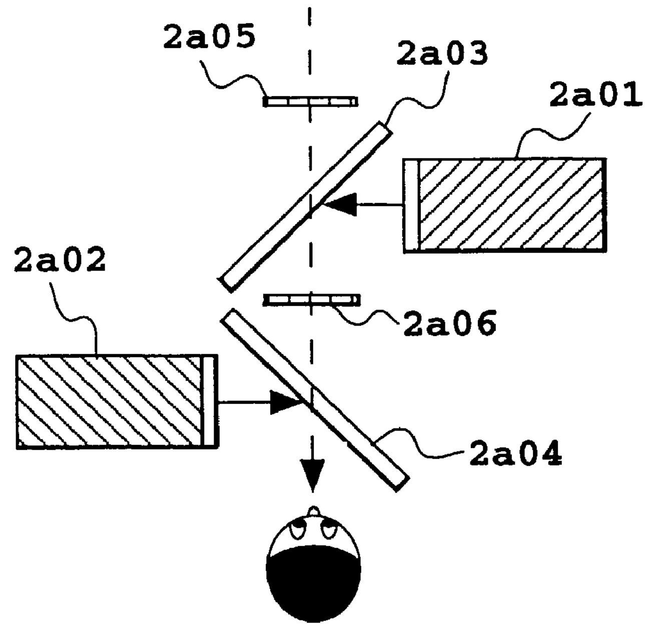
FIGS. 17A and 17B are schematic diagrams showing the outline configuration of a three-dimensional display according to a third embodiment of the invention.
Figure 17B:
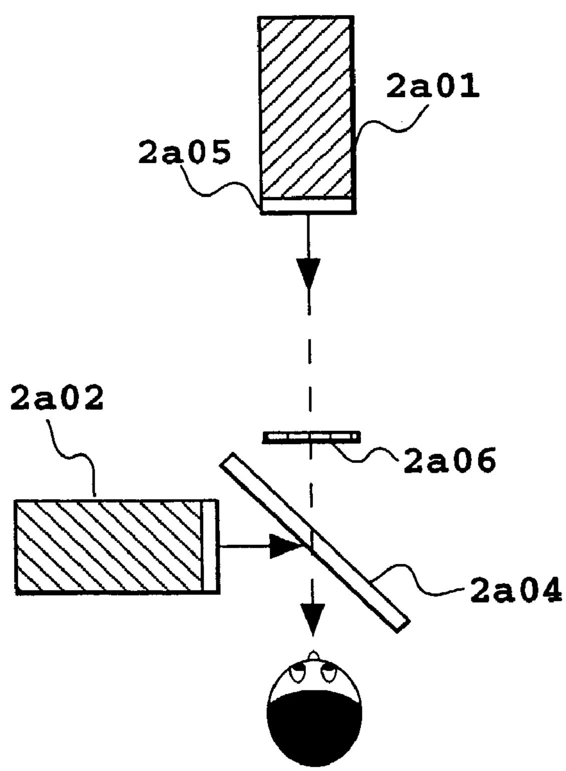

FIGS. 17A and 17B illustrate the outline configuration of a three-dimensional display according to a third embodiment of the invention.

In the three-dimensional display of the third embodiment, as shown in FIG. 17A, a plurality of two-dimensional displays **2*a*01, 2*a*02, a total reflecting mirror 2*a*03 (e.g., reflectivity/transmittivity=100/0) and a partial reflecting mirror 2*a*04** (e.g., reflectivity/transmittivity=50/50) are used to construct an optical system on which to place a plurality of two-dimensional images described in the previous first and second embodiments.

By changing the arrangements of these constitutional components, it is possible to place an image plane **2*a*05 and an image plane 2*a*06 at different positions in the direction of depth, the image plane 2*a*05 being formed by reflecting the displayed image of the two-dimensional display 2_a_01 by the total reflecting mirror 2_a_03 and passing it through the partial reflecting mirror 2_a_04, the image plane 2_a_06 being formed by reflecting the displayed image of the two-dimensional display 2_a_02 by the partial reflecting mirror 2_a_04**.

This optical system uses only mirrors and thus has the advantage of less degradation of picture quality.

The two-dimensional displays 2_a_01, 2_a_02 may use CRT, liquid crystal display, LED display, plasma display, FED display, DMD display, projection type display and line drawing type display.

It is obvious that the similar effect of this invention can be produced even when the total reflecting mirror 2_a_03 of this embodiment is replaced with a partial reflecting mirror, although this lowers the brightness of image of the two-dimensional display 2_a_01.

While this embodiment has described a case where the order of depth positions of image planes are equal to the order of depth positions of the two-dimensional displays, it is apparent that the order of depth positions of the image planes can be changed freely by changing the distances from the total reflecting mirror or partial reflecting mirror to the respective two-dimensional displays.

[A-0023]

As shown in FIG. 17B, an optical system for arranging a plurality of two-dimensional images described in the previous embodiments 1 and 2 can be constructed by directly arranging the two-dimensional display 2_a_01 without using the total reflecting mirror 2_a_03 and by using the partial reflecting mirror 2_a_04 (e.g., reflectivity/transmittivity=50/50).

That is, the image plane 2_a_05, which is formed by passing the displayed image of the two-dimensional display 2_a_01 through the partial reflecting mirror 2_a_04, and the image plane 2_a_06, which is formed by reflecting the displayed image of the two-dimensional display 2_a_02 by the partial reflecting mirror 2_a_04, can be located at different positions in the direction of depth.

[A-0024]

While this embodiment has described a case where the order of depth positions of the image planes is equal to the order of the depth positions of the two-dimensional displays, it is obvious that the order of the depth positions of the image planes can be changed freely by changing the distances from the partial reflecting mirror to the respective two-dimensional displays.

Figure 18A:
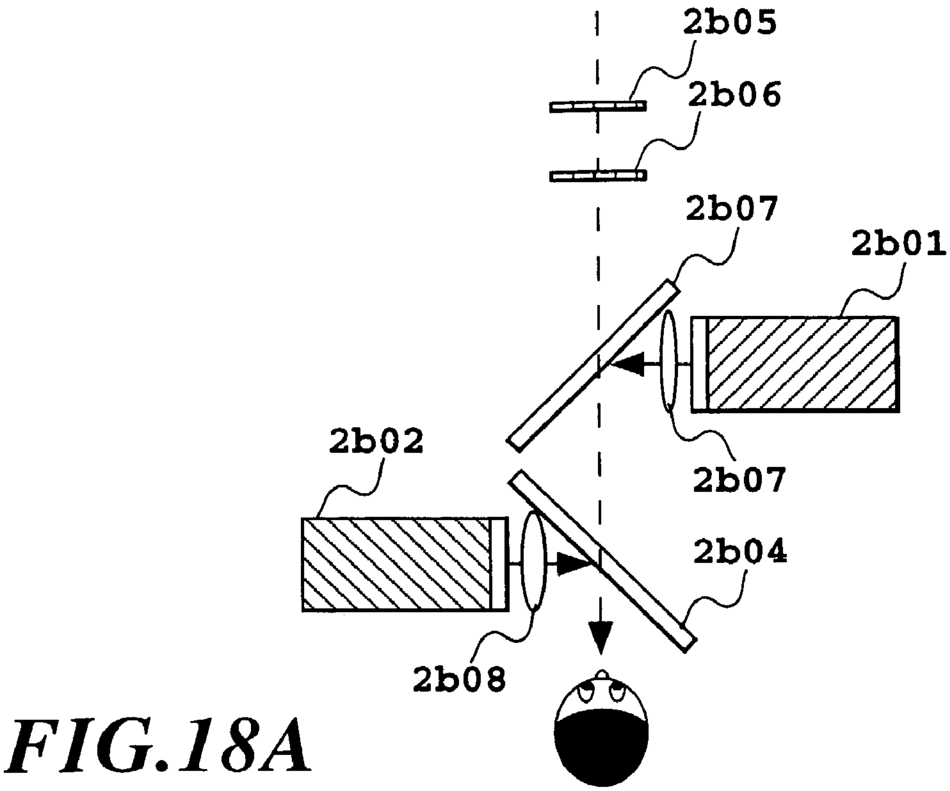
FIGS. 18A and 18B are schematic diagrams showing examples that allow flexible changes in the position of an image plane by incorporating a lens or the like in an optical system of the third embodiment.
Figure 18B:
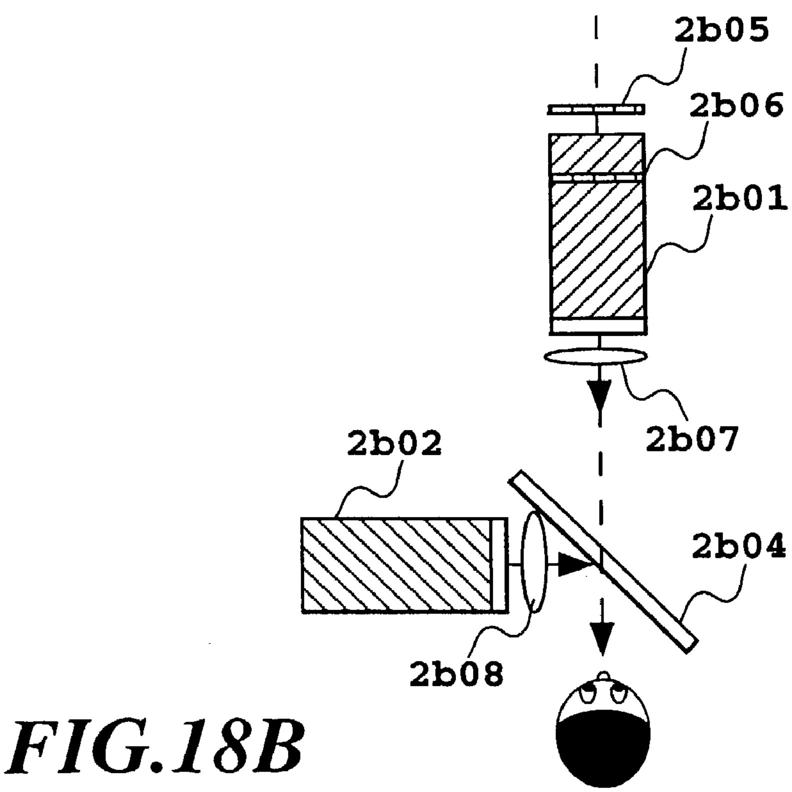

One example which can change the position of the image plane more flexibly by incorporating lens or the like in the optical system is shown in FIGS. 18A and 18B.

As shown in FIG. 18A, by adding convex lenses 2_b_07, 2_b_08 to the optical system, which comprises a plurality of two-dimensional displays 2_b_01, 2_b_02, a total reflecting mirror 2_b_03 (e.g., reflectivity/transmittivity=100/0) and a partial reflecting mirror 2_b_04 (e.g., reflectivity/transmittivity=50/50), in order to change the image position, it is seen that the positional relation between the image plane 2_b_05 and the image plane 2_b_06, which has been restricted by the size of the displays, can be more flexibly set.

It is obvious that the similar effect of this invention can be obtained even if the total reflecting mirror 2_b_03 of this embodiment is replaced with a partial reflecting mirror, although this lowers the brightness of an image of the two-dimensional display 2_b_01.

While in this embodiment we have described a case where the order of depth positions of image planes is equal to the order of depth positions of two-dimensional displays, it is obvious that the order of depth positions of image planes can be changed freely by changing the distances from the total reflecting mirror or partial reflecting mirror to the two-dimensional displays or by installing lens or the like in the optical system.

[A-0025]

Further, as shown in FIG. 8B, by adding convex lenses 2_b_07, 2_b_08 to the optical system, which includes the two-dimensional display 2_b_01 directly installed without using the total reflecting mirror 2_b_03 and also a partial reflecting mirror 2_b_04 (e.g., reflectivity/transmittivity=50/50), to change the image position, it is seen that the positional relation between the image plane 2_b_05 and the image plane 2_b_06, which has been restricted by the size of the displays, can be more flexibly set.

As in the ordinary lens system, it may of course be advantageous in terms of distortion to use a combination lens in addition to convex lenses.

Further, although this embodiment has shown a case where virtual images are used which are formed by installing the two-dimensional displays at positions within a lens focal length, it is obvious that the invention can also be applied to a case where real images are used which are formed by installing the two-dimensional displays at positions outside the lens focal length.

While this embodiment has described a case where the order of depth positions of image planes is equal to the order of depth positions of the two-dimensional displays, it is obvious that the order of depth positions of image planes can be changed freely by changing the distances from the partial reflecting mirror to the two-dimensional displays or installing lens or the like in the optical system.

[A-0026]

Figure 19:
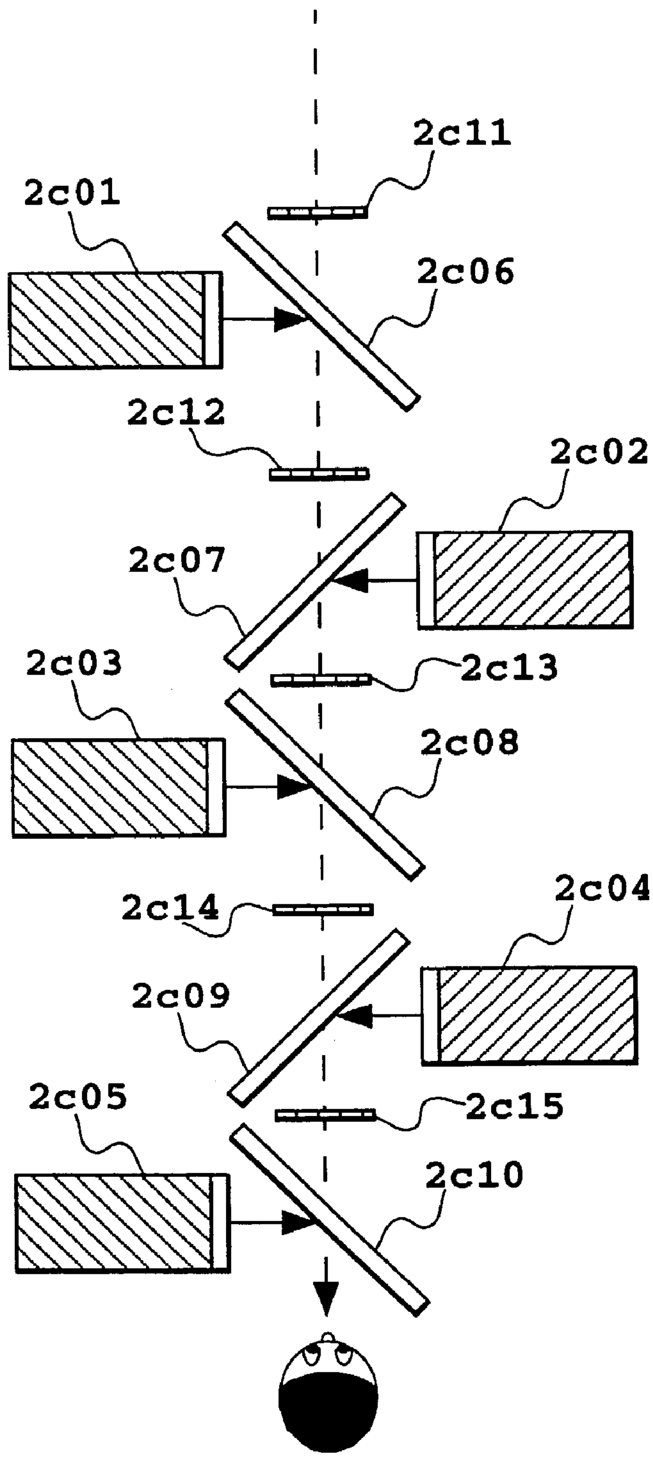
FIG. 19 is a schematic diagram showing an example in which there is an increased number of two-dimensional displays, according to the third embodiment.

FIG. 19 shows an example that uses an increased number of two-dimensional displays.

In this case, a plurality of two-dimensional displays 2_c_01, 2_c_02, 2_c_03, 2_c_04, 2_c_05, a total reflecting mirror 2_c_06 (e.g., reflectivity/transmittivity=100/0) and partial reflecting mirrors 2_c_07 (e.g., reflectivity/transmittivity=50/50), 2_c_08 (e.g., reflectivity/transmittivity=33.3/66.7), 2_c_09 (e.g., reflectivity/transmittivity=25/75), 2_c_10 (e.g., reflectivity/transmittivity=20/80) are used to construct an optical system to arrange a plurality of two-dimensional images.

By changing the arrangements of these constitutional components, it is possible to place an image plane 2_c_11 and image planes 2_c_12–2_c_15 at different positions in the direction of depth, the image plane 2_c_11 being formed by reflecting the displayed image of the two-dimensional display 2_c_01 by the total reflecting mirror 2_c_06 and passing it through the partial reflecting mirrors 2_c_07–2_c_10, the image planes 2_c_12–2_c_15 being formed by reflecting the displayed images of the two-dimensional displays 2_c_02–2_c_05 by the partial reflecting mirrors 2_c_07–2_c_10 and passing them through the partial reflecting mirrors.

This optical system uses only mirrors and thus has the advantage of less degradation of picture quality.

While this embodiment has described a case where there are five two-dimensional displays, it is apparent that the similar configuration can be adopted when a different number of two-dimensional displays are used.

In this case also, it is obvious that adding lens systems as shown in FIGS. 17 and 18 makes it easy to control the positions of image planes.

It is also obvious that replacing the total reflecting mirror 2_c_03 in this embodiment with a partial reflecting mirror will produce the similar effect to that of the invention, although this lowers the brightness of the image of the two-dimensional display 2c01.

While this embodiment has described a case where the order of depth positions of image planes are equal to the order of depth positions of the two-dimensional displays, it is apparent that the order of depth positions of the image planes can be changed freely by changing the distances from the total reflecting mirror or partial reflecting mirror to the respective two-dimensional displays.

[A-0027]

Figure 20:
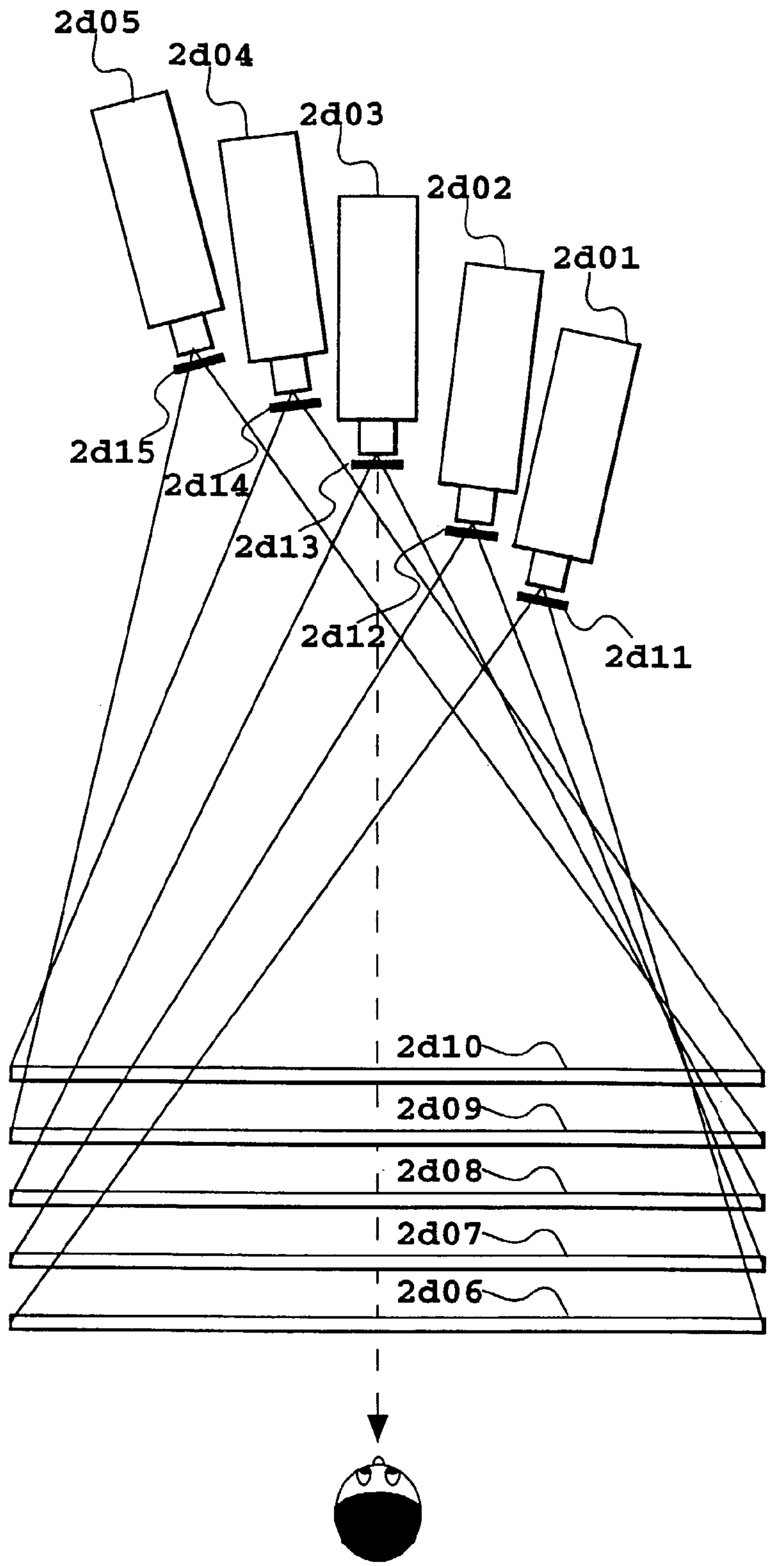
FIG. 20 is a schematic diagram showing an example which uses a plurality of projector type two-dimensional displays of the third embodiment and scatter plates to form an optical system that projects images from the projectors onto the scatter plates.

FIG. 20 shows one example of an optical system for arranging a plurality of two-dimensional images which is constructed by using a plurality of projection type two-dimensional displays (for example, CRT type, LCD type, ILV type and DMD type) 2d01, 2d02, 2d03, 2d04, 2d05 and scatter plates 2d06, 2d07, 2d08, 2d09, 2d10 and by projecting images from the projectors onto the scatter plates.

Here, the scatter plates 2d06–2d10 may be such devices as can control scattering/transmission or reflection/transmission, such as polymer dispersed liquid crystal devices, holographic polymer dispersed liquid crystal devices or combined devices of liquid crystal and multi-lens array. Shutters 2d11–2d15 may be such devices as can control transmission/interruption, such as twisted nematic liquid crystal devices, ferroelectric liquid crystal devices or mechanical shutter devices.

The scatter plates 2d06–2d10 are arranged at different depth positions, the focusing planes of the projector type two-dimensional displays 2d01–2d05 are aligned with these scatter plates 2d06–2d10, images are projected onto the scatter plates, and the scattering/transmission timing of the scatter plates 2d06–2d10 is synchronized with the transmission/interruption timing of the shutters 2d11–2d15 when activating the scatter plates and the shutters. This enables the depth positions of the image planes 2d11–2d15 formed on the scatter plates 2d06–2d10 to be controlled on a time division basis.

In this way, the use of projectors provides an advantage of enhanced level of freedom of display layout.

[A-0028]

Although this embodiment has described a case where there are five two-dimensional displays, the similar configuration can be employed when a different number of displays are provided.

It is obvious that the lamps of projectors can be turned on or off instead of using the shutters.

Further, although the third embodiment mainly concerns a case where the image planes are located near, within or beyond the three-dimensional display, these image planes can easily be located away from or in front of the three-dimensional display. One such example is shown in FIG. 21.

Figure 21:
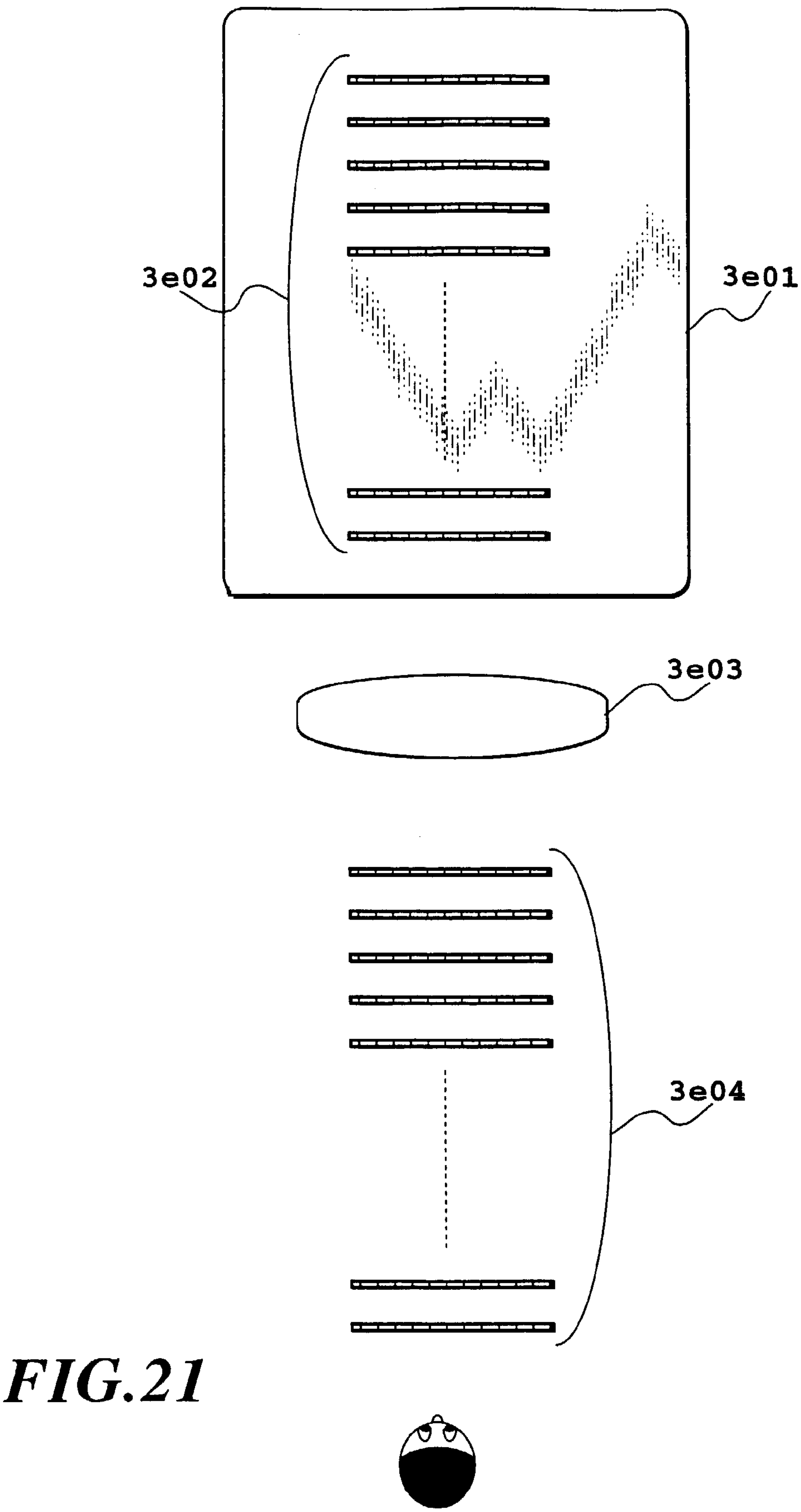
FIG. 21 is a schematic diagram showing another example which adds optical devices to the third embodiment.

For example, it can easily be seen that by arranging a lens system 3e03 in front of an optical system 3e01 as shown in FIG. 21, the internal image planes 3e02 can be moved to the positions of external image planes 3e04.

This offers the advantage that because the images are reproduced floating in space, the images are more likely to look three-dimensional to the observer than when the images are located inside or behind the display.

[A-0029]

[Embodiment 4]

The fourth embodiment of the present invention is an example in which the optical system in the previous embodiments 1, 2 for arranging a plurality of two-dimensional images is constructed by using a volumetric three-dimensional display.

As described in "Three-Dimensional Display" (by Senju Masuda, published by Sangyo Tosho K.K.), the volumetric three-dimensional display performs three-dimensional image presentation by stacking two-dimensional images (same as the two-dimensional images in the embodiment 1) sampled in the direction of depth.

The volumetric three-dimensional display includes a varifocal mirror type and a vibration screen type.

Figure 22:
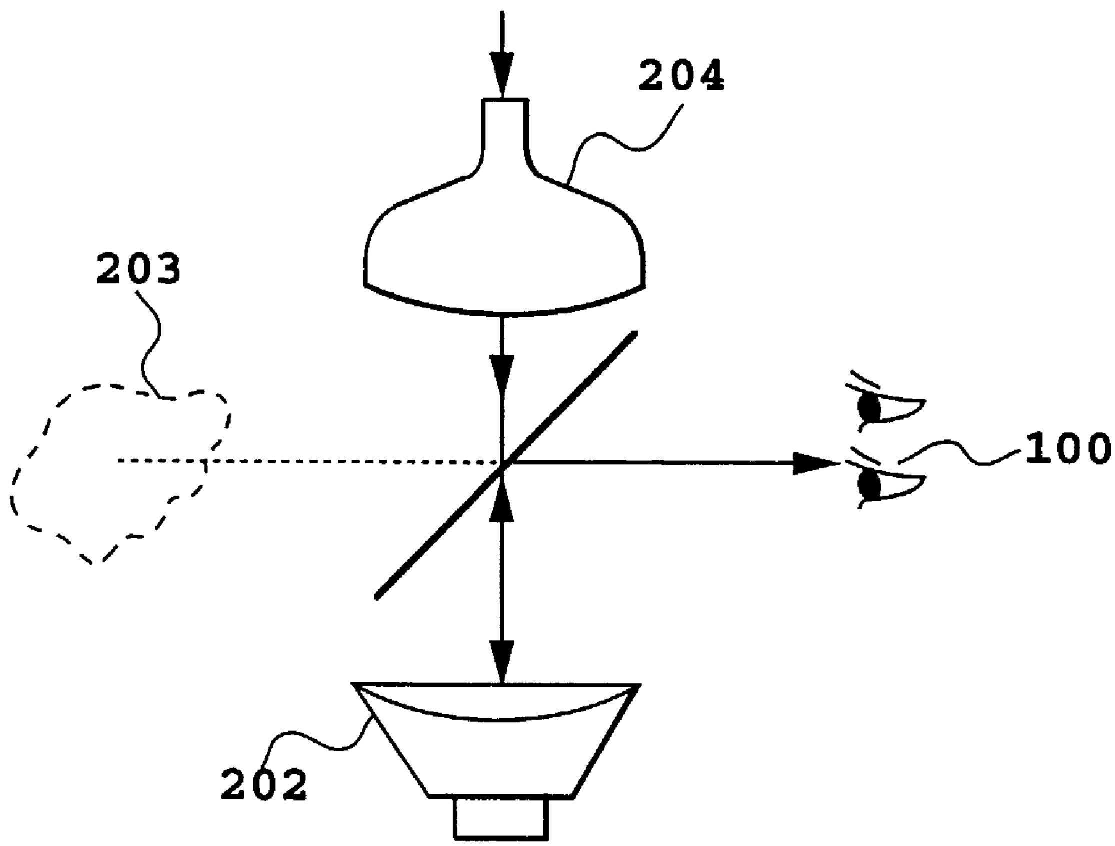
FIG. 22 is a schematic diagram showing the outline configuration of a varifocal mirror type volumetric three-dimensional display according to a fourth embodiment of the invention.

The varifocal mirror type, as shown in FIG. 22, transmits an image displayed on the two-dimensional 204 such as television through a half mirror 201 and a varifocal mirror 202 to form a three-dimensional image (virtual image) for an observer 100.

The varifocal mirror 202, a key device in this method, is made by applying metal such as aluminum or multilayer dielectric on the surface of a woofer (low tone reproducing speaker) to form a concave mirror. When vibrated like an ordinary woofer, the concave mirror portion changes its curvature to change the focal length.

Hence, the position of a virtual image or a real image of the two-dimensional display 204 can be changed by changing the focal length.

Therefore, by displaying images sampled in the direction of depth (two-dimensional images obtained by slicing a three-dimensional object at positions shifted in the direction of depth and sampling the sliced portions) on the two-dimensional display 204 in synchronism with the change in the focal length of the varifocal mirror 202, it is possible to form a three-dimensional image on a time division basis (by taking advantage of the after image effect).

With this method and apparatus, this invention can provide a plurality of two-dimensional images by repeating a short-duration activation of the two-dimensional display a number of times.

The depth position of an image plane can be specified by the vibration position of the varifocal mirror 202.

Therefore, changing the brightness of the two-dimensional images described in the preceding embodiments 1, 2 and displaying the images on the image planes can produce the effect of this invention.

In addition to few moving parts, this method also has an advantage of being able to form a plurality of image planes easily.

[A-0030]

Figure 23:
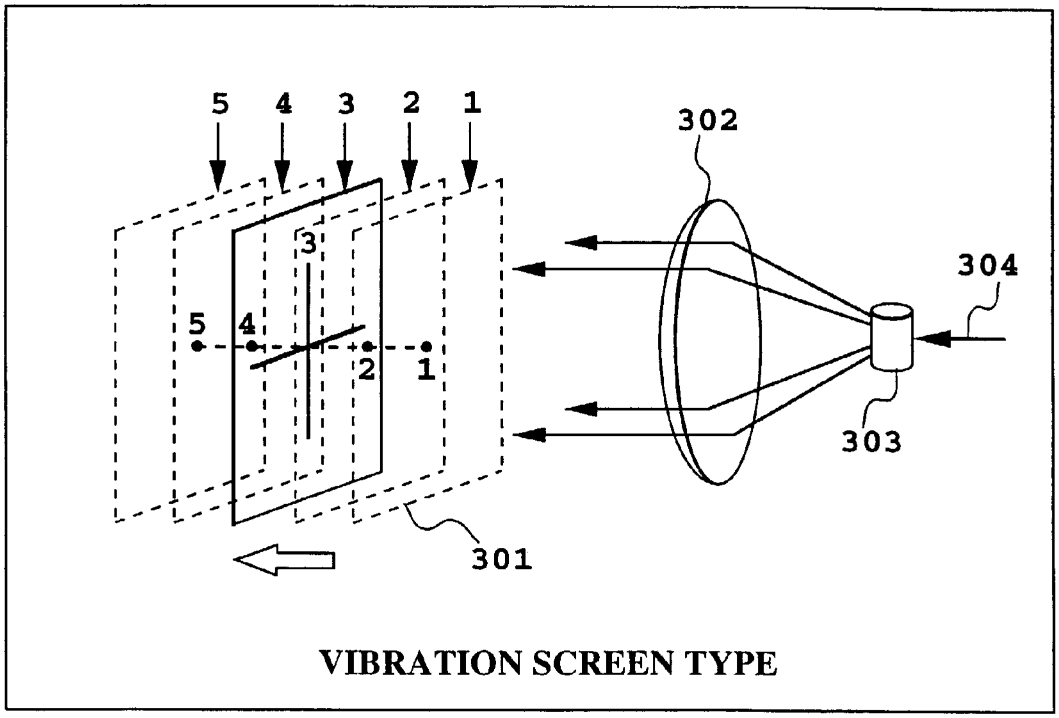
FIG. 23 is a schematic diagram showing the outline configuration of a vibration screen type volumetric three-dimensional display according to the fourth embodiment.

The vibration screen type volumetric three-dimensional display, as shown in FIG. 23, includes: a vibration screen (e.g., diffusion plate, lenticular plate and fly's eye lens) 301 that vibrates in the direction of depth; an optical system 302 including lens; a scanner for raster scanning a laser beam in horizontal and vertical directions (horizontal/vertical scanner comprising, for example, a light deflector using a polygon mirror and a galvanometer mirror) 303; and a laser light source 304.

This method drives the scanner 303 at high speed when the vibration screen 301 is at a desired depth position, writes a sampled image corresponding to that depth position on the screen, and repeats this process by changing the depth position within the after image time, thereby reproducing a three-dimensional image.

With this method and apparatus, this embodiment can present a plurality of two-dimensional image planes by repeating within the after image time a process of writing the sample image on the vibration screen 301 at high speed.

The depth position of the image plane can be specified by the position of the vibration screen 301.

Hence, by changing the brightness of the two-dimensional images described in the preceding embodiments 1, 2 and displaying the images on these image planes, the effect of this invention can be produced.

This method has the advantages of being able to easily suppress distortions on the screen surface and easily form a plurality of image planes.

[A-0031]

[Embodiment 5]

Figure 24:
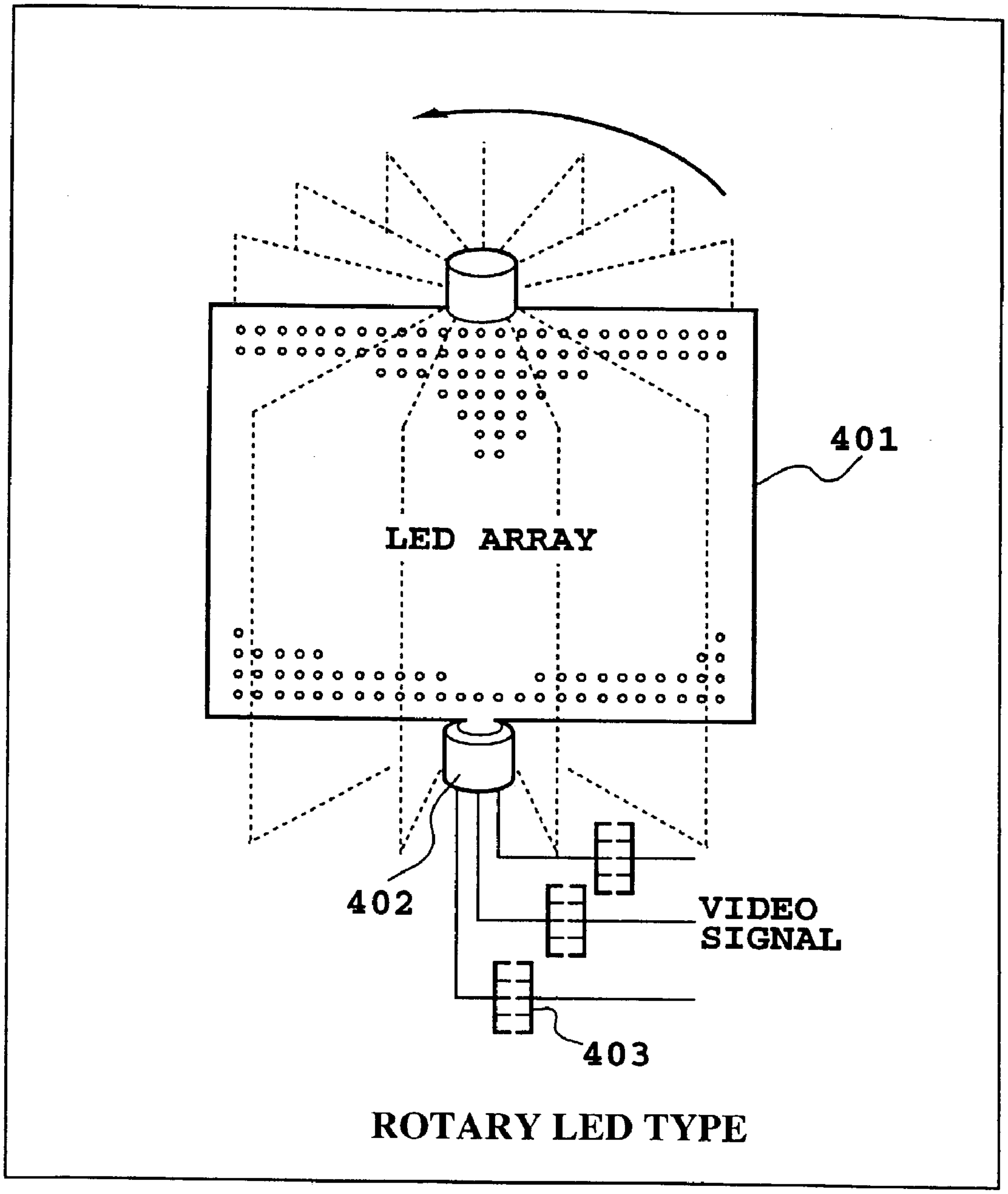
FIG. 24 is a schematic diagram showing the outline configuration of a rotary LED type three-dimensional display according to a fifth embodiment of the invention.

The fifth embodiment of the present invention is a rotary LED type three-dimensional display, which, as shown in FIG. 24, includes an LED display 401 having an LED array, a rotating device 402 for rotating the LED display 401, and a video supply device 403 for feeding a video signal to the LED display 401.

This method requires sampling a three-dimensional object in polar coordinates with the rotating axis of the LED display 401 as a center.

The two-dimensional image sampled in the polar coordinates is displayed on the LED display 401 in synchronism with the rotation of the LED display 401 and this process is repeated by changing the rotation angle to represent a three-dimensional image.

With this method and apparatus, this embodiment can present a plurality of two-dimensional image planes by converting a desired two-dimensional image plane into the polar coordinates, displaying at high speed an image on LEDs at the converted position coordinates within the after image time, and repeating this process while changing the rotation angle.

Then, by changing the brightness of the two-dimensional images described in the preceding embodiments 1, 2 and displaying the images on these image planes, the effect of this invention can be produced.

This method offers the advantages of being able to easily suppress distortions on the screen surface, rotate the LED display 401 relatively easily, and easily form a plurality of image planes.

[A-0032]

[Embodiment 6]

Figure 25:
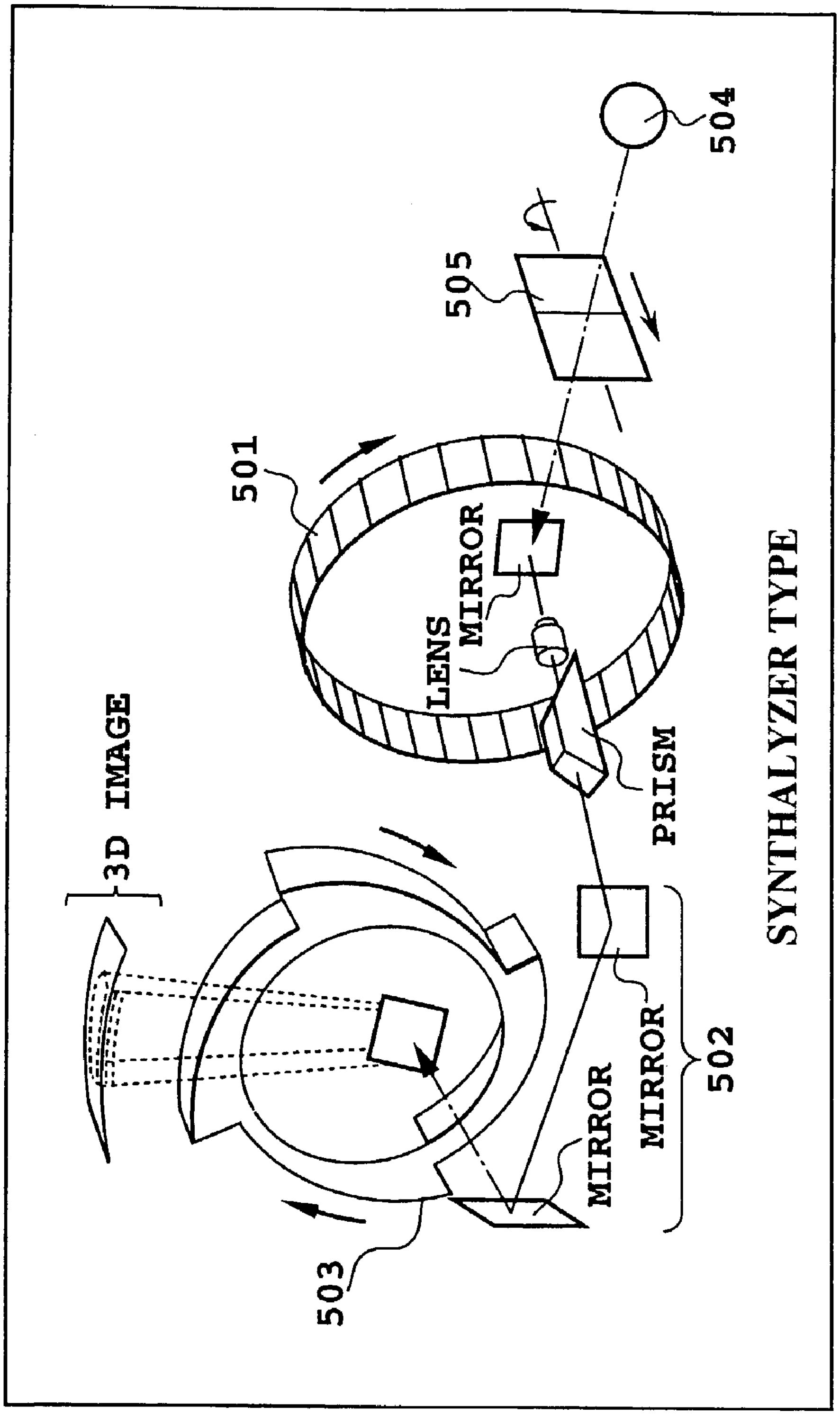
FIG. 25 is a schematic diagram showing the outline configuration of a synthalyzer type three-dimensional display according to a sixth embodiment of the invention.

The sixth embodiment of the present invention is a synthalyzer type three-dimensional display which, as shown in FIG. 25, includes a film recorded with two-dimensional images or a two-dimensional display (e.g., CRT and liquid crystal display) 501, a conversion optical system such as prism and mirror 502, and a projection drum 503. Denoted 504 is a light source and 505 a shutter.

The projection drum 503, a key device in this method, is made of a transparent material (e.g., glass and acrylics or other transparent plastics) and has a varying thickness. The image of the film or two-dimensional display 501 is projected through the projection drum to display an image.

This method utilizes the fact that as the projection drum 503 is rotated, the drum thickness changes causing the position of the image plane to change.

Thus, by displaying images sampled in the direction of depth (two-dimensional images obtained by slicing a three-dimensional object at positions shifted in the direction of depth and sampling the sliced portions) on the two-dimensional display 501 in synchronism with the change in the position of the image plane, it is possible to form a three-dimensional image on a time division basis (by utilizing the after image effect).

With this method and apparatus, this embodiment can present a plurality of two-dimensional image planes by repeating the short-duration displaying of the film or two-dimensional display a number of times within the after image time.

The depth position of the image plane can be specified by the thickness of the projection drum.

Therefore, by changing the brightness of the two-dimensional images described in the preceding embodiments 1, 2 and displaying the images on these image planes, the effect of this invention can be obtained.

In addition to few moving parts, this method has the advantage of being able to form a plurality of image planes easily.

The invention realized by the inventor has been described in detail in conjunction with embodiments. It should be noted that the invention is not limited to these embodiments and that various modifications may be made without departing from the spirit of the invention.

[A-0033]

The advantages and effects obtained by the representative embodiments described above may be summarized briefly as follows.

[A-0034]

Because a plurality of two-dimensional images obtained by slicing a three-dimensional object at positions shifted in the direction of depth and sampling the sliced portions are displayed on planes 1–N ($N \geqq 2$) having different depth positions from an observer and because the brightness of each of the two-dimensional images on respective planes is changed independently of each other, it is possible to suppress contradictions among physiological factors of stereoscopy, reduce the amount of information, and reproduce an electrically rewritable three-dimensional image.

[B-0019]

[Embodiment 7]

Figure 26A:
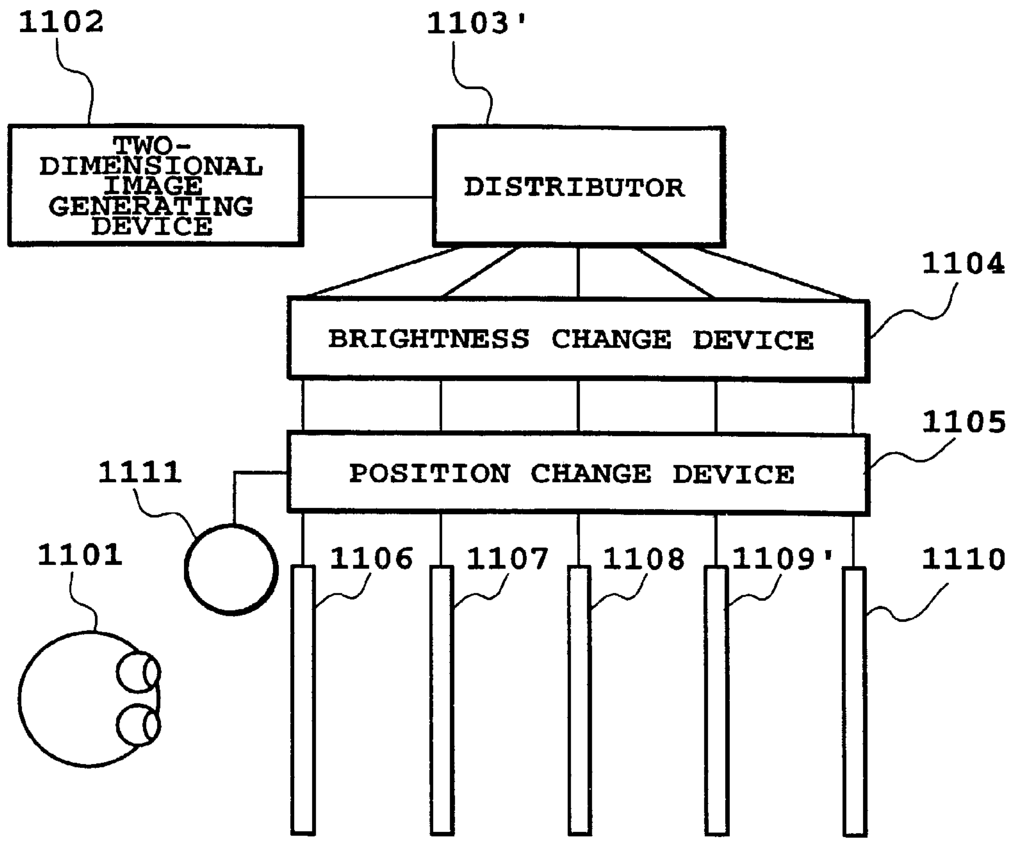
FIGS. 26A and 26B are conceptual diagrams showing the outline configurations of the three-dimensional display according to a seventh embodiment of the invention.
Figure 26B:
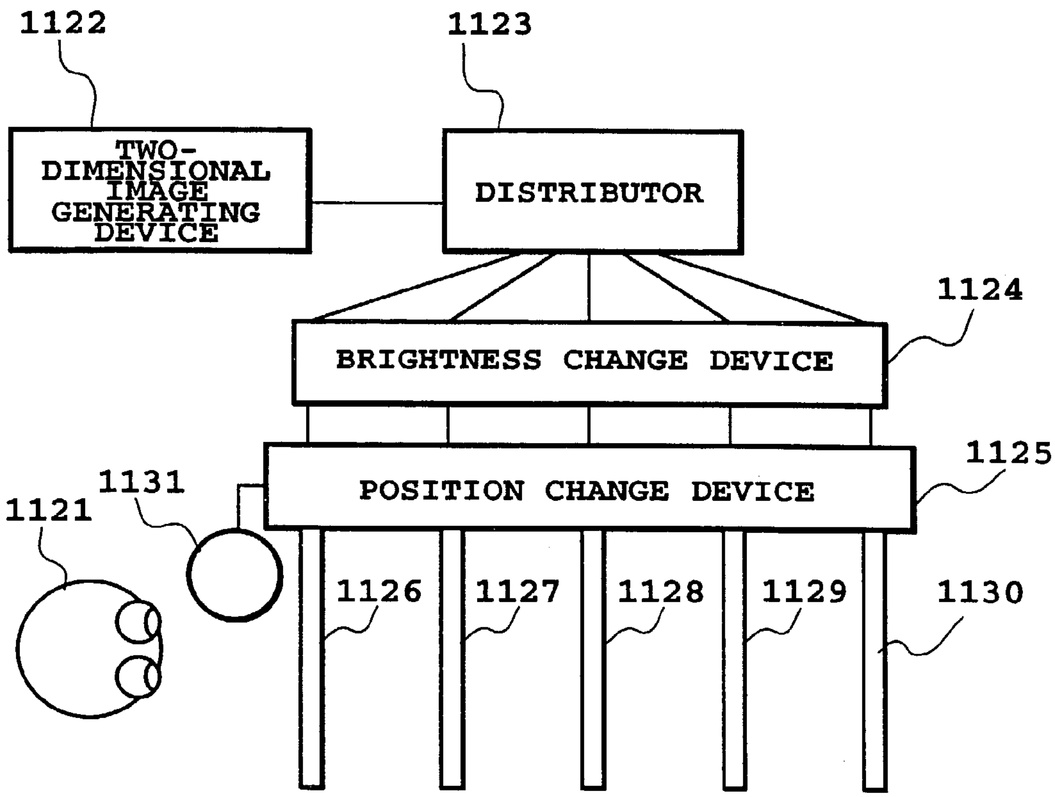

FIGS. 26A and 26B show a conceptual diagram showing the outline configuration of a three-dimensional display according to this embodiment. For components of the three-dimensional display of this embodiment that are identical with the corresponding components of the preceding embodiments 1 to 6, detailed explanations of their constructions and operations are omitted.

[B-0020]

In the three-dimensional display of this embodiment, as shown in FIG. 26A, a two-dimensional image with depth information which was generated by a two-dimensional image generation device 1102 is distributed into a plurality of images (in this case, five images) for different depth positions by a distributor 1103. The brightness for each of the distributed two-dimensional images with depth information is changed by a brightness change device 1104 according to the depth position of the image. The display elements are moved by a position change device (two-dimensional image change device) 1105 to such positions that the axes of the images as seen from an observer overlap each other, and the brightness changed images are displayed on the two-dimensional displays 1106–1110, thus providing a three-dimensional representation.

[B-0021]

Figure 27:
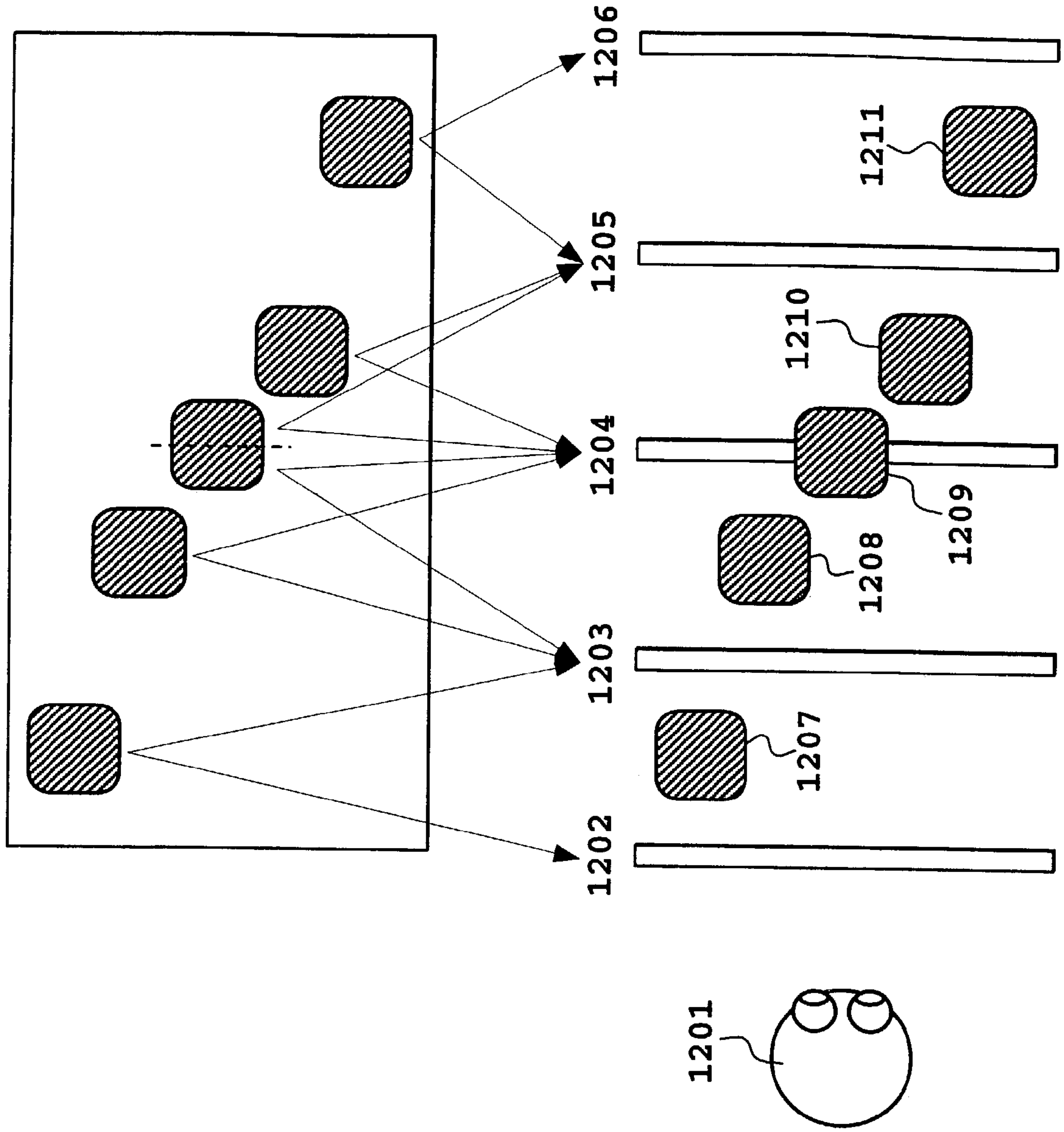
FIG. 27 is a conceptual diagram showing how a distribution device works according to this embodiment.

FIG. 27 is a conceptual diagram showing the working of the distributor 1103. An image 1207 to be represented between an image plane 1202 and an image plane 1203 is displayed on the image plane 1202 and the image plane 1203. An image 1208 to be represented between image planes 1203 and 1204 is displayed on the image planes 1203 and 1204. Images to be represented between image planes 1204 and 1205 and between image planes 1205 and 1206 are displayed in the similar way. The image to be represented (for example, image 1207) may be located at any position between the image planes 1202 and 1203. For the image 1209 that is to be represented straddling an image plane (for example, image plane 1204), a part to be shown in front of the image plane 1204 is displayed in the same way as the front image 1208 and a part to be shown behind the image plane 1204 is displayed in the same way as the rear image 1210.

[B-0022]

In FIG. 26B, a two-dimensional image with depth information which was generated by a two-dimensional image generation device 1122 is distributed into a plurality of images (in this case, five images) for different depth positions by a distributor 1123. The brightness for each of the distributed two-dimensional images with depth information is changed by a brightness change device 1124 according to the depth position of the image. Displays 1126–1130 are moved by a position change device (two-dimensional image change device) 1125 to such positions that the axes of the images as seen from an observer overlap each other, and the brightness changed images are displayed on these displays 1126–1130 thus providing a three-dimensional representation.

[B-0023]

Figure 28A:
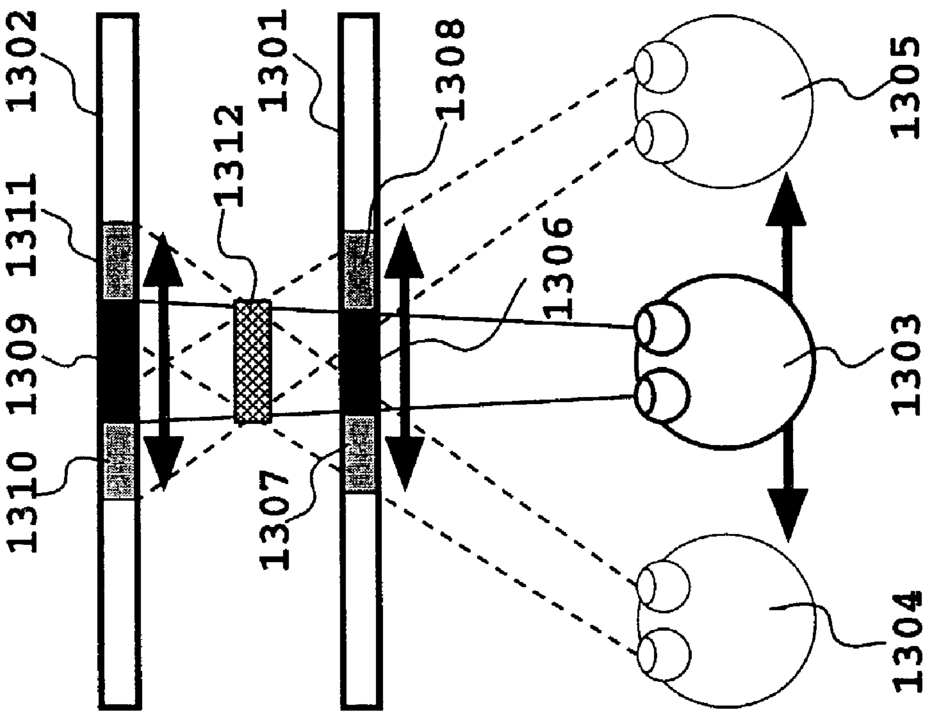
FIGS. 28A to 28C are conceptual diagrams showing how images are moved according to this embodiment.
Figure 28B:
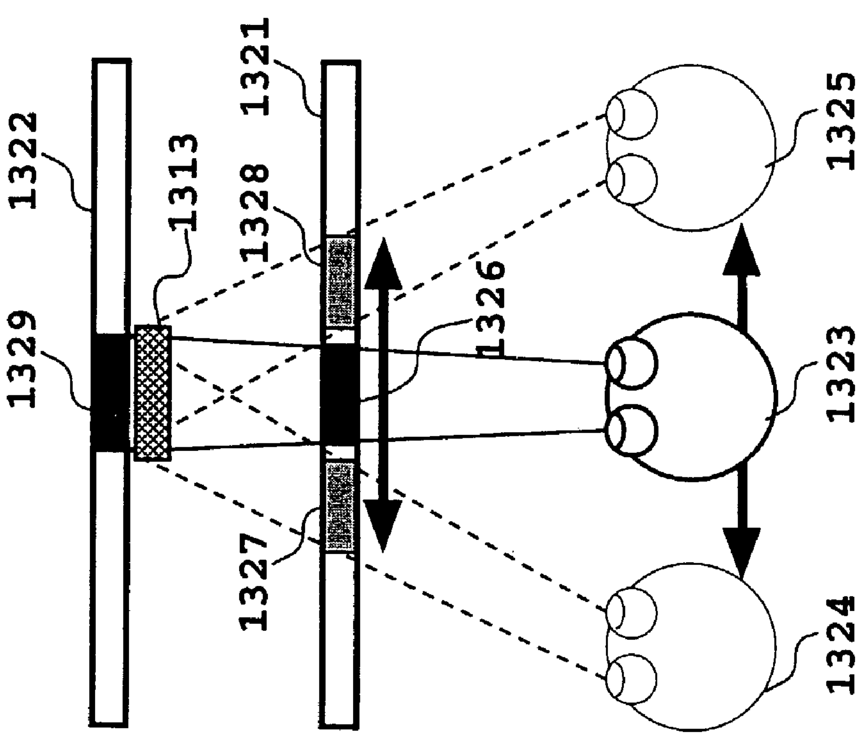
Figure 28C:
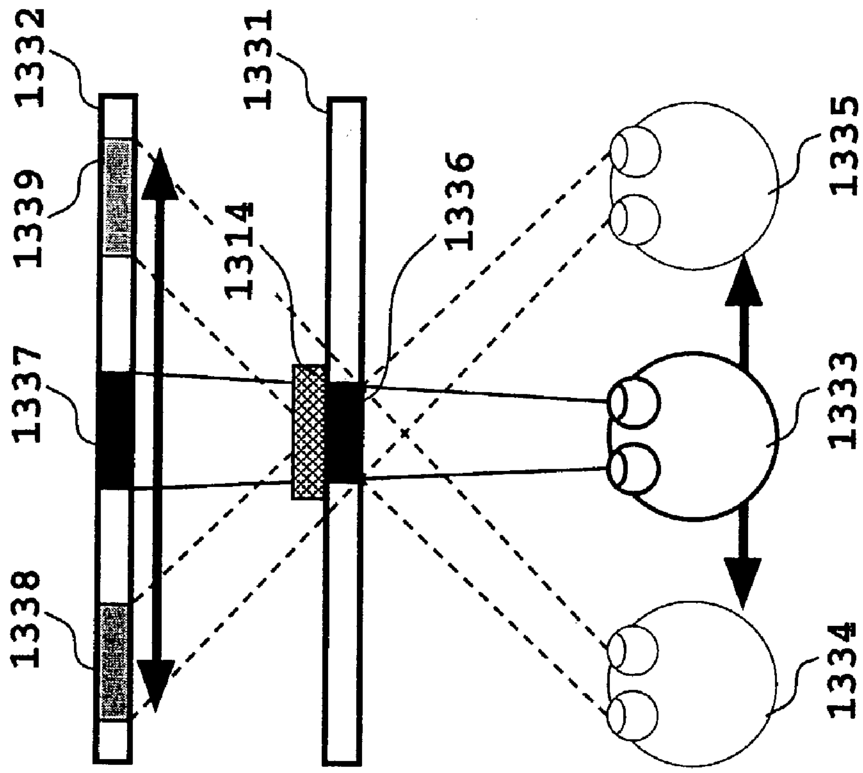

FIGS. 28A to 28C are conceptual diagrams showing how an image moves, according to this embodiment.

FIG. 28A shows a conceptual diagram for a case where a three-dimensional image is reproduced at around an intermediate part between two image planes 1301 and 1302. When the observer views from a viewing position of an observer 1303, the images displayed on the front and rear image planes are located at images 1306 and 1309. When the viewing position of the observer 1303 moves to a viewing position of an observer 1304, the image 1306 is moved to a position of an image 1307 and the image 1309 to a position of an image 1311 because the reproducing position of the three-dimensional image 312 must be fixed. When the viewing position moves to a viewing position of an observer 1305, the images are moved to positions of images 1308 and 1310 respectively.

[B-0024]

FIG. 28B is a conceptual diagram for a case where a three-dimensional image 1313 is reproduced between two image planes 1321 and 1322 at a position close to the image plane 1322. When the observer views from a viewing position of an observer 1323, the images displayed on the front and rear image planes are located at images 1326 and 1329.

[B-0025]

When the viewing point of the observer 1323 moves to a viewing position of an observer 1324, the image 1326 is moved to a position of an image 1327 and the image 1329 is left almost at its position because the reproducing position of the three-dimensional image 1313 needs to be fixed. When the viewing point moves to a viewing position of an observer 1325, the image 1326 is moved to a position of an image 1328.

[B-0026]

FIG. 28C is a conceptual diagram for a case where a three-dimensional image 1314 is reproduced between two image planes 1331 and 1332 at a position close to the image plane 1331. When the observer views from a viewing position of an observer 1333, the images displayed on the front and rear image planes are located at images 1336, 1337.

[B-0027]

When the viewing point of the observer 1333 moves to a viewing position of an observer 1334, the image 1337 is moved to a position of an image 1339 and the image 1336 is left almost at its position because the reproducing position of the three-dimensional image 1314 needs to be fixed. Similarly, when the viewing point moves to a viewing position of an observer 1335, the image 1337 is moved to a position of an image 1338.

[B-0028]

By combining the image moving methods of FIGS. 28A to 28C according to the reproducing position of a three-dimensional image, it is possible to eliminate a double image caused by positional discrepancy between the front and rear images even when the viewing point of an observer changes and to ensure that the positions of gravity centers and outlines of the images on the front and rear image planes snugly overlap so that the observer can recognize the display as a representation of a single object.

[B-0029]

Figure 29A:
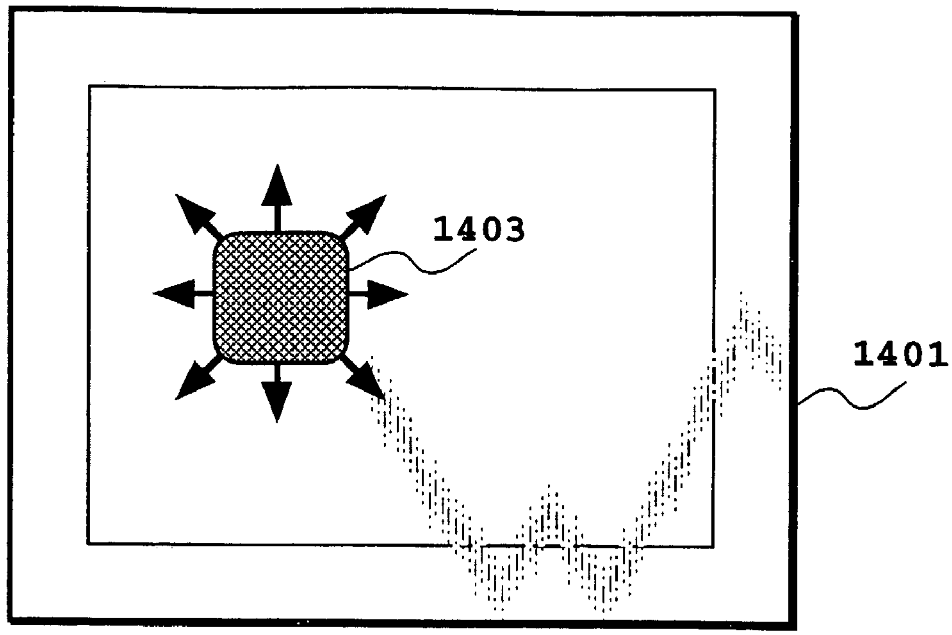
FIGS. 29A and 29B are schematic diagrams showing a method of moving images according to this embodiment.
Figure 29B:
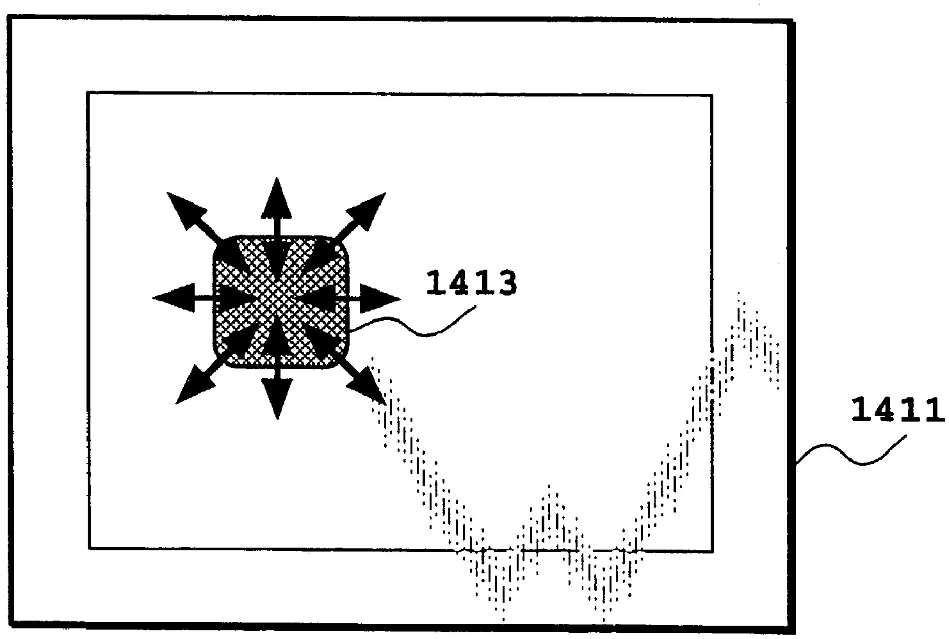

FIGS. 29A and 29B are conceptual diagrams showing how the display elements are moved.

One method of moving an image is, as shown in FIGS. 29A and 29B, to move an image 1403 displayed on a two-dimensional display 401 vertically or horizontally, or to enlarge or reduce an image 1413 displayed on a two-dimensional display 411, or to combine these methods and electrically rewrite the display element. In that case, when a Figure needs to be deformed slightly (as by trapezoidal deformation) as when an observer moves greatly, the display element on the display is also changed at the same time. When the amount of movement of the image is small, such a change is not necessary as long as the displayed object looks natural to the observer.

[B-0030]

As the observer moves, the displayed image is rewritten into an image as it will appear when viewed from the observer, thus producing a movement parallax, too. For example, when the observer moves to the left, the displayed image is rewritten into an image as it will appear when viewed from the left viewing point corresponding to the position of the observer. By rewriting the image according to the change in position of the observer, the required movement parallax can be realized. For the vertical movement of the observer also, the corresponding movement parallax is produced by the similar method.

[B-0031]

Figure 30A:
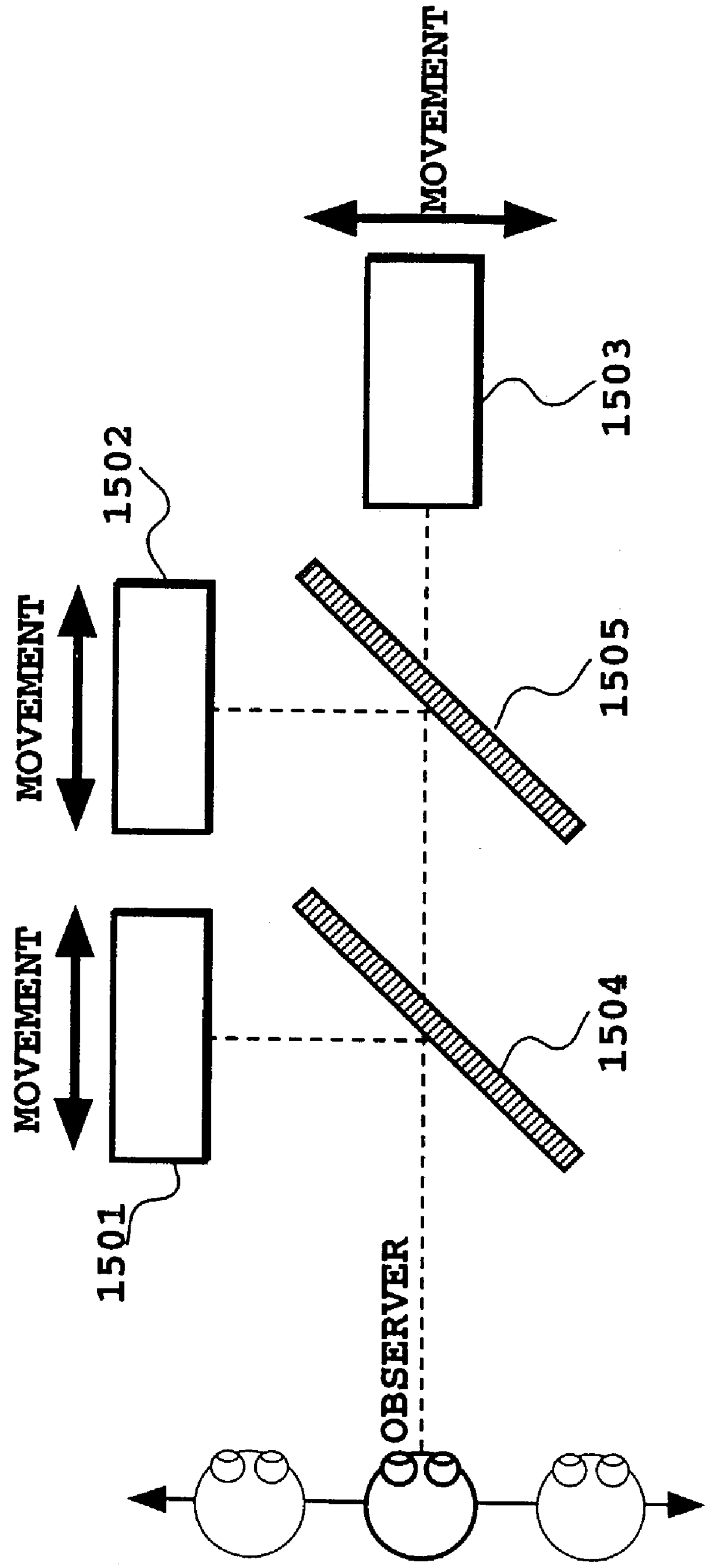
FIGS. 30A and 30B are schematic diagrams showing a method of moving the displays according to this embodiment.
Figure 30B:
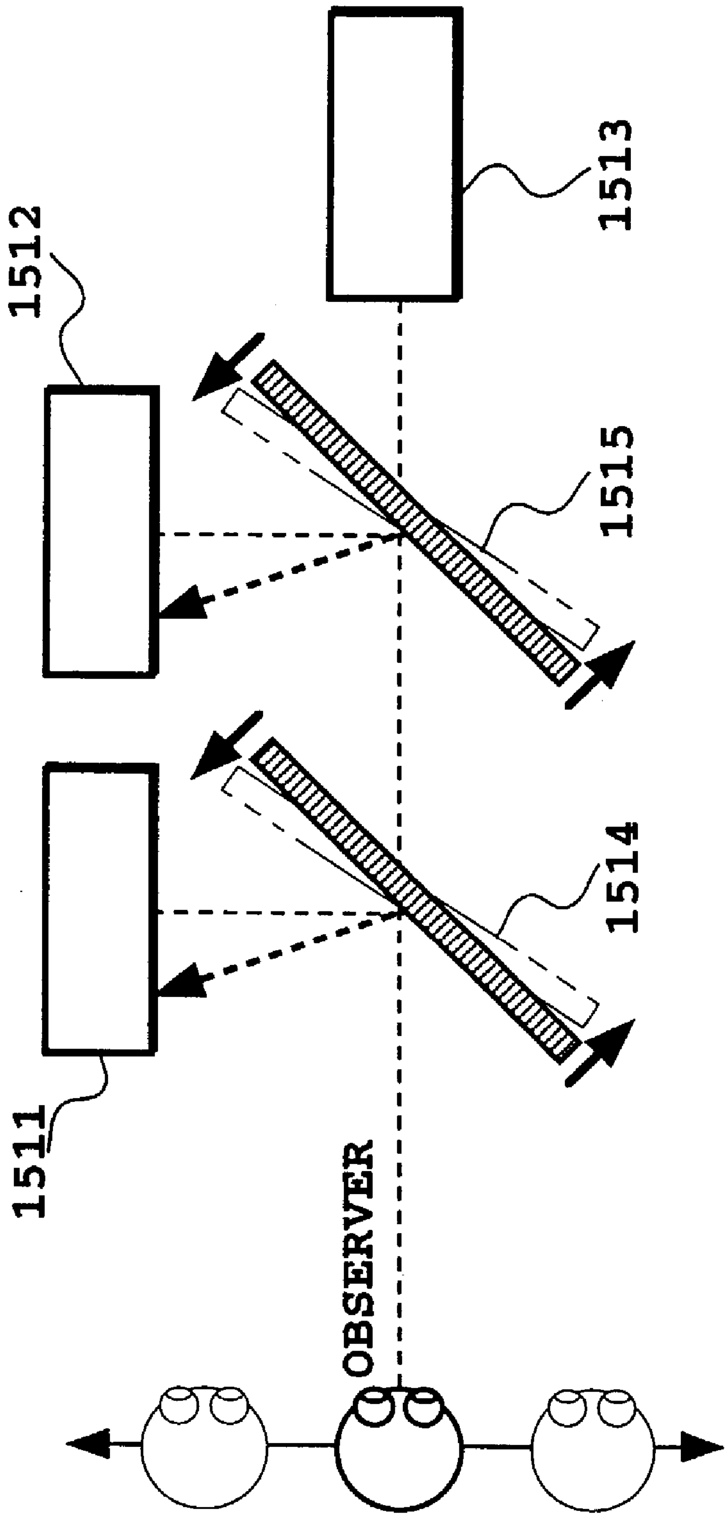
Figure 31:
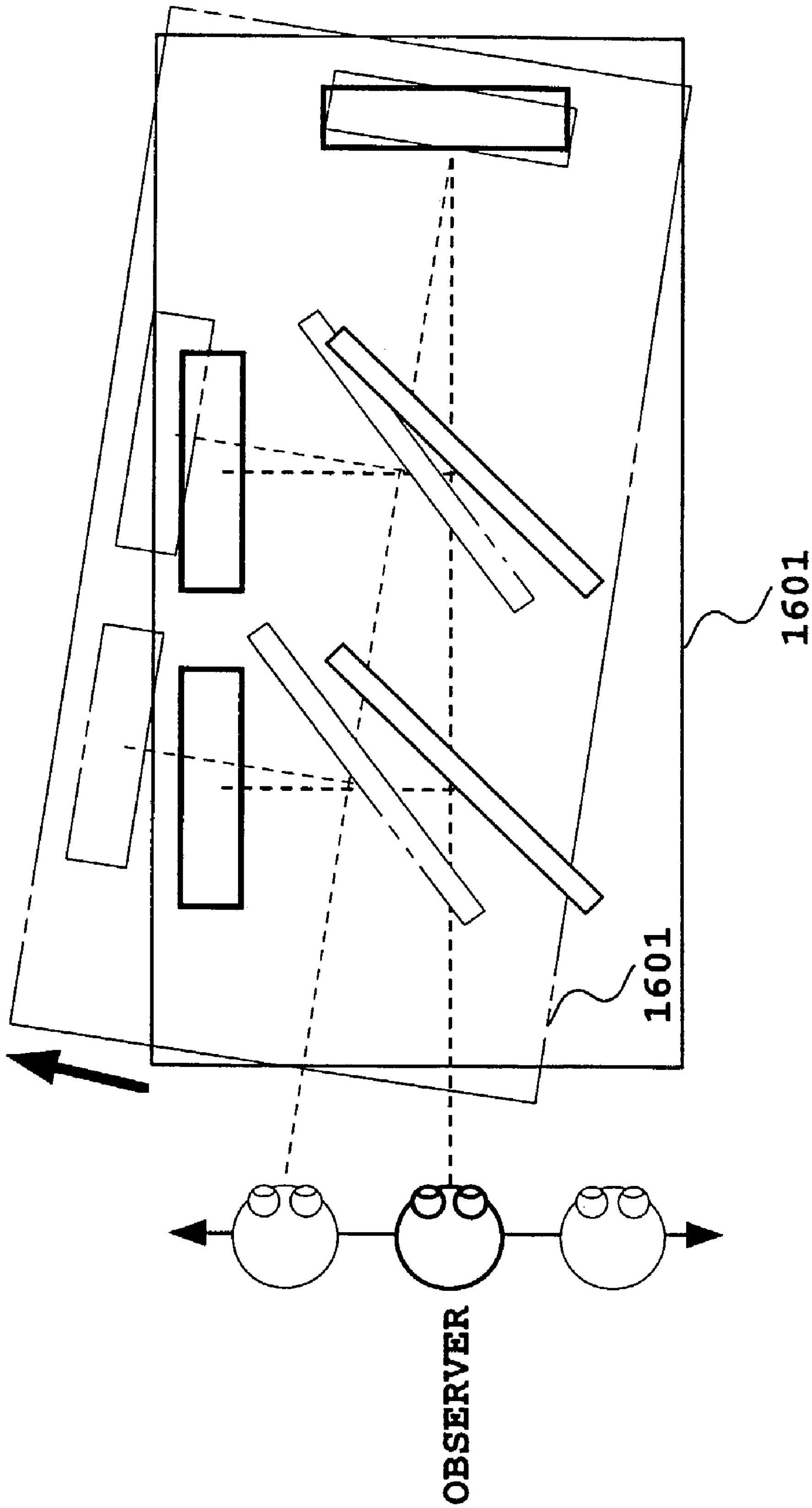
FIG. 31 is a schematic diagram showing a method of moving the whole apparatus according to this embodiment.

Another method of moving the image, as shown in FIGS. 30A, 30B and 31, is to mechanically move two-dimensional displays. The mechanical moving method includes: moving two-dimensional displays 1501, 1502, 1503 (FIG. 30A); in a three-dimensional display having half mirrors, rotating the half mirrors 1514, 1515 (FIG. 30B); and moving an entire three-dimensional display 1601 (FIG. 31).

[B-0032]

When it is necessary to cause a slight deformation to a Figure (as by trapezoidal deformation), the display element on the display is also changed at the same time or corrections are made on an optical system such as prism. The optical system for corrections may include one of a prism, a lens and parallel plates, or a combination of these. When the amount of movement of an image is small, such a change need not be performed as long as the displayed object looks natural to the observer. Mechanically moving the displays changes physical positions of the displays and thus can expand a viewing zone. In the method of moving the entire three-dimensional display, the viewing zone can be expanded by making the movement follow the position of the observer.

[B-0033]

As a further image moving method, it is possible to combine the display element moving method with the mechanical moving method. In this method, to follow a large movement of an observer, the image is moved by the mechanical moving method to expand the viewing zone. To follow a small movement of an observer, the display element is moved. This combined method can simplify the moving apparatus, prevent the observer from feeling incongruous, and ensure swift movement of images.

[B-0034]

Figure 32A:
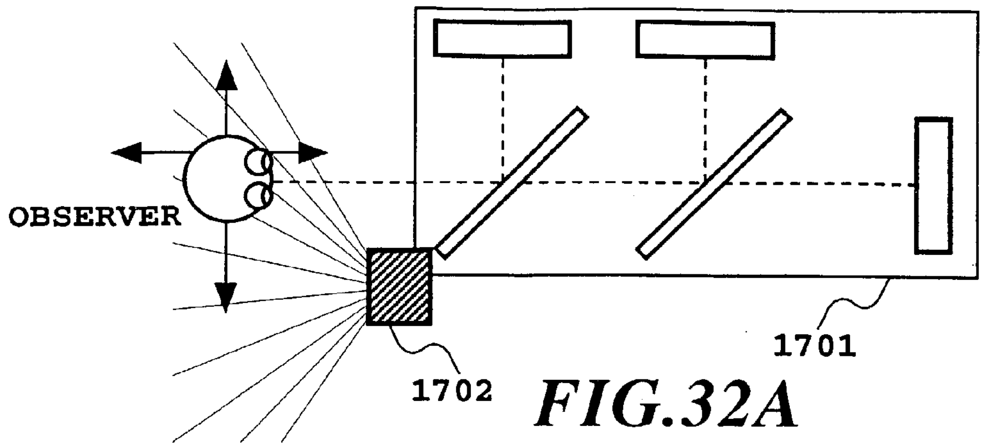
FIGS. 32A to 32C are schematic diagrams showing a position detection method according to this embodiment.
Figure 32B:
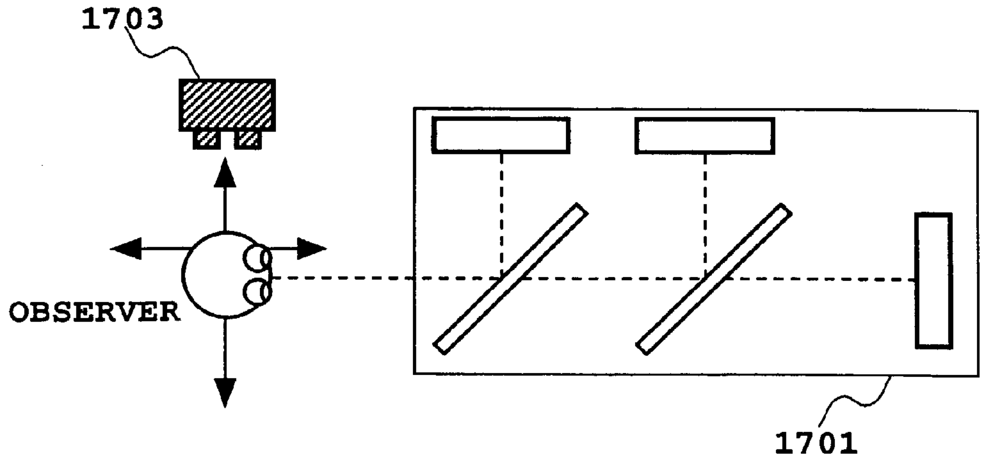
Figure 32C:
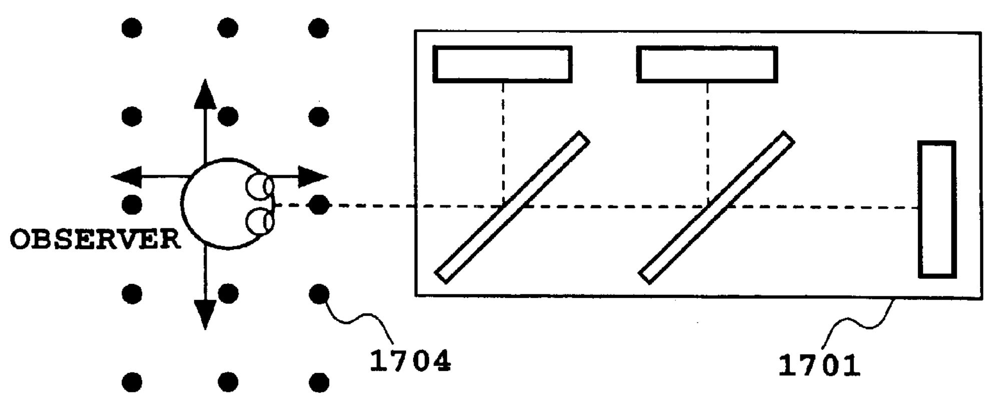
Figure 33A:
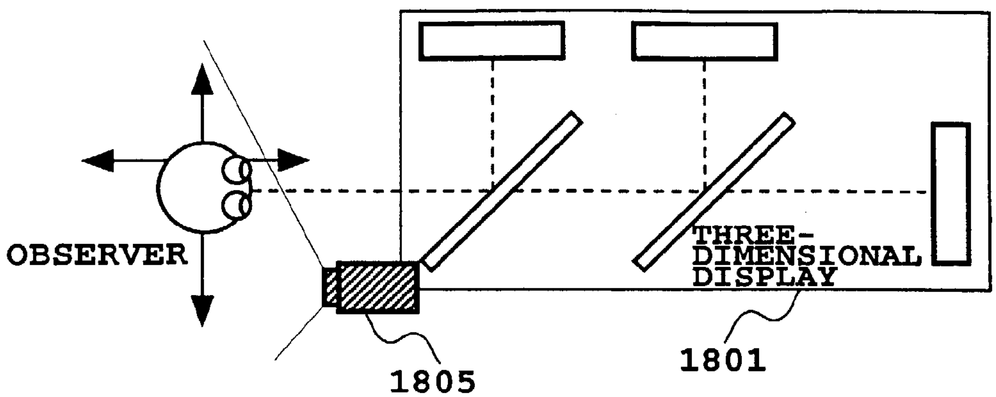
FIGS. 33A and 33B are schematic diagrams showing another position detection method according to this embodiment.
Figure 33B:
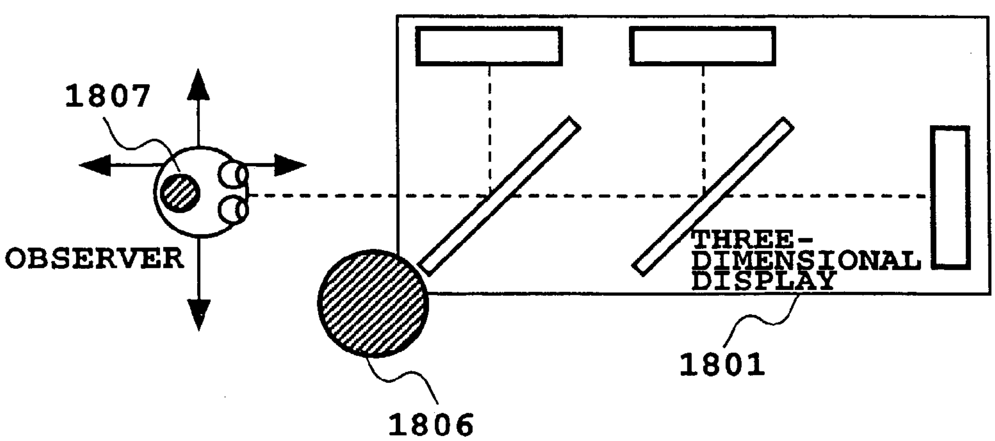

The movement of an observer may preferably be detected by determining the position of the observer relative to a three-dimensional display 701 by using an infrared sensor 1702 as shown in FIG. 32A, an ultrasonic distance sensor or laser distance sensor 1703 as shown in FIG. 32B and an optical sensor as shown in FIG. 32C. For detecting the position of a human using the above-described kinds of sensors, publicly known technologies may be used. Other known technologies may also be used, which include a method that detects the position of an observer from the image provided by a camera 1805 as shown in FIG. 33A and a method that uses a magnetic sensor 1807 possessed by an observer or a magnetic sensor 1806 installed in the three-dimensional display to detect the position of an observer.

[B-0035]

The present invention has been described in detail in conjunction with embodiments and it should be noted, however, that the invention is not limited to these embodiments and that various modifications may be made without departing from the spirit of the invention.

[B-0036]

The advantages of this embodiment may be briefly summarized as follows.

(1) When the viewing point of an observer changes or when the observer moves, this embodiment can eliminate positional discrepancies between the front and rear display images or minimize the discrepancies to such an extent that the displayed object does not look unnatural, thus making it possible to reproduce a three-dimensional image with no or little blur, which would otherwise be caused by deviated overlapping of the front and rear images.

(2) When the viewing point of an observer changes or when the observer moves, the two-dimensional images displayed on respective displays are changed according to the movement of the observer's viewing point. This can expand the viewing zone.

(3) When the viewing point of an observer changes or when the observer moves, the displays or the three-dimensional display are moved according to the movement of the observer's viewing point. This can expand the viewing zone.

[C-0013]

[Embodiment 8]

Figure 34:
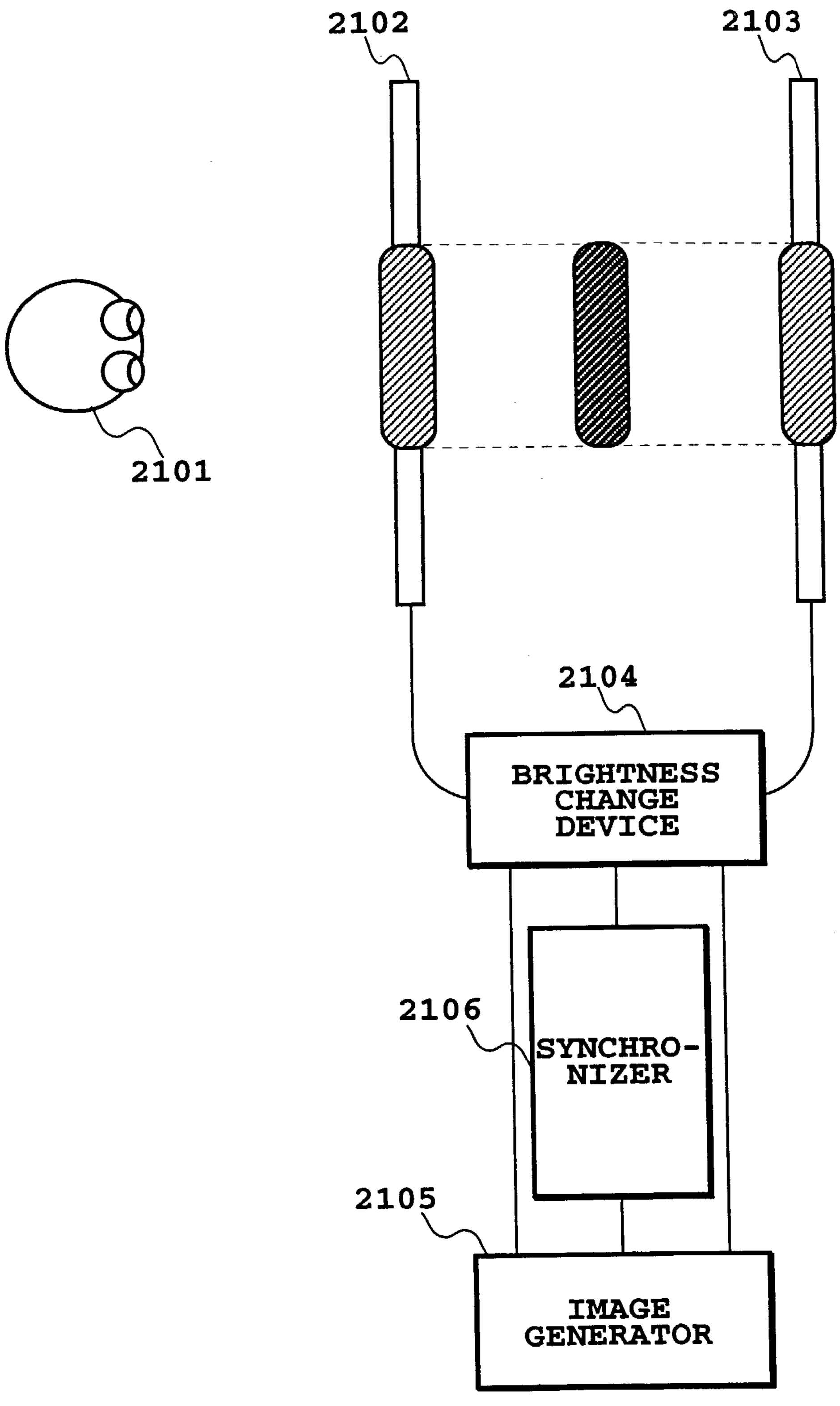
FIG. 34 is a block diagram showing the concept of a three-dimensional display according to an eighth embodiment of the invention.
Figure 35A:
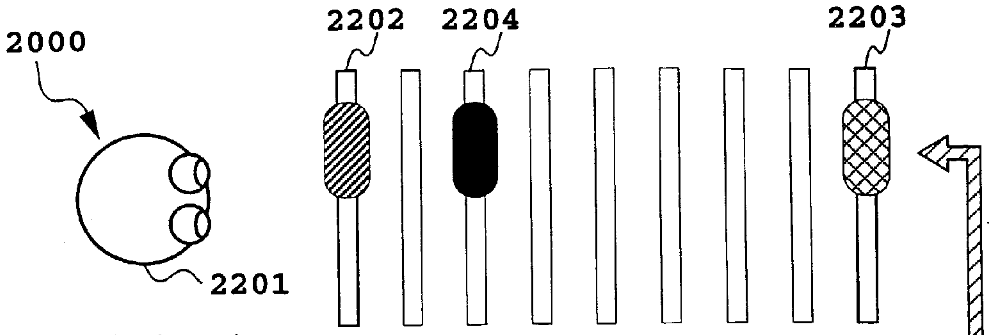
FIGS. 35A to 35D are schematic diagrams showing the principle of the three-dimensional display according to the eighth embodiment.
Figure 35B:
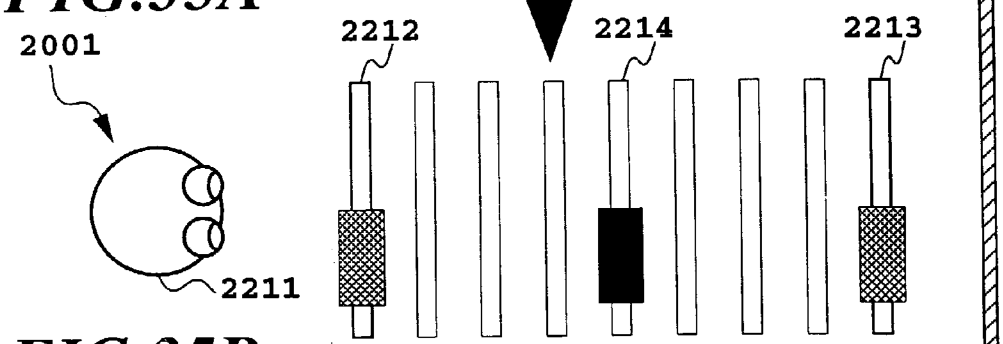
Figure 35C:
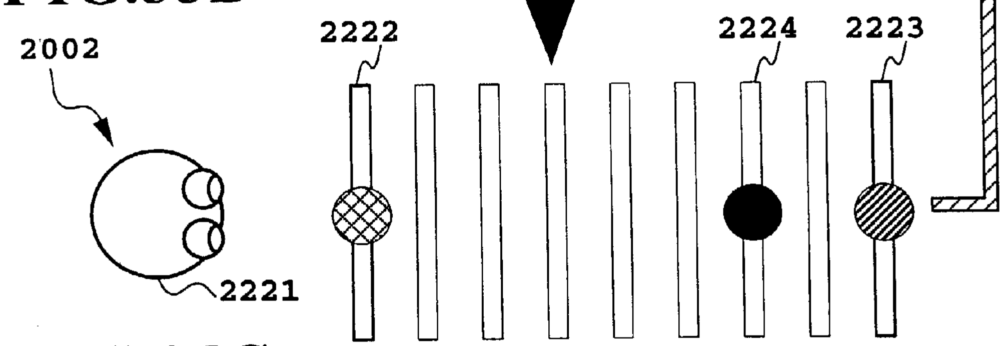
Figure 35D:
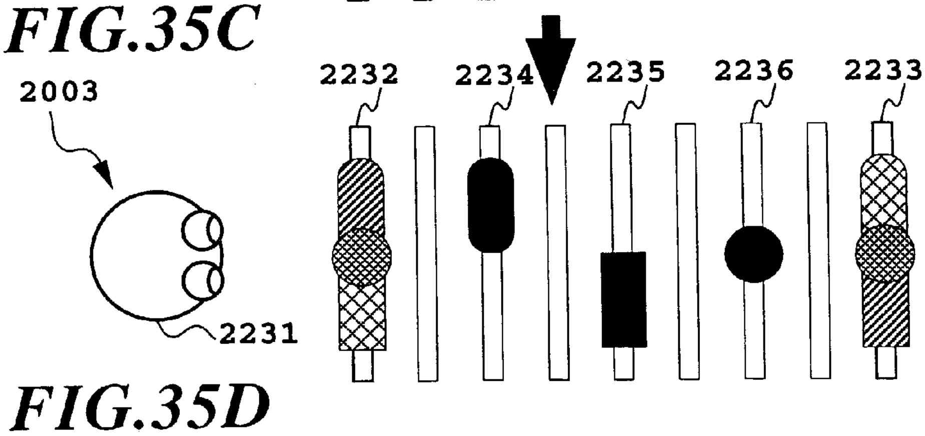

FIG. 34 is a block diagram showing a concept of a three-dimensional display according to this invention.

The three-dimensional representation method of this embodiment, too, has a plurality of image planes (display surfaces), for example image planes 2102, 2103, set in front of an observer 2101, as shown in FIG. 34, and a plurality of two-dimensional images are displayed on these image planes by using two-dimensional displays and an optical system.

A three-dimensional object to be presented to the observer 2101 is projected onto the image planes 2102, 2103 along the line of sight of both eyes of the observer to generate two-dimensional images.

The two-dimensional images can be generated by a variety of methods, which include one that uses two-dimensional images of the object shot by camera from the line of sight, one that synthesizes a plurality of two-dimensional images shot from different directions, and one that uses a synthesizing technique or modeling technique based on computer graphics.

[C-0014]

With this embodiment, when an object to be presented is a plurality of objects located at different depth positions and overlapping each other on the line of sight of the observer 2101, an image generator 2105 generates for each of the objects to be presented two-dimensional images that are to be displayed simultaneously on a plurality of image planes, e.g., the image planes 2102, 2103.

That is, in this embodiment, for each object to be displayed there are generated two-dimensional images which are projected from the object onto the image planes 2102, 2103 from the line of sight of both eyes of the observer 2101.

[C-0015]

In this case, two-dimensional images to be displayed at desired depth positions (two-dimensional images for each of the objects to be presented) are generated by the image generator 2105 shown in FIG. 34 in the order from the near depth position to the far depth position with respect to the observer, in the reverse order or in a random order.

Then, the brightness of the generated two-dimensional images to be displayed on the image planes 2102, 2103 is changed by a brightness change device 2104 to the brightness values corresponding to their depth positions, and the two-dimensional images thus generated are displayed on the image planes 2102, 2103.

[C-0016]

A synchronizer 2106 synchronizes the depth positions for which the image generator 2105 generates the images with the depth positions for which the synchronizer 2106 changes the brightness of the images. That is, the images and their corresponding depth positions are synchronized.

The synchronizer 2106 shown in FIG. 34 is conceptually illustrated, and the brightness can be changed either mechanically or by software. Two or more synchronizers 2106 may be used.

Further, the brightness change device 2104 and the synchronizer 2106 may be constructed as one device.

[C-0017]

A method of displaying a three-dimensional image on the three-dimensional display according to this embodiment will be described by referring to FIG. 35.

Step 2000: Two-dimensional images of an object that one wants reproduced at a front position as viewed from an observer, such as a three-dimensional image 2204, are changed in brightness by the brightness change device 2104 and the synchronizer 2106 and then displayed on image planes 2202, 2203 to reproduce the three-dimensional image 2204.

Step 2001: Next, two-dimensional images of an object that one wants reproduced at an intermediate position as viewed from an observer, such as a three-dimensional image 2214, are changed in brightness and displayed on image planes 2212, 2213 to reproduce the three-dimensional image 2214.

Step 2003: Next, two-dimensional images of an object that one wants reproduced at a rear position as viewed from an observer, such as a three-dimensional image 2224, are changed in brightness and displayed on image planes 2222, 2223 to reproduce the three-dimensional image 2224.

Changing the brightness can be achieved by two methods: one is to change the brightness according to the three-dimensional image to be displayed and then display the image, and one is to change the brightness continuously while displaying the three-dimensional image.

For example, the brightness of the front image plane may be changed from high to middle to low and the brightness of the rear image plane from low to middle to high so that the overall brightness as seen by the observer remains constant in order to change the position at which the three-dimensional image is reproduced from the front toward the rear. It is possible to reverse the brightness changing order. Another method is to change the brightness freely according to any desired position where a three-dimensional image is to be reproduced.

[C-0018]

This embodiment greatly differs from conventional techniques in that the steps 2000, 2001 and 2002 in FIG. 35 are repeated at high speed during the display of image.

Repeating the steps 2000, 2001 and 2002 of FIG. 35 at high speed allows the observer 2231 to see the three-dimensional images 2234, 2235, 2236 reproduced at respective positions as shown in the state 2003 and also to see the rear image through the front image. Here, 2232 and 2233 denote image planes and 2234, 2235 and 2236 represent three-dimensional images reproduced.

The speed at which the steps 2000, 2001 and 2002 of FIG. 5 are repeated is set within the after image time of human eye, for example at 60 Hz or higher, to realize displaying of a three-dimensional image without flicker.

That is, displaying two or more overlapping three-dimensional images can be achieved by performing the image displaying procedures on a time division basis at high speed such that the resultant images are all displayed sequentially within the after image time of human eye.

The number of brightness-changed two-dimensional images for different depth positions needs to be greater than the maximum number of brightness-changed images required to display the overlapping portions of the three-dimensional images.

[C-0019]

Figure 36:
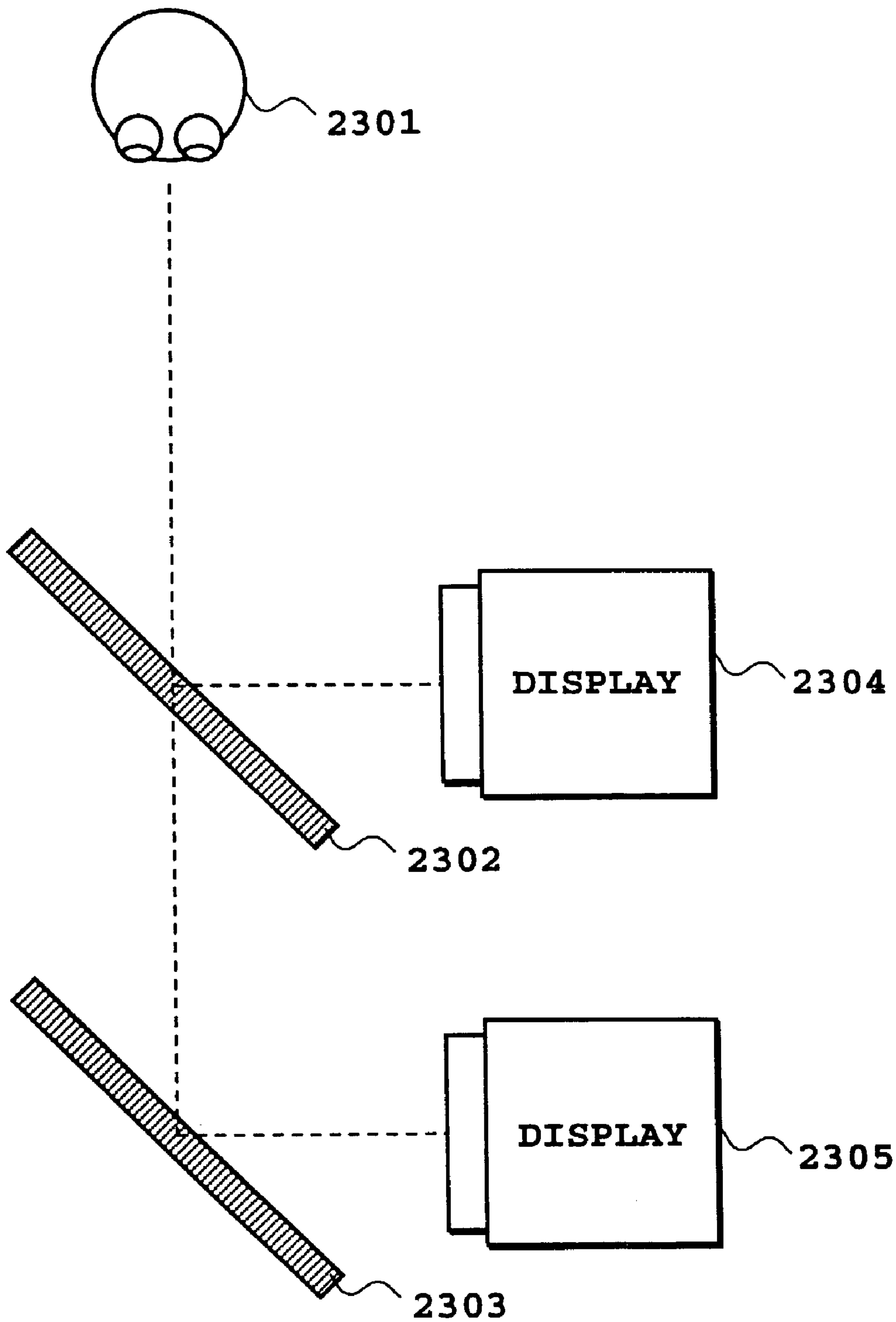
FIG. 36 is a schematic diagram showing the outline configuration of the three-dimensional display according to the eighth embodiment.

FIG. 36 is a schematic diagram showing the outline configuration of a three-dimensional display according to an eighth embodiment of the invention.

In the three-dimensional display of this embodiment, two-dimensional displays 2304, 2305 define the front and rear image planes respectively and the two-dimensional images displayed on the two image planes are arranged on the same optical axis by half mirrors 2302, 2303.

The images displayed on the two-dimensional displays 2304, 2305 are, as shown in FIG. 35, rapidly changed in brightness and displayed to the observer 2301 repetitively.

The two-dimensional displays 2304, 2305 may use CRT, liquid crystal display and plasma display and, when higher speed is required, can use displays using ferroelectric liquid crystals or antiferroelectric liquid crystals.

Alternatively, it is possible to use a display that allows high-speed random access to individual pixels, such as a display of oscilloscope.

In this case, the brightness levels of two-dimensional images displayed on the two-dimensional displays 2304, 2305 are changed by the two-dimensional displays 2304, 2305 themselves.

[C-0021]

[Embodiment 9]

Figure 37:
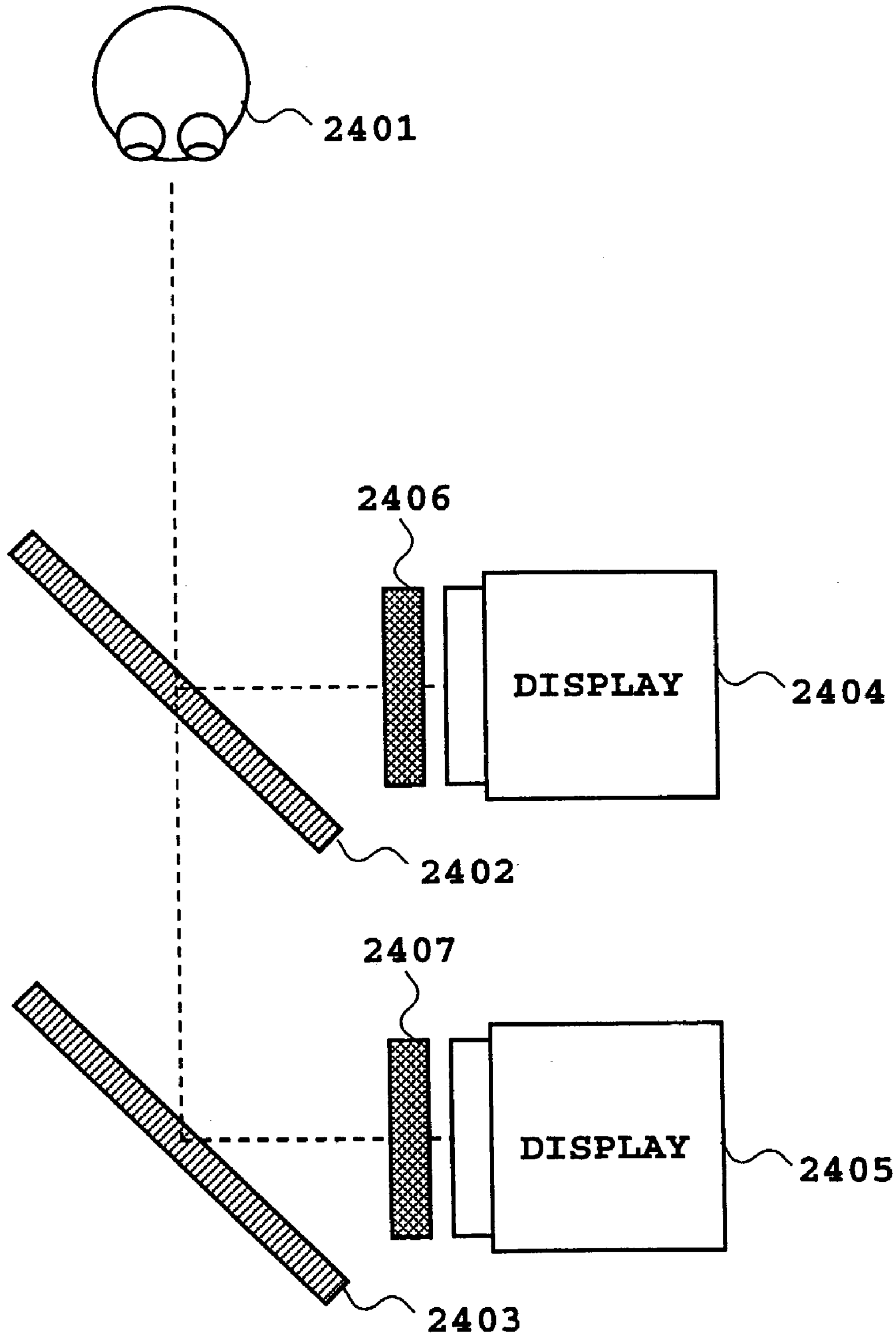
FIG. 37 is a schematic diagram showing the outline configuration of a three-dimensional display according to a ninth embodiment of the invention.

FIG. 37 is a schematic diagram showing the outline configuration of a three-dimensional display according to a ninth embodiment of the present invention. Reference number 2401 represents an observer, 2402 and 2403 half mirrors, and 2404 and 2405 two-dimensional displays.

The three-dimensional display of this embodiment differs from the three-dimensional display of the eighth embodiment in that the brightness of displayed images are changed by beam attenuating filters 2406, 2407.

The beam attenuating filters 2406, 2407 according to this embodiment may be a filter that continuously changes its light intensity attenuation by mechanical rotation, a filter that electrically attenuates light intensity by liquid crystals, a device that has slits having changing opening areas and arranged in the direction of rotation and which mechanically rotates the slits to change the brightness, and a device which changes the opening time by a ferroelectric shutter to change the brightness.

In the three-dimensional display of this embodiment, the attenuation of the beam attenuating filters 2406, 2407 is synchronized with the two-dimensional images displayed on the two-dimensional displays 2404, 2405 to display a three-dimensional image.

[C-0022]

[Embodiment 10]

Figure 38:
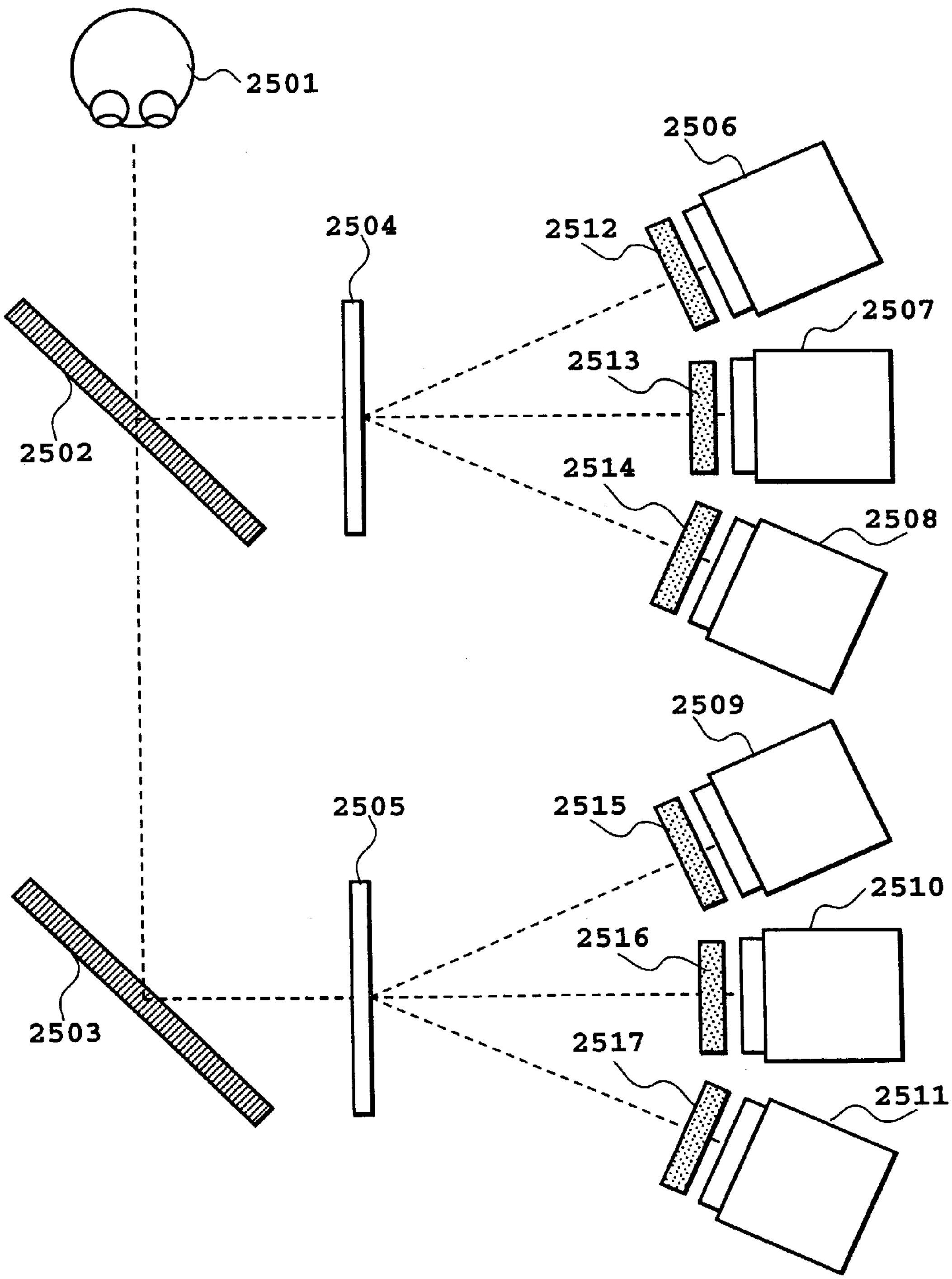
FIG. 38 is a schematic diagram showing the outline configuration of a three-dimensional display according to a tenth embodiment of the invention.

FIG. 38 is a schematic diagram showing the outline configuration of a three-dimensional display according to a tenth embodiment of the invention. Reference number 2501 represents an observer, 2502 and 2503 half mirrors, 2504 and 2505 screens, 2506–2511 two-dimensional displays, and 2512–2517 shutters.

In the three-dimensional display of this embodiment a plurality of projector type two-dimensional displays 2506–2511 are used.

For example, a two-dimensional display 2506 displays a two-dimensional image for a front three-dimensional image as viewed from an observer, a two-dimensional display 2507 displays a two-dimensional image for an intermediate three-dimensional image, and a two-dimensional display 2508 displays a two-dimensional image for a rear three-dimensional image. Shutters 2512–2514 are operated to project these two-dimensional images sequentially on a time division basis onto a screen 2504.

Similarly, a two-dimensional display 2509 displays a two-dimensional image for a front three-dimensional image as viewed from an observer, a two-dimensional display 2510 displays a two-dimensional image for an intermediate three-dimensional image, and a two-dimensional display 2511 displays a two-dimensional image for a rear three-dimensional image. Shutters 2515–2517 are operated to project these two-dimensional images sequentially on a time division basis onto a screen 2505.

Then, the two-dimensional images displayed on the screens 2504, 2505 are arranged on the same optical axis by half mirrors 2502, 2053.

In this embodiment, the brightness of each of the two-dimensional images projected from the two-dimensional displays 2506–2511 is preset to a desired brightness level corresponding to the depth position of the two-dimensional image displayed.

[C-0023]

[Embodiment 11]

Figure 39:
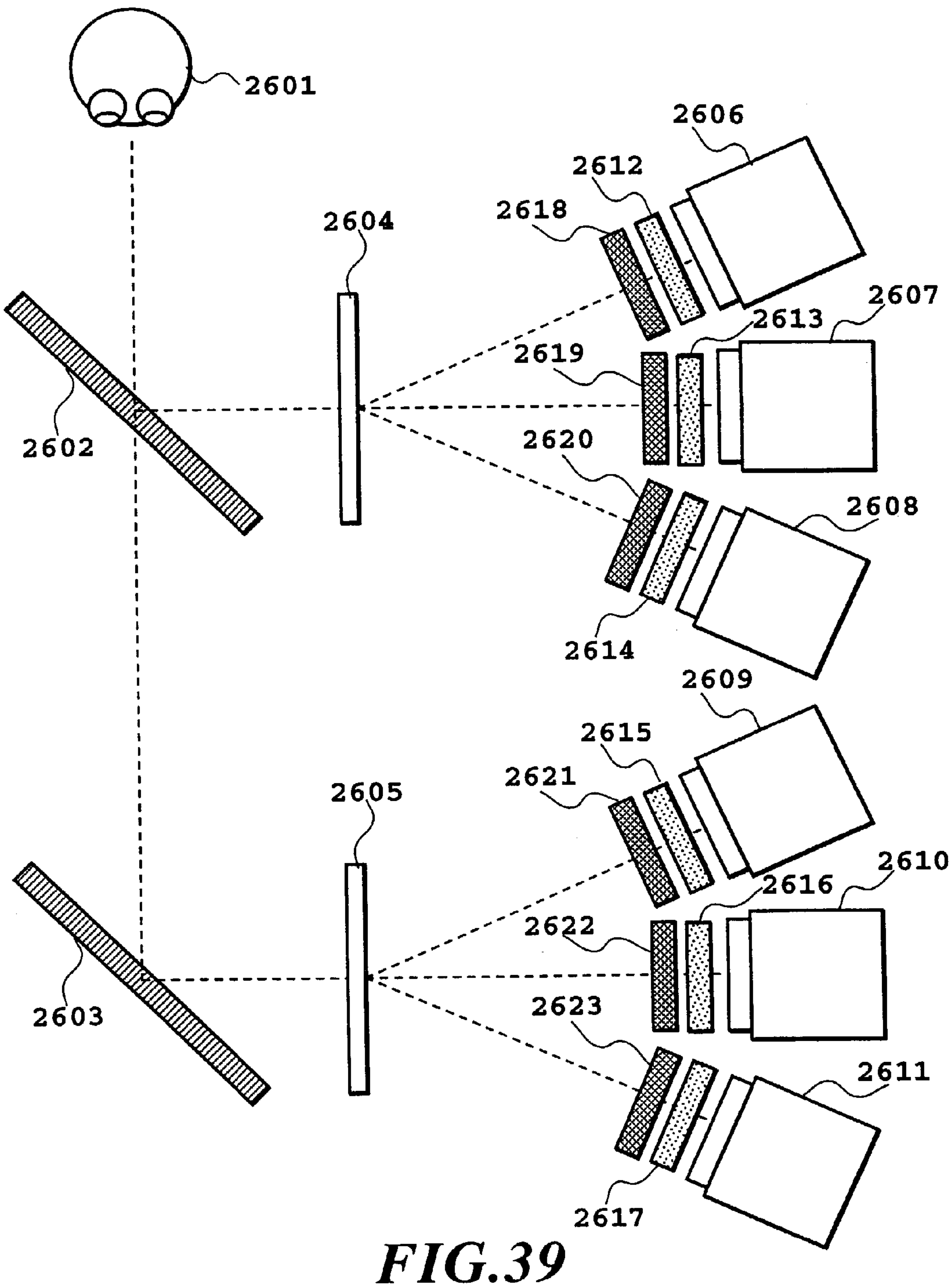
FIG. 39 is a schematic diagram showing the outline configuration of a three-dimensional display according to an eleventh embodiment of the invention.

FIG. 39 is a schematic diagram showing the outline configuration of a three-dimensional display according to a eleventh embodiment of the invention. Reference number 2601 represents an observer, 2602 and 2603 half mirrors, 2604 and 2605 screens, 2606–2611 two-dimensional displays, 2612–1617 shutters, and 2618–2623 beam attenuating filters.

The three-dimensional display of this embodiment differs from the three-dimensional display of the preceding tenth embodiment in that the brightness of each of the two-dimensional images displayed on the two-dimensional displays 2606–2611 is changed by beam attenuating filters 2618–2623 installed at the front of the two-dimensional displays 2606–2611.

For example, when three three-dimensional images are reproduced at positions shifted in the direction of depth by using the two-dimensional displays 2606–2608 that display two-dimensional images on the front image plane and the two-dimensional displays 2609–2611 that display two-dimensional images on the rear image plane, the brightness of each two-dimensional display can be set constant and therefore the beam attenuating filters 2618–2623 may have fixed levels of attenuation.

[C-0024]

When three or more three-dimensional images are reproduced at positions shifted in the direction of depth, the beam attenuating filters 2618–2623 may be a filter that continuously changes its light intensity attenuation by mechanical rotation, a filter that electrically attenuates light intensity by liquid crystals, a device that has slits having changing opening areas and arranged in the direction of rotation and which mechanically rotates the slits to change the brightness, and a device which changes the opening time by a ferroelectric shutter to change the brightness.

The attenuation of the beam attenuating filters 2618–2623 is synchronized with the two-dimensional images projected from the two-dimensional displays 2606–2611 to produce three-dimensional images.

[C-0025]

[Embodiment 12]

Figure 40:
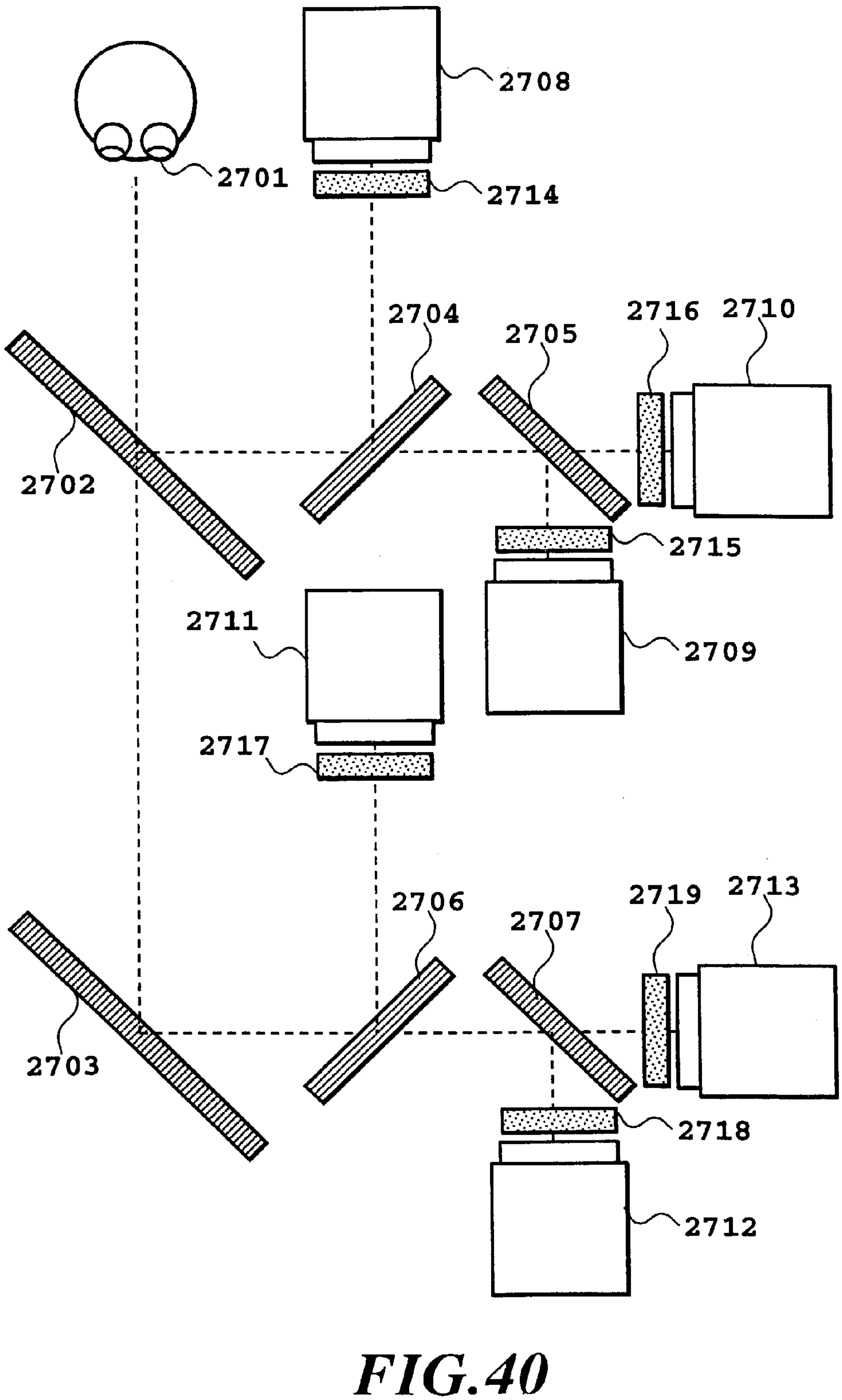
FIG. 40 is a schematic diagram showing the outline configuration of a three-dimensional display according to a twelfth embodiment of the invention.

FIG. 40 is a schematic diagram showing the outline configuration of a three-dimensional display according to a twelfth embodiment of the present invention. Reference numeral 2701 denotes an observer, 2702–2707 half mirrors, 2708–2713 two-dimensional displays, and 2714–2719 shutters.

In the three-dimensional display of this embodiment, the light axes of the two-dimensional displays 2708–2710 are aligned with each other by the half mirrors 2704, 2705, and the two-dimensional images displayed on the two-dimensional displays 2708–2710 are projected onto the front image plane by the shutters 2714–2716 on a time division basis. The light axes of the two-dimensional displays 2711–2713 are aligned with each other by the half mirrors 2706, 2707, and the two-dimensional images displayed on the two-dimensional displays 2711–2713 are projected onto the rear image plane by the shutters 2717–2719 on a time division basis.

[C-0026]

For the two-dimensional displays 2708–2713, a CRT, a liquid crystal display and a plasma display may be used. When a faster speed is required, a display using ferroelectric liquid crystals or antiferroelectric liquid crystals may be used.

[C-0027]

Alternatively, it is possible to use a display that allows high-speed random access to individual pixels, such as a display of oscilloscope.

In this case, the brightness levels of two-dimensional images displayed on the two-dimensional displays 2708–2713 are changed by the two-dimensional displays 2708–2713 themselves.

[C-0028]

[Embodiment 13]

Figure 41:
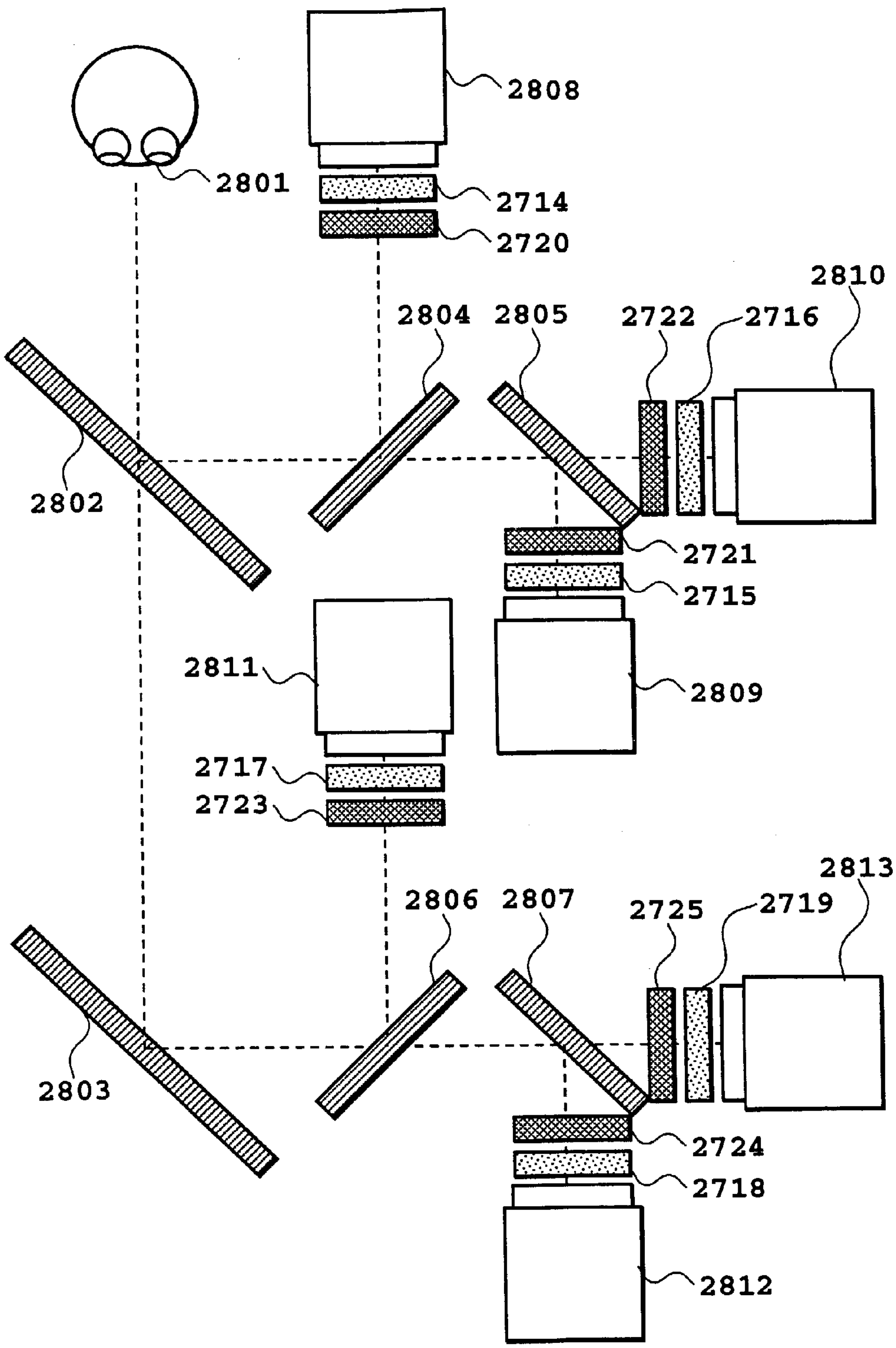
FIG. 41 is a schematic diagram showing the outline configuration of a three-dimensional display according to a thirteenth embodiment of the invention.

FIG. 41 is a schematic diagram showing the outline configuration of a three-dimensional display according to a thirteenth embodiment of the invention. Reference number 2801 denotes an observer, 2802–2807 half mirrors, 2808–2813 two-dimensional displays, 2714–2719 shutters and 2720–2725 beam attenuating filters.

The three-dimensional display of this embodiment differs from the three-dimensional display of the preceding twelfth embodiment in that the brightness of each of the two-dimensional images displayed on the two-dimensional displays 2808–2813 is changed by the beam attenuating filters 2720–2725 disposed at the front of the two-dimensional displays 2808–2813.

For example, when three three-dimensional images are reproduced at positions shifted in the direction of depth by using the two-dimensional displays 2808–2810 that display two-dimensional images on a front image plane and the two-dimensional displays 2811–2813 that display two-dimensional images on a rear image plane, the brightness of each two-dimensional display can be set constant and therefore the beam attenuating filters 2720–2725 can use fixed levels of attenuation.

[C-0029]

When three or more three-dimensional images are reproduced at positions shifted in the direction of depth, the beam attenuating filters 2720–2725 may be a filter that continuously changes its light intensity attenuation by mechanical rotation, a filter that electrically attenuates light intensity by liquid crystals, a device that has slits having changing opening areas and arranged in the direction of rotation and which mechanically rotates the slits to change the brightness, and a device which changes the opening time by a ferroelectric shutter to change the brightness.

The attenuation of the beam attenuating filters 2720–2725 is synchronized with the two-dimensional images projected from the two-dimensional displays 2808–2813 to produce three-dimensional images.

[C-0030]

The invention has been described in detail in conjunction with embodiments. It should be noted, however, that the invention is not limited to the embodiments but various modifications may be made without departing from the spirit of the invention.

[C-0031]

The advantages and effects produced by the representative embodiments described in this specification may be summarized briefly as follows.

[C-0032]

With this invention, a plurality of objects which have different depth positions and overlap each other on the line of sight of an observer can be represented by three-dimensional images in such a way that all the three-dimensional images can be seen by the observer without being hidden by the front images.

[D-0020]

[Embodiment 14]

The three-dimensional display according to a fourteenth embodiment of the present invention represent the overall depth position of the entire three-dimensional object between a plurality of image focusing planes.

Figure 42:
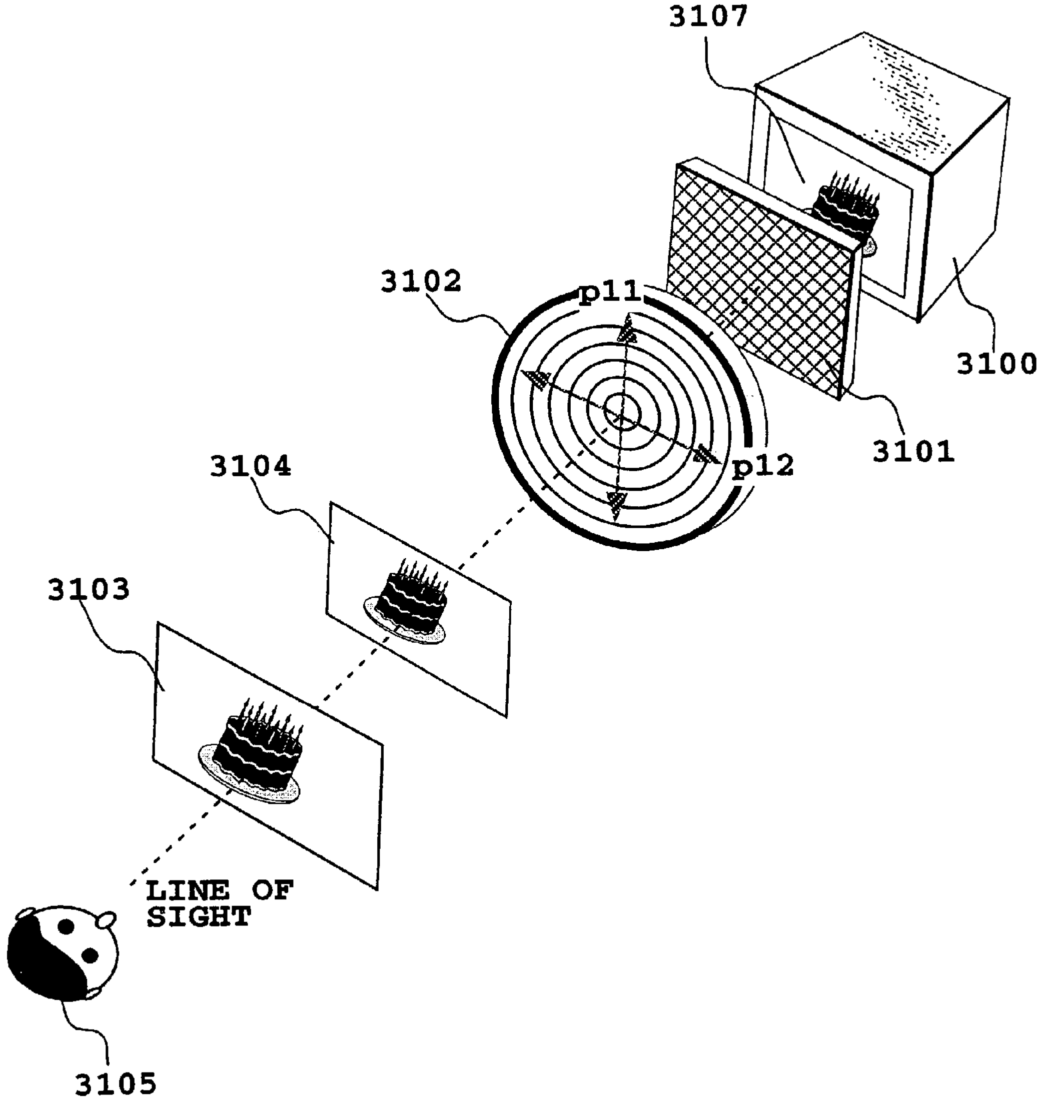
FIG. 42 is a schematic diagram showing the outline configuration of a three-dimensional display according to a fourteenth embodiment of the invention.

FIG. 42 shows the outline configuration of the three-dimensional display of the fourteenth embodiment of the invention. This three-dimensional display includes a two-dimensional display 3100, a polarization varying device 3101 and a polarization type bifocal optical system 3102.

The display light of a two-dimensional image displayed on the two-dimensional display 3100 is split and displayed onto two image focusing planes (in FIG. 42, image focusing planes 3103 and 3104) of the polarization type bifocal optical system 3102 at a brightness ratio that depends on a polarization direction of exit light from the polarization varying device 3101.

When the polarization direction of exit light agrees with one of intrinsic polarization directions (meaning two independent polarization directions) P11 of the polarization type bifocal optical system 3102, the two-dimensional image displayed on the two-dimensional display 3100 is focused on, for example, the image focusing plane 3103. When the polarization direction of the exit light matches the other intrinsic polarization direction P12, the two-dimensional image displayed on the two-dimensional display 3100 is focused on the image focusing plane 3104.

When the polarization direction is other than these two intrinsic polarization directions (including linear polarization, circular polarization, elliptical polarization, etc.), the brightness levels of the image focusing planes 3103 and 3104 are set according to a ratio of components of the exit light polarization direction as projected onto the orthogonal intrinsic polarization directions.

[D-0021]

Among the two-dimensional displays 3100 are a CRT display, a liquid crystal display, an LED display, a plasma display, an FED display, a projection type display and a line drawing type display.

An example of the polarization varying device 3101 includes a device using liquid crystals and a device using PLZT which has birefringence and can control the birefringence by an electric field. These devices will be described later.

Further, an example of the polarization type bifocal optical system 3102 includes a device using liquid crystals and a device which has two optical systems with image focusing planes different from those of the polarization beam splitter or two optical systems with image focusing planes different from those of the beam splitter and the polarizer. These devices will be described later.

[D-0022]

The basic operation of the three-dimensional display of this embodiment will be explained.

Figure 43:
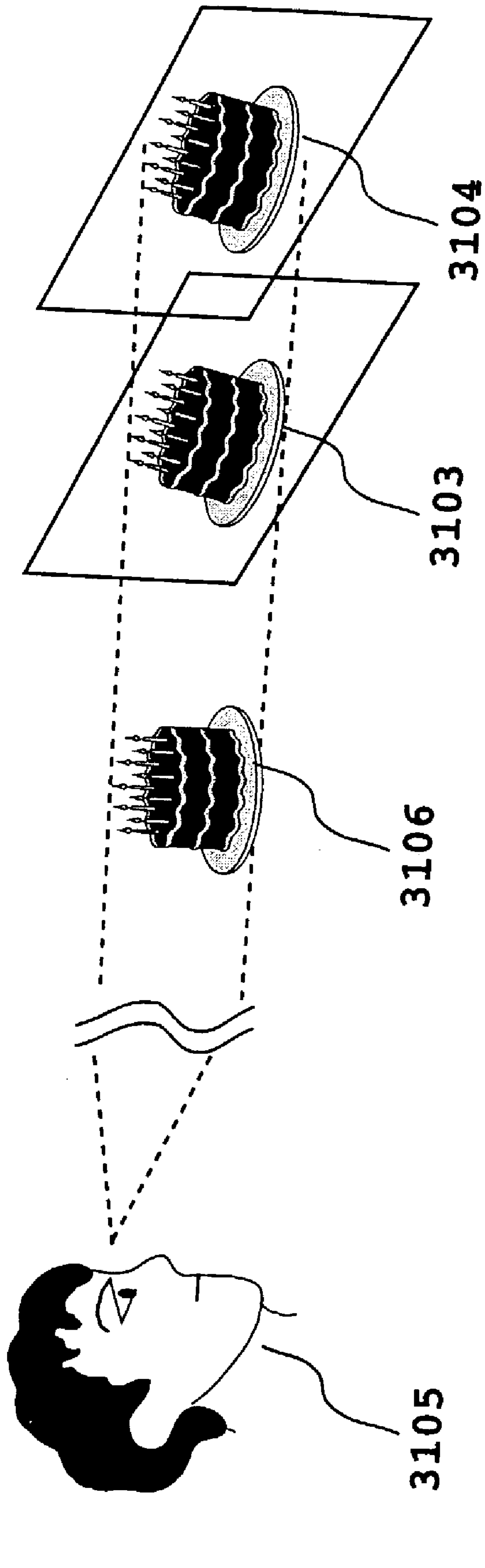
FIG. 43 is a schematic diagram showing the method of generating two-dimensional images in the three-dimensional display according to the fourteenth embodiment.

In the three-dimensional display of this embodiment, as shown in FIG. 43, a three-dimensional object 3106 to be presented to an observer 3105 is projected along the line of sight of both eyes of the observer 3105 onto image focusing planes 3103, 3104 to form two-dimensional images 3107, which are then displayed on the two-dimensional displays 3100 shown in FIG. 42.

The two-dimensional images 3107 may be generated in a variety of ways, which include a method that uses two-dimensional images of the three-dimensional object 3106 shot by camera from the direction of line of sight; a method that synthesizes a plurality of two-dimensional images shot from different directions; or a method that uses synthesizing and modeling techniques based on computer graphics.

[D-0023]

Each polarization varying element of the polarization varying device 3101 is related to one or more groups of pixels on the two-dimensional display 3100.

Figure 44:
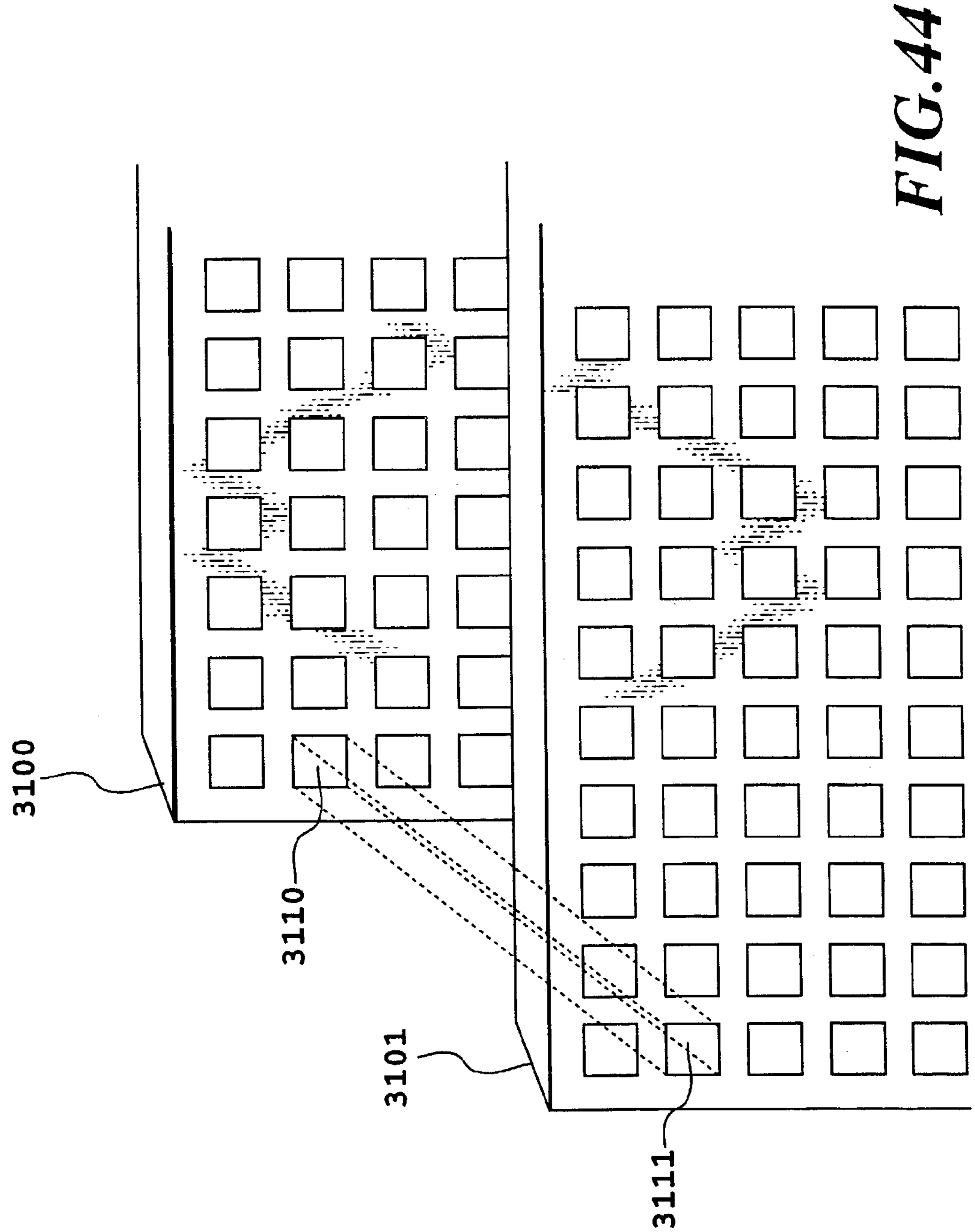
FIG. 44 is a schematic diagram showing the correspondence between pixels of a two-dimensional display and polarization varying elements of a polarization varying device in the three-dimensional display according to the fourteenth embodiment.
Figure 45:
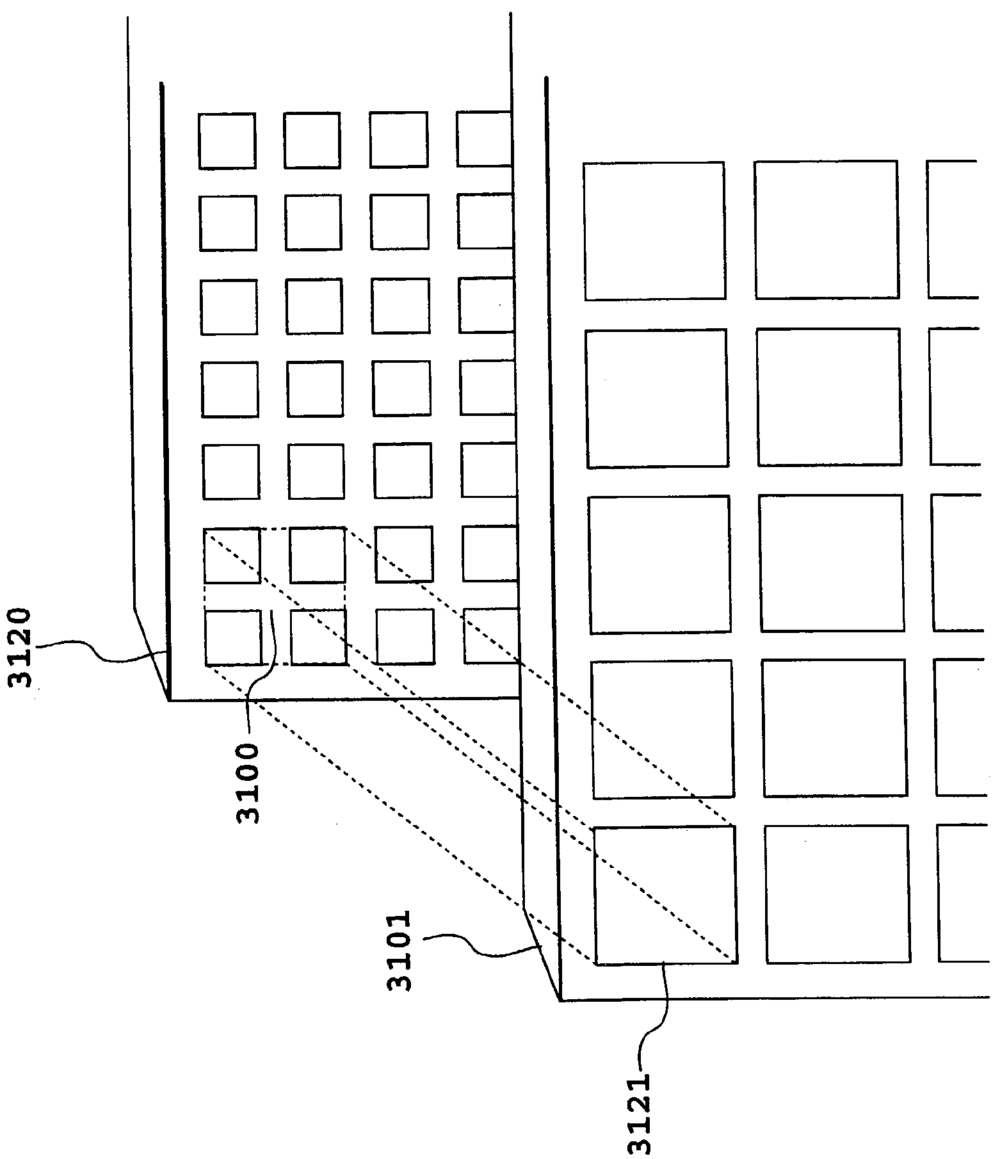
FIG. 45 is a schematic diagram showing the correspondence between pixels of a two-dimensional display and polarization varying elements of a polarization varying device in the three-dimensional display according to the fourteenth embodiment.

For example, as shown in FIG. 44, one pixel 3110 of the two-dimensional display 3100 is related to one polarization varying element 3111 of the polarization varying device 3101. Or, as shown in FIG. 45, a plurality of pixels 120 of the two-dimensional display 3100 are related to one polarization varying element 3121 of the polarization varying device 3101.

[D-0024]

Next, the exit light polarization direction of the polarization varying element (for example, 3111 of FIG. 44 or 3121 of FIG. 45) of the polarization varying device 3101 is changed according to the depth position of that part of the three-dimensional object 3106 which corresponds to the associated pixel (e.g., 3110 in FIG. 44) or pixels (e.g., 3120 in FIG. 45) of the two-dimensional display 3100.

This causes two-dimensional images with brightness levels corresponding to the exit light polarization direction to be displayed on the image focusing planes 3103 and 3104.

The positional relation of the image focusing planes 3103, 3104 is adjusted in advance by using an appropriate optical system so that the images on the image focusing planes 3103, 3104 overlap each other on the line of sight of the observer 3105.

Overlapping the images of the image focusing planes 3103, 3104 on the line of sight of the observer 3105 can be realized by putting the centers or gravity centers of the two-dimensional images 3107 on the line of sight.

[D-0025]

The essential point of the three-dimensional display of this embodiment is that, by changing the exit light polarization direction of each polarization varying element of the polarization varying device 3101, the brightness of each part of the images on the image focusing planes 3103, 3104 is changed according to the depth position of the three-dimensional object 3106 while keeping constant the overall brightness as seen by the observer 3105.

One example method of changing the brightness is explained below by referring to FIGS. 46 to 49.

It is assumed that the image focusing plane 3103 is located closer to the observer 3105 than the image focusing plane 3104 and that the intrinsic polarization directions of the polarization type bifocal optical system 3102 for the image focusing planes 3103, 3104 are taken as p11 and p12.

Figure 46:
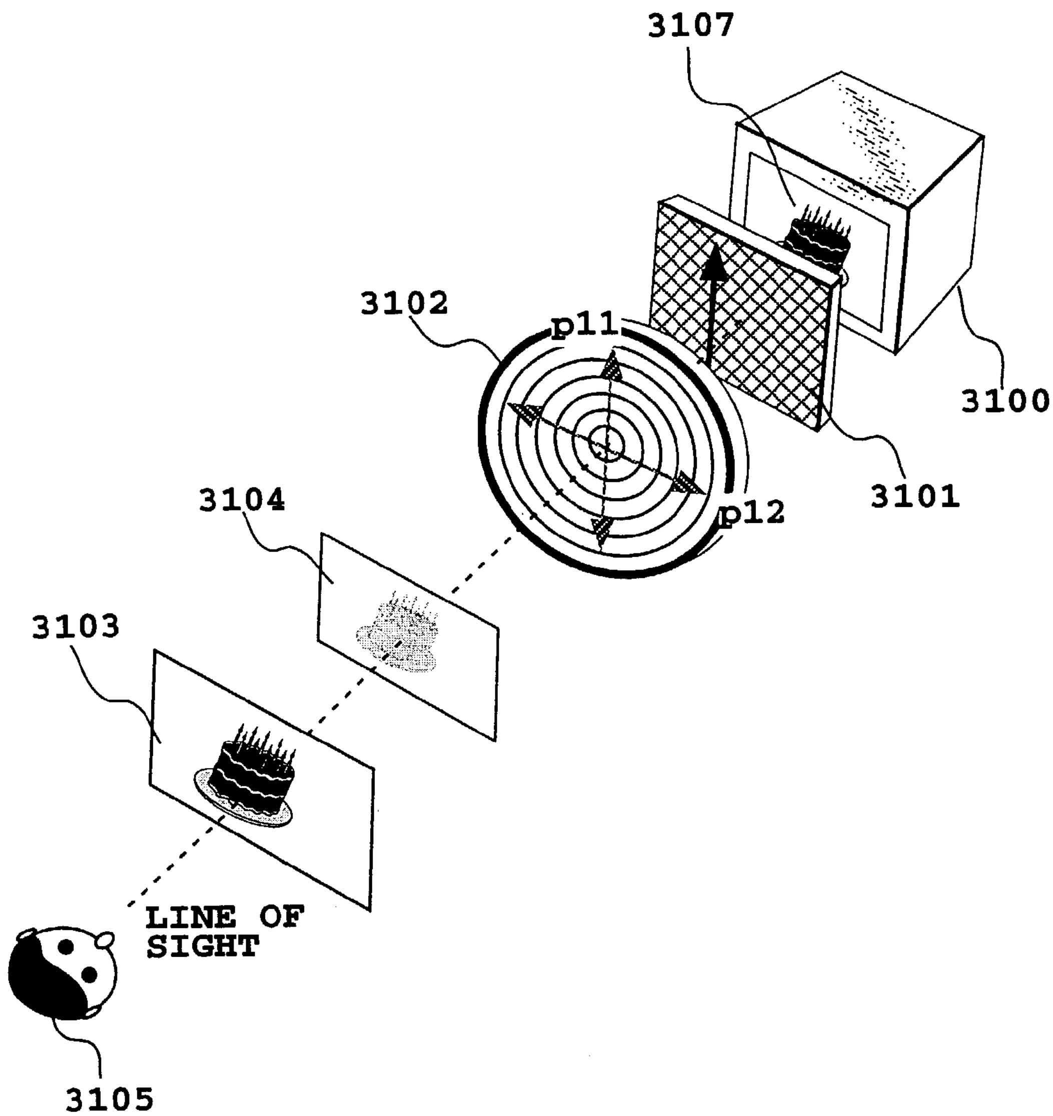
FIG. 46 is a schematic diagram showing a method of displaying a three-dimensional image in the three-dimensional display according to the fourteenth embodiment.

As shown in FIG. 46, when the exit light polarization direction of each polarization varying element of the polarization varying device 3101 coincides with p11, the brightness of the image on the image focusing plane 3103 becomes equal to the brightness of the three-dimensional object 3106 and the brightness of the image on the image focusing plane 3104 becomes zero, thus representing the three-dimensional object 3106 positioned on the image focusing plane 3103.

Figure 47:
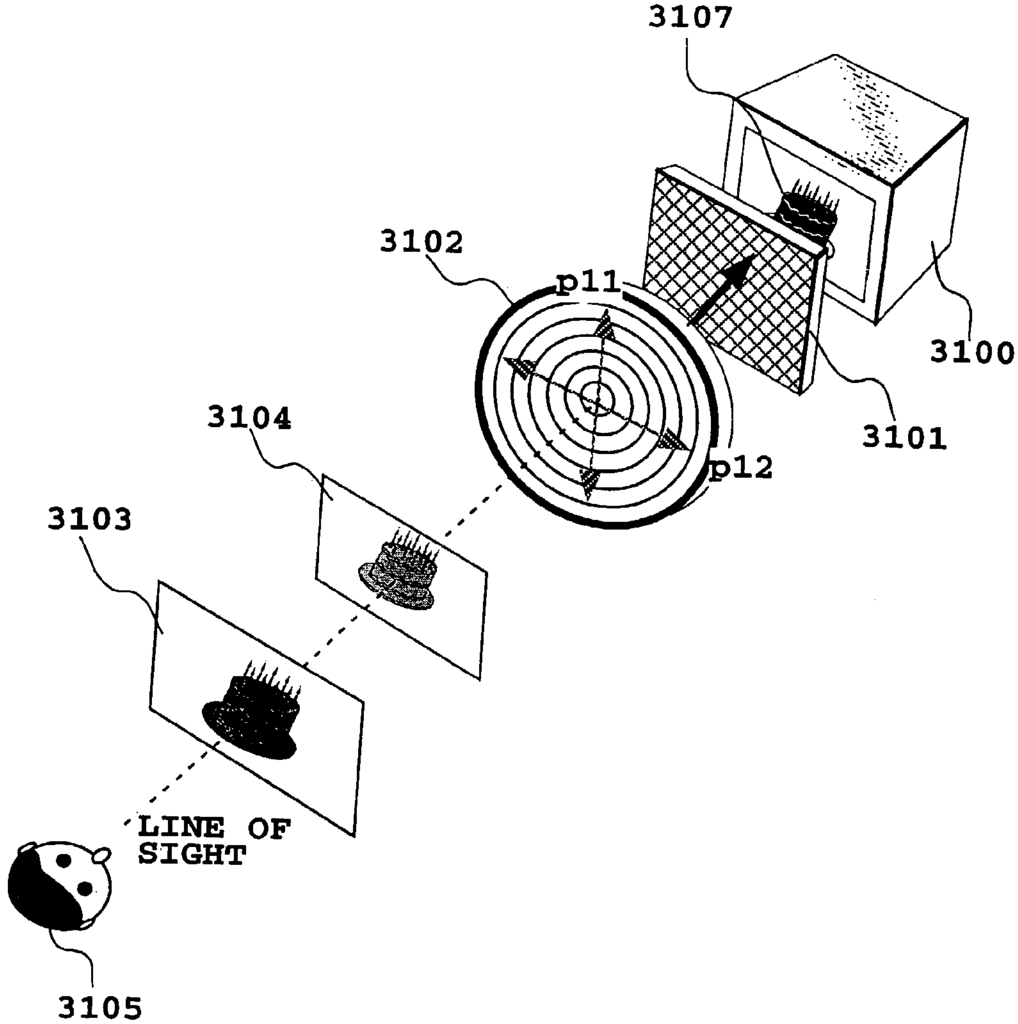
FIG. 47 is a schematic diagram showing a method of displaying a three-dimensional image in the three-dimensional display according to the fourteenth embodiment.

Next, as shown in FIG. 47, as the exit light polarization direction of each polarization varying element of the polarization varying device 3101 is tilted from p11, the brightness of the image on the image focusing plane 3103 slightly lowers from that of FIG. 46 and the brightness of the image on the image focusing plane 3104 increases, thus representing the three-dimensional object 3106 that has moved slightly away from the image focusing plane 3103 toward the image focusing plane 3104.

[D-0026]

Figure 48:
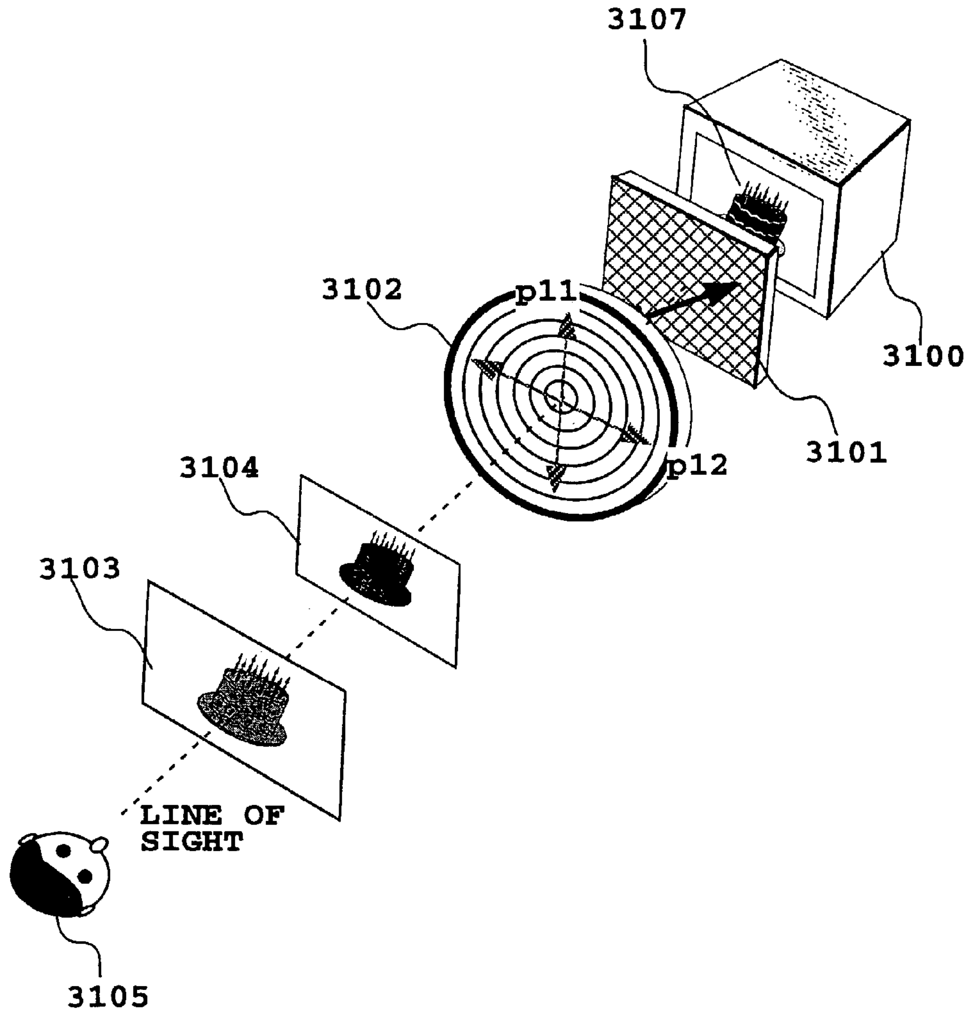
FIG. 48 is a schematic diagram showing a method of displaying a three-dimensional image in the three-dimensional display according to the fourteenth embodiment.

Further, as shown in FIG. 48, when the exit light polarization direction of each polarization varying element of the polarization varying device 3101 is further tilted from that shown in FIG. 47, the brightness of the image on the image focusing plane 3103 further decreases from that of FIG. 47 and the brightness of the image on the image focusing plane 3104 further increases, thus representing a situation where the three-dimensional object 3106 has moved further away from the image focusing plane 3103 toward the image focusing plane 3104.

Figure 49:
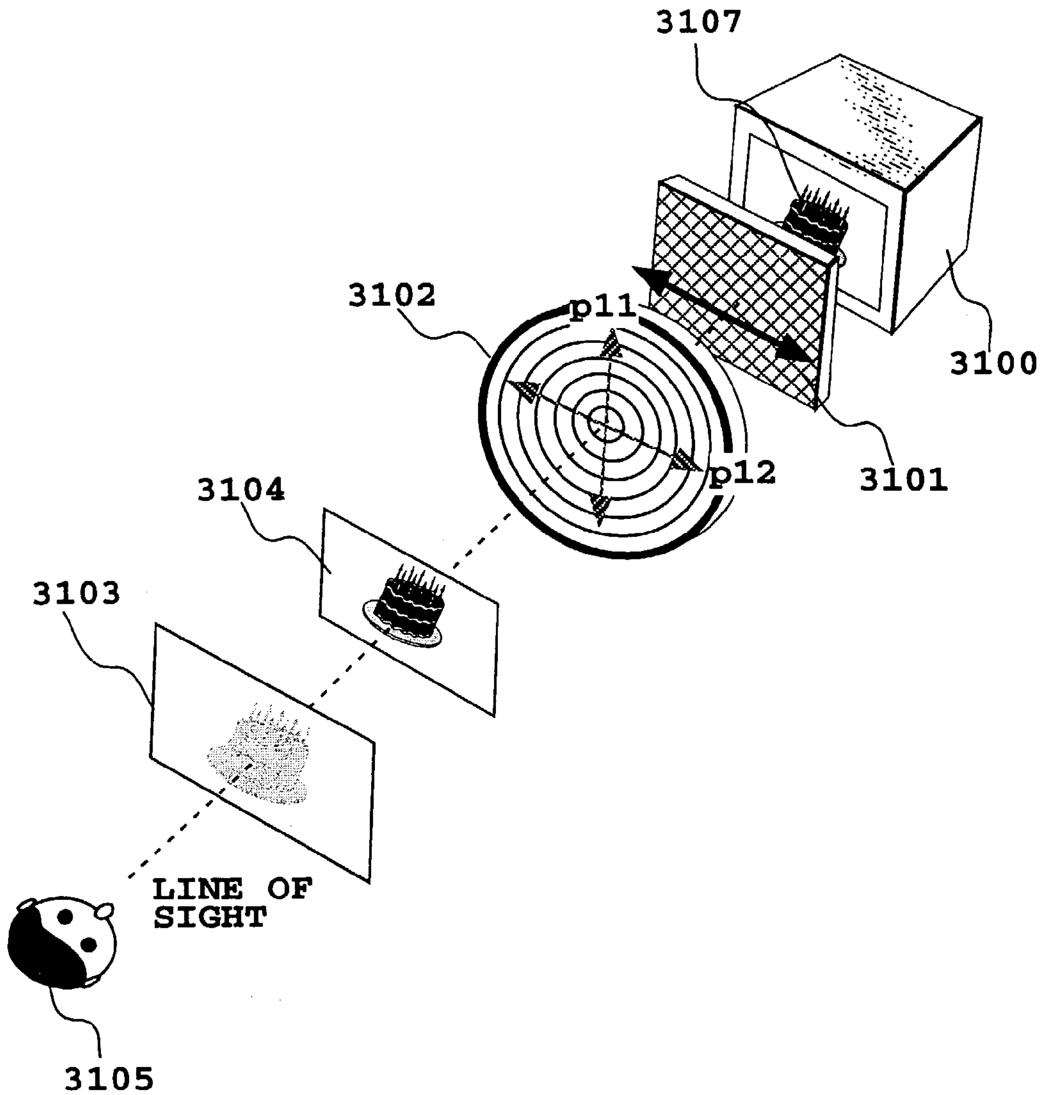
FIG. 49 is a schematic diagram showing a method of displaying a three-dimensional image in the three-dimensional display according to the fourteenth embodiment.

Finally, as shown in FIG. 49, when the exit light polarization direction of each polarization varying element of the polarization varying device 3101 coincides with p12, the brightness of the image on the image focusing plane 3104 becomes equal to the brightness of the three-dimensional object 3106 and the brightness of the image on the image focusing plane 3103 becomes zero, thus representing a situation where the three-dimensional object 3106 is on the image focusing plane 3104.

[D-0027]

With the above representation method, the observer 3105 perceives the three-dimensional object 3106 to be located between the image focusing planes 3103 and 3104 because of observer's physiological or mental factors or optical illusion although the images are actually displayed on the image focusing planes 3103, 3104.

Because, unlike the conventional three-dimensional display, the three-dimensional display of this embodiment has at least two image displaying planes on the near and far sides of the optical illusion position, it is possible to suppress contradictions among the binocular parallax, convergence and focusing—the problem experienced with the conventional three-dimensional display—which in turn is expected to reduce eyestrains.

Further, because, unlike the conventional three-dimensional display, the three-dimensional object even at an intermediate position between the image planes appears three-dimensional to the observer, this embodiment has the advantage of being able to provide a realistic three-dimensional image representation, not the kind of conventional solidity presented by gathering sheet-divided depths.

The three-dimensional display of this embodiment also has the advantage of being able to significantly reduce the amount of data required for three-dimensional representation because it can represent even a three-dimensional object disposed between a plurality of planes.

[D-0028]

Because the three-dimensional display of this embodiment utilizes human physiological or mental factors or optical illusion based on changes in image brightness, there is an advantage that a coherent light source such as a laser is not required and that a color stereoscopic image representation can be easily realized.

Further, because the three-dimensional display of this embodiment does not include mechanical driving parts, it has the advantage of light weight and improved reliability.

Further, because the two-dimensional representation is achieved by the two-dimensional display 3100 and the depthwise representation is achieved by the polarization varying device 3101, this embodiment has the advantage of simple control.

Further, because the resolutions of images can be differentiated, the amount of information can be reduced. That is, in view of the fact that the resolution requirement for the depth direction is lower than that for the two-dimensional direction, it may be an effective method to reduce the resolution in the depth direction.

[D-0029]

In the three-dimensional display of this embodiment, the size of the device is not restricted by the position, interval and size of the image focusing planes.

That is, it is possible to locate the image focusing planes 3103, 3104 at the front side of the three-dimensional display as virtual planes by an optical system, or at the rear side by another optical system.

The image focusing planes 3103, 3104 can be spaced apart a greater distance than in this embodiment by an optical system.

Further, the size of the formed images can also be made larger than in this embodiment by an optical system.

Thus, compared with a method in which displays are actually arranged, this embodiment has the advantage of being able to reduce the overall size of the three-dimensional display.

[D-0030]

The above description concerns a case where the brightness levels of the two-dimensional images 3107 on a plurality of image focusing planes 3103, 3104 are changed while keeping constant the overall brightness as seen by the observer. It is a common technique employed in computer graphics to progressively reduce the overall brightness as seen by the observer 3105 toward the far side in order to make the image look solid. It is obvious that the use of this technique also in this embodiment can further enhance the three-dimensional effect.

Sequentially changing the two-dimensional images 3107 and the polarization direction of the display light of the two-dimensional images 3107 and throwing it onto a plurality of image focusing planes 3103, 3104 at different depth positions can generate a three-dimensional video image.

While this embodiment has described a case where the three-dimensional object 3106 to be represented is displayed as two-dimensional images on two image focusing planes 3103, 3104, it is apparent that the similar effects can be expected if more than two image focusing planes are used.

This embodiment has described only the basic configuration and it is apparent that aberration can be reduced by adding optical systems.

Further, this embodiment has described a case where an observer 3105 is located at the front center of the three-dimensional display. If the observer 310 is located at other positions, it is apparent that the similar effects can easily be produced by changing or adding optical systems.

[D-0031]

[Embodiment 15]

The three-dimensional display according to a fifteenth embodiment of the invention differs from the preceding embodiment in that the three-dimensional display represents the depth of the three-dimensional object itself.

Figure 50:
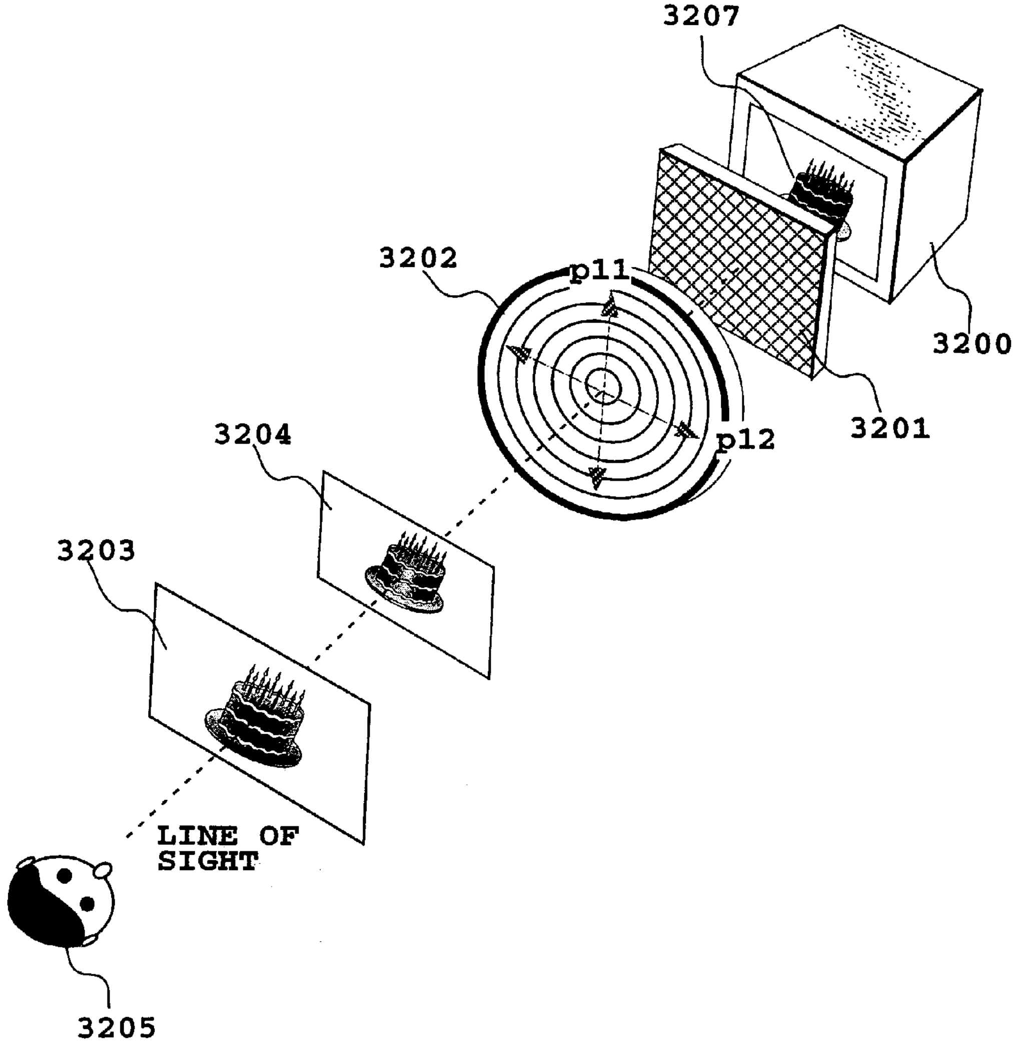
FIG. 50 is a schematic diagram showing the outline configuration of a three-dimensional display according to a fifteenth embodiment of the invention.

FIG. 50 shows the outline configuration of the three-dimensional display of the fifteenth embodiment of the invention. The three-dimensional display, as with the fourteenth embodiment, includes a two-dimensional display 3200, a polarization varying device 3201 and a polarization type bifocal optical system 3202.

In the three-dimensional display of this embodiment, too, the display light of a two-dimensional image displayed on the two-dimensional display 3200 is split and displayed onto two image focusing planes (in FIG. 50, image focusing planes 3203 and 3204) of the polarization type bifocal optical system 3202 at a brightness ratio that depends on a polarization direction of exit light from the polarization varying device 3201.

[D-0032]

The basic operation of the three-dimensional display of this embodiment will be explained as follows.

First, the two-dimensional images 3207 of a three-dimensional object to be represented are displayed on the two-dimensional display 3200.

Then, as shown in FIGS. 44 and 45, each polarization varying element of the polarization varying device 3201 is related to one or more pixels of the two-dimensional display 3200.

Next, the exit light polarization direction of the related polarization varying element is changed according to the depth position of that part of the three-dimensional object which corresponds to the associated pixel (e.g., 3110 in FIG. 44) or pixels (e.g., 3120 in FIG. 45) of the two-dimensional display 3200.

This causes two-dimensional images with brightness levels corresponding to the exit light polarization direction to be displayed on the image focusing planes 3203 and 3204.

The positional relation of the image focusing planes 3203, 3204 is adjusted in advance by using an appropriate optical system so that the images on the image focusing planes 3203, 3204 overlap each other on the line of sight of the observer 3205.

[D-0033]

The essential point of the three-dimensional display of this embodiment is that, by changing the exit light polarization direction of each polarization varying element of the polarization varying device 3201, the brightness of each part of the images on the image focusing planes 3203, 3204 is changed according to the depth position of each part of the three-dimensional object while keeping constant the overall brightness as seen by the observer 3205.

One example method of changing the brightness is explained below by referring to FIGS. 51A and 51B.

Figure 51A:
FIGS. 51A and 51B are schematic diagrams showing a method of displaying a three-dimensional image in the three-dimensional display according to the fifteenth embodiment.
Figure 51B:
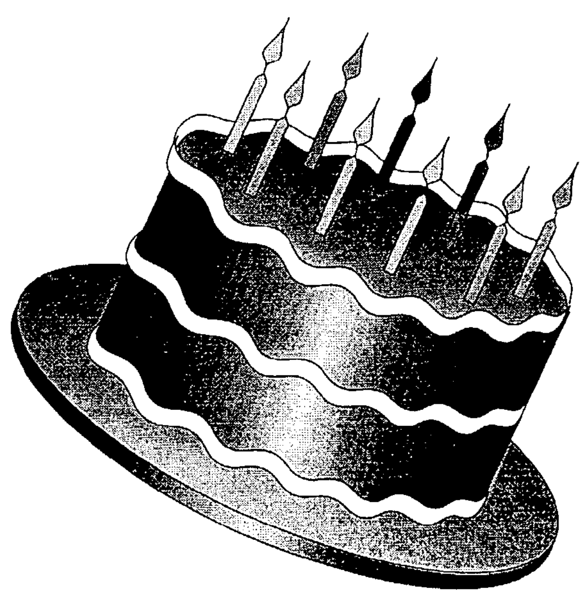

FIG. 51A show an example image formed on an image focusing plane close to the observer, for example image focusing plane 3203, and FIG. 51B represents an example image formed on an image focusing plane remote from the observer, for example image focusing plane 3204.

When a cake, as shown in FIGS. 51A and 51B, is taken as an example object, the top and bottom surfaces of the cake is almost flat except for candles stuck on the top, the wall surface is cylindrical, and the candles are arranged near the circumference of the top surface of the cake.

As shown in FIGS. 51A and 51B, in the two-dimensional images 3207, on the top and bottom surfaces the upper parts represent the remote parts of the cake. On the wall surface, the central part of the wall surface corresponds to the near side of the cake, and as you go from the center toward the left and right, the surface position moves toward the far side. And the central part of the hidden wall surface, which is shown higher than the front wall surface, is located on the far side.

In this case, polarization direction of each part needs to be changed by considering the two intrinsic polarization directions of the polarization type bifocal optical system 3202 so that the brightness levels of the image focusing planes 3203, 3204 will change as follows.

[D-0034]

First, the brightness on the top and bottom surfaces is progressively changed according to the depth position so that, as shown in FIG. 51A, on an image focusing plane 3203 close to the observer 3205 a portion close to the observer 3205 (a lower part of the two-dimensional image 3207) has a higher brightness level and a portion remote from the observer (an upper part of the two-dimensional image 3207) has a lower brightness level.

Further, on an image focusing plane 3204 remote from the observer 3205, the brightness is progressively changed according to the depth position so that, as shown in FIG. 51B, a portion close to the observer 3205 (a lower part of the two-dimensional image 3207) has a lower brightness level and a portion remote from the observer (an upper part of the two-dimensional image 3207) has a higher brightness level.

Next, the brightness of the cylindrical portion is also changed progressively according to its depth position so that, on an image focusing plane close to the observer 3205, a portion close to the observer 3205 (around the center) has a higher brightness level and a portion remote from the observer (near the left and right end) has a lower brightness level, as shown in FIG. 51A.

On an image focusing plane 3204 remote from the observer 3205, the brightness is changed progressively so that, as shown in FIG. 51B, a portion close to the observer 3205 (around the center) has a lower brightness level and a portion remote from the observer (near the left and right end) has a higher brightness level.

In FIGS. 51A and 51B, the darker the image is shaded, the higher the brightness level it represents.

With the above representation method, the observer 3205 perceives as if there is a cylindrical cake with almost flat top and bottom surfaces because of observer's physiological or mental factors or optical illusion although what is actually shown to the observer is two-dimensional images.

With this three-dimensional display of this embodiment, it is possible to easily represent a three-dimensional object having a continuous depth.

[D-0035]

[Embodiment 16]

A polarization type bifocal optical system that can be used in the three-dimensional displays of the preceding embodiments will be explained.

Figure 52:
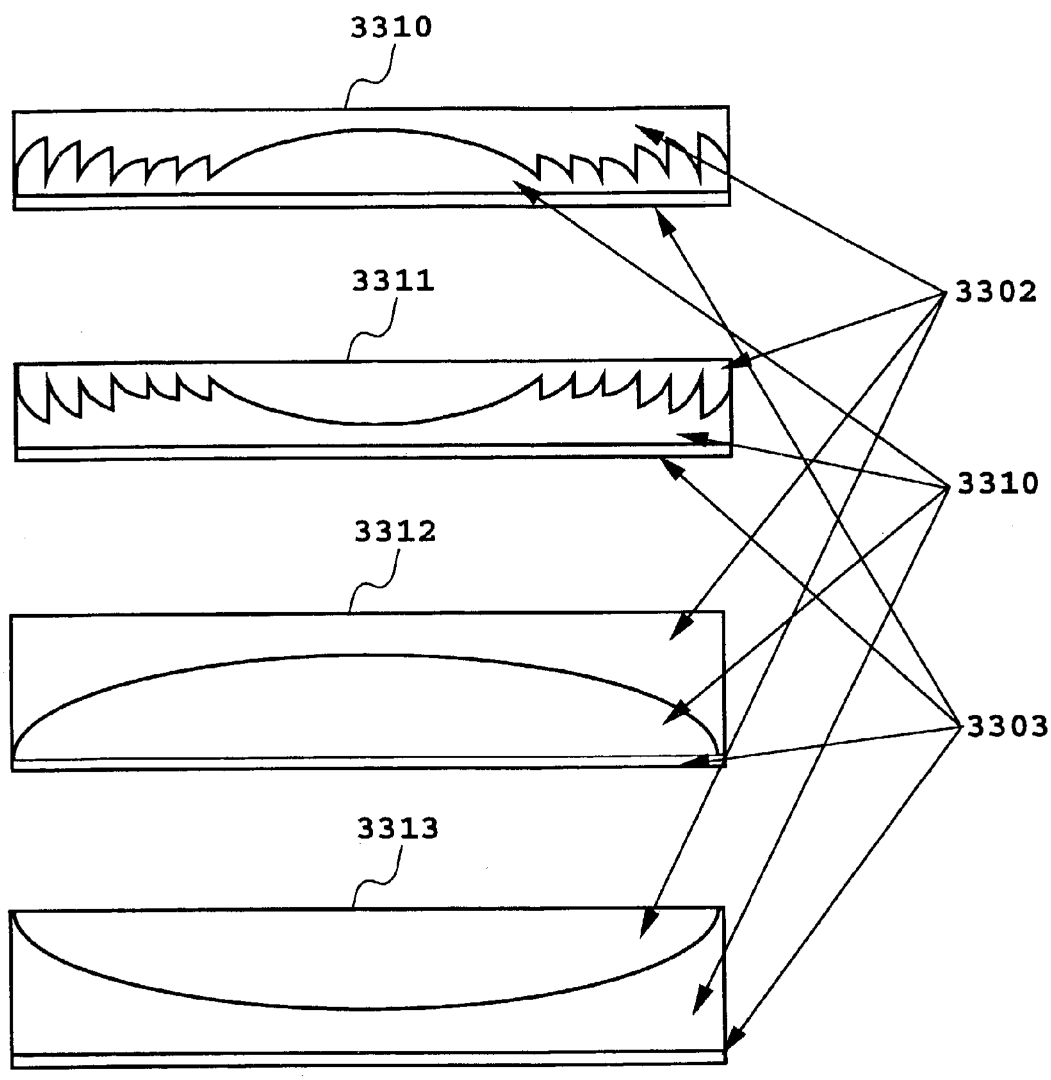
FIG. 52 is a schematic diagram showing one example of a polarizing type bifocal optical system that can be used in the three-dimensional display according to each of the embodiments of the invention.

FIG. 52 shows examples of the polarization type bifocal optical system that can be used in the three-dimensional displays of the preceding embodiments.

The polarization type bifocal optical systems represented by reference numerals 3310–3313 in FIG. 52 each have a fixed focus lens 3301 and a birefringent area 3302.

The fixed focus lens 3301 is formed by, for example, a convex lens of glass or plastics as shown in a polarization type bifocal optical system 3313; a concave lens of glass or plastics as shown in a polarization type bifocal optical system 3312; or a lens system combining convex lens, concave lens and prism of glass or plastics or a mirror system combining convex lens, concave lens and prism as shown in polarization type bifocal optical systems 3310, 3311, respectively.

The birefringent area 3302 is formed of, for example, a medium of liquid crystals or PLZT that has birefringence.

[D-0036]

Here, it is assumed that the refractive index of the fixed focus lens 3301 is n1, that the intrinsic polarization directions in the birefringent area 3302 are p21 and p22, and that the refractive indices in these polarization directions are n21 and n22.

When, for example, light enters from the birefringent area 3302, the incident light is split into polarized light beams having polarization directions of p21 and p22 according to the polarized state. The polarized beams propagate according to the refractive indices n21, n22 they sense, and contact the fixed focus lens 3301 of the refractive index of n1.

Figure 53:
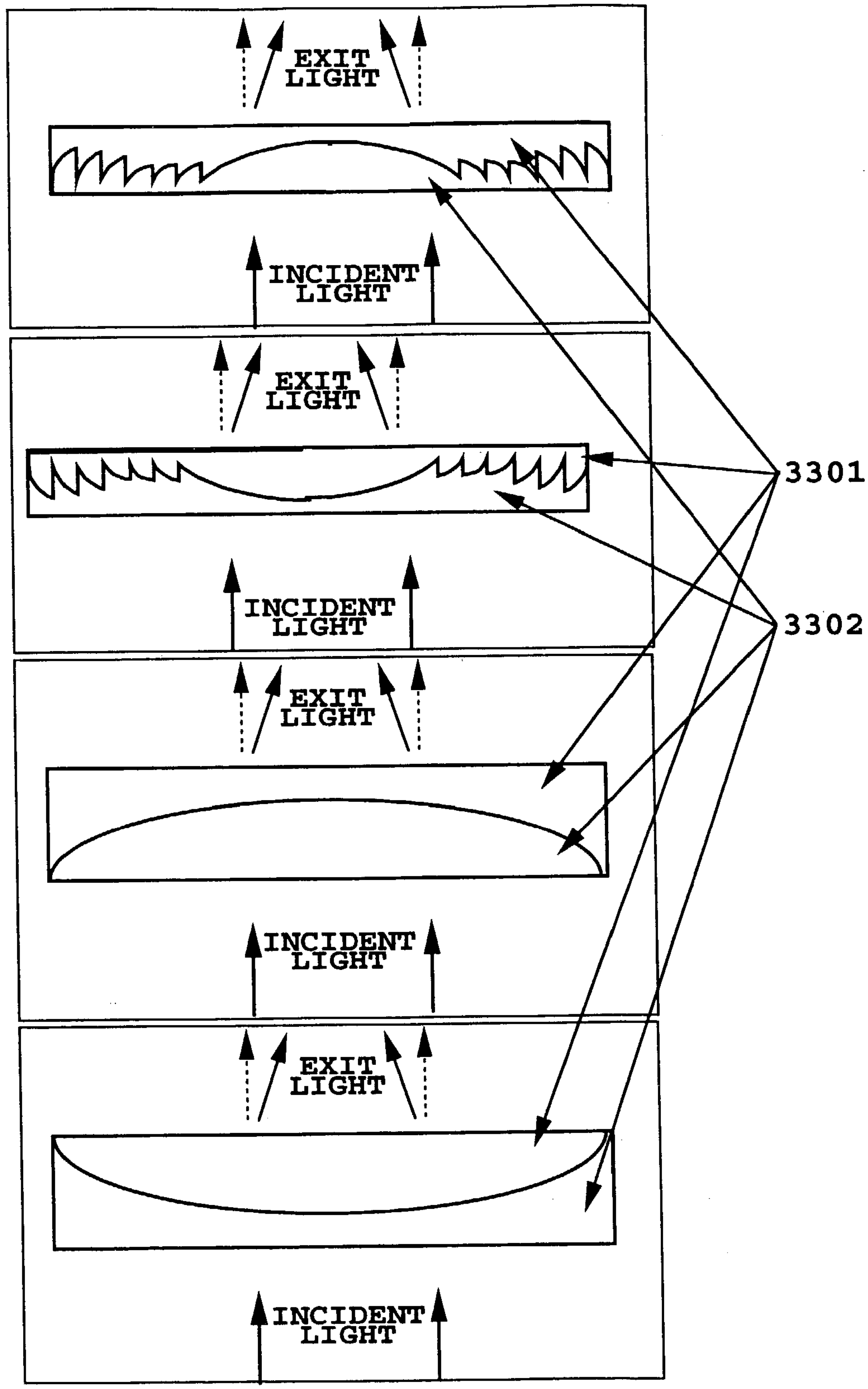
FIG. 53 is a schematic diagram showing the relation between incoming light and exit light in the polarizing type bifocal optical system shown in FIG. 52.

As shown in FIG. 53, the two polarized light beams, which remain split as they go out, form images at different positions according to the difference in the refractive index. That is, this optical system works as a bifocal optical system that splits light beam according to the polarization directions.

Conversely, when light enters from the fixed focus lens 3301 side, the light is split according to the refractive indices associated with the intrinsic polarization directions and forms images on two different image focusing planes.

[D-0037]

As shown in FIG. 52, when the birefringent area 3302 is liquid crystals, the addition of an alignment layer 3303 can ensure uniform in-plane splitting of light entering from the birefringent area 3302 side.

Even when the alignment layer 3303 is provided on only one of the birefringent areas 3302, the incident light becomes twisted by its own optical activity according to the alignment of the birefringent medium. Because the refractive indices that the split light beams sense do not change, the aforementioned effect will also be produced without problem.

Providing an alignment layer also on the side of an interface with the fixed focus lens 3301 is effective when light is thrown in from the fixed focus lens 3301 side or when such alignment-dependent optical systems are connected in series.

[D-0038]

Figure 54:
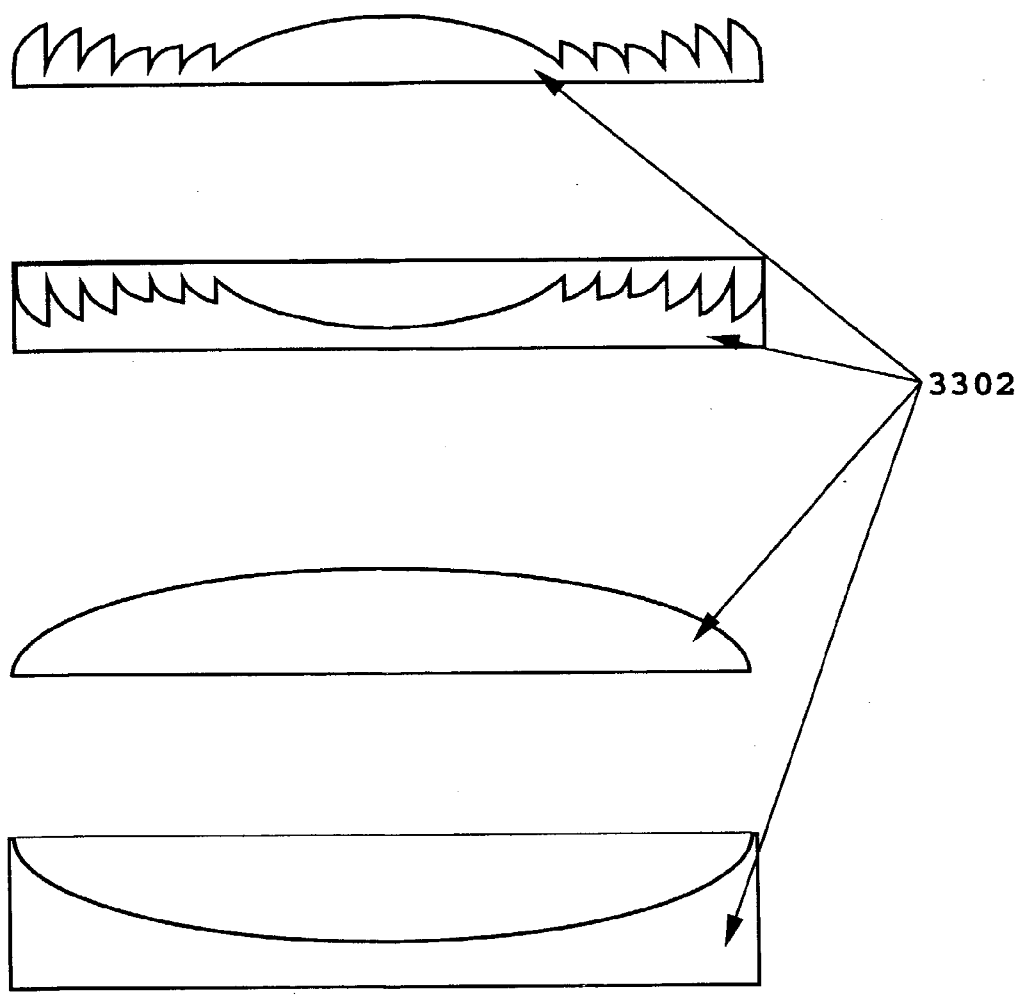
FIG. 54 is a schematic diagram showing another example of a polarizing type bifocal optical system that can be used in the three-dimensional display according to each of the embodiments of the invention.

In the polarization type bifocal optical systems shown in FIGS. 52 and 53, even when the fixed focus lens 3301 is not provided, it is obvious that if one or both sides of the birefringent area 3302 are formed in a lens or prism shape as shown in FIG. 54, the effects similar to those shown in FIGS. 52 and 53 can be produced.

Liquid crystal are useful as a birefringent medium because of their large refractive anisotropy. Applicable kinds of liquid crystals include ordinary nematic liquid crystal, polymer dispersed liquid crystal, holographic polymer dispersed liquid crystal, polymer liquid crystal, smectic liquid crystal, ferroelectric liquid crystal, and polymer stabilized ferroelectric liquid crystal.

Further, it is obvious that birefringence can also be obtained with polymer materials other than liquid crystals by aligning the major axes of the polymer materials during forming.

[D-0039]

[Embodiment 17]

Figure 55:
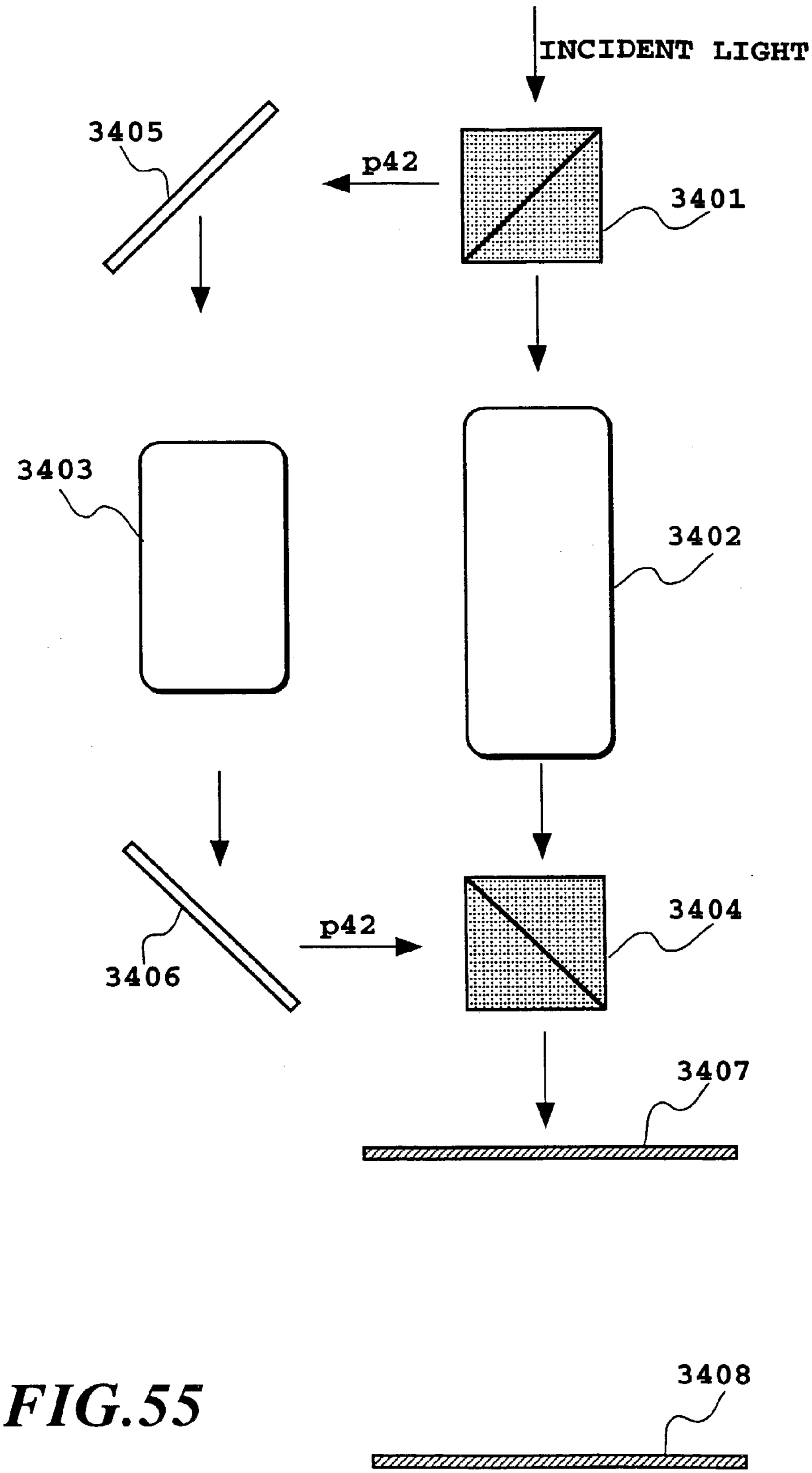
FIG. 55 is a schematic diagram showing still another example of a polarizing type bifocal optical system that can be used in the three-dimensional display according to each of the embodiments of the invention.

FIG. 55 shows other examples of the polarization type bifocal optical system that can be used in the three-dimensional displays of the preceding embodiments.

The polarization type bifocal optical system shown in FIG. 55 comprises: a polarizing beam splitter 3401 for splitting a beam on the incoming side; two optical systems 3402, 3403 with different focal lengths; a polarizing beam splitter 3404 for synthesizing on the outgoing side; and plane mirrors 3405, 3406 for bending a light path.

The two optical systems 3402, 3403 are formed, for example, by convex lens, concave lens, prism, convex/concave mirror or plane mirror or a combination of these.

In the polarization type bifocal optical system shown in FIG. 55, incident light is split by the polarizing beam splitter 3401 into two intrinsic polarized beams p41, p42 at a brightness ratio that corresponds to their polarization directions, and then fed into the optical systems 3402, 3403.

The optical systems 3402, 3403 have different focal lengths and thus the incident polarized beams p41, p42 have different image forming distances.

Therefore, when both of the polarized beams p41, p42 are synthesized by the polarizing beam splitter 3404, the two intrinsic polarized beams p41, p42 form images on different image focusing planes 3407, 3408.

In this way, the optical system shown in FIG. 55 can form a polarization type bifocal optical system that can split light at a brightness ratio that corresponds to the polarization directions.

Figure 56:
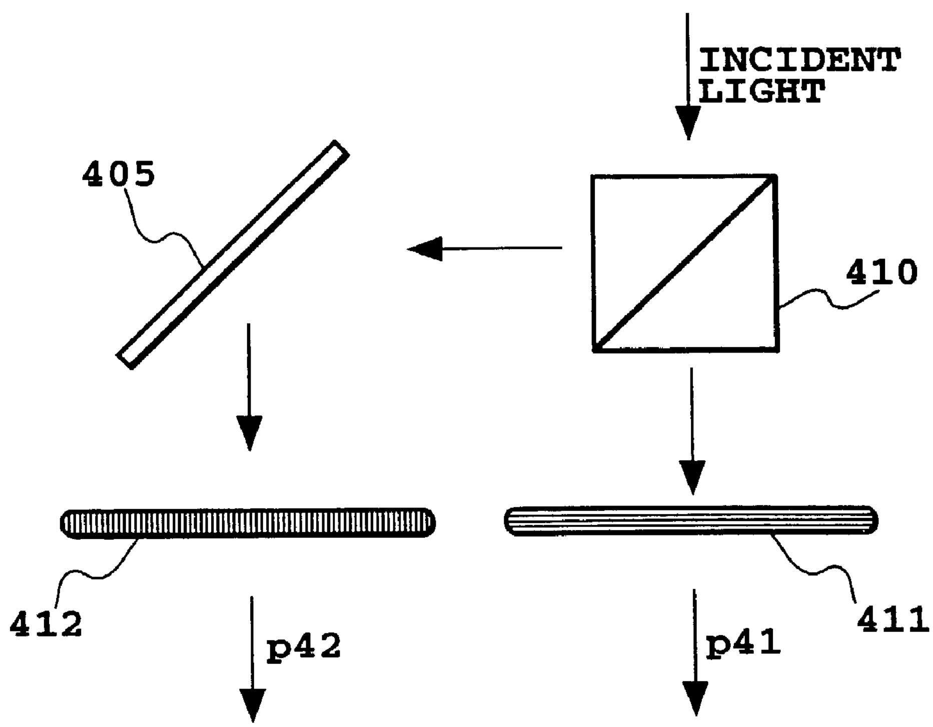
FIG. 56 is a schematic diagram showing an optical system that can be used instead of the polarizing beam splitter shown in FIG. 55.

Here it is obvious that the similar effects can be produced if an optical system including the configuration shown in FIG. 56 is used instead of the polarizing beam splitter 3401.

That is, the configuration of FIG. 56 includes polarizing plates 3411, 3412 whose polarization directions are perpendicular to that of the beam splitter 3410 (e.g., semitransparent mirror and semitransparent prism). This configuration provides the similar effects.

It is also possible to use an optical system having the configuration shown in FIG. 56 instead of the polarizing beam splitter 3404.

[D-0040]

[Embodiment 18]

The polarization varying device that can be used in the three-dimensional displays of the preceding embodiments will be explained.

A well known example of device that can change the polarization direction of incident light, as do the polarization varying devices used in the three-dimensional displays of the preceding embodiments, is a device that uses a medium (e.g., liquid crystals and PLZT) capable of changing birefringence by electric field and voltage.

Many kinds of devices using liquid crystals are described in "Liquid Crystals, Basics" and "Liquid Crystals, Applications" (by Okano and Kobayashi, published by Baifukan).

Major examples are explained below by referring to FIGS. 57 to 63A and 62B.

Figure 57:
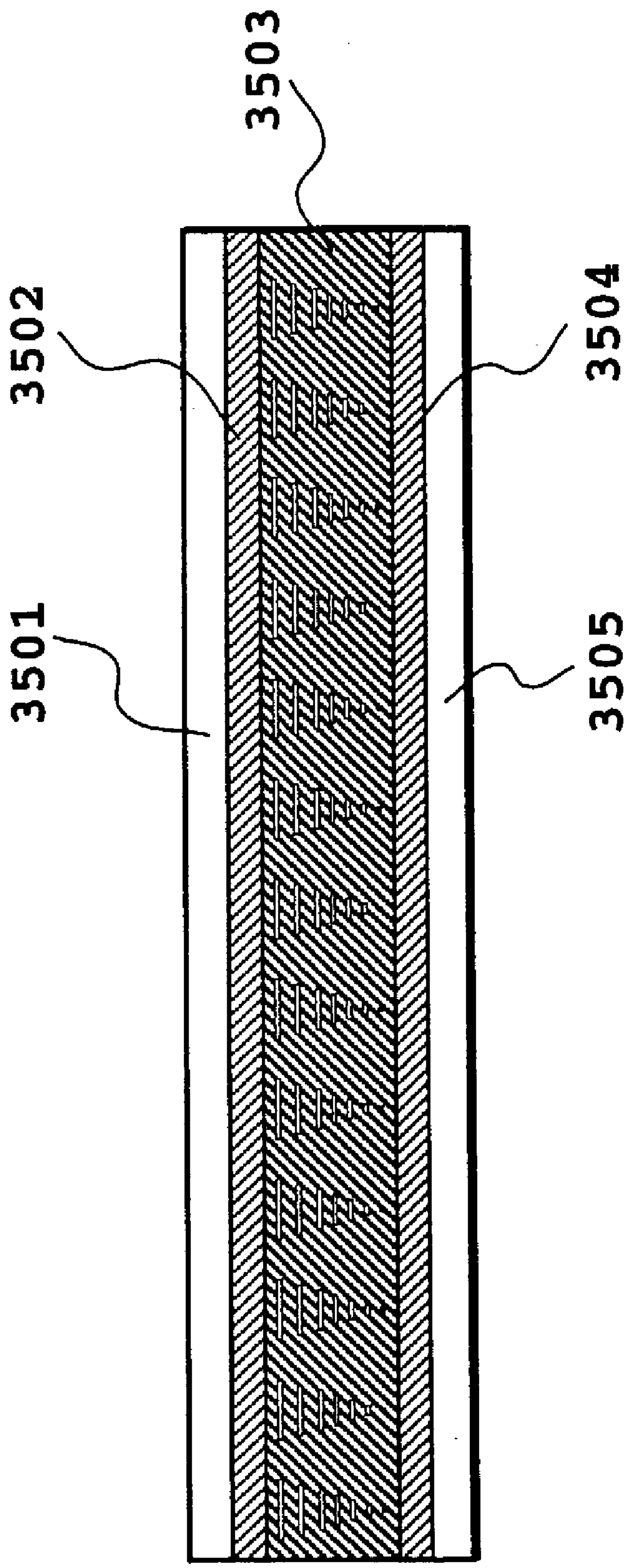
FIG. 57 is a cross-sectional view showing the outline configuration of a twisted nematic type polarization varying device that can be used in the three-dimensional display according to each of the embodiments of the invention.

FIG. 57 shows the outline configuration of a twisted nematic type polarization varying device that can be used in the three-dimensional displays of the preceding embodiment.

The twisted nematic type polarization varying device shown in FIG. 57 includes a transparent conductive layer (transparent electrode) 3501, an alignment layer 3502, a nematic liquid crystal region 3503, an alignment layer 3504, and a transparent conductive layer (transparent electrode) 3505.

It is common that the orientation directions of the alignment layers 3502 and 3504 are set perpendicular to each other and that a chiral material is added so that the liquid crystal molecules are twisted or describe a spiral in the same direction.

[D-0041]

Figure 58:
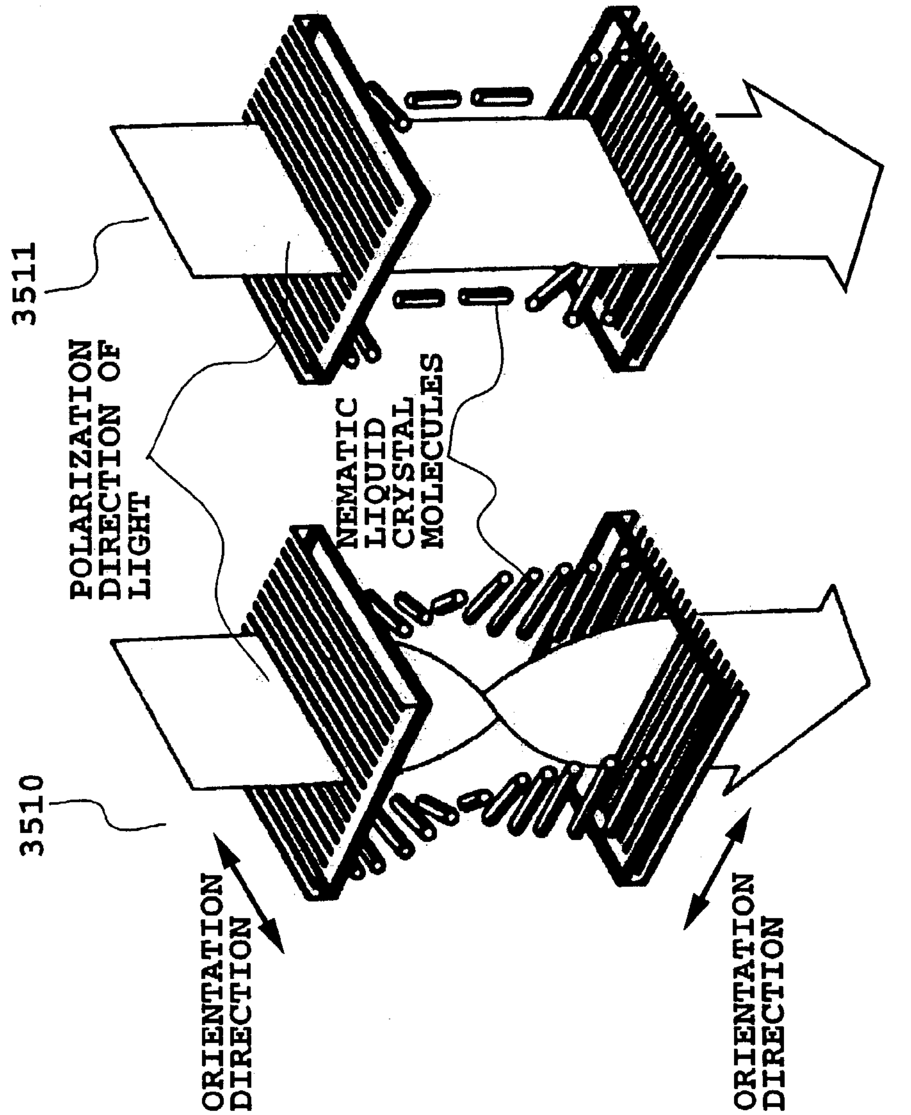
FIG. 58 is a schematic diagram showing the operating principle of the twisted nematic type polarization varying device shown in FIG. 57.

As indicated by reference number 3510 in FIG. 58, when no voltage is applied between the transparent conductive films 3501 and 3505, the crystal molecules rotate 90 degrees to described a spiral by the orientation restriction force of the alignment layers 3502, 3504 and the effect of the chiral material.

The linearly polarized incident light therefore has its polarization direction changed almost 90 degrees by the optical activity of the liquid crystals (one of the properties of the birefringent material) before going out of the liquid crystals.

[D-0042]

When a voltage V5 sufficiently higher than the threshold voltage is applied between the transparent conductive films 3501 and 3505, the liquid crystal molecules are aligned in the voltage application direction, as indicated by reference numeral 3511.

Hence, the incident light goes out almost without changing the polarization direction.

When the voltage applied between the transparent conductive films 3501 and 3505 is V5 or lower, a continuous change in polarization direction according to the applied voltage is obtained.

In this way, the polarization direction of the incident light can be changed by the voltage applied between the transparent conductive films 3501 and 3505.

Further, it is also a well known practice to arrange these constitutional elements in matrix and drive them by using active drive elements.

[D-0043]

Figure 59:
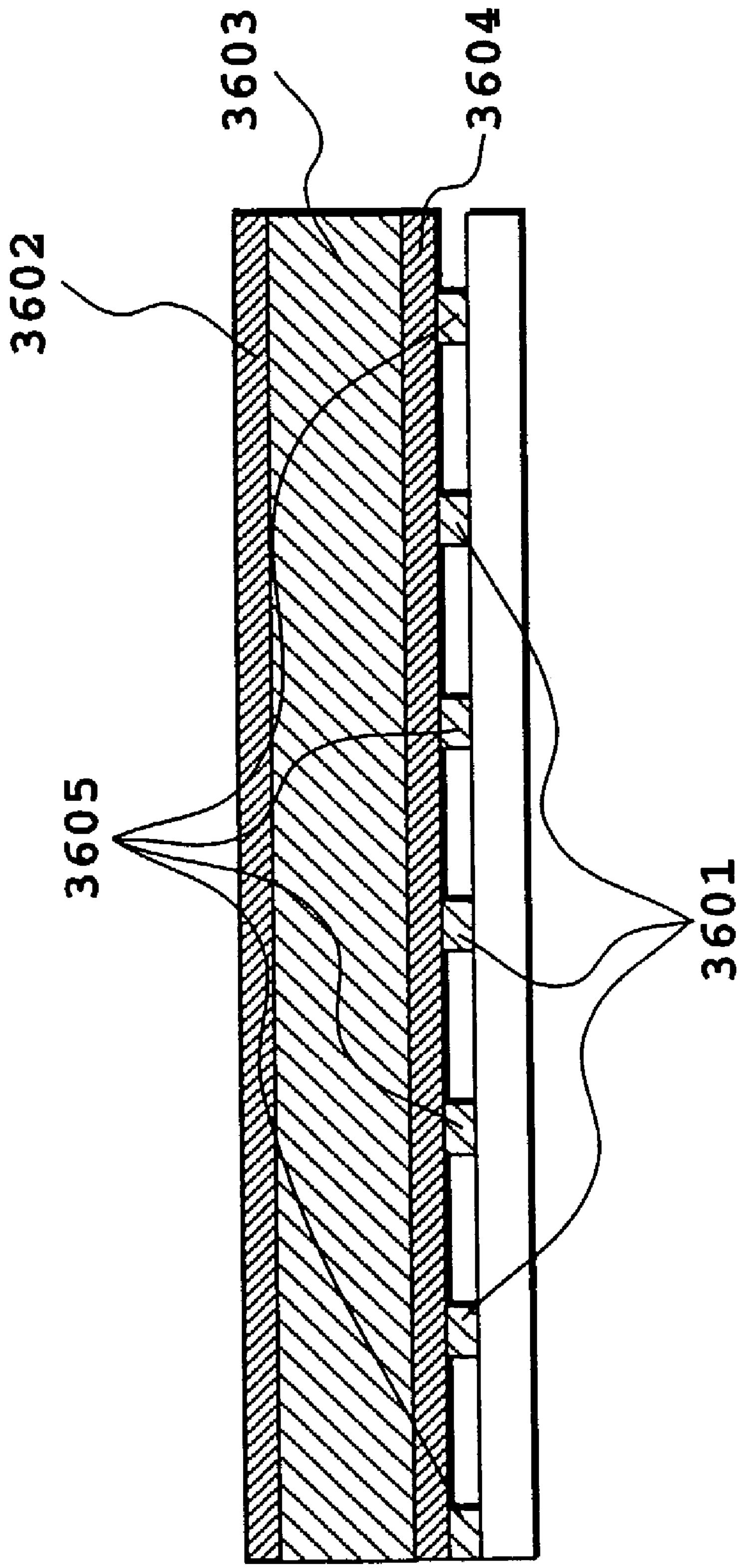
FIG. 59 is a cross-sectional view showing the outline configuration of an in-plane type polarization varying device that can be used in the three-dimensional display according to each of the embodiments of the invention.

FIG. 59 shows the outline configuration of an in-plane type polarization varying device that can be used in the two-dimensional displays of the preceding embodiments.

The in-plane type polarization varying device includes a transparent conductive film (transparent electrode) 3601, an alignment layer 3602, a nematic liquid crystal region 3603, an alignment layer 3604, and a transparent conductive film (transparent electrode) 3605.

Here the orientation directions of the alignment layer 3602 and the alignment layer 3604 are parallel, and the transparent conductive films 3601 and 3605 are in the same plane.

Figure 60:
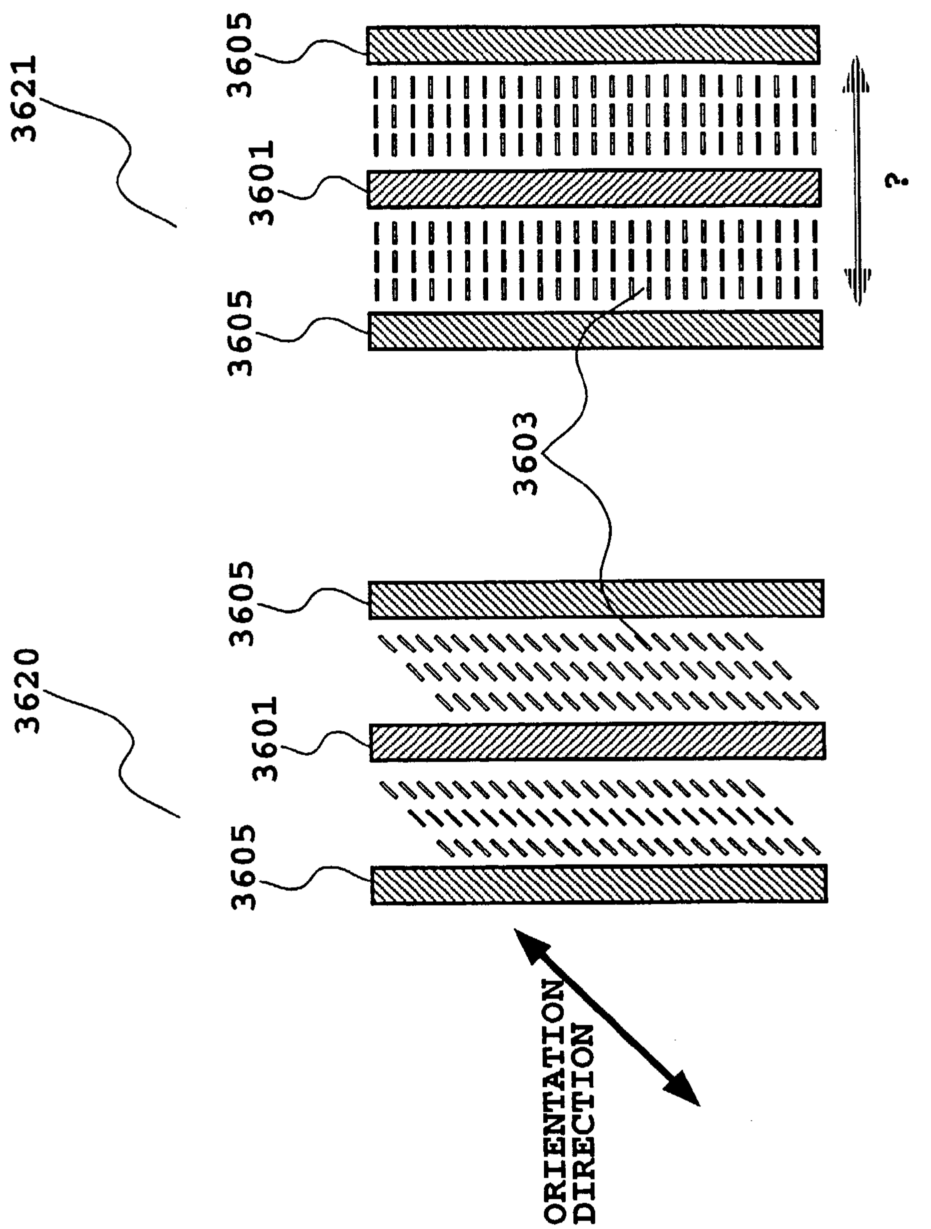
FIG. 60 is a schematic diagram showing the working principle of the in-plane type polarization varying device shown in FIG. 59.

As shown by reference numeral 3620 in FIG. 60, when no voltage is applied between the transparent conductive films 3601, 3605, the liquid crystal molecules are aligned in the orientation direction by the orientation restriction force of the alignment layers 3602, 3604.

When, as shown by reference numeral 3621 in FIG. 60, a voltage V6 sufficiently higher than the threshold voltage is applied between the transparent conductive films 3601 and 3605, the liquid crystal molecules are aligned in the direction of voltage application.

Because the direction in which the liquid crystal molecules having birefringence are aligned is changed in this way, the polarization state of the exit light can be changed.

Further, when the voltage applied between the transparent conductive films 3601 and 3605 is V6 or lower, a continuous change in polarization direction according to the applied voltage is obtained.

It is also a well known practice to arrange these constitutional elements in matrix and drive them by using active drive elements.

Figure 61:
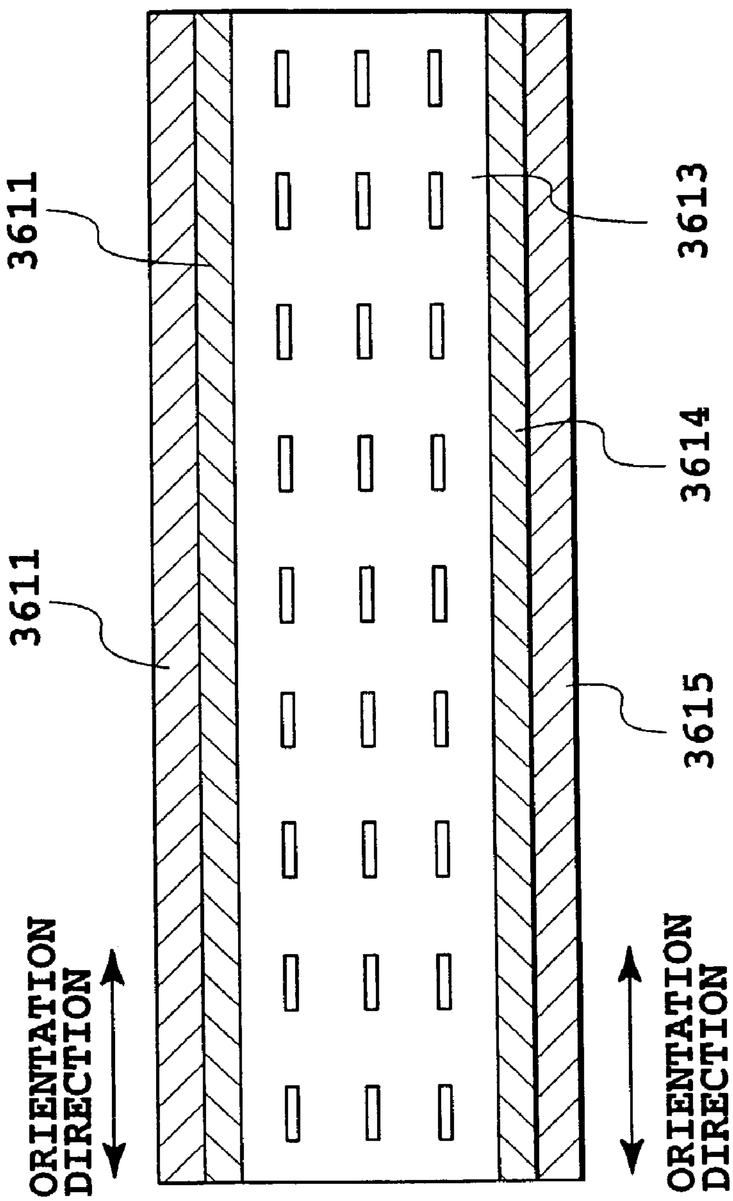
FIG. 61 is a schematic diagram showing the outline configuration of a homogeneous type polarization varying device that can be used in the three-dimensional display according to each of the embodiments of the invention.

FIG. 61 shows the outline configuration of a homogeneous type polarization varying device that can be used in the three-dimensional displays of the preceding embodiments.

The homogeneous type polarization varying device shown in FIG. 61 includes a transparent conductive film (transparent electrode) 3611, an alignment layer 3612, a liquid crystal (e.g., nematic liquid crystal) region 3613, an alignment layer 3614, and a transparent conductive film (transparent electrode) 3615.

In the homogeneous type polarization varying device shown in FIG. 61, because homogeneously aligned liquid crystals are used, the orientation directions of the alignment layers 3612 and 3614 are set equal (parallel).

Further, in the homogeneous type polarization varying device shown in FIG. 61, light is entered whose polarization direction is deviated from the orientation direction of the alignment layer.

Figure 62A:
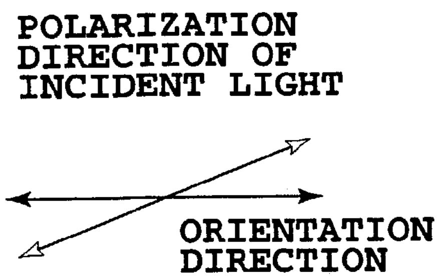
FIGS. 62A to 62C are schematic diagrams showing light incident on the homogeneous type polarization varying device shown in FIG. 61 and an orientation of an alignment layer.

For example, as shown in FIG. 62A, when incident light is linearly polarized, its polarization direction is shifted toward an intermediate direction between 0 and 90° (for example 45°) when the light is thrown into the homogeneous type polarization varying device shown in FIG. 61.

Figure 62B:
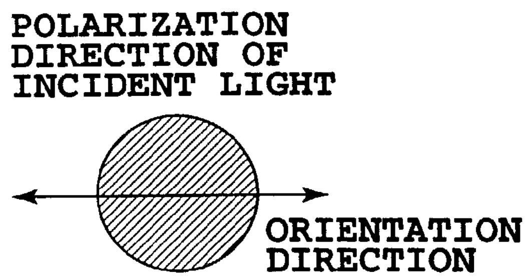
Figure 62C:
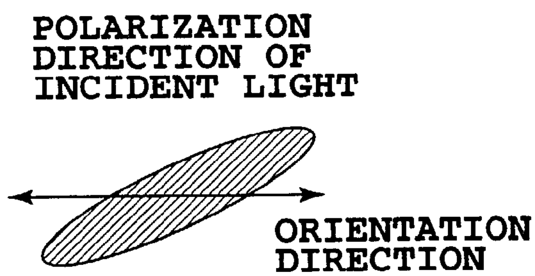

Further, as shown in FIGS. 62B and 62C, incident light which is circularly polarized or elliptically polarized is entered into the homogeneous type polarization varying device shown in FIG. 61.

Figure 63A:
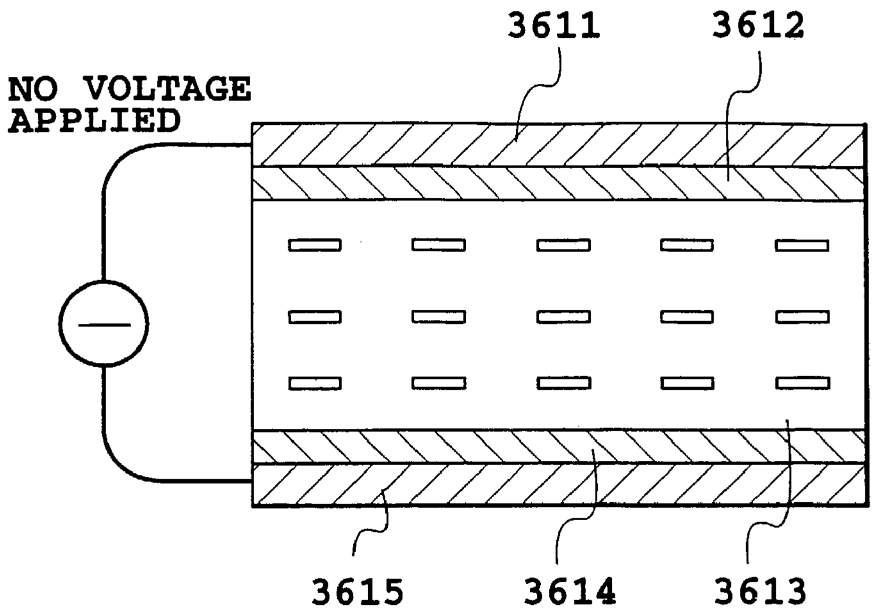
FIGS. 63A and 63B are schematic diagrams showing the operating principle of the homogenous type polarization varying device shown in FIG. 61.
Figure 63B:
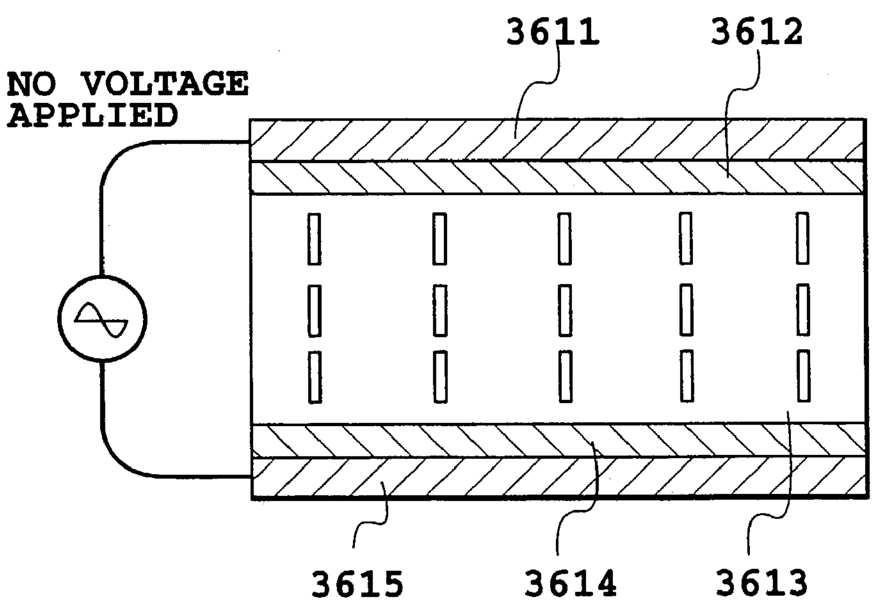

When, as shown in FIG. 63B, a voltage V7 sufficiently higher than the threshold voltage is applied between the transparent conductive films 3611 and 3615, the liquid crystal molecules are aligned in the direction of voltage application.

Therefore, the incident light goes out almost without changing the polarization direction.

On the other hand, when no voltage is applied between the transparent conductive films 3611 and 3615, as shown in FIG. 63A, the liquid crystal molecules are aligned in the orientation direction by the orientation restriction force of the alignment layers 3612, 3614 and also aligned parallel to the alignment layers 3612, 3614.

Therefore, the incident light goes out with its polarization direction changed by the birefringence of the liquid crystals.

Further, when the voltage applied between the transparent conductive layers 3611 and 3615 are V7 or lower, a continuous change in polarization direction according to the applied voltage is obtained.

In this way the polarization direction of the incident light can be changed by the voltage applied between the transparent conductive films 3611 and 3615.

Further, it is also a well known practice to arrange these constitutional elements in matrix and drive them by using active drive elements.

There are apparently a variety of apparatuses that can use other liquid crystals than nematic liquid crystal, such as ferroelectric liquid crystal, polymer dispersed liquid crystal and polymer liquid crystal, and produce the similar effects.

Although the present invention has been described in detail in conjunction with preceding embodiments, it should be noted that the invention is not limited to these embodiments and various modifications may be made without departing from the spirit of the invention.

[D-0044]

The representative advantages of this invention may be briefly summarized as follows.

Contradictions among physiological factors associated with stereoscopy can be minimized; the amount of information required can be reduced; and electrically rewritable three-dimensional videos can be reproduced.

[E-0007]

[Embodiment 19]

In the following examples, a word "plane" on which to put an image is used. This is similar in meaning to an image plane that is often used in optics. Means to realize such an image plane can obviously be realized by combining many optical devices, which include a variety of optical elements (e.g., lens, total reflecting mirror, partial reflecting mirror, curved mirror, prism, polarizer and wavelength plate) and two-dimensional displays (e.g., CRT, liquid crystal display, LED display, plasma display, FED display, DMD display, projection type display and line drawing type display).

The following examples concern a case where a three-dimensional object to be presented is displayed as two-dimensional images on mainly two planes. If the number of planes is increased to more than two, the similar effect can obviously be expected.

Figure 64:
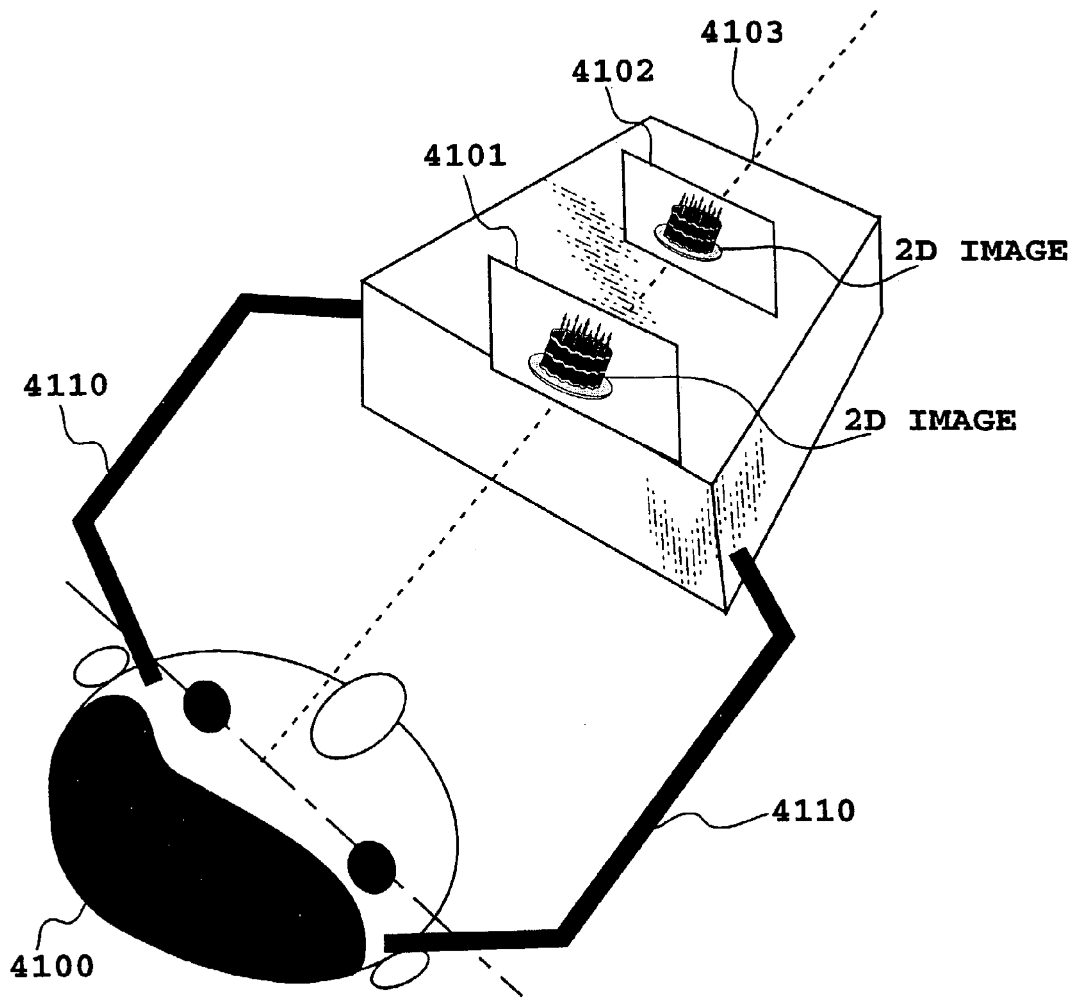
FIG. 64 is a schematic diagram showing the principle of a head-mounted display according to a nineteenth embodiment of the invention.

FIG. 64 shows the principle of a head-mounted display according to a nineteenth embodiment of the present invention.

In this embodiment a plurality of planes 4101, 4102 are set in front of an observer 4100 (with the plane 4101 put closer to the observer 4100 than the plane 4102, for example). To display a plurality of two-dimensional images on these planes, an optical system 4103 is constructed by using two-dimensional displays and a variety of optical elements. (Details will be described in the twentieth and subsequent embodiment.)

Example two-dimensional displays include CRT, liquid crystal display, LED display, plasma display, FED display, DMD display, projection type display and line drawing type display. Example optical elements include lens, total reflecting mirror, partial reflecting mirror, curved mirror, prism, polarizer and wavelength plate.

The observer 4100 wears fixing means 4110 to fix relative positions of a plurality of two-dimensional images displayed on the planes 4101, 4102 with respect to left and right eyes of the observer 4100.

[E-0008]

Figure 65:
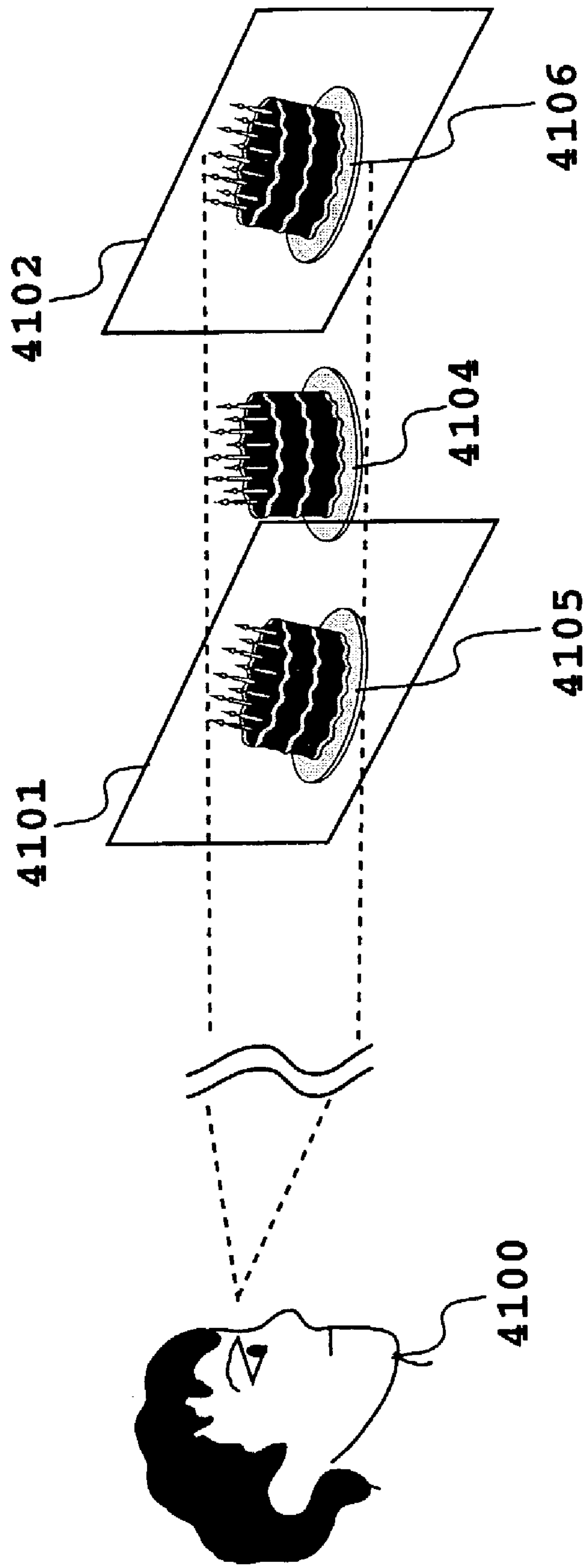
FIG. 65 is a schematic diagram showing a method of generating two-dimensional images in the head-mounted display according to the nineteenth embodiment.

Next, as shown in FIG. 65, a three-dimensional object 4104 to be presented to the observer 4100 is projected onto the planes 4101, 4102 as seen from one point on a line connecting the left and right eyes of the observer 4100 to form two-dimensional images 4105, 4106.

The two-dimensional images can be generated by a variety of ways, which include a technique that photographs the object 4104 by camera from the one point described above; a technique that synthesizes a plurality of two-dimensional images photographed from different directions; or synthesizing and modeling techniques based on computer graphics.

The two-dimensional images 4105, 4106 are displayed on the planes 4101, 4102 as shown in FIG. 64 so that they overlap each other as seen from the one point.

This can be achieved by putting the centers or gravity centers of the two-dimensional images 4105, 4106 on the line of sight.

[E-0009]

The important point of this embodiment is that, on the apparatus having the above configuration, the brightness levels of the two-dimensional images are changed according to the depth position of the three-dimensional object 4104 while keeping constant the overall brightness as seen by the observer 4100 (i.e., in such a way that the overall brightness as seen by the observer 4100 is equal to the brightness of the three-dimensional object 4104).

One example method of changing the brightness level is described below.

FIGS. 66 to 69 are black and white illustrations and, for simplicity, parts with higher brightness levels are shaded darker.

Figure 66:
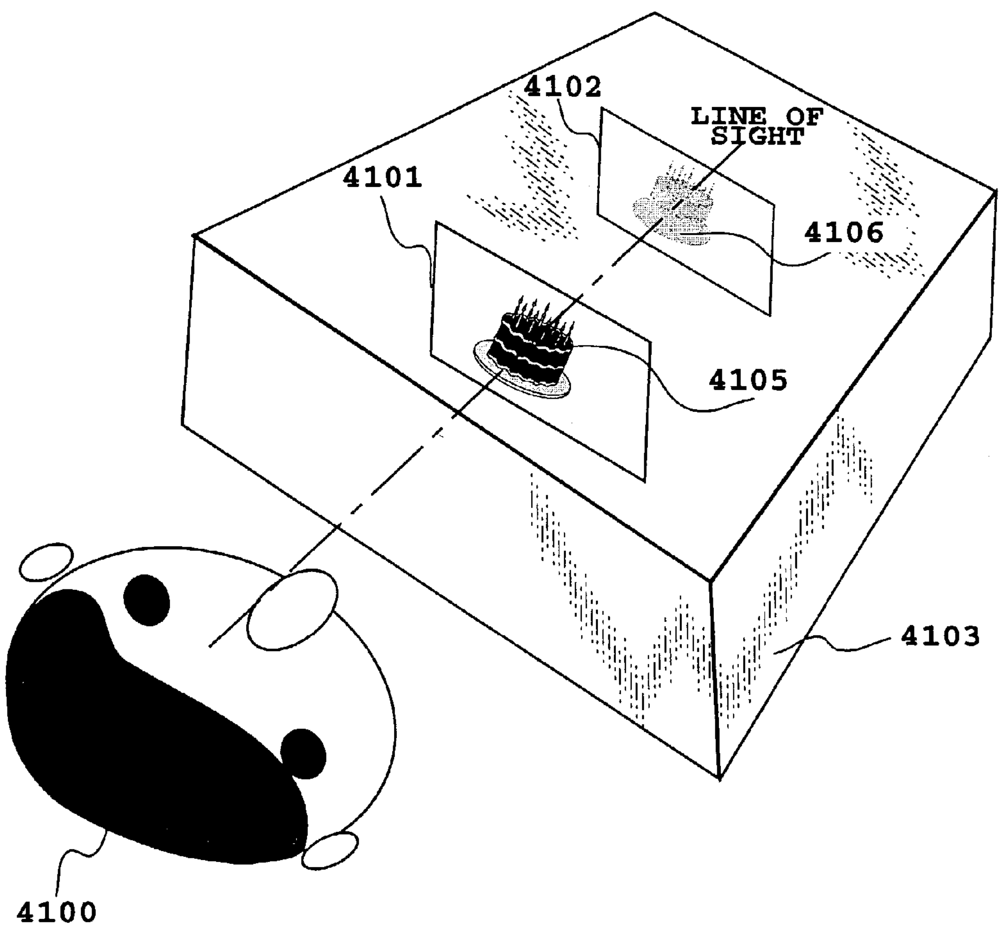
FIG. 66 is a schematic diagram showing a method of displaying a three-dimensional image in the head-mounted display according to the nineteenth embodiment.

For example, when the three-dimensional object 4104 is displayed at a depth position corresponding to the position of the plane 4101, the brightness of a two-dimensional image 4105 on the plane 4102 is set equal to that of the three-dimensional object 4104 and the brightness of the two-dimensional image 4106 on the plane 4102 is set to zero, as shown in FIG. 66.

Figure 67:
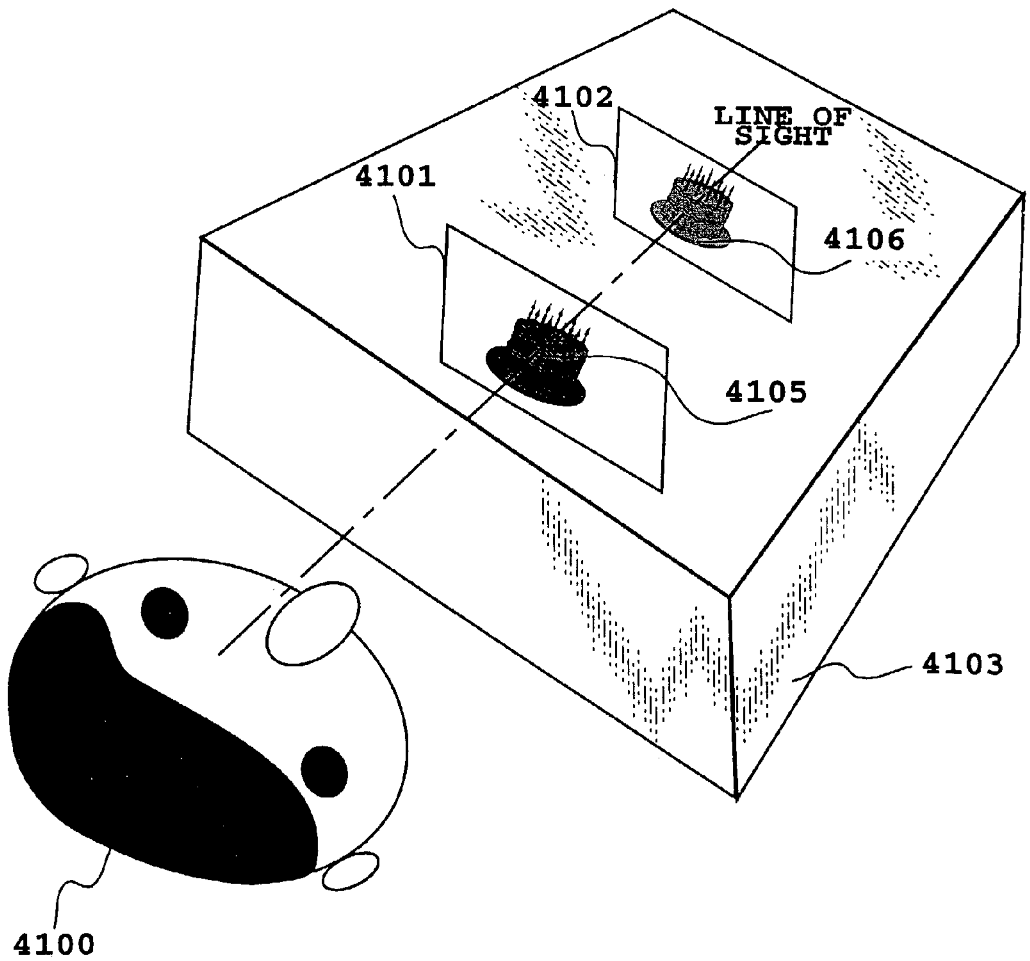
FIG. 67 is a schematic diagram showing a method of displaying a three-dimensional image in the head-mounted display according to the nineteenth embodiment.
Figure 68:
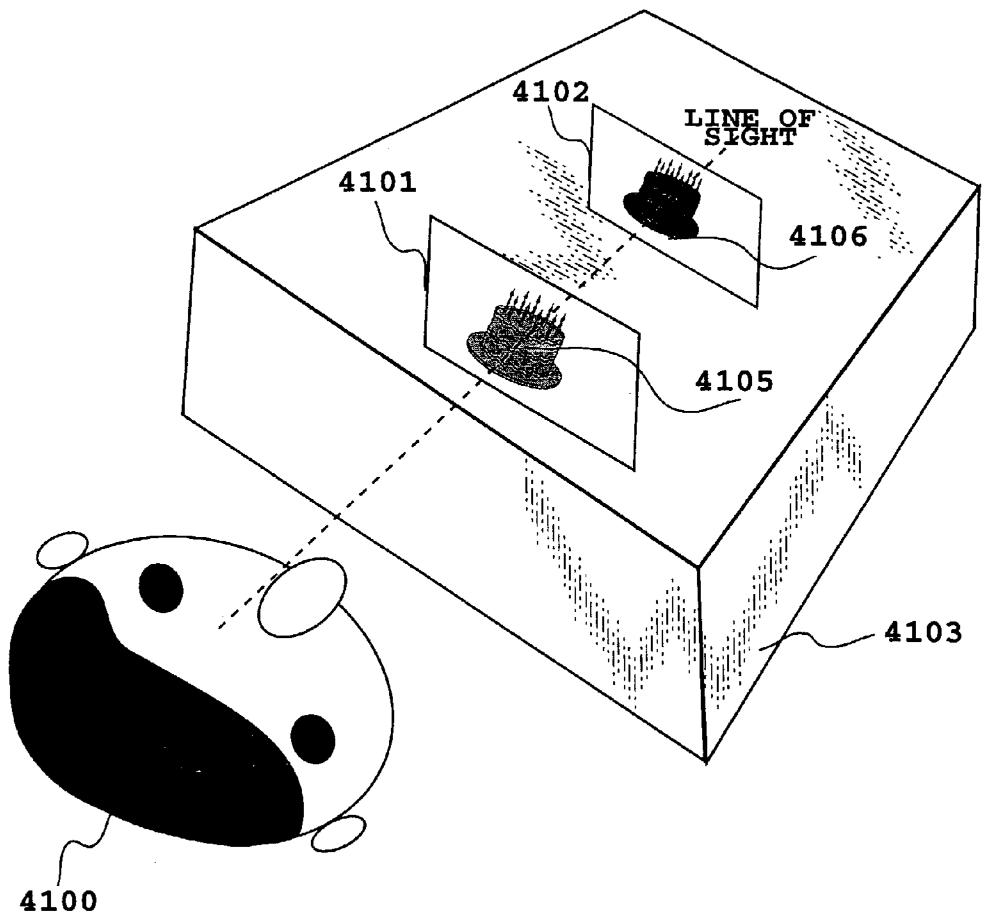
FIG. 68 is a schematic diagram showing a method of displaying a three-dimensional image in the head-mounted display according to the nineteenth embodiment.

Next, when the three-dimensional object 4104 moves slightly away from the observer 4100 and is shown at a depth position slightly away from the plane 4101 and closer to the plane 4102, the brightness of the two-dimensional image 4105 is slightly lowered and the brightness of the two-dimensional image 4106 is slightly raised, as shown in FIG. 67.

Further, when the three-dimensional object 4104 moves further away from the observer 4100 and is shown at a depth position further away from the plane 4101 and closer to the plane 4102, the brightness of the two-dimensional image 4105 is further lowered and the brightness of the two-dimensional image 4106 is further raised.

Figure 69:
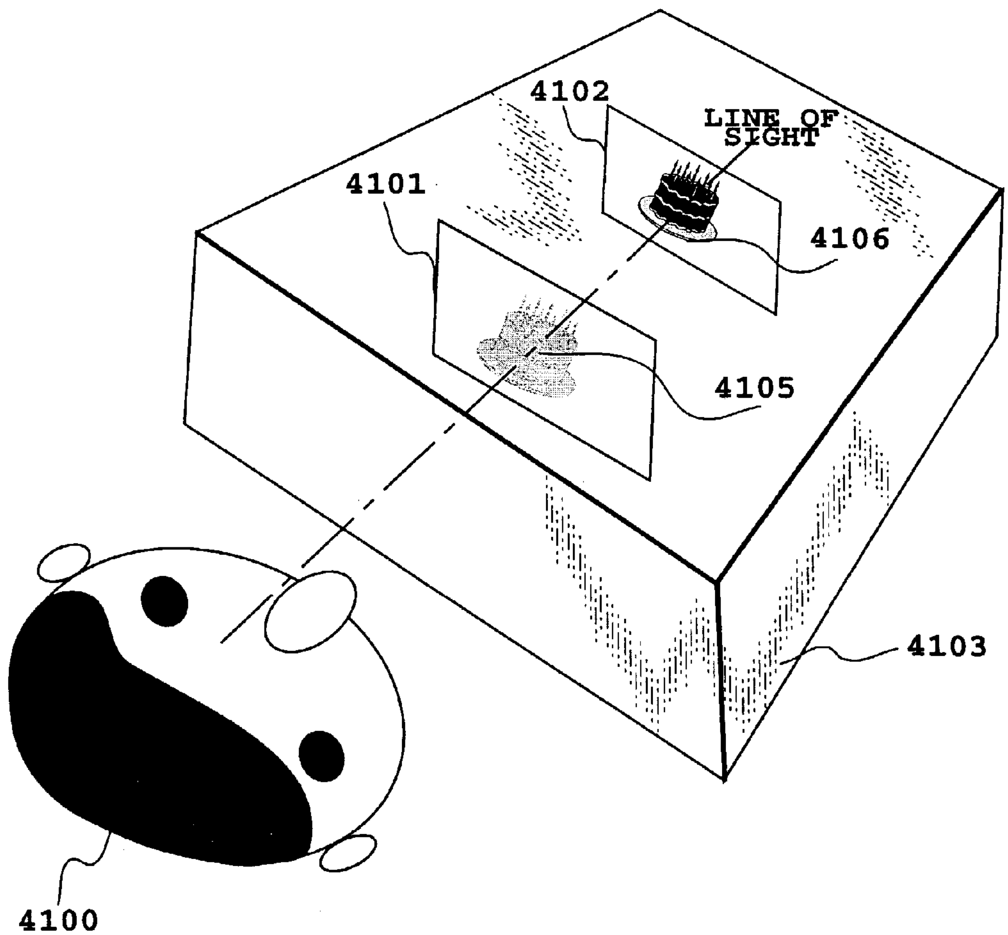
FIG. 69 is a schematic diagram showing a method of displaying a three-dimensional image in the head-mounted display according to the nineteenth embodiment.

Finally, when the three-dimensional object 4104 is shown at a depth position corresponding to the position of the plane 4102, the brightness of the two-dimensional image 4106 on the plane 4102 is set equal to that of the three-dimensional object 4104 and the brightness of the two-dimensional image 4105 on the plane 4101 is set to zero as shown in FIG. 69 for instance.

Displaying the object in this manner enables the observer 4100 to feel as if the three-dimensional object 4104 is located between the planes 4101 and 4102 because of observer's physiological or mental factors or optical illusion although what is actually shown to the observer is the two-dimensional images 4105, 4106.

That is, when for example the two-dimensional images 4105, 4106 with almost equal brightness are displayed on the planes 4101 and 4102, the three-dimensional object 4104 looks as if it lies near to a middle point between the depth positions of the planes 4101, 4102.

[E-0010]

Particularly when a point between the left and right eyes is used as a viewing point on a line connecting the left and right eyes of the observer 4100, the reliability for producing this effect is increased (or simply put, this same effect can be produced for a large number of people or most of the time).

Further, when a center position between the left and right eyes of the observer 4100 is used as the viewing point, there is an advantage that the same effect can be more readily produced and that the size of a double image produced from the planes 4101, 4102 for both eyes can be reduced.

[E-0011]

The above description concerns a method and apparatus in which the overall depth position of the three-dimensional object 4104 is represented by using two-dimensional images on the planes 4101 and 4102. This embodiment apparently can be applied also as a method and apparatus that represents the depth of the three-dimensional object itself.

In this case, the brightness level of each part of the two-dimensional images 4105, 4106 needs to be changed according to the depth position of each corresponding part of the three-dimensional object 4104 while keeping constant the overall brightness as seen by the observer 4100 (i.e., in such a way that the overall brightness as seen by the observer 4100 is equal to the brightness of the three-dimensional object 4104).

For example, the brightness of the two-dimensional image 4105 displayed on the plane 4101 close to the observer 4100 is changed progressively according to the depth position of the corresponding part of the object so that a portion close to the observer 4100 has a higher brightness level and a portion remote from the observer has a lower brightness level.

The brightness of the two-dimensional image 4105 displayed on the plane 4102 remote from the observer 4100 is progressively changed according to the depth position of the corresponding part of the object so that a portion close to the observer has a lower brightness level and a portion remote from the observer has a higher brightness level.

Displaying the object in this manner enables the observer 4100 to feel as if the object presented has a solid body with some depth because of observer's physiological or mental factors or optical illusion although what is actually shown to the observer is two-dimensional images.

[E-0012]

Unlike the conventional apparatus (planar display), this embodiment has at least two image display planes on the near and far sides of the optical illusion position, so that contradictions among the binocular parallax, convergence and focusing—the problem experienced with the conventional apparatus—can be suppressed significantly, which in turn is expected to reduce eyestrains.

As to the focusing, because the observer 4100 sees two or more planes simultaneously, the focus point coincides with the optical illusion position where both of the images can be seen with minimum blur.

Further, because this embodiment can also present a three-dimensional object 4104 that exists between a plurality of planes, there is an advantage that the amount of data required for three-dimensional representation can be reduced substantially.

Further, because the apparatus of this embodiment is fixedly worn by the observer 4100, this embodiment has the advantage of being able to easily display two-dimensional images according to the movement of the observer 4100 or eyes.

Although the head-mounted display is basically a display that is secured to the head of the wearer, the present invention can apparently be applied also to an apparatus that is not mounted on the head as long as the apparatus is so constructed that the positional relationship between the eyes of the observer and the plane will not be changed.

Further, because this embodiment makes use of human physiological or mental factors or optical illusion based only on brightness changes of two-dimensional images, the embodiment does not require the use of a coherent light source such as a laser and facilitates the color stereoscopic image representation.

Further, since this embodiment does not include mechanical driving parts, it can suitably reduce the weight of and improve the reliability of the apparatus.

This embodiment mainly concerns a case where there are only two planes for displaying two-dimensional images and where a three-dimensional object to be presented to the observer 4100 lies between the two planes. It is, however, apparent that the similar configuration can be employed if there are more planes or the three-dimensional object 4104 to be presented is located at a different position.

[E-0013]

This embodiment can obviously display a video so that an observer can see the motion of an object in the horizontal and vertical directions as long as the two-dimensional displays have display speeds compatible with the video. It is also apparent that the motion of an object in the depth direction can also be presented to the observer by changing the brightness of a plurality of planes for each frame.

In this case, the brightness of each part of the two-dimensional images 4105, 4106 is changed according to a change over time of the depth position of the three-dimensional object 4104 while keeping constant the overall brightness as seen by the observer 4100 (i.e., in such a way that the overall brightness as seen by the observer 4100 is equal to the brightness of the three-dimensional object 4104).

That is, when for example the three-dimensional object 4104 is on the plane 4101, the brightness of the two-dimensional image 4105 on the plane 4101 is set equal to that of the three-dimensional object 4104 and the brightness of the two-dimensional image 4106 on the plane 4102 is set to zero.

[E-0014]

Next, when the three-dimensional object 4104 progressively moves slightly away from the observer 4100 and inches from the plane 4101 toward the plane 4102 over time, the brightness of the two-dimensional image 4105 is lowered slightly over time according to the movement in the depth position of the three-dimensional object 4104 and at the same time the brightness of the two-dimensional image 4106 is slightly raised over time.

Next, when the three-dimensional object 4104 moves further away from the observer 4100 and inches from the plane 4101 further toward the plane 4102 over time, the brightness of the two-dimensional image 4105 is lowered further over time according to the movement in the depth position of the three-dimensional object 4104 and at the same time the brightness of the two-dimensional image 4105 is raised further over time.

Next, when the three-dimensional object 4104 finally reaches the plane 4102 over time, the brightness of the two-dimensional image 4106 on the plane 4102 is changed over time until it becomes equal to the brightness of the three-dimensional object 4104 according to the movement in the depth position of the three-dimensional object 4104 and at the same time the brightness of the two-dimensional image 4105 on the plane 4101 is changed over time until it becomes zero.

Displaying the object in this way enables the observer 4100 to feel as if the three-dimensional object 4104 moves over time from the plane 4101 to the plane 4102 in the direction of depth because of observer's physiological or mental factors or optical illusion although what is actually shown to the observer is two-dimensional images 4105, 4106.

It is obvious that, because of the after image effect, the above-described effect of this embodiment can be produced as long as the two-dimensional images are displayed within one frame, whether they are displayed simultaneously or at different times, or displayed simultaneously for one duration and separately for another duration.

Further, this embodiment has an advantage of being able to significantly reduce the amount of data required for three-dimensional representation because this embodiment can display a stereoscopic representation of a three-dimensional object lying between a plurality of planes.

[Embodiment 20]

Figure 70:
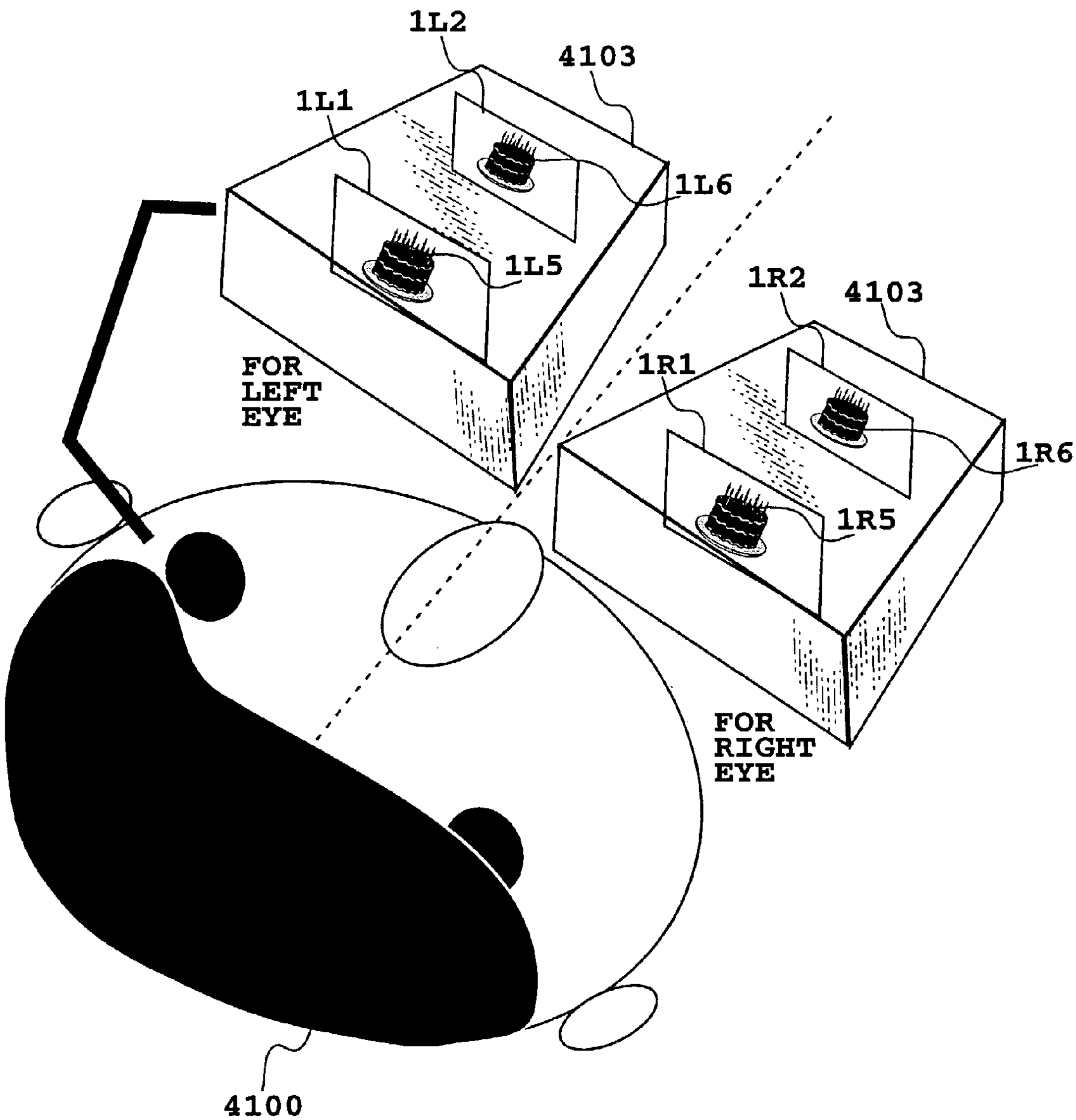
FIG. 70 is a schematic diagram showing the principle of a head-mounted display according to a twentieth embodiment of the invention.

FIG. 70 illustrates the principle of a head-mounted display according to a twentieth embodiment of the invention.

In this embodiment, a plurality of planes, for example, planes 1R1, 1R2, 1L1, 1L2 are arranged in front of the left and right eyes of the observer 4100 (the planes 1R1, 1L1 are set closer to the observer 4100 than the planes 1R2, 1L2). To display a plurality of two-dimensional images on these planes, an optical system 4103 is constructed for each of the left and right eyes by using two-dimensional displays and a variety of optical elements. (Details will be described in the twenty-first and subsequent embodiments.)

Examples of the two-dimensional displays include CRT, liquid crystal display, LED display, plasma display, FED display, projection type display and line drawing type display. Examples of optical elements include lens, total reflecting mirror, partial reflecting mirror, curved mirror, prism, polarizer and wavelength plate.

The observer 4100 wears a fixing means 4110 to fix the relative positions between the plurality of two-dimensional images displayed on these planes 1R1, 1R2, 1L1, 1L2 and the left and right eyes of the observer 4100.

[E-0015]

Figure 71:
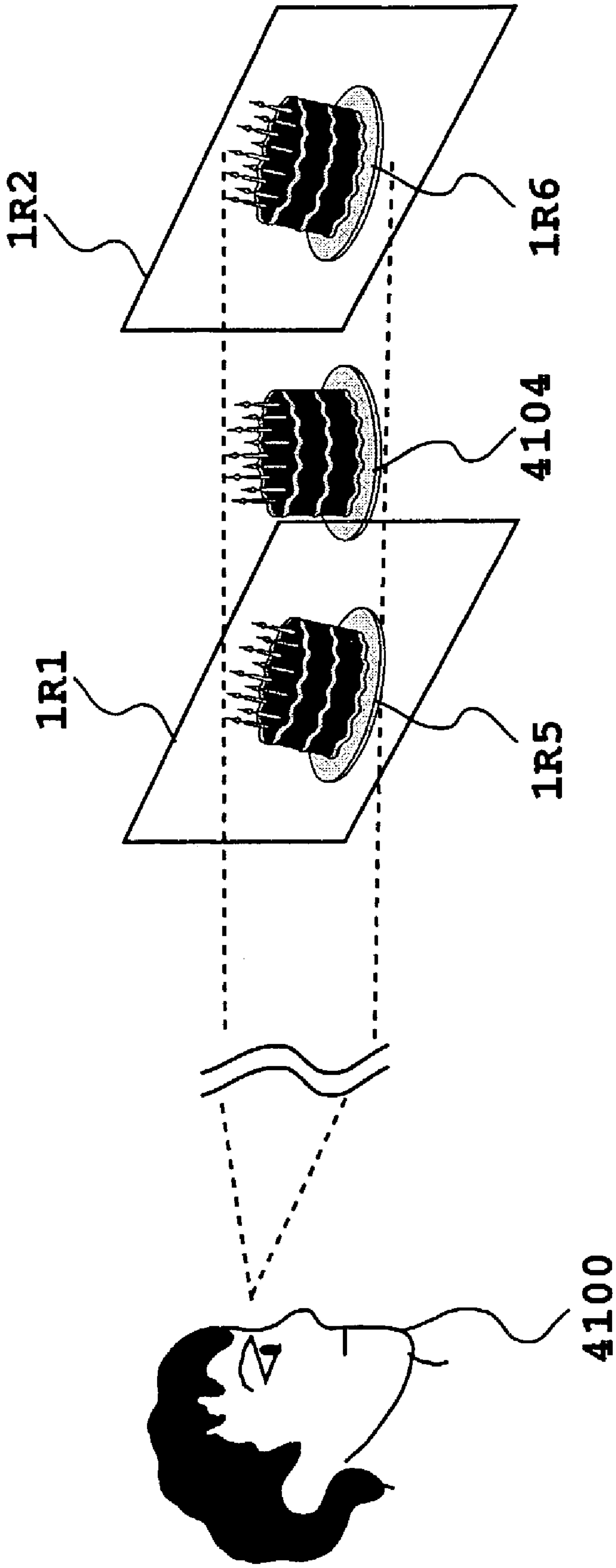
FIG. 71 is a schematic diagram showing a method of generating two-dimensional images in the head-mounted display according to the twentieth embodiment.

Next, as shown in FIG. 71, a three-dimensional object 4104 to be presented to the observer 4100 is projected onto the planes 1R1, 1R2, 1L1, 1L2, as viewed from one point on a line connecting the left and right eyes of the observer 4100, to form two-dimensional images 1R5, 1R6, 1L5, 1L6.

While FIG. 71 shows the configuration for only the right eye, the configuration for the left eye can be obtained simply by replacing the symbol R with L.

The two-dimensional images 1R5, 1R6, 1L5, 1L6 can be generated by a variety of ways, which include a technique that uses two-dimensional images obtained by photographing the three-dimensional object 4104 by camera in the direction of line of sight; a technique that synthesizes a plurality of two-dimensional images photographed from different directions; or synthesizing and modeling techniques based on computer graphics.

The two-dimensional images 1R5, 1R6, 1L5, 1L6, as shown in FIG. 70, are displayed on the planes 1R1, 1L1 and planes 1R2, 2L2 so that they overlap each other as seen from one point on the line connecting the left and right eyes of the observer 4100.

This can be achieved by putting the centers or gravity centers of the two-dimensional images 1R5, 1R6, 1L5, 1L6 on the line of sight.

[E-0016]

The important point of this embodiment is that, in the apparatus having the above-described configuration, the brightness of each of the two-dimensional images 1R5, 1R6, 1L5, 1L6 is changed within the after image time of the human eye according to the depth position of the three-dimensional object 4104 (see FIG. 65) while keeping constant the overall brightness as seen by the observer 4100 (i.e., in such a way that the overall brightness as seen by the observer 4100 is equal to the brightness of the three-dimensional object 4104.

One example method of changing the brightness is described below.

FIGS. 72 to 75 show the configuration for only the right eye because the same configuration applies also to the left eye. Because FIGS. 72 to 75 are black and white illustrations, parts with higher brightness levels are shaded darker for simplicity.

Figure 72:
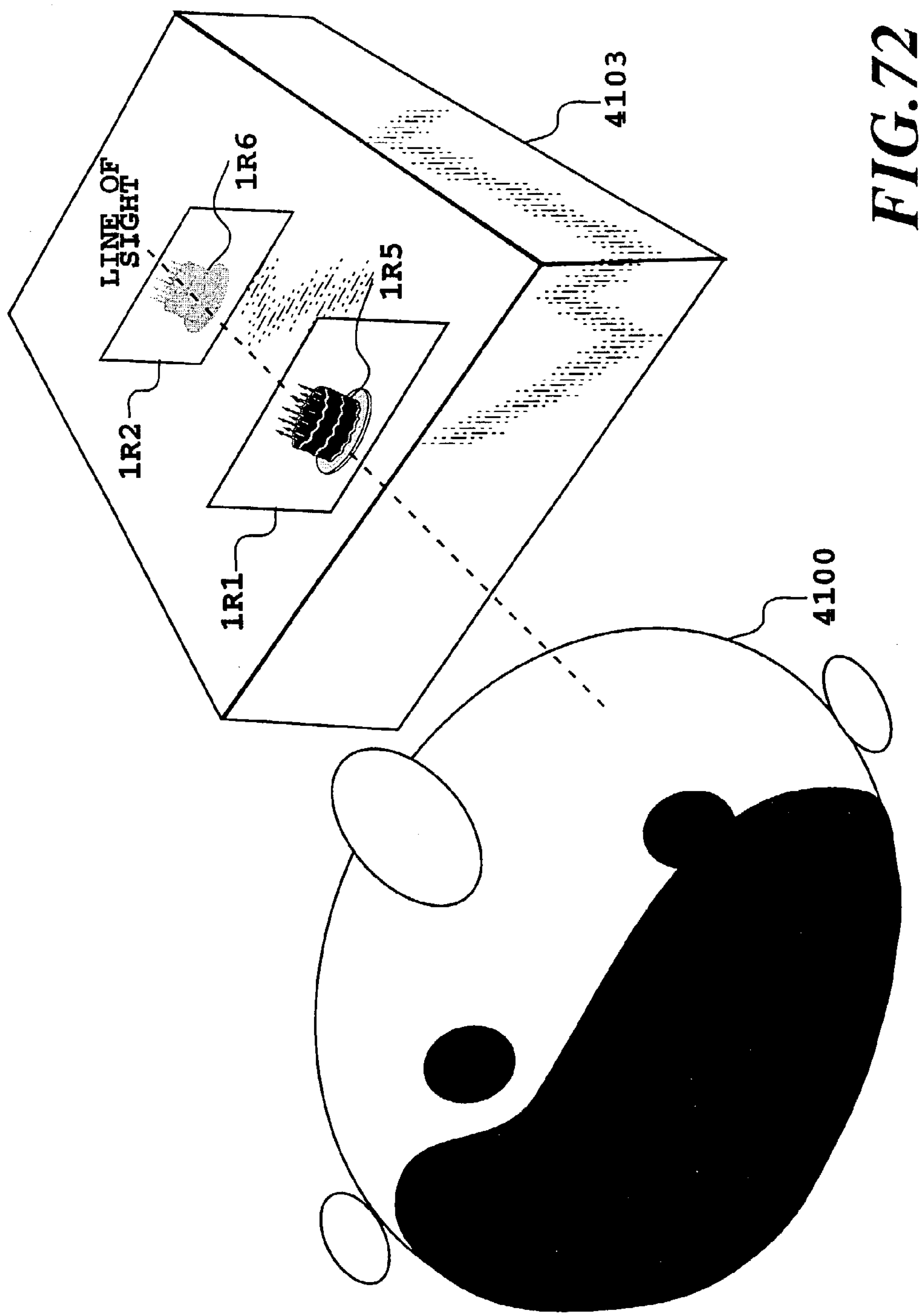
FIG. 72 is a schematic diagram showing a method of displaying three-dimensional images in the head-mounted display according to the twentieth embodiment.

When, for example, the three-dimensional object 4104 is displayed at a depth position corresponding to the positions of the planes 1R1, 1L1, the brightness levels of the two-dimensional images 1R5, 1L5 on the planes 1R1, 1L1 are set equal to the brightness level of the three-dimensional object 4104 and the brightness levels of the two-dimensional images 1R6, 1L6 on the planes 1R2, 1L2 are set to zero, as shown in FIG. 72.

Figure 73:
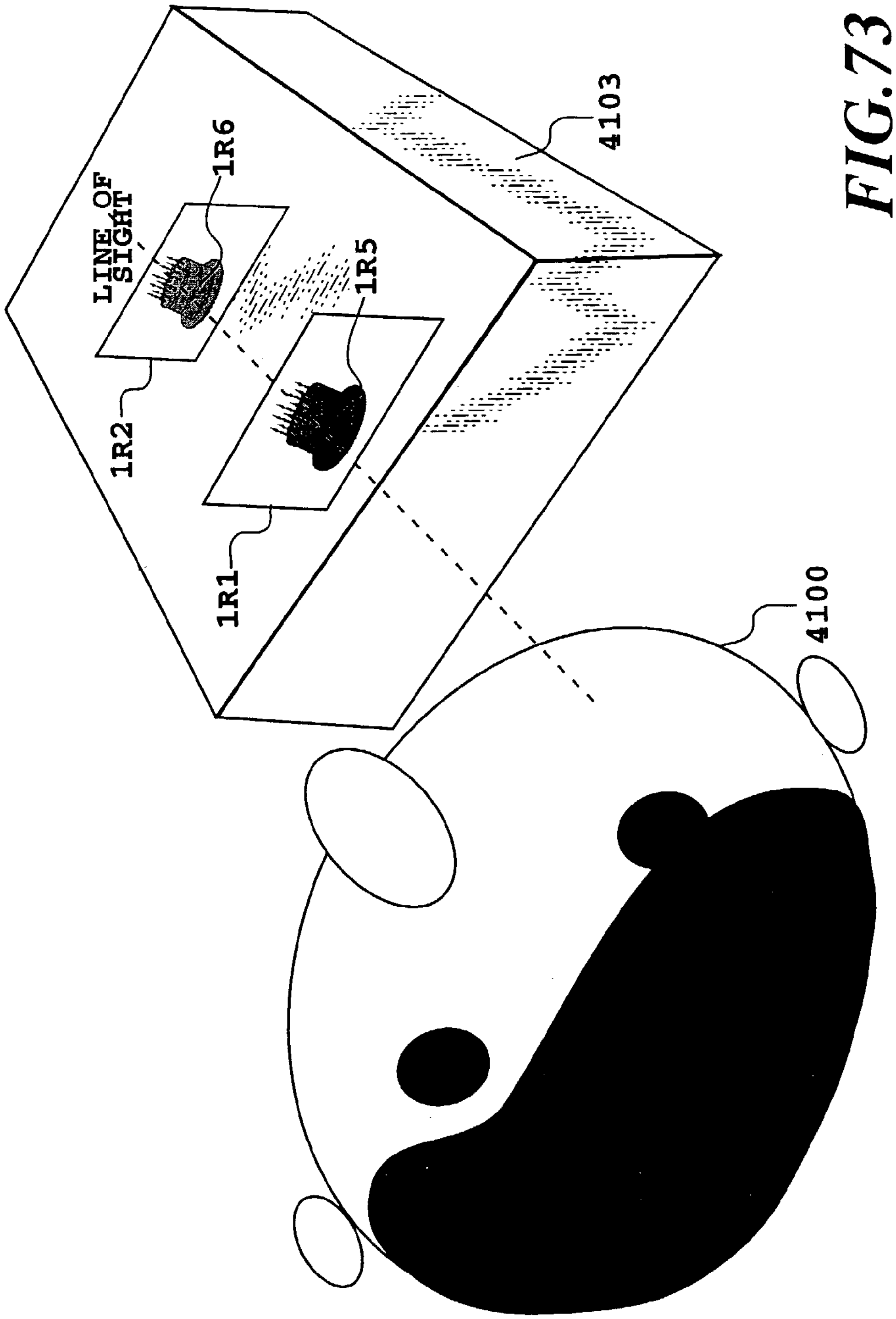
FIG. 73 is a schematic diagram showing a method of displaying three-dimensional images in the head-mounted display according to the twentieth embodiment.

Next, when the three-dimensional object 4104 moves slightly away from the observer 4100 and is displayed at a depth position slightly away from the planes 1R1, 1L1 and closer to the planes 1R2, 1L2, the brightness levels of the two-dimensional images 1R5, 1L5 are slightly lowered and the brightness levels of the two-dimensional images 1R6, 1L6 are slightly raised, as shown in FIG. 73.

Figure 74:
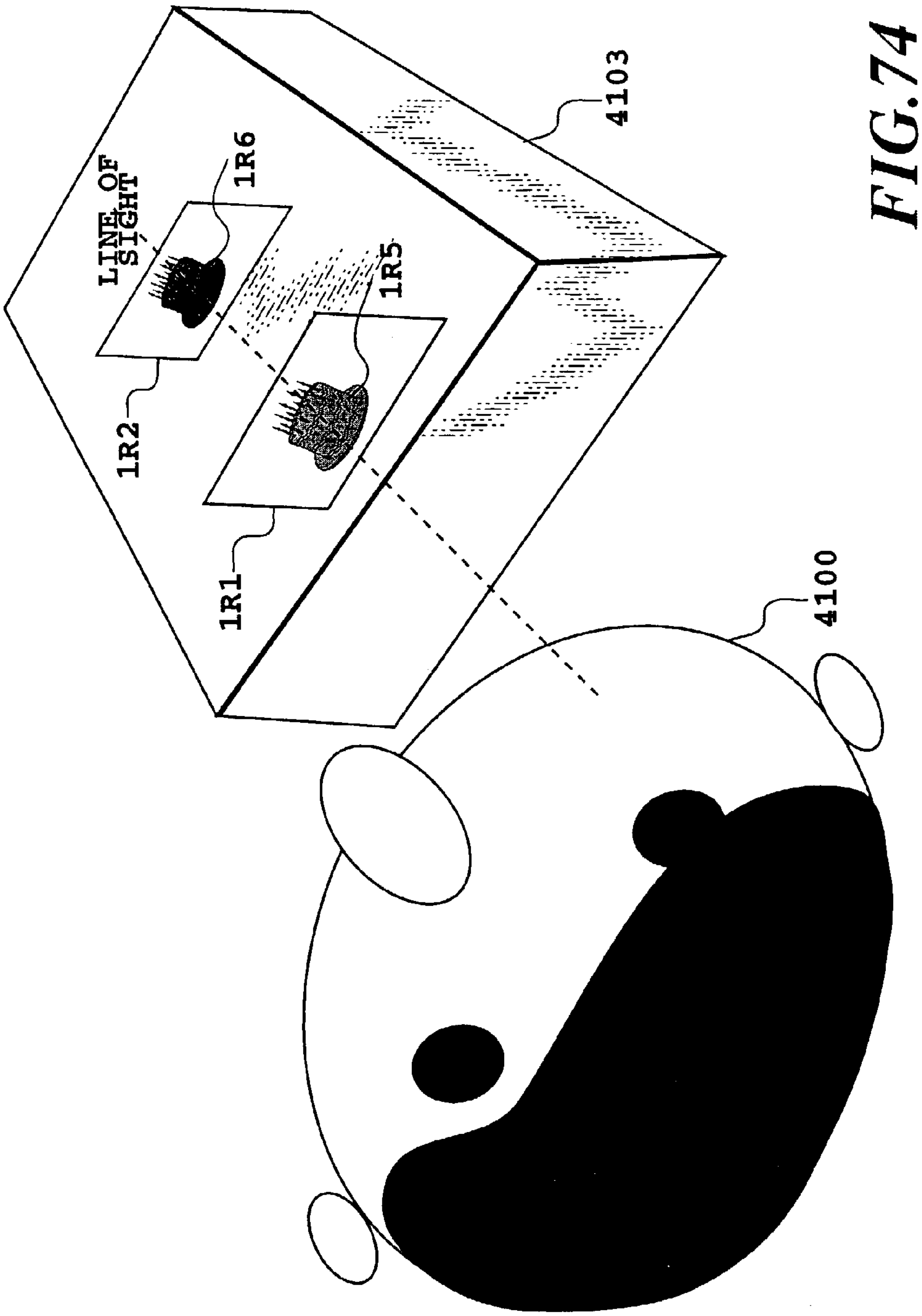
FIG. 74 is a schematic diagram showing a method of displaying three-dimensional images in the head-mounted display according to the twentieth embodiment.

Next, when the three-dimensional object 4104 moves further away from the observer 4100 and is displayed at a depth position further away from the planes 1R1, 1L1 and closer to the planes 1R2, 1L2, the brightness levels of the two-dimensional images 1R5, 1L5 are further lowered and the brightness levels of the two-dimensional images 1R6, 1L6 are further raised, as shown in FIG. 74.

Figure 75:
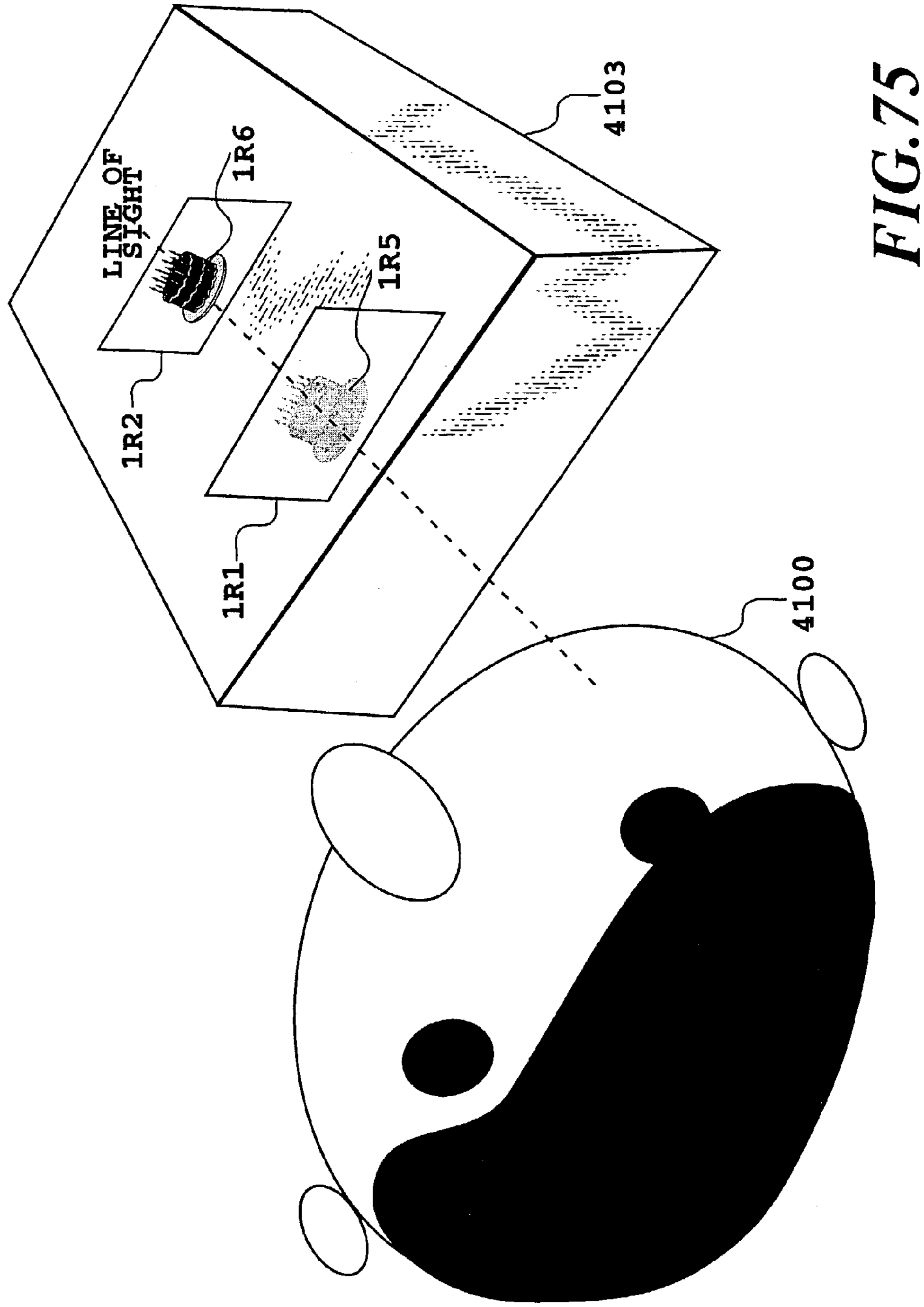
FIG. 75 is a schematic diagram showing a method of displaying three-dimensional images in the head-mounted display according to the twentieth embodiment.

Finally, when the three-dimensional object 4104 is displayed at a depth position corresponding to the planes 1R2, 1L2, the brightness levels of the two-dimensional images 1R6, 1L6 on the planes 1R2, 1L2 are set equal to the brightness level of the three-dimensional object 4104 and the brightness levels of the two-dimensional images 1R5, 1L5 on the planes 1R1, 1L1 are set to zero, as shown in FIG. 75.

Displaying the object in this manner enables the observer 4100 to feel as if the three-dimensional object 4104 is located between the planes 1R1, 1L1 and the planes 1R2, 1L2 because of human physiological or mental factors or optical illusion although what is actually shown to the observer is the two-dimensional images 1R5, 1R6, 1L5, 1L6.

That is, when for example the two-dimensional images with almost equal brightness are displayed on the planes 1R1, 1L1 and the planes 1R2, 1L2, the three-dimensional object 4104 looks as if it lies near to a middle point between the depth positions of the planes 1R1, 1L1 and the planes 1R2, 1L2.

Particularly when a point between the left and right eyes is used as a viewing point on a line connecting the left and right eyes of the observer 4100, the reliability for producing this effect is increased (or simply put, this same effect can be produced for a large number of people or most of the time).

Further, when a center position between the left and right eyes of the observer 4100 is used as the viewing point, there is an advantage that the same effect can be more readily produced and that the size of double image produced from the planes 1R1 1L1 and planes 1R2, 1R2 for both eyes can be reduced.

[E-0017]

As with the nineteenth embodiment, this embodiment can obviously express the depth of a three-dimensional object itself.

Unlike the conventional apparatus, this embodiment has at least two image display planes on the near and far sides of the optical illusion position, so that contradictions among the binocular parallax, convergence and focusing—the problem experienced with the conventional apparatus—can be suppressed significantly, which in turn is expected to reduce eyestrains.

As to the focusing, because the observer 4100 sees two or more planes simultaneously, the focus point coincides with the optical illusion position where both of the images can be seen with minimum blur.

In this embodiment, because the displays are mounted one for each eye, there is an advantage that the two-dimensional images can be readily displayed according to the movement of the observer or eyes.

Further, because this embodiment makes use of human physiological or mental factors or optical illusion based only on brightness changes of two-dimensional images, the embodiment does not require the use of a coherent light source such as a laser and facilitates the color stereoscopic image representation.

Further, since this embodiment does not include mechanical driving parts, it can suitably reduce the weight of and improve the reliability of the apparatus.

This embodiment mainly concerns a case where there are only two planes for displaying two-dimensional images and where a three-dimensional object 4104 to be presented to the observer 4100 lies between the two planes. It is, however, apparent that the similar configuration can be employed if there are more planes or the three-dimensional object 4104 to be presented is located at a different position.

Like the nineteenth embodiment, this embodiment can obviously display a video so that an observer can see the motion of an object in the horizontal and vertical directions as long as the two-dimensional displays have display speeds compatible with the video. It is also apparent that the motion of an object in the depth direction can also be presented to the observer by changing the brightness of a plurality of planes for each frame.

It is obvious that, because of the after image effect, the above-described effect of this embodiment can be produced as long as the two-dimensional images are displayed within one frame, whether they are displayed simultaneously or at different times, or displayed simultaneously for one duration and separately for another duration.

Further, this embodiment has an advantage of being able to significantly reduce the amount of data required for three-dimensional representation because this embodiment can display a stereoscopic representation of a three-dimensional object lying between a plurality of planes.

[Embodiment 21]

An optical system 4103 that can be used in the preceding embodiments will be described.

Figure 76:
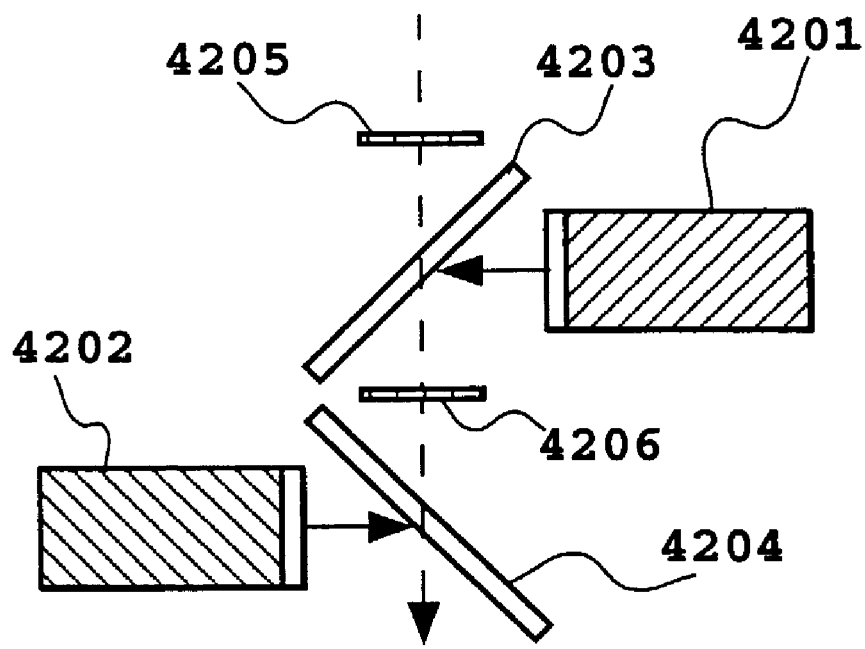
FIG. 76 is a schematic diagram showing one example of an optical system that can be used in each of the embodiments of the invention.

FIG. 76 shows one example of the optical system 4103 that can be used in the preceding embodiments of the present invention.

The optical system 4103 shown in FIG. 76 employs a plurality of two-dimensional displays 4201, 4202, a total reflecting mirror 4203 (for example, reflectivity/transmittivity=100/0), and a partial reflecting mirror 4204 (for example, reflectivity/transmittivity=50/50).

The plurality of two-dimensional displays 4201, 4202 are, for example, CRT, liquid crystal display, LED display, plasma display, FED display, DMD display, projection type display and line drawing type display.

In the optical system shown in FIG. 76, by changing the arrangement of the constitutional elements, it is possible to place two planes 4205, 4206 at different positions in the direction of depth, the plane 4205 being formed by reflecting a two-dimensional image of the two-dimensional display 4201 by the total reflecting mirror 4203 and passing it through the partial reflecting mirror 4204, the plane 4206 being formed by reflecting a two-dimensional image of the two-dimensional display 4202 by the partial reflecting mirror 4204.

In the optical system shown in FIG. 76, only mirrors (total reflecting mirror 4203 and partial reflecting mirror 4204) are used, there is an advantage of less degradation of image quality.

[E-0018]

Figure 77:
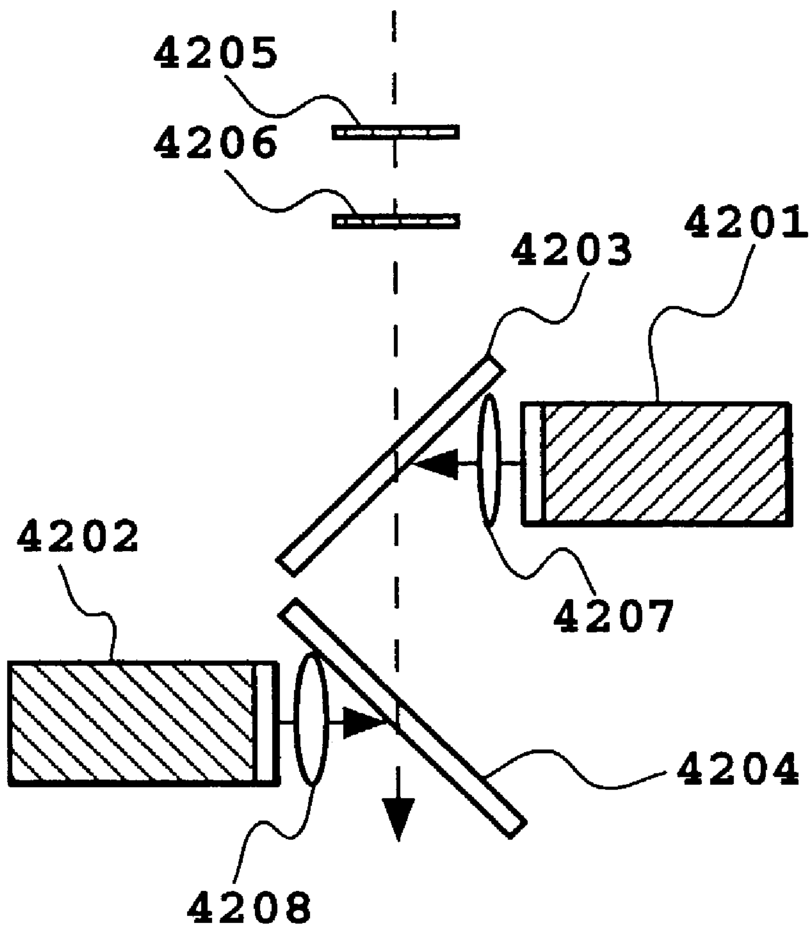
FIG. 77 is a schematic diagram showing another example of an optical system that can be used in each of the embodiments of the invention.

FIG. 77 illustrates another example of optical system 4103 that can be used in the preceding embodiments of the invention.

The optical system 4103 shown in FIG. 77, by including lenses 4207, 4208 in the optical system shown in FIG. 76, makes it possible to change the position of the planes more flexibly.

In the optical system shown in FIG. 77, which includes a plurality of two-dimensional displays 4201, 4202, a total reflecting mirror 4203 (for example, reflectivity/transmittivity=100/0), and a partial reflecting mirror 4204 (for example, reflectivity/transmittivity=50/50), convex lenses 4207, 4208 are added to change the positions of the images, thus allowing more flexible setting of the positional relation between the plane 4205 and the plane 4206 which has been restricted by the size of the apparatus.

As in the ordinary lens system, it may of course be advantageous in terms of distortion to use a combination lens in addition to convex lenses.

Further, although this embodiment has shown a case where virtual images are used, it is obvious that the invention can also be applied to a case where real images are used.

[E-0019]

Figure 78:
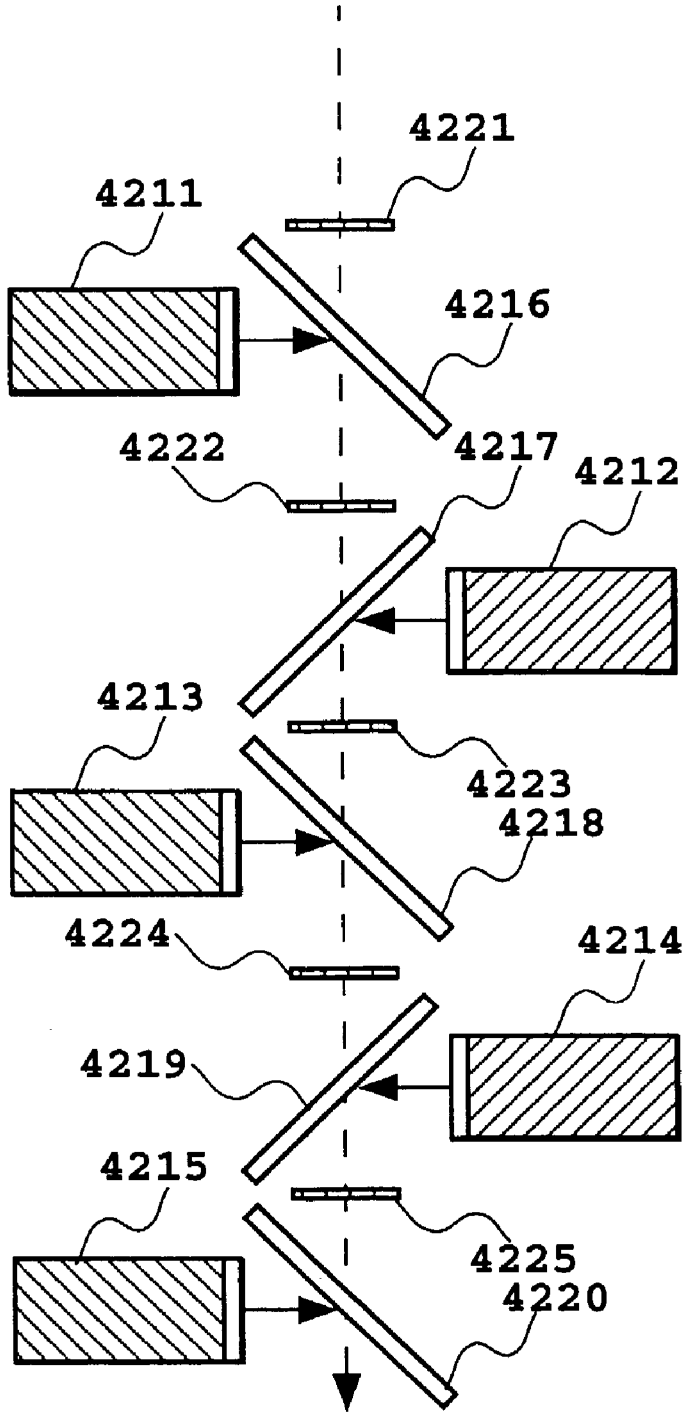
FIG. 78 is a schematic diagram showing a further example of an optical system that can be used in each of the embodiments of the invention.

FIG. 78 shows a further example of optical system 4103 that can be used in the preceding embodiments of the invention.

The optical system 4103 shown in FIG. 78 incorporates additional two-dimensional displays into the optical system shown in FIG. 76.

That is, a plurality of two-dimensional displays 4211, 4212, 4213, 4214, 4215, a total reflecting mirror 4216 (e.g., reflectivity/transmittivity=100/0) and partial reflecting mirrors 4217 (e.g., reflectivity/transmittivity=50/50), 4218 (e.g., reflectivity/transmittivity=33.3/66.7), 4219 (e.g., reflectivity/transmittivity=25/75), 4220 (e.g., reflectivity/transmittivity=20/80) are used to construct an optical system.

In the optical system 4103 shown in FIG. 78, by changing the arrangements of these constitutional components, it is possible to place a plane 4221 and planes 4222–4225 at different positions in the direction of depth, the image plane 4221 being formed by reflecting a two-dimensional image of the two-dimensional display 4211 by the total reflecting mirror 4216 and passing it through the partial reflecting mirrors 4217–4220, the planes 4222–4225 being formed by reflecting two-dimensional images of the two-dimensional displays 4212–4215 by the partial reflecting mirrors 4217–4220 and passing them through these partial reflecting mirrors.

This optical system 4103 shown in FIG. 78 uses only mirrors and thus has the advantage of less degradation of picture quality.

While FIG. 78 shows a case where there are five two-dimensional displays, it is apparent that the similar configuration can be adopted when a different number of two-dimensional displays are used.

In this case also, it is obvious that adding lens systems as shown in FIGS. 77 makes it easy to control the positions of planes.

[E-0020]

Figure 79:
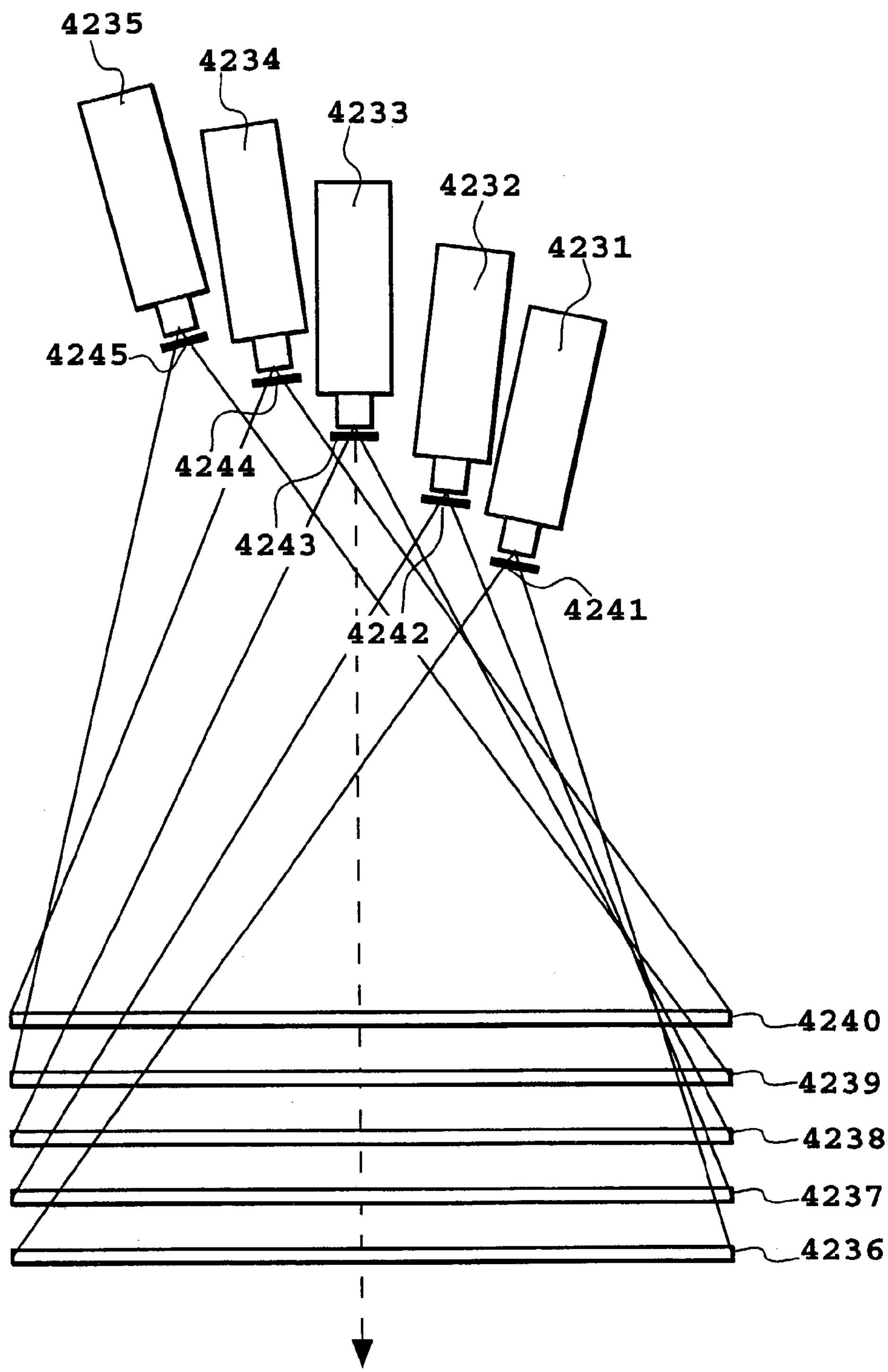
FIG. 79 is a schematic diagram showing a further example of an optical system that can be used in each of the embodiments of the invention.

FIG. 79 shows a further example of the optical system 4103 that can be used in the preceding embodiments of the invention.

The optical system 4103 shown in FIG. 79 uses a plurality of projector type two-dimensional displays 4231, 4232, 4233, 4234, 4235, shutters 4241, 4242, 4243, 4244, 4245, and scatter plates 4236, 4237, 4238, 4239, 4240 to project two-dimensional images from the projector type two-dimensional displays 4231–4235 through the shutters 4236–440 onto the scatter plates 4236–4240 to produce the two-dimensional images at desired locations.

The projector type two-dimensional displays 4231–4235 are, for example, of CTR type, LCD type, ILV type, DMD type, etc.

The scatter plates 4236–4240 are, for example, such devices as can control scattering/transmission or reflection/transmission, such as polymer dispersed liquid crystal devices, holographic polymer dispersed liquid crystal devices or combined devices of liquid crystal and multi-lens array. Shutters 4241–4245 may be such devices as can control transmission/interruption, such as twisted nematic liquid crystal devices, ferroelectric liquid crystal devices or mechanical shutter devices.

The scatter plates 4236–4240 are arranged at different depth positions, the focusing planes of the projector type two-dimensional displays 4231–4235 are aligned with these scatter plates 4236–4240, two-dimensional images are projected onto the scatter plates, and the scattering/transmission timing of the scatter plates 4236–4240 is synchronized with the transmission/interruption timing of the shutters 4241–4245 when activating the scatter plates and the shutters. This enables the depth positions of the planes 4241–4245 formed on the scatter plates 4236–4240 to be controlled on a time division basis.

Like the optical system 4103 shown in FIG. 79, the use of projector type two-dimensional displays 4231–4235 provides an advantage of enhanced level of freedom of display layout.

Although the optical system 4103 of FIG. 79 concerns a case where there are five projector type two-dimensional displays, it is apparent that the similar configuration can be employed when a different number of displays are provided.

It is obvious that the lamps of projector type two-dimensional displays 4231–4235 can be turned on or off instead of using the shutters.

[E-0021]

In the preceding embodiments, we have mainly described a case where the planes are located near, inside or beyond the head-mounted displays. Incorporation of optical devices enables these planes to be easily arranged away from or in front of the two-dimensional displays.

Figure 80:
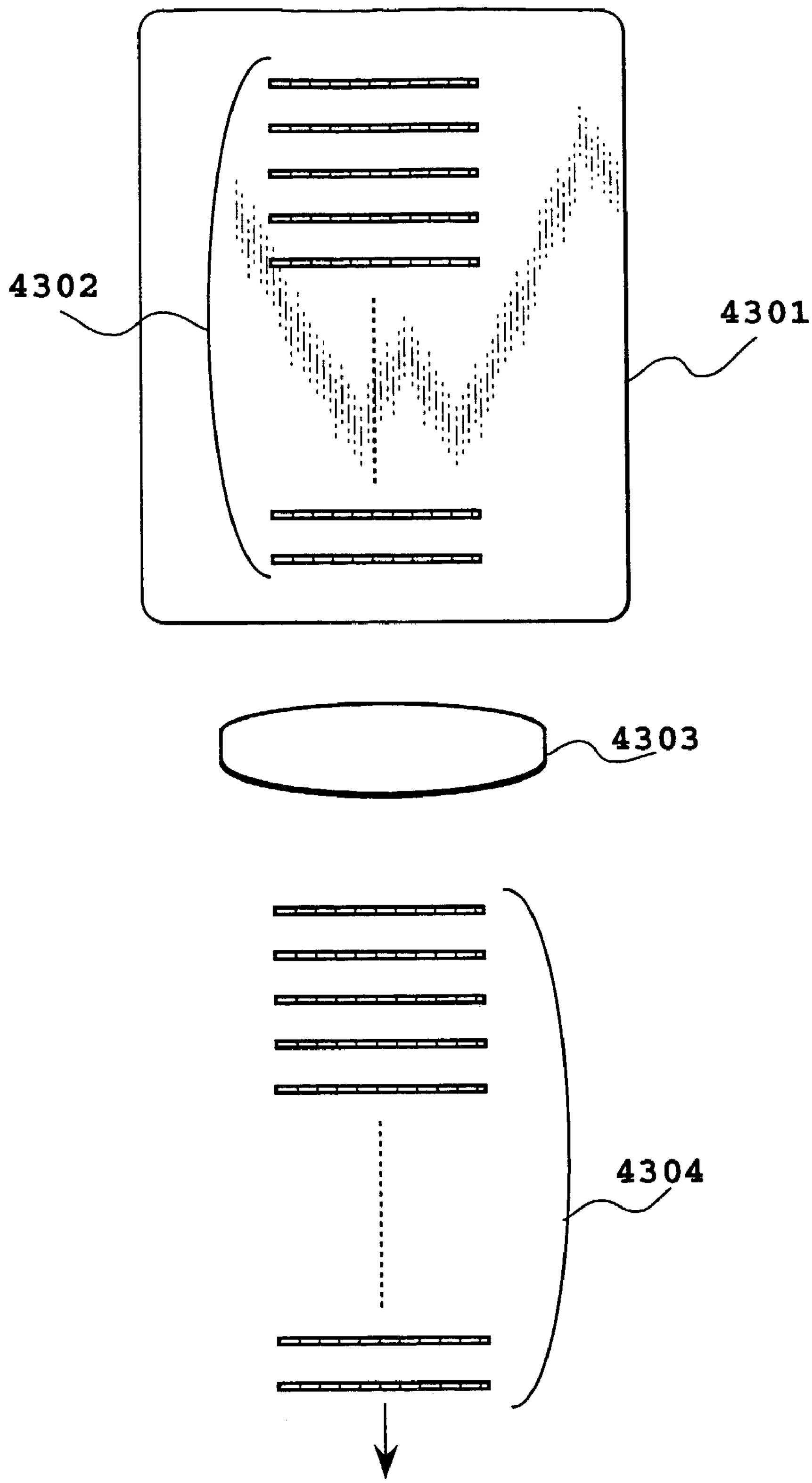
FIG. 80 is a schematic diagram showing a further example of an optical system that can be used in each of the embodiments of the invention.

One such example is shown in FIG. 80.

For example, it can easily be seen that by arranging a lens system 4303 in front of the optical system 4301 shown in the preceding embodiments, the internal planes 4302 can be moved to the positions of external planes 4304.

This offers the advantage that because the three-dimensional images are reproduced floating in space, the three-dimensional images are more likely to appear three-dimensional to the observer than when the three-dimensional images are located inside or behind the display.

The invention has been described in detail in conjunction with the preceding embodiments and it should be noted that the invention is not limited to these embodiments and that various modifications may be made without departing from the spirit of the invention.

[E-0022]

The representative advantages of this invention may be briefly summarized as follows.

Contradictions among physiological factors associated with stereoscopy can be minimized; the amount of information required can be reduced; and electrically rewritable three-dimensional videos can be reproduced.

[F-0001]

[Embodiment 22]

Figure 81A:
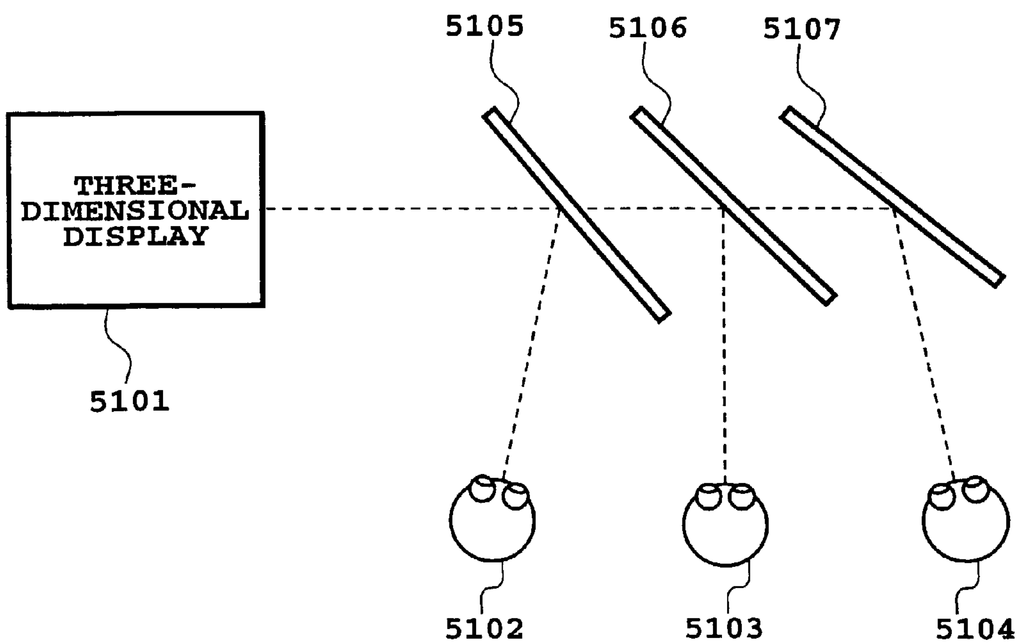
FIGS. 81A and 81B are schematic diagrams showing three-dimensional displays according to a twenty-second embodiment of the invention.
Figure 81B:
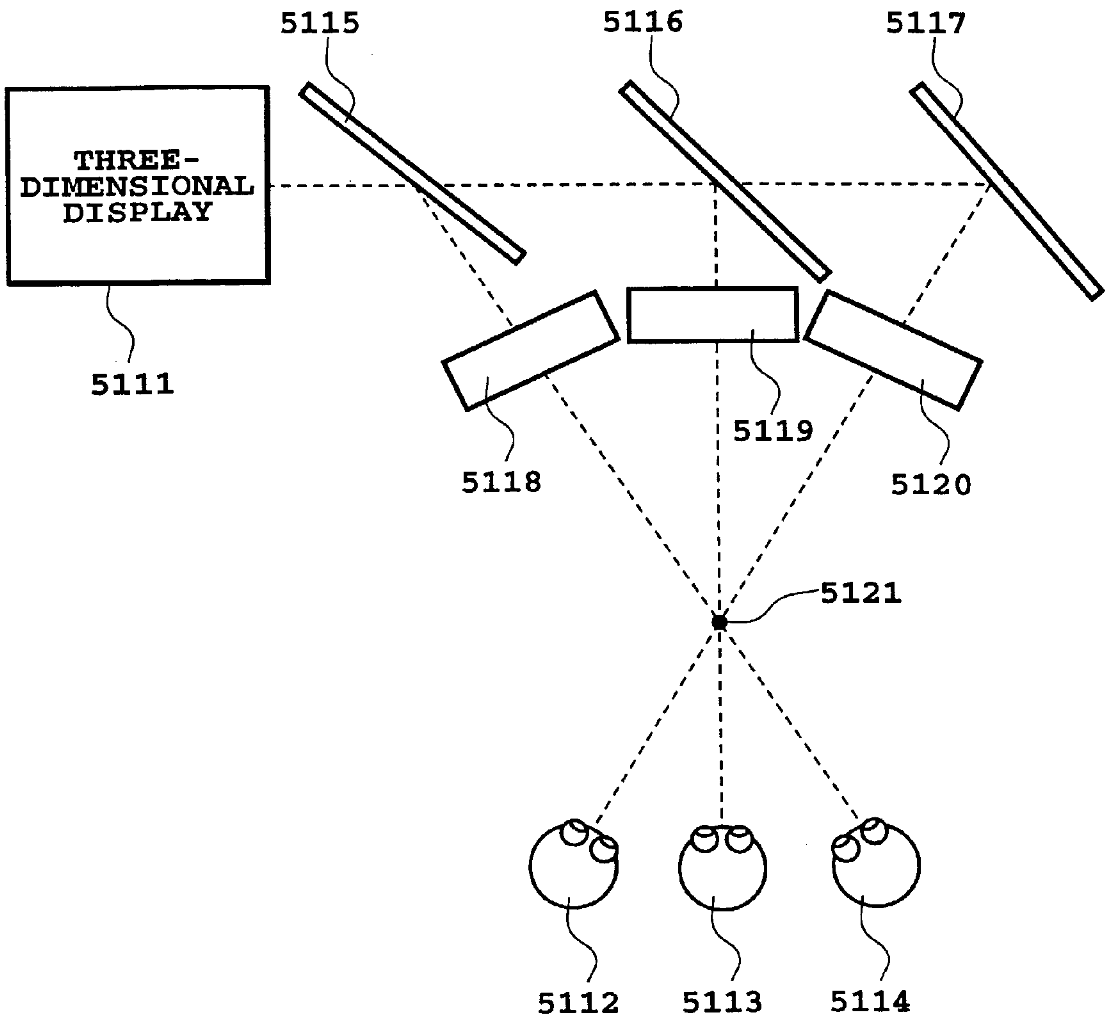

FIGS. 81A and 81B show the concept of a twenty-second embodiment of the invention.

FIG. 81A illustrates a three-dimensional display 5101 which allows a plurality of observers 5102, 5103, 5104 to simultaneously view a three-dimensional image displayed on the three-dimensional display 5101, by putting reflectors 5105, 5106, 5107 at different angles on the optical axis of the three-dimensional display to reflect the three-dimensional image toward the observers. The reflectors 5105, 5106, 5107 used are, for example, half mirrors or prisms, which can perform reflection or refraction and transmission at the same time. The reflector 5107 alone may use a total reflecting mirror.

FIG. 81B illustrates a three-dimensional display 5111 which allows a plurality of observers 5112, 5113, 5114 to simultaneously view a three-dimensional image displayed on the three-dimensional display 5111, by putting reflectors 5115, 5116, 5117 at different angles on the optical axis of the three-dimensional display to reflect the three-dimensional image toward the observers. Optical systems 5118, 5119, 5120 arranged on optical axes connecting the observers and the reflectors cause the three-dimensional image displayed on the three-dimensional display 5111 to be focused on an image plane 5121 so that all the observers can view the three-dimensional image at the same position (image plane 5121). The reflectors 5115, 5116, 5117 used are, for example, half mirrors or prisms, which can perform reflection or refraction and transmission at the same time. The reflector 5117 alone may use a total reflecting mirror.

With this simple method, a three-dimensional display that allows a plurality of observers to view an image simultaneously can be realized.

[Embodiment 23]

Figure 82A:
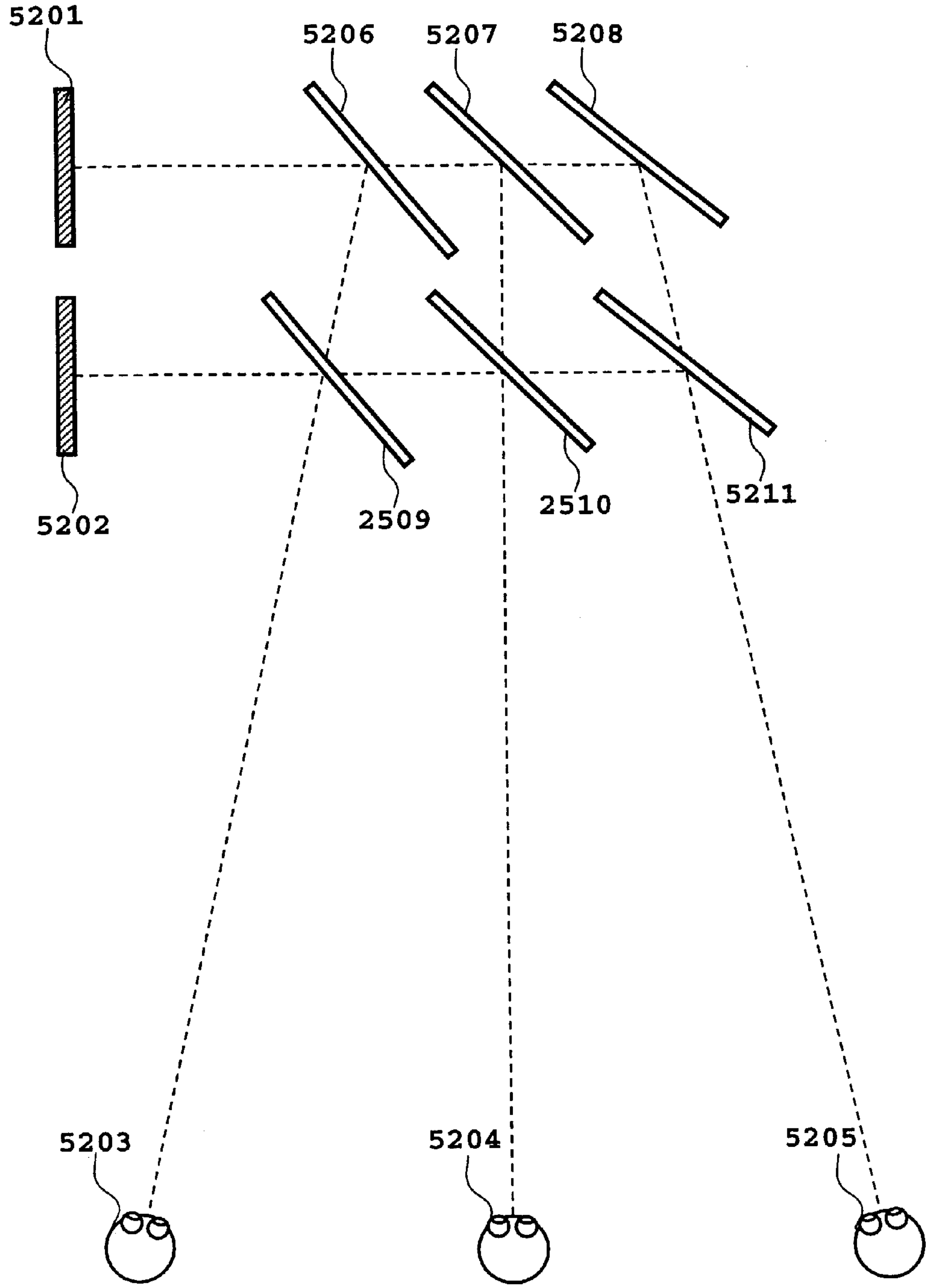
FIGS. 82A and 82B are schematic diagrams showing three-dimensional displays according to a twenty-third embodiment of the invention.
Figure 82B:
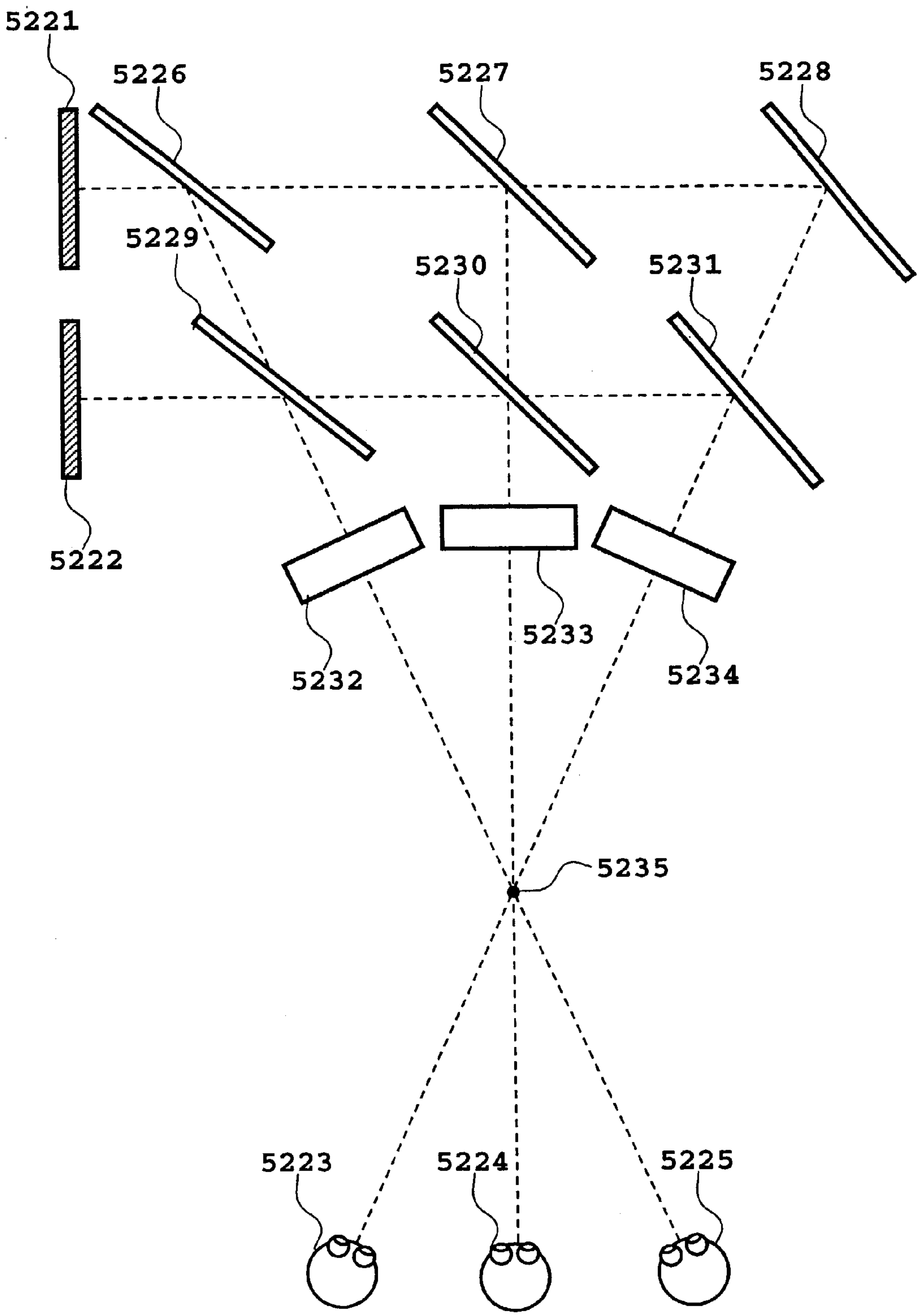

FIGS. 82A and 82B illustrate the concept of a twenty-third embodiment of the invention.

FIG. 82A illustrates a three-dimensional display, which displays a three-dimensional image by using two displays 5201 and 5202 and which includes reflectors 5206, 5207, 5208 and reflectors 5209, 5210, 5211 arranged at different angles on two optical axes of the two displays to reflect two images of the two displays along the same optical axis toward each of a plurality of observers 5203, 5204, 5205 so that each observer can view the two images overlapping each other and all the observers can view the same overlapping images at the same time. The reflectors 5206, 5207, 5208, 5209, 5210, 5211 are, for example, half mirrors or prisms, which can perform reflection or refraction and transmission at the same time. The reflector 5208 alone may use a total reflecting mirror.

FIG. 82B illustrates a three-dimensional display, which displays a three-dimensional image by using two displays 5221 and 5222 and which includes reflectors 5226, 5227, 5228 and reflectors 5229, 5230, 5231 arranged at different angles on two optical axes of the two displays to reflect two images of the two displays along the same optical axis toward each of a plurality of observers 5223, 5224, 5225 so that each observer can view the two images overlapping each other and all the observers can view the same overlapping images at the same time. Optical systems 5232, 5233, 5234 arranged on optical axes connecting the observers and the reflectors cause a three-dimensional image displayed by the two displays 5221, 5222 to be focused on an image plane 5235 so that all the observers can view the three-dimensional image at the same position (image plane 5235). The reflectors 5226, 5227, 5228, 5229, 5230, 5231 are, for example, half mirrors or prisms, which can perform reflection or refraction and transmission at the same time. The reflector 5228 alone may use a total reflecting mirror.

With this simple method, a three-dimensional display that allows a plurality of observers to view an image simultaneously can be realized.

[Embodiment 24]

Figure 83A:
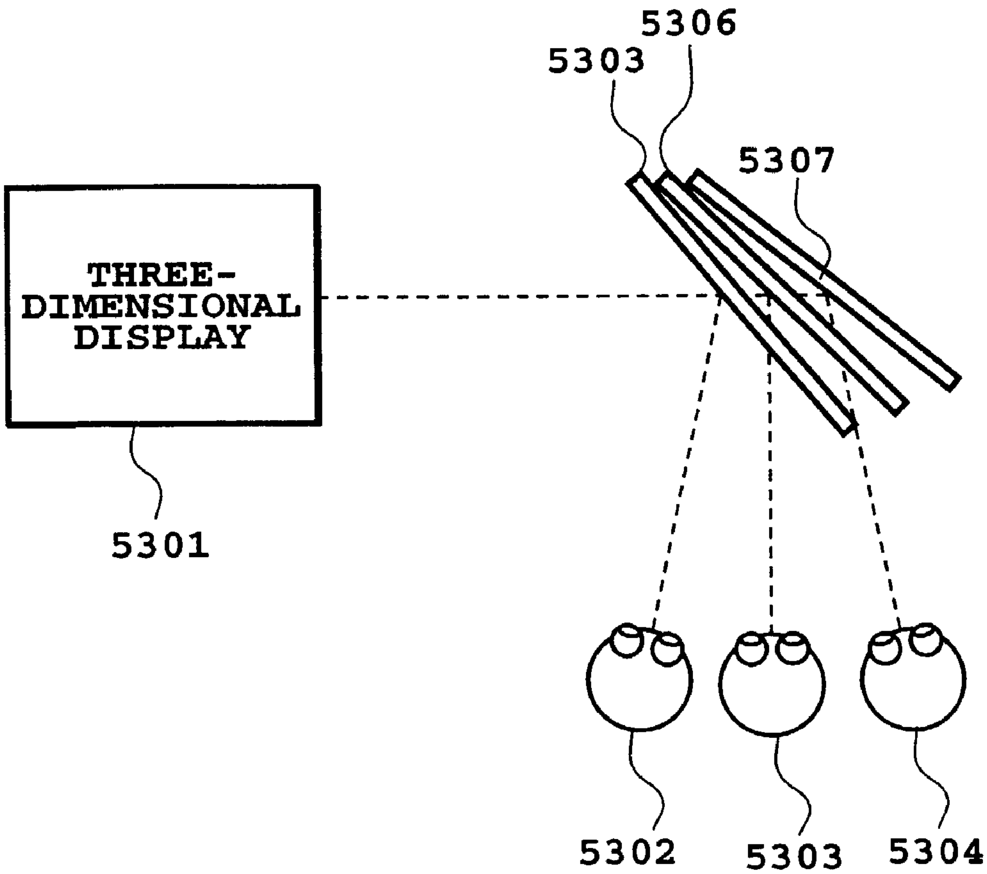
FIGS. 83A and 83B are schematic diagrams showing three-dimensional displays according to a twenty-fourth embodiment of the invention.
Figure 83B:
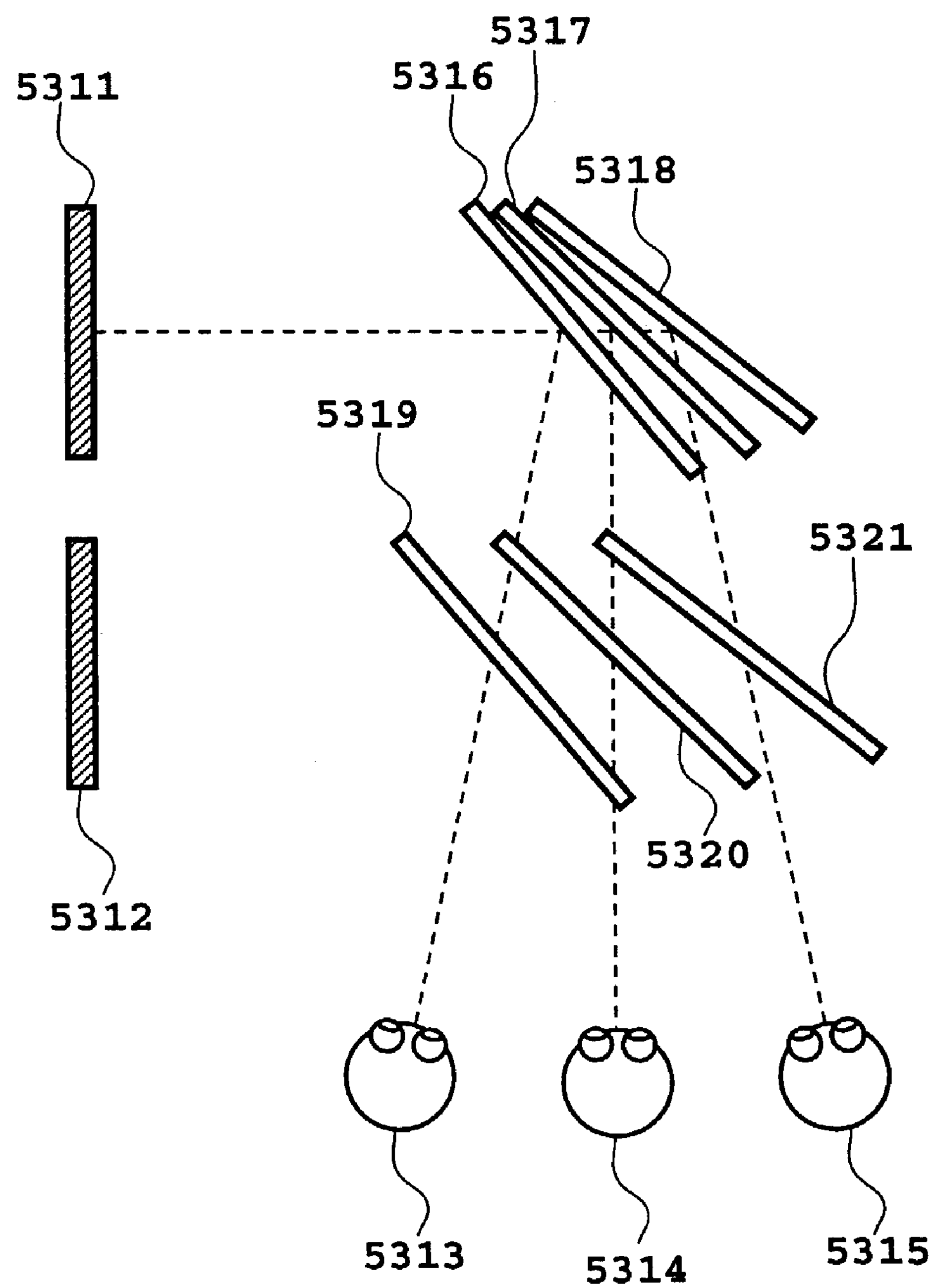

FIGS. 83A and 83B illustrate the concept of a twenty-fourth embodiment of the invention.

FIG. 83A shows a three-dimensional display 5301, which includes reflectors 5305, 5306, 5307 arranged at different angles on an optical axis of the three-dimensional display to reflect a three-dimensional image toward each of a plurality of observers 5302, 5303, 5304 so that all the observers can view the three-dimensional image simultaneously. The reflectors 5305, 5306, 5307 may use, for example, dichroic mirror, dichroic prism and holographic optical element, which can limit the wavelength to be reflected and can perform reflection and transmission at the same time. The reflector 5307 alone can use a total reflecting mirror. By shifting the reflection wavelength of each reflector to a degree that will not result in a significant change in color, all the observers can view almost the same three-dimensional image. Color representation can be provided by stacking reflectors of three primary colors (R, G, B) (for example, stacking three red, green and blue reflectors at the position of reflector 5305).

FIG. 83B illustrates a three-dimensional display, which displays a three-dimensional image by using two displays 5311 and 5312 and which includes reflectors 5316, 5317, 5318 and reflectors 5319, 5320, 5321 arranged at different angles on two optical axes of the two displays to reflect two images of the two displays along the same optical axis toward each of a plurality of observers 5313, 5314, 5315 so that each observer can view the two images overlapping each other and all the observers can view a three-dimensional image at the same time. The reflectors 5316, 5317, 5318, 5319, 5320, 5321 may use, for example, dichroic mirror, dichroic prism and holographic optical element, which can limit the wavelength to be reflected and can perform reflection and transmission at the same time. The reflector 5318 alone can use a total reflecting mirror. By shifting the reflection wavelength of each reflector to a degree that will not result in a significant change in color, all the observers can view almost the same three-dimensional image. Color representation can be provided by stacking reflectors of three primary colors (R, G, B) (for example, stacking three red, green and blue reflectors at the position of reflector 5316). The paired reflectors (e.g., reflector 5316 and reflector 5319) may have the same band of wavelength.

This configuration is possible even when mirrors are overlapping each other on an optical axis.

[Embodiment 25]

Figure 84A:
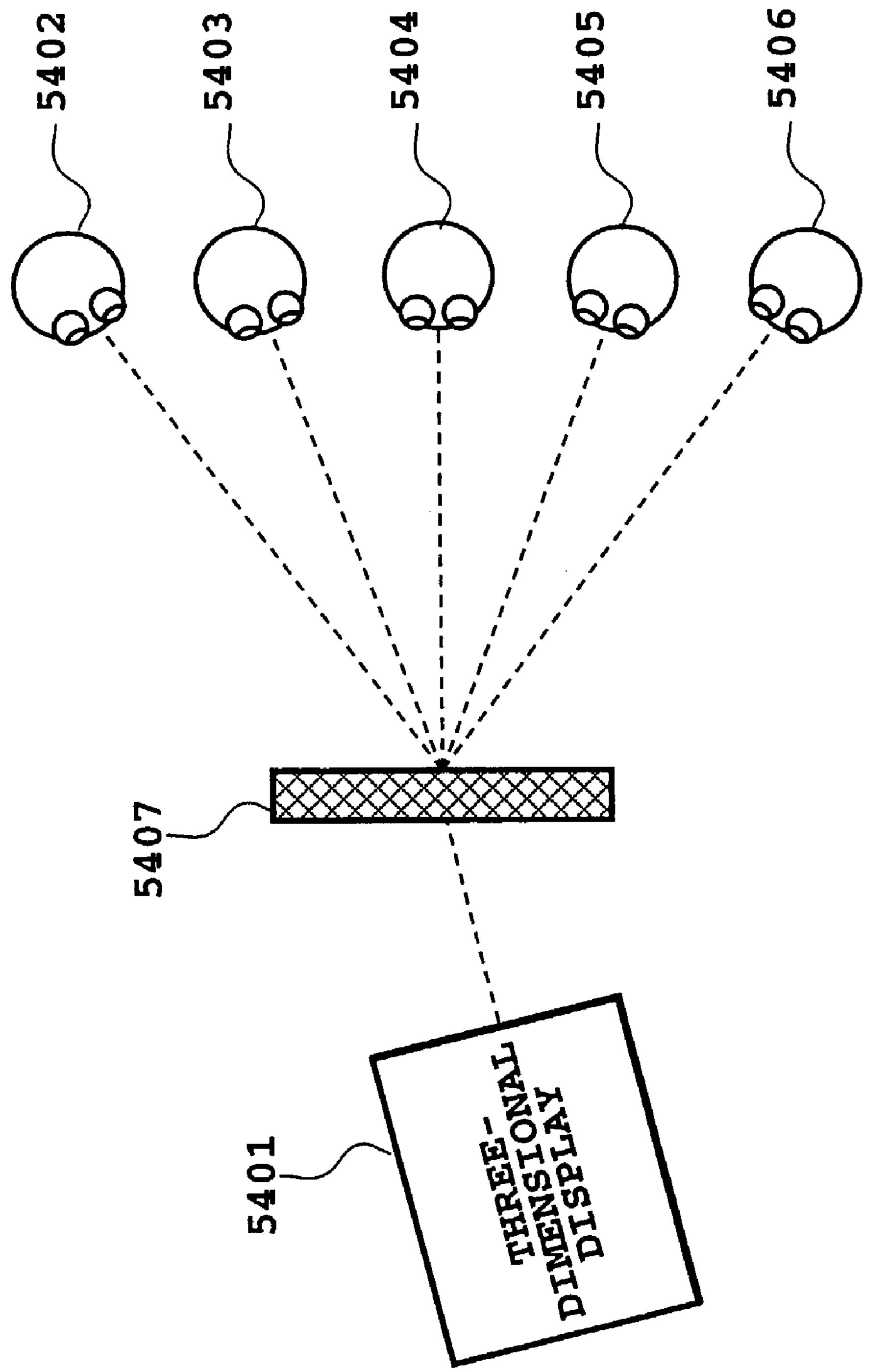
FIGS. 84A to 84E are schematic diagrams showing three-dimensional displays according to a twenty-fifth embodiment of the invention.
Figure 84B:
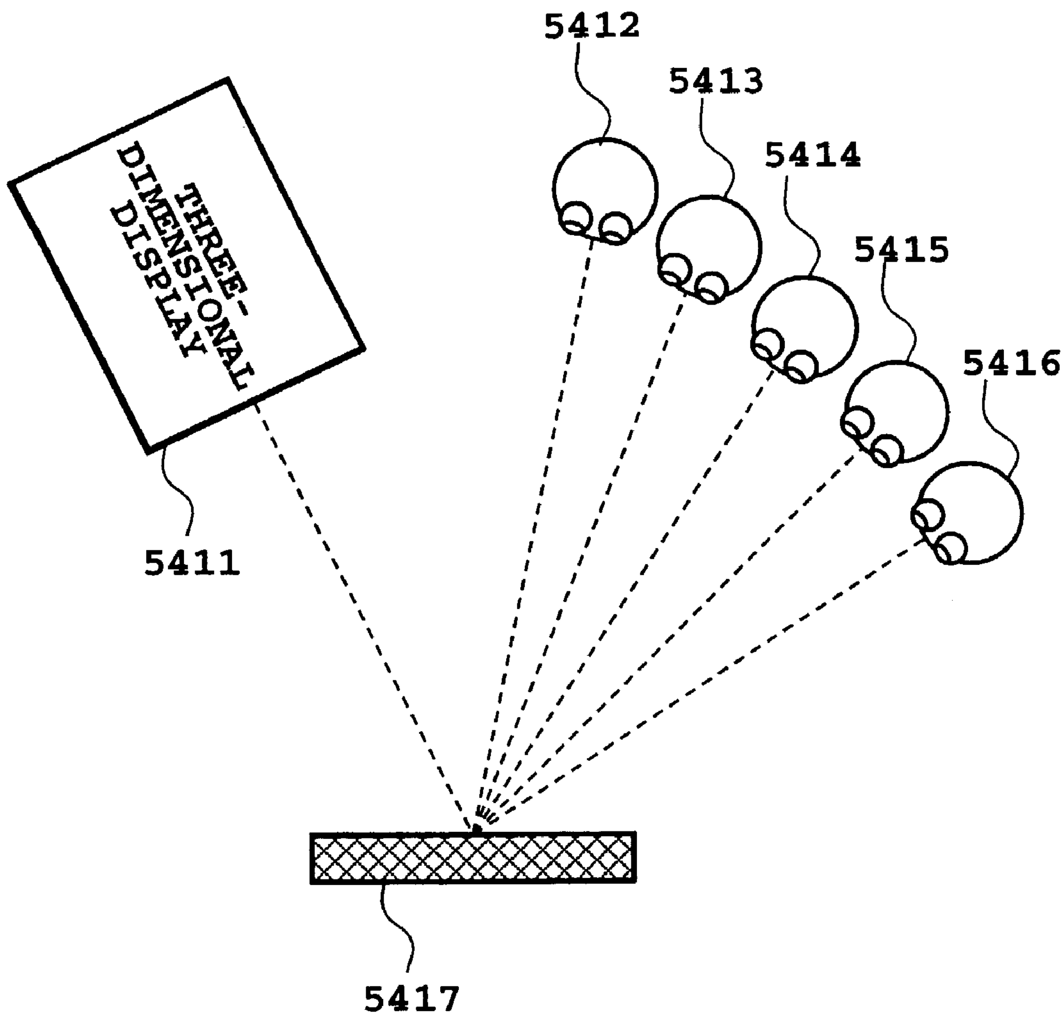

FIGS. 84A and 84B show the concept of a twenty-fifth embodiment of the invention.

Figure 84C:
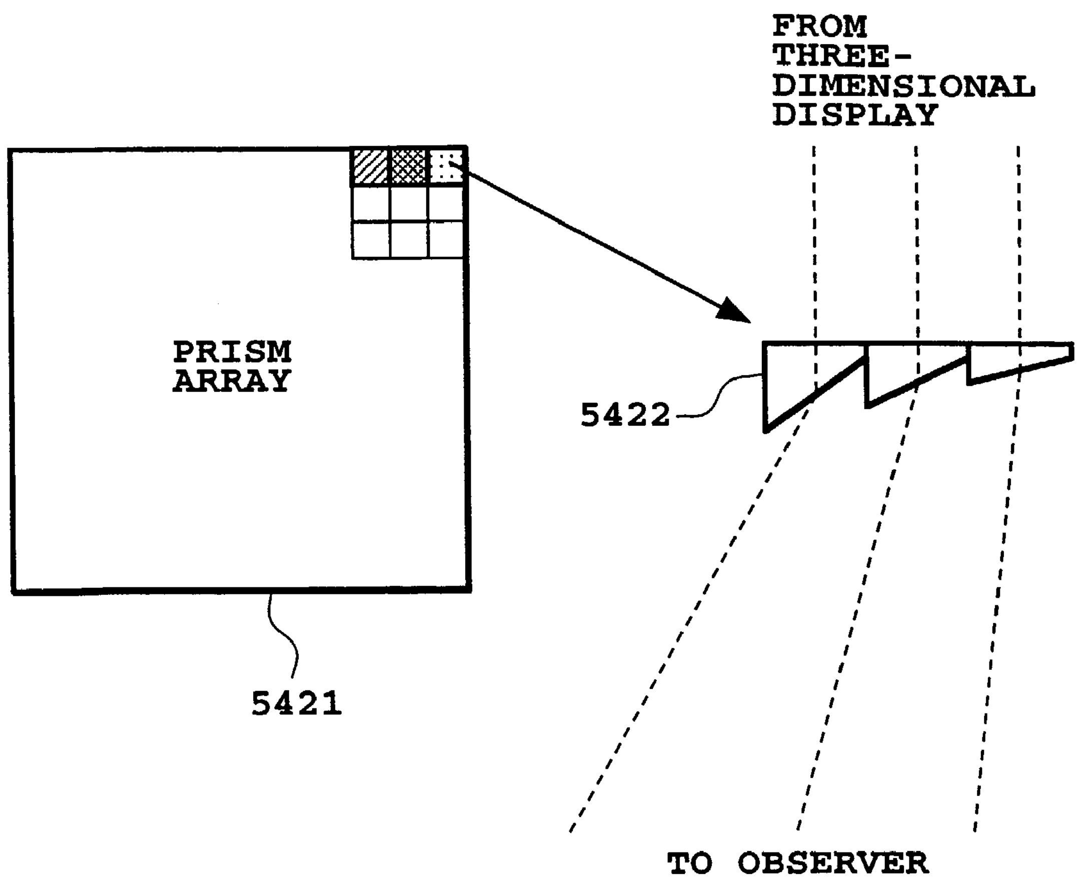
Figure 84D:
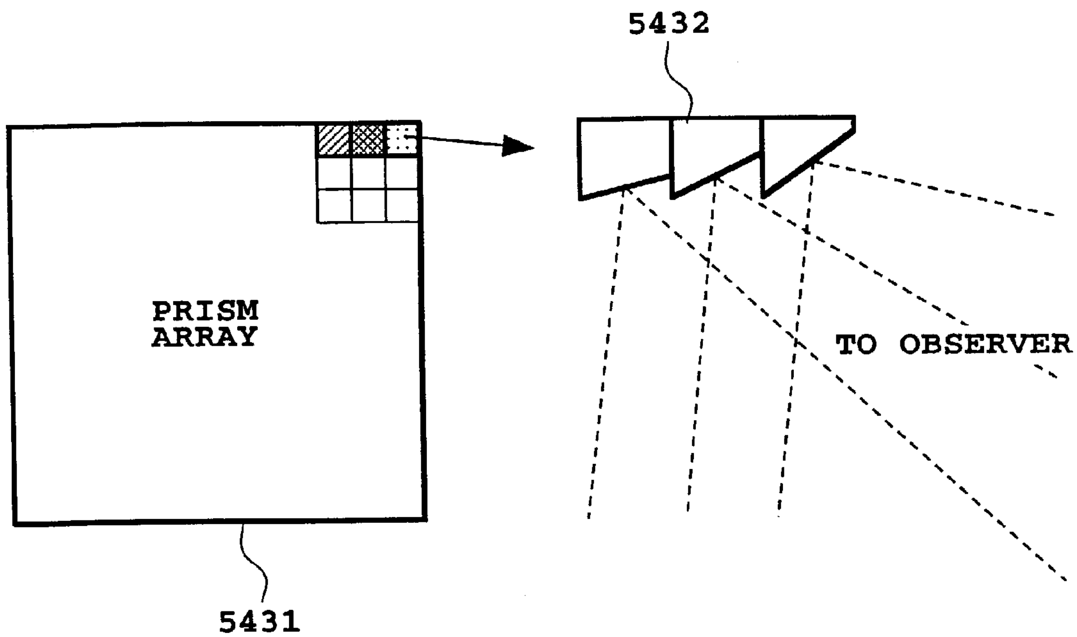
Figure 84E:
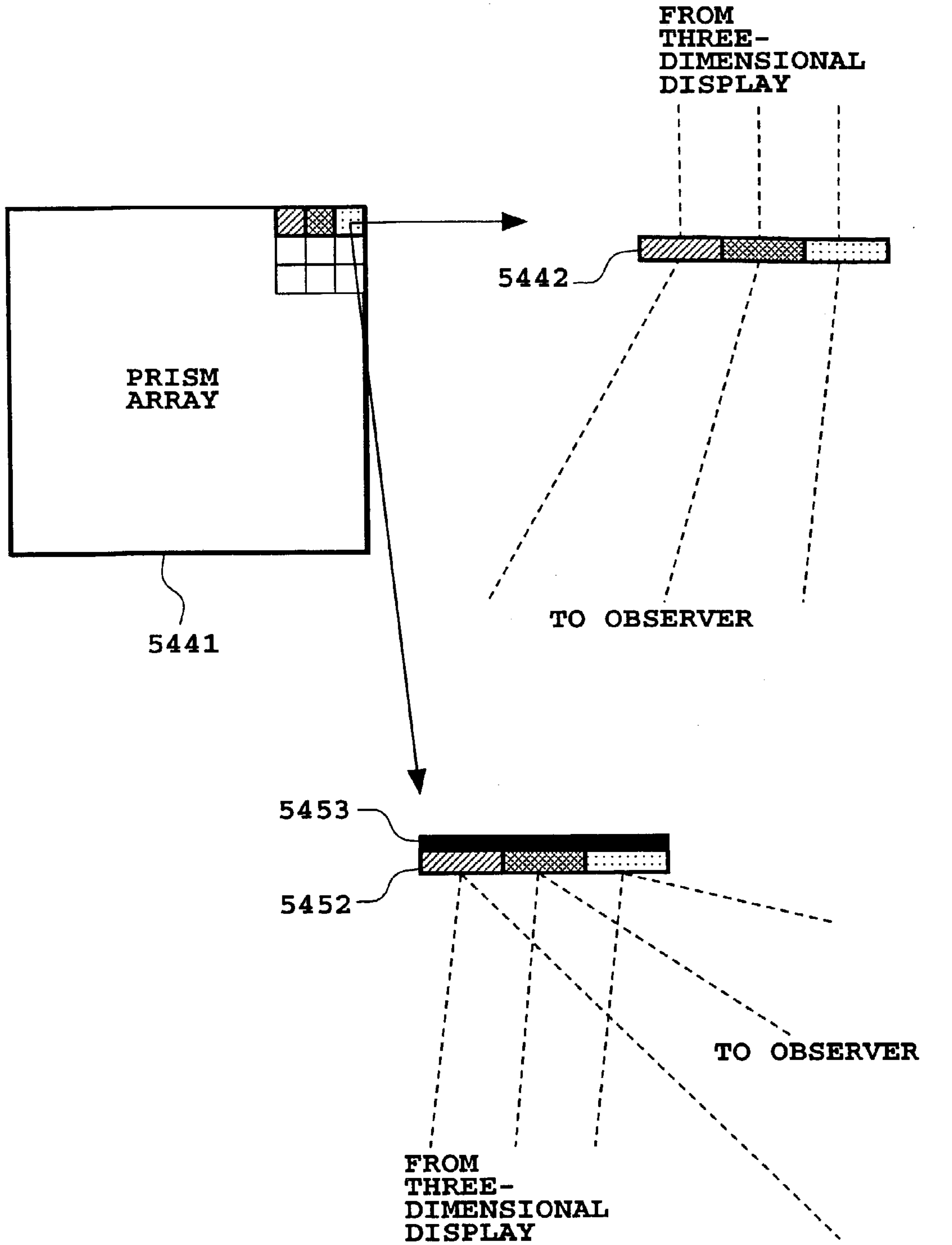

FIG. 84A shows a three-dimensional display, which includes a viewing zone distributor 5407 to distribute an optical axis from the three-dimensional display 5401 into a plurality of optical axes and refract light from the three-dimensional display toward each of a plurality of observers 5402, 5403, 5404, 5405, 5406 so that all the observers can simultaneously view the same three-dimensional image displayed on the three-dimensional display. Among example devices used for the viewing zone distributor 5407 are a holographic optical element that has a plurality of diffraction angles and can diffract rays of light at different angles at the same time, a prism array 5421 such as shown in FIG. 84C, and a diffraction grating array 5441 such as shown in FIG. 84E. The prism array 5421 has a number of small prisms 5422 with different refraction directions to refract and distribute light from the three-dimensional display toward each of the observers. Likewise, the diffraction grating array 5441 has a number of small diffraction gratings 5442 with different sizes of gratings to diffract and distribute light from the three-dimensional display toward each of the observer.

FIG. 84B shows a three-dimensional display, which includes a viewing zone distributor 5417 to distribute an optical axis from the three-dimensional display 5411 into a plurality of optical axes and reflect light from the three-dimensional display toward each of a plurality of observers 5412, 5413, 5414, 5415, 5416 so that all the observers can simultaneously view the same three-dimensional image displayed on the three-dimensional display. Among example devices used for the viewing zone distributor 5417 are a holographic optical element that has a plurality of reflection angles and can reflect rays of light at different angles at the same time, a mirror array 5431 such as shown in FIG. 84D, and a diffraction grating array 5441 such as shown in FIG. 84E. The mirror array 5431 has a number of small mirrors 5432 with different reflection directions to reflect light from the three-dimensional display toward each of the observers. Likewise, the diffraction grating array 5441 has a number of small diffraction gratings 5442 with different sizes of gratings to reflect and distribute light from the three-dimensional display toward each of the observer.

This arrangement can expand a viewing zone of an observer while moving or a viewing zone for a plurality of observers.

[Embodiment 26]

Figure 85A:
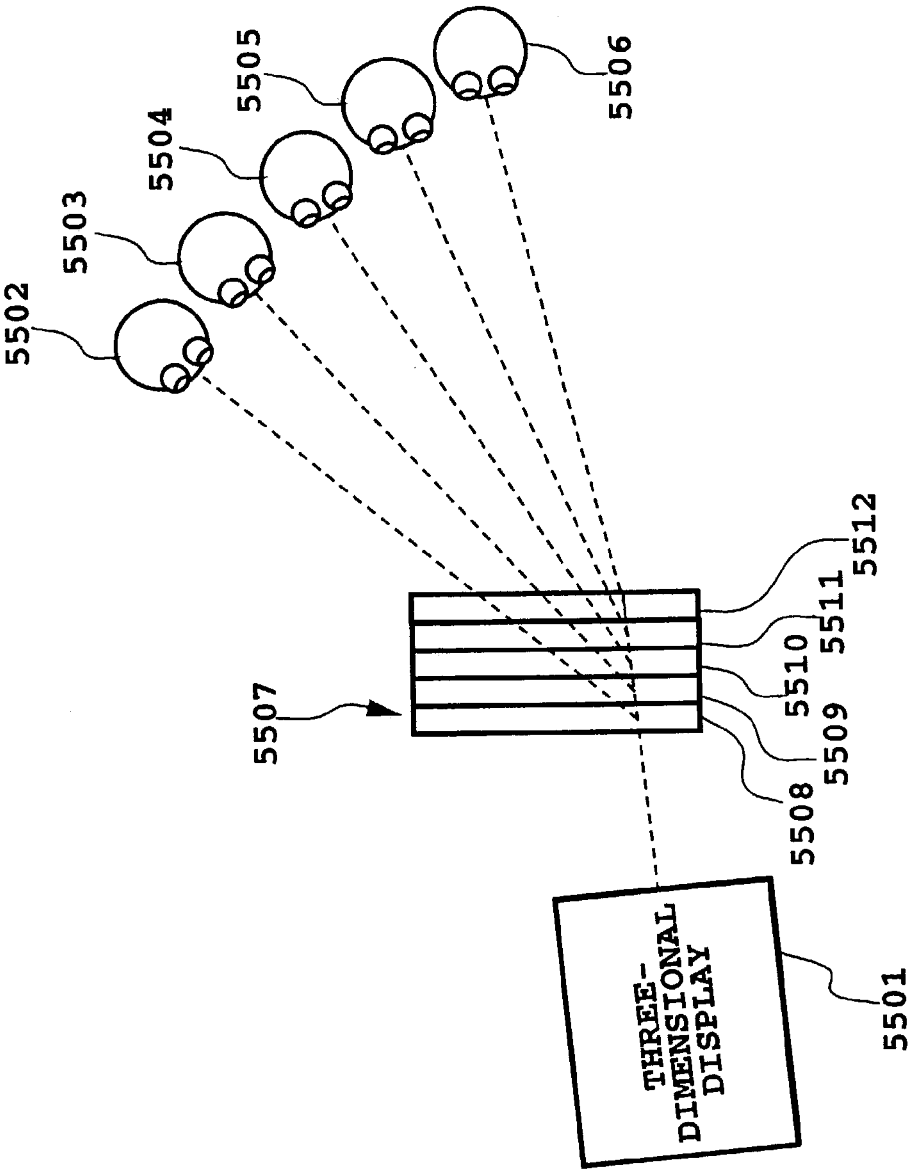
FIGS. 85A and 85B are schematic diagrams showing three-dimensional displays according to a twenty-sixth embodiment of the invention.
Figure 85B:
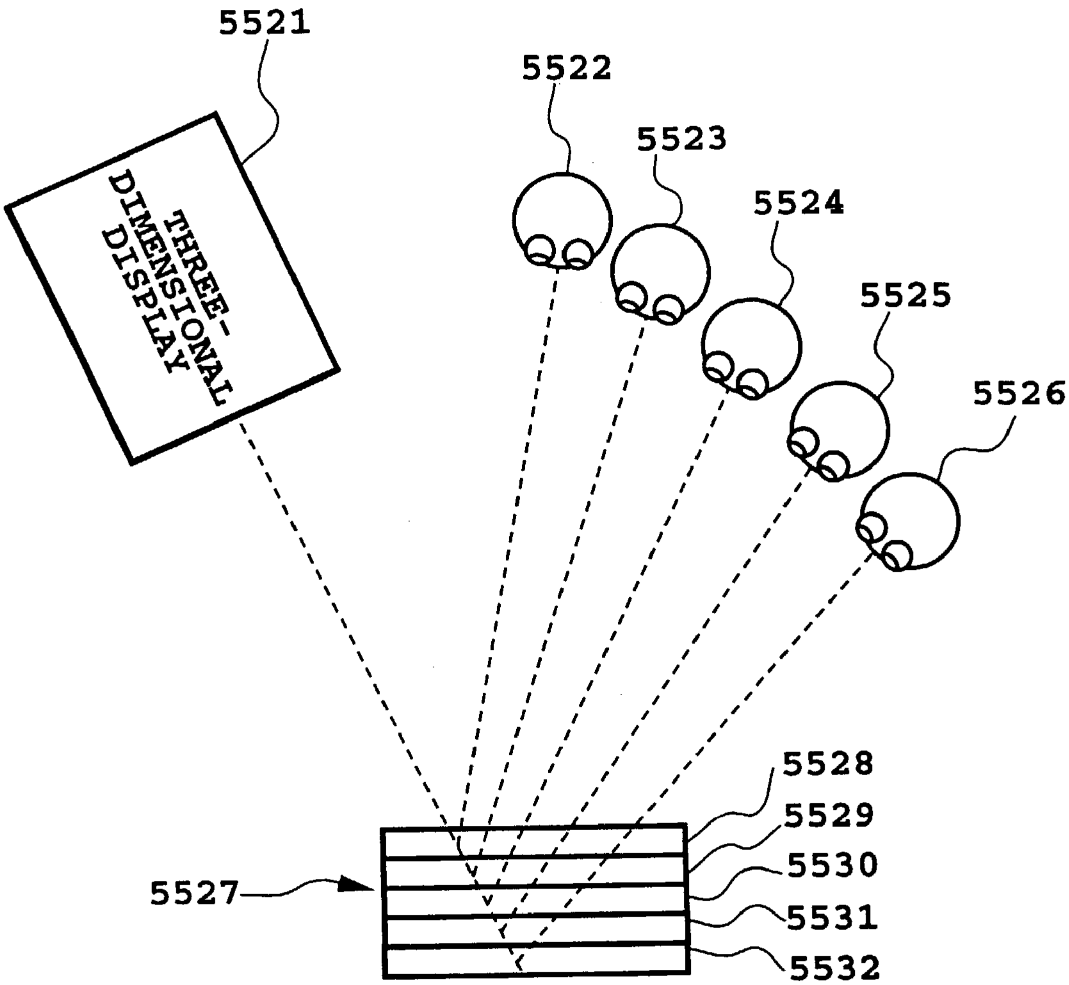

FIGS. 85A and 85B show the concept of a twenty-sixth embodiment of the invention.

FIG. 85A shows a three-dimensional display, which includes a viewing zone distributor 5507 to distribute an optical axis from the three-dimensional display 5501 into a plurality of optical axes and refract light from the three-dimensional display toward each of a plurality of observers 5502, 5503, 5504, 5505, 5506 so that all the observers can simultaneously view the same three-dimensional image displayed on the three-dimensional display. The viewing zone distributor 5507 uses a plurality of holographic optical elements stacked together each of which can diffract light at only one angle. The holographic optical elements 5508, 5509, 5510, 5511, 5512 with different diffraction angles are stacked together to diffract light from the three-dimensional display toward the respective observers.

FIG. 85B shows a three-dimensional display, which includes a viewing zone distributor 5527 to distribute an optical axis from the three-dimensional display 5521 into a plurality of optical axes and reflect light from the three-dimensional display toward each of a plurality of observers 5522, 5523, 5524, 5525, 5526 so that all the observers can simultaneously view the same three-dimensional image displayed on the three-dimensional display. The viewing zone distributor 5527 uses a plurality of holographic optical elements stacked together each of which can diffract light at only one angle. The holographic optical elements 5528, 5529, 5530, 5531, 5532 with different reflection angles are stacked together to distribute light from the three-dimensional display toward the respective observers.

This arrangement can expand a viewing zone of an observer while moving or a viewing zone for a plurality of observers.

[Embodiment 27]

FIGS. 86A to 86D show the concept of a twenty-seventh embodiment of the invention.

Figure 86A:
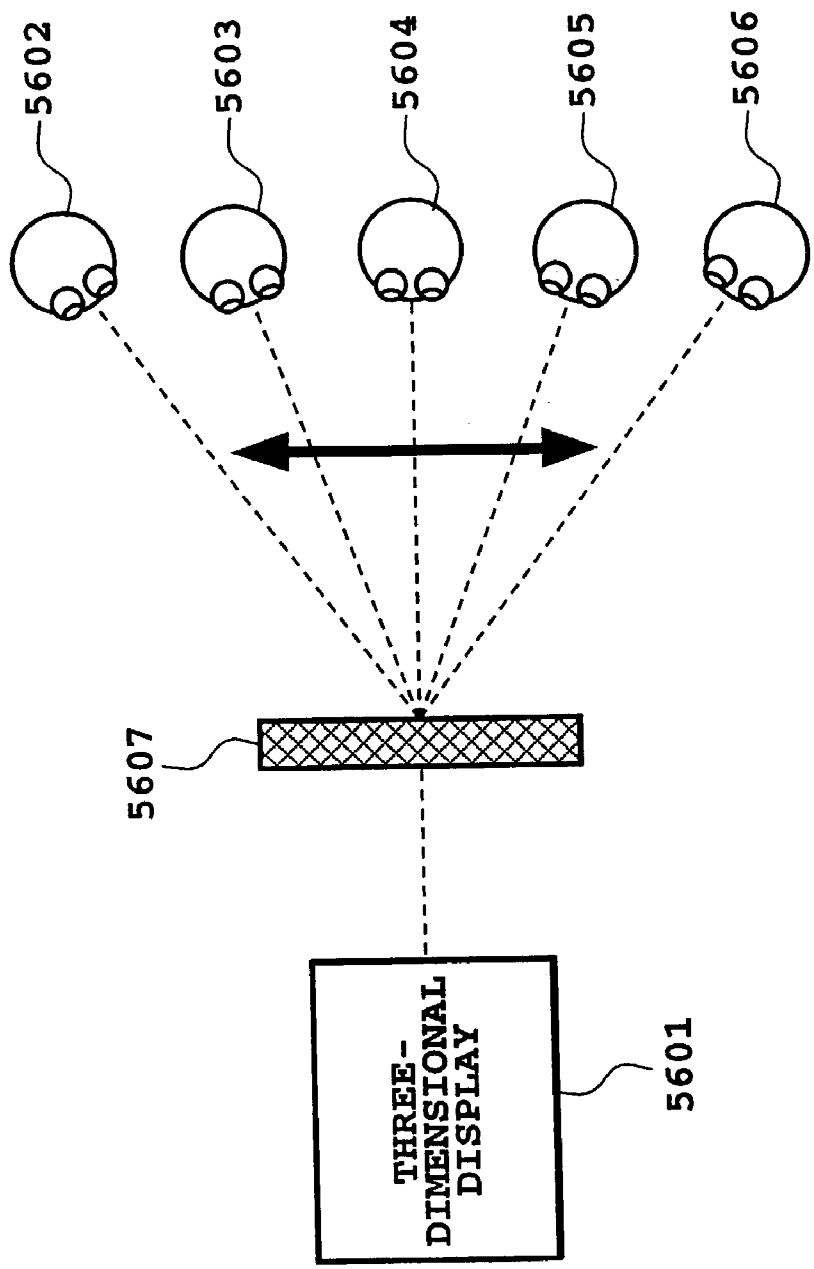
FIGS. 86A to 86D are schematic diagrams showing three-dimensional displays according to a twenty-seventh embodiment of the invention.

FIG. 86A illustrates a three-dimensional display, which includes a viewing zone distributor 5607 to distribute an optical axis from the three-dimensional display 5601 into a plurality of optical axes on a time division basis and refract light from the three-dimensional display toward each of a plurality of observers 5602, 5603, 5604, 5605, 5606 so that all the observers can view the same three-dimensional image. The viewing zone distributor 5607 uses a liquid crystal deflection element which comprises a liquid crystal and an optical element disposed in contact with the liquid crystal. The liquid crystal deflection element deflects light from the three-dimensional display at high speed within the after image time of human eye between observer 5602 and observer 5606 to distribute light to individual observers. When the light, while being deflected, reaches the direction of an observer, it is halted temporarily at that position and then deflected toward the next observer. This process is repeated at high speed allowing the observers to see a three-dimensional image.

Figure 86B:
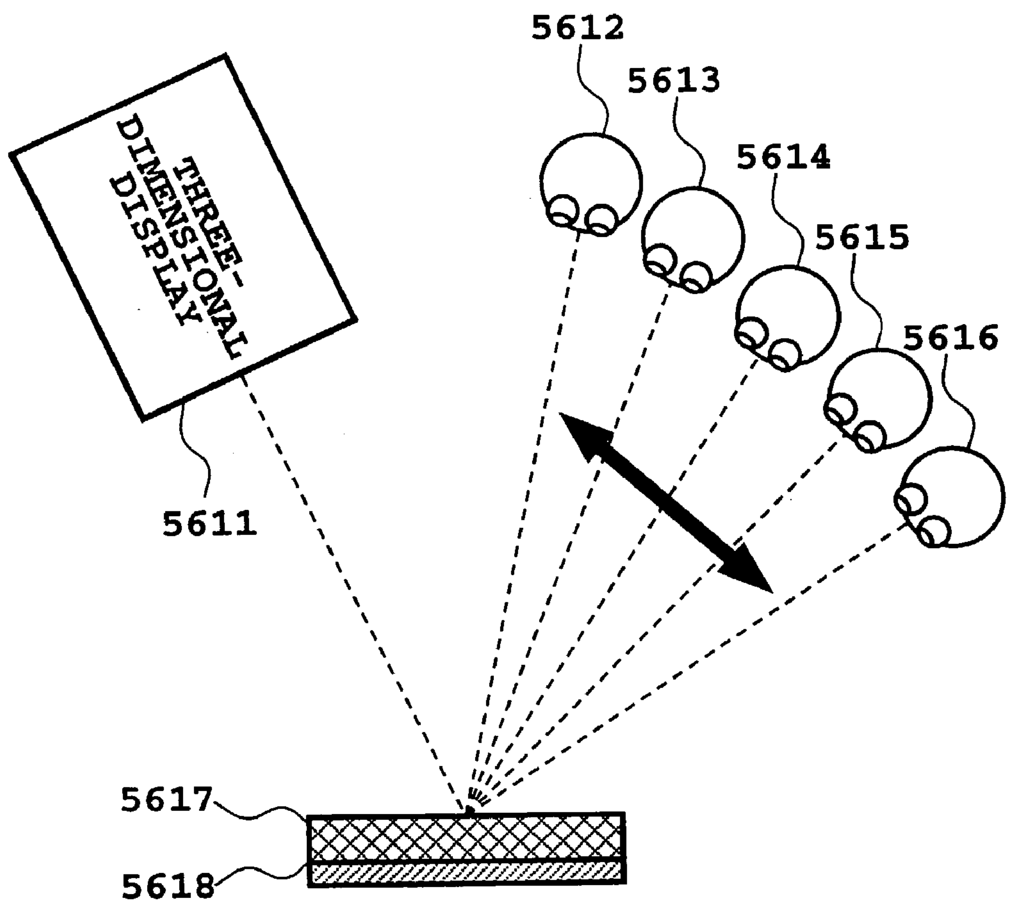

FIG. 86B illustrates a three-dimensional display, which includes a viewing zone distributor 5617 and a reflector 5618 to distribute an optical axis from the three-dimensional display 5611 into a plurality of optical axes on a time division basis and reflect light from the three-dimensional display toward each of a plurality of observers 5612, 5613, 5614, 5615, 5616 so that all the observers can view the same three-dimensional image. The viewing zone distributor 5617 uses a liquid crystal deflection element which comprises a liquid crystal and an optical element disposed in contact with the liquid crystal. The liquid crystal deflection element deflects light from the three-dimensional display at high speed within the after image time of human eye between observer 5612 and observer 5616 to distribute light to individual observers. When the light, while being deflected, reaches the direction of an observer, it is halted temporarily at that position and then deflected toward the next observer. This process is repeated at high speed allowing the observers to see a three-dimensional image. The reflector 5618 uses such reflecting material as mirror.

Figure 86C:
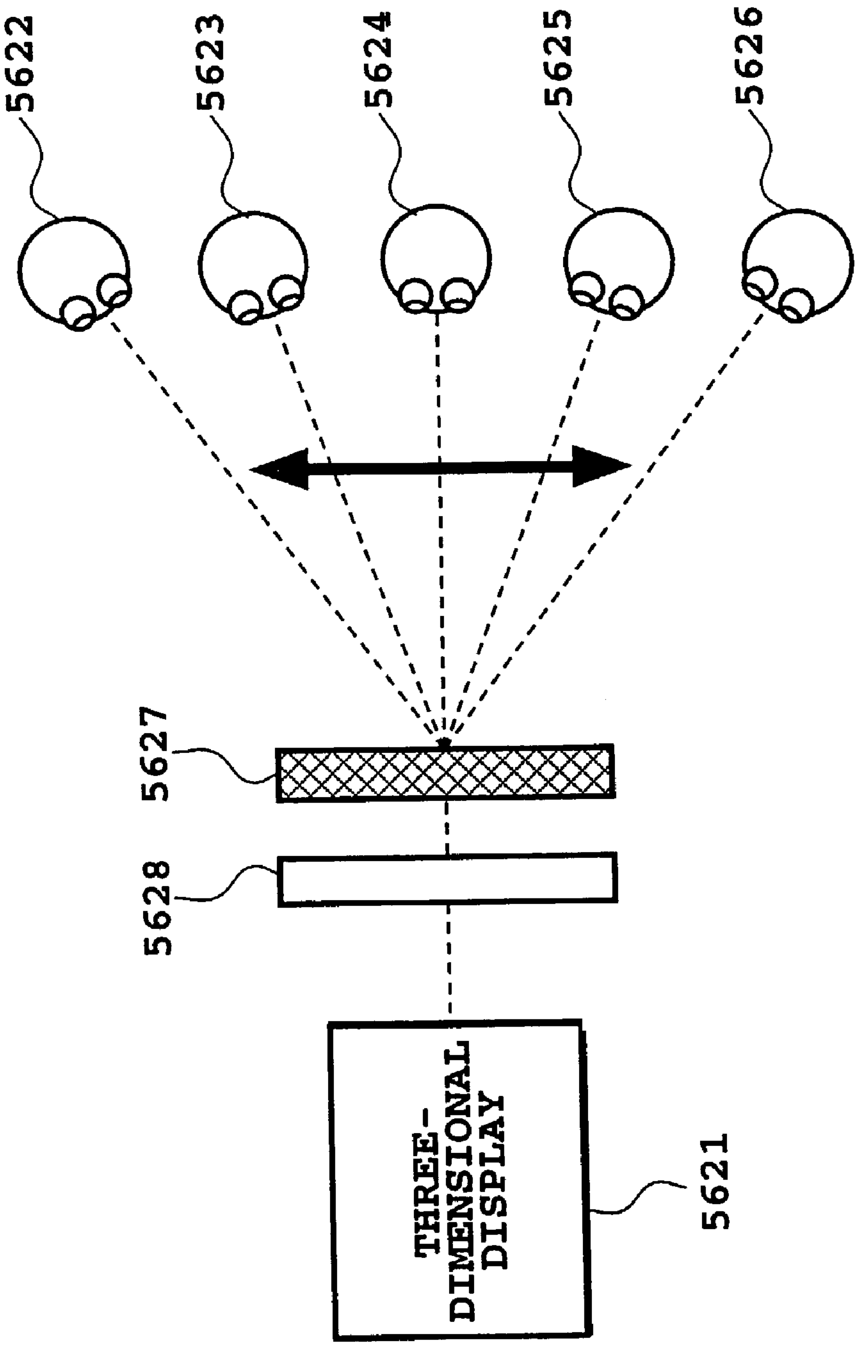

FIG. 86C illustrates a three-dimensional display, which includes a viewing zone distributor 5627 to distribute an optical axis from the three-dimensional display 5621 into a plurality of optical axes on a time division basis and refract light from the three-dimensional display toward each of a plurality of observers 5622, 5623, 5624, 5625, 5626 so that all the observers can view the same three-dimensional image. The viewing zone distributor 5627 uses a liquid crystal deflection element which comprises a liquid crystal and an optical element disposed in contact with the liquid crystal. The liquid crystal deflection element deflects light from the three-dimensional display at high speed within the after image time of human eye between observer 5622 and observer 5626 to distribute light to individual observers. A shutter 5628 is operated at the same time that the refraction direction of the viewing zone distributor 5627 aligns with the direction of each observer, thus allowing the observers to see a three-dimensional image.

Figure 86D:
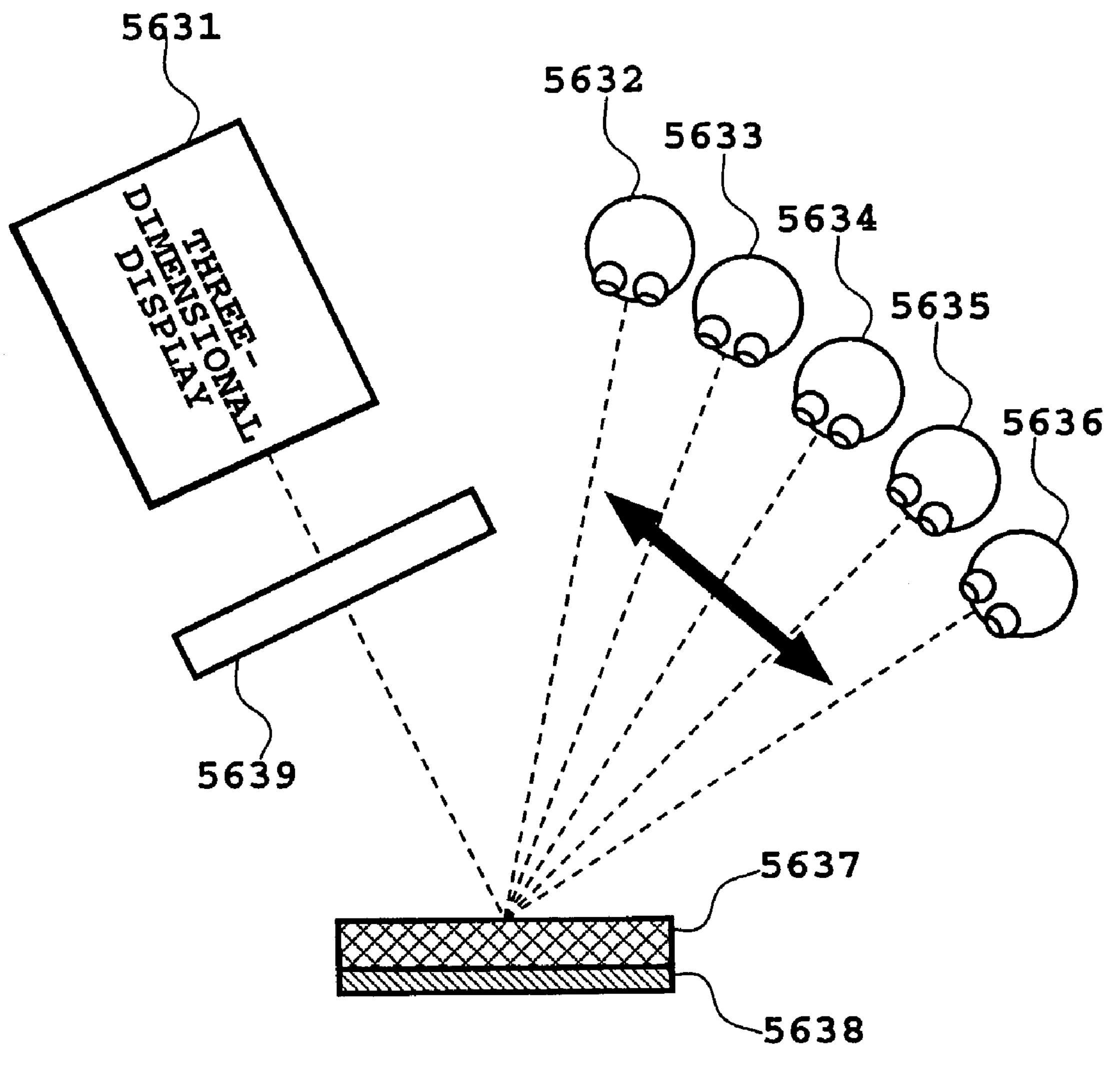

FIG. 86D illustrates a three-dimensional display, which includes a viewing zone distributor 5637 and a reflector 5638 to distribute an optical axis from the three-dimensional display 5631 into a plurality of optical axes on a time division basis and reflect light from the three-dimensional display toward each of a plurality of observers 5632, 5633, 5634, 5635, 5636 so that all the observers can view the same three-dimensional image. The viewing zone distributor 5637 uses a liquid crystal deflection element which comprises a liquid crystal and an optical element disposed in contact with the liquid crystal. The liquid crystal deflection element deflects light from the three-dimensional display at high speed within the after image time of human eye between observer 5632 and observer 5636 to distribute light to individual observers. A shutter 5639 is operated at the same time that the refraction direction of the viewing zone distributor 5637 aligns with the direction of each observer, thus allowing the observers to see a three-dimensional image. The reflector 5638 uses such reflecting material as mirror.

This apparatus can also be used for expanding a viewing zone of an observer when he or she moves.

[Embodiment 28]

Figure 87A:
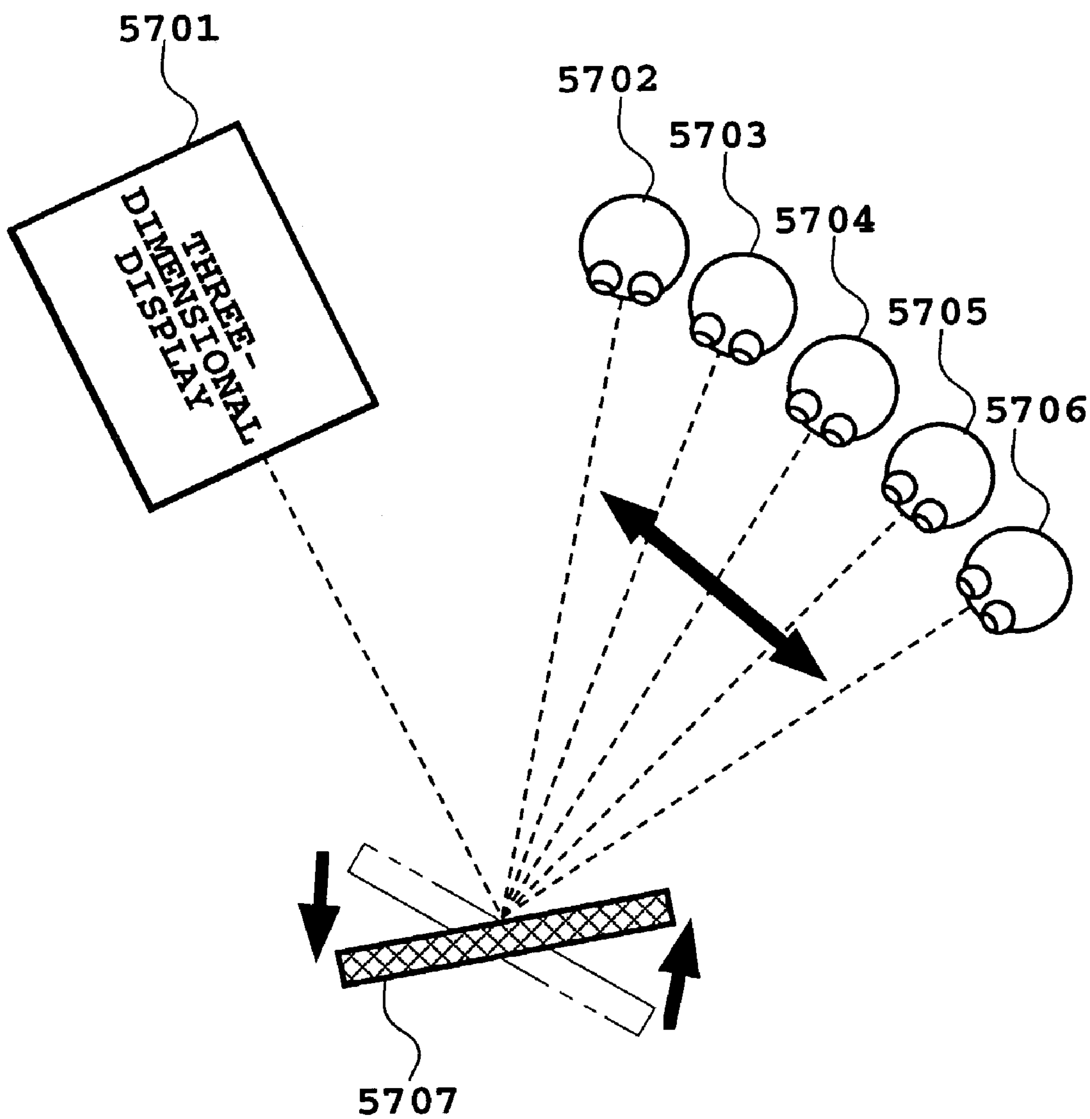
FIGS. 87A and 87B are schematic diagrams showing three-dimensional displays according to a twenty-eighth embodiment of the invention.
Figure 87B:
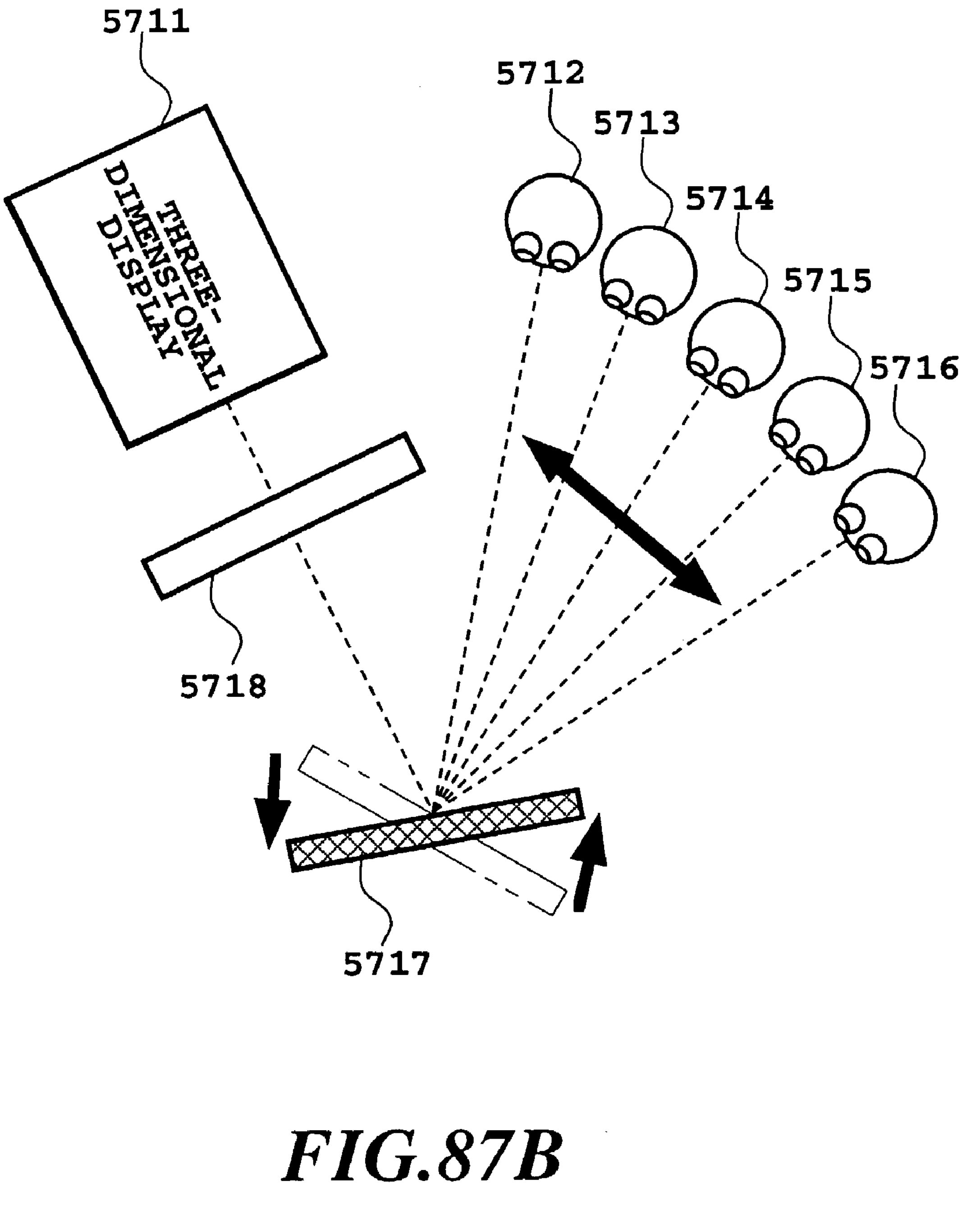

FIGS. 87A and 87B show the concept of a twenty-eighth embodiment of the invention.

FIG. 87A illustrates a three-dimensional display, which includes a reflector 5707 to distribute an optical axis from the three-dimensional display 5701 into a plurality of optical axes on a time division basis and reflect/refract light from the three-dimensional display toward each of a plurality of observers 5702, 5703, 5704, 5705, 5706 so that all the observers can view the same three-dimensional image. Among devices used for the reflector 5707 are a half mirror, a total reflecting mirror and a prism. The reflector 5707 deflects light from the three-dimensional display at high speed within the after image time of human eye between observer 5702 and observer 5706 to distribute light to individual observers. Light distribution can be achieved by reciprocating the reflector to left and right at high speed or by rotating it in one direction. When the light, while being deflected, reaches the direction of an observer, it is stopped temporarily at that position and then deflected toward the next observer. This process is repeated at high speed allowing the observers to see a three-dimensional image.

FIG. 87B illustrates a three-dimensional display, which includes a reflector 5717 to distribute an optical axis from the three-dimensional display 5711 into a plurality of optical axes on a time division basis and reflect/refract light from the three-dimensional display toward each of a plurality of observers 5712, 5713, 5714, 5715, 5716 so that all the observers can view the same three-dimensional image. Among devices used for the reflector 5717 are a half mirror, a total reflecting mirror and a prism. The reflector 5717 deflects light from the three-dimensional display at high speed within the after image time of human eye between observer 5712 and observer 5716 to distribute light to individual observers. Light distribution can be achieved by reciprocating the reflector to left and right at high speed or by rotating it in one direction. A shutter 5718 is operated at the same time that the reflection/refraction direction of light, while being deflected, aligns with the direction of each observer, thus allowing the observers to see a three-dimensional image.

This arrangement can expand a viewing zone of an observer while moving or a viewing zone for a plurality of observers.

The present invention has been described in detail in conjunction with example embodiments. It should be noted that the invention can be applied not only to the above-described three-dimensional displays but also as a means to expand a narrow viewing zone in general three-dimensional displays or stereoscopic displays. It should also be noted that the invention is not limited to these embodiments but various modifications may be made without departing from the spirit of the invention.

The representative advantages of this invention may be briefly summarized as follows.

In three-dimensional displays or stereoscopic displays with narrow viewing zones, the viewing zone distributor installed to distribute a viewing zone from the display to a plurality of other directions allows expansion of the viewing zone or increase in the number of viewing zones, which in turn makes it possible for a plurality of people to simultaneously view the displayed image or for a moving observer to view the image.

In a three-dimensional display which generates a three-dimensional image by displaying on a plurality of image planes at different depth positions two-dimensional images with brightness levels whose ratio corresponds to the depth position of each part of an object to be presented, the viewing zone distributor installed to distribute the viewing zone from the display into a plurality of other directions allows expansion of the viewing zone while keeping the misalignment between the front and rear displayed images at a low level that does not appear incongruous to the observer. The provision of the viewing zone distributor also allows the three-dimensional image to be viewed by a plurality of observers simultaneously or to be seen by the observer while moving.

[F-0002]

[Center of Overlapping Two-Dimensional Images]

In the preceding embodiments, the phenomenon of this invention occurs when the sizes of two-dimensional images on the front and rear planes are controlled so that these two-dimensional images overlap as seen with the visual acuity of the observer from one point on a line connecting the left and right eyes of the observer. More precisely speaking, the essential requirement for this phenomenon is that the two-dimensional images must overlap in the vertical direction as viewed with the visual acuity of the observer from one point on a line connecting the left and right eyes of the observer.

Figure 88A:
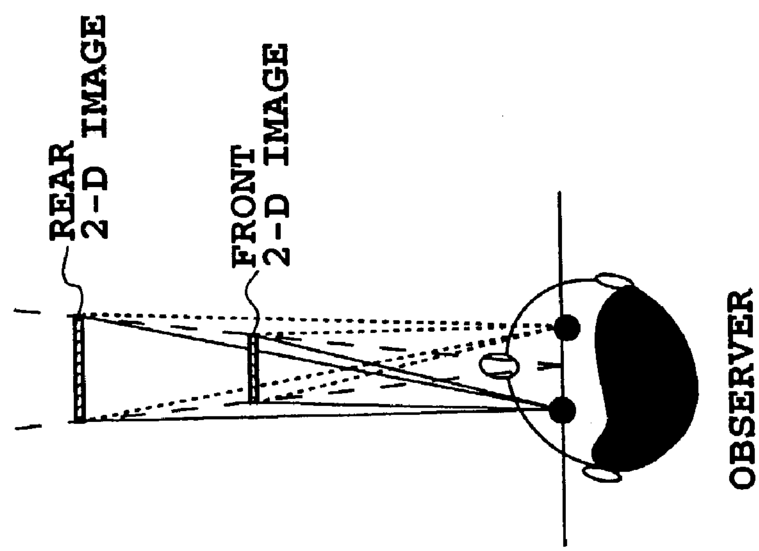
FIGS. 88A to 88C are schematic diagrams showing the principle of the invention.
Figure 88B:
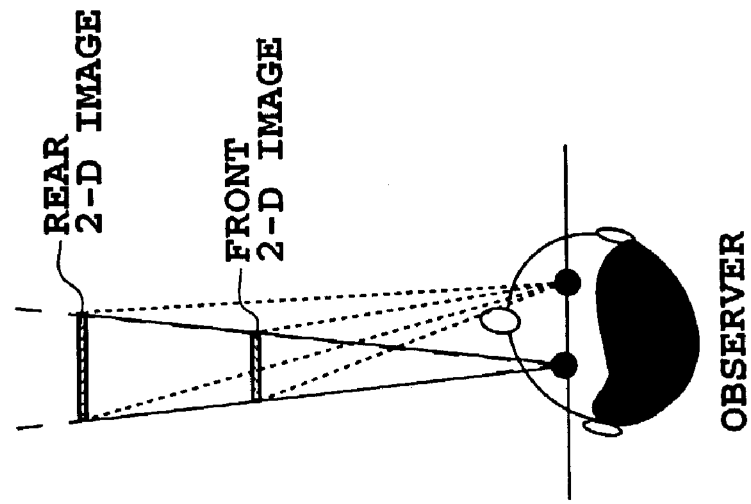
Figure 88C:
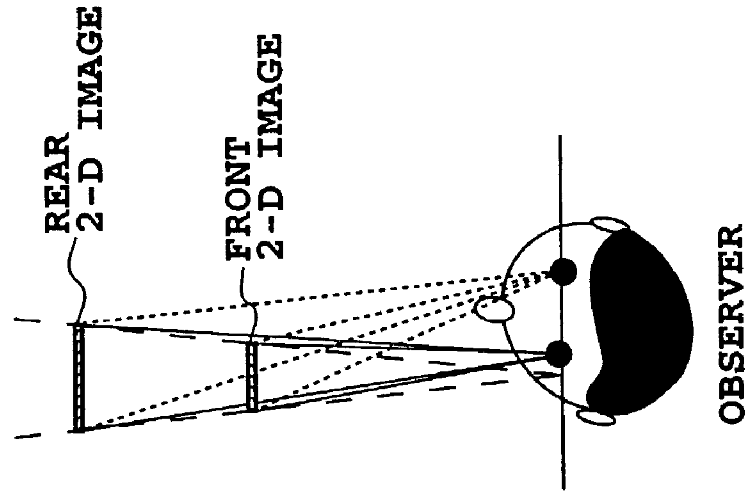

This is explained by referring to FIGS. 88A to 88C. The best viewing position is at a middle point between the left and right eyes, as shown in FIG. 88A. This is because the double image of edge portions as seen from both eyes are smallest in this case. The viewing position from which the phenomenon of the invention can be observed is between both eyes, and the extreme allowable position is as shown in FIG. 88B. There is a possibility, however, that this phenomenon can still be observed even when the viewing position goes outside both eyes by a small amount undistinguishable from FIG. 88B and stays within the visual acuity of the observer, as shown in FIG. 88C. When the viewing position moves further away, this phenomenon generally cannot be observed correctly, with the displayed images perceived as two separate front and rear two-dimensional images.

[Coloring of Overlapping Two-Dimensional Images]

Figure 89:
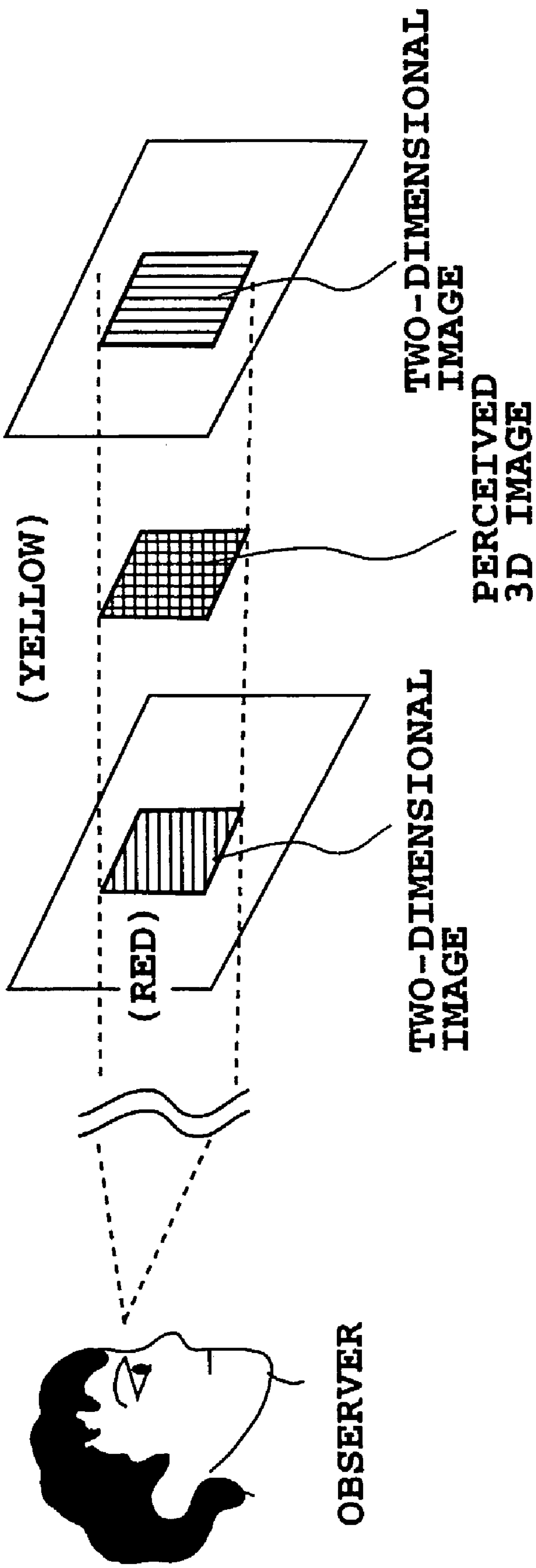
FIG. 89 is a schematic diagram showing the principle of the invention.

With this invention, the apparent depth position of a perceived three-dimensional image can be changed by changing the ratio of brightness levels of the front and rear two-dimensional images. Hence, as shown in FIG. 89, the color of the front two-dimensional image (e.g., red in FIG. 89) and the color of the rear two-dimensional image (e.g., green in FIG. 89) can be differentiated from each other in such a way that the three-dimensional image that is perceived by the observer when he sees these overlapping two-dimensional images has the intended color to be presented (e.g., yellow in FIG. 89).

[Distance between Planes]

Figure 90B:
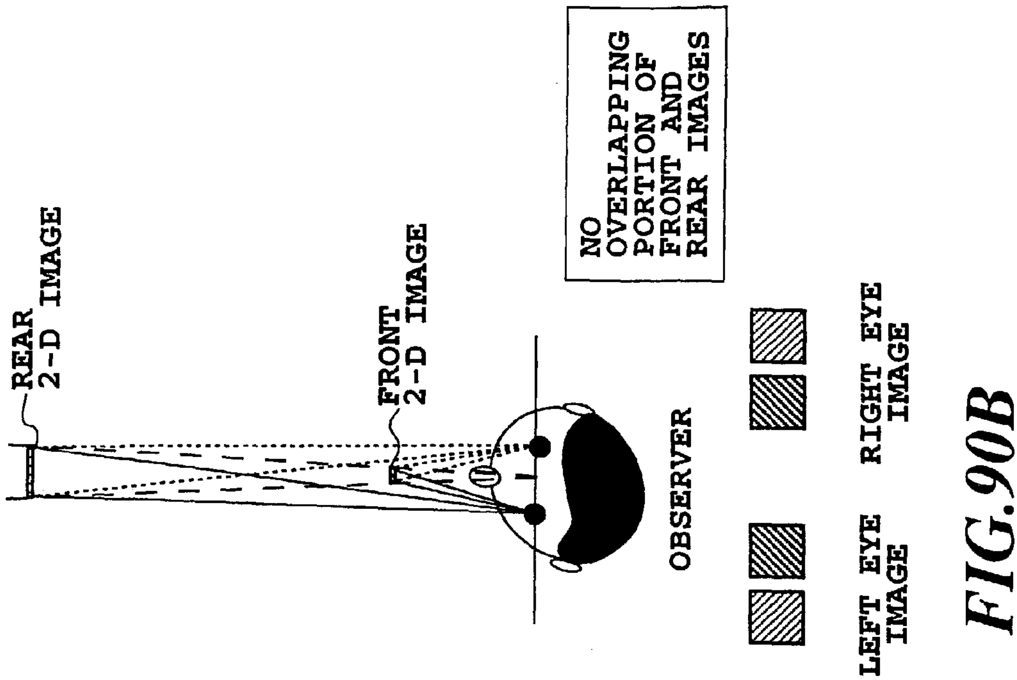
FIGS. 90A and 90B are schematic diagrams showing the principle of the invention.
Figure 90A:
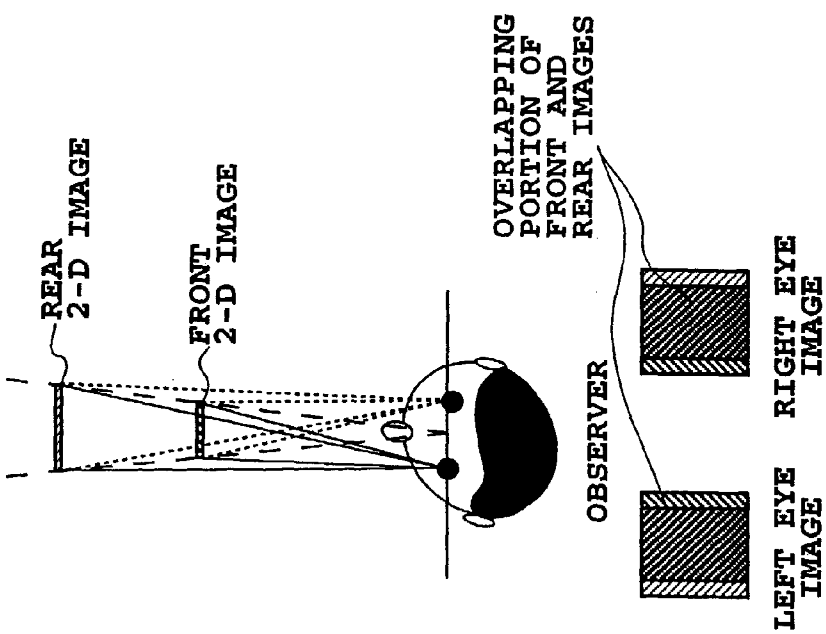

The phenomenon of the present invention is produced when there are overlapping portions of the front and rear two-dimensional images in the right-eye image and in the left-eye image, as shown in FIG. 90A. Hence, when the front and rear planes are set apart by a great distance and the front and rear two-dimensional images do not overlap and are separated in the right-eye image and in the left-eye image, as shown in FIG. 90B, the phenomenon of interest is not generated and the observer perceives two separate front and rear two-dimensional images.

[F-0003]

Figure 91A:
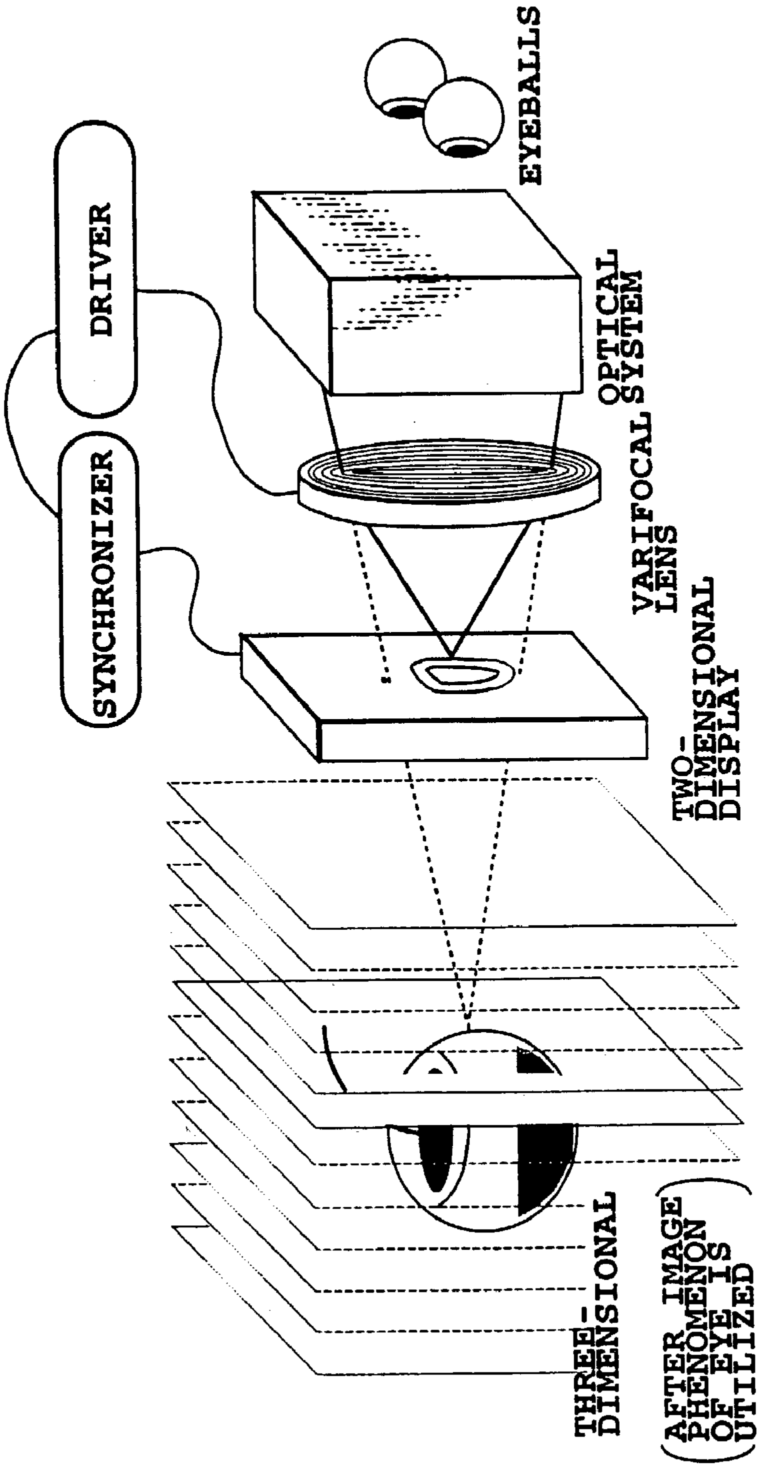
FIGS. 91A and 91B are schematic diagrams showing a three-dimensional representation method according to a further embodiment of the invention.
Figure 91B:
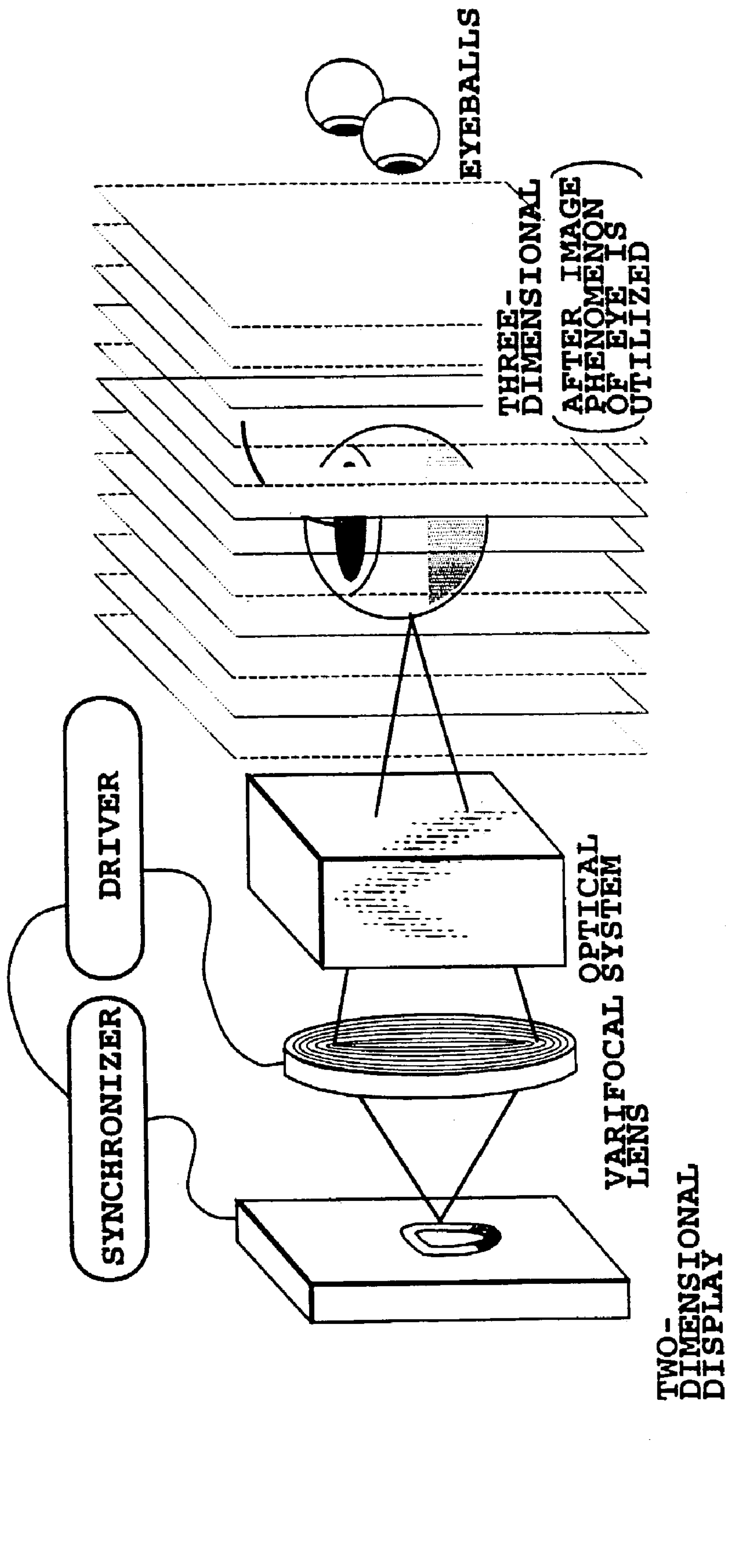

Another example of the embodiment 28 is explained by referring to FIGS. 91A and 91B. FIG. 91A illustrates an example case where a three-dimensional virtual image is produced. FIG. 91B illustrates an example case where a three-dimensional real image is generated. This embodiment includes a two-dimensional display (for example, CRT, liquid crystal display, LED display, PDP and FED), a varifocal lens (for example, dual-frequency type: see Japanese Patent Application 182222/1996 titled "Optical Apparatus"; high-voltage liquid crystal type: see Japanese Patent Application 202244/1996 titled "Optical Apparatus"; polarizing multifocal type; and liquid crystal motor type: see Japanese Patent Application 301600/1997 titled "Optical Apparatus"), an optical system (for example, concave lens, convex lens, concave mirror, convex mirror, total reflecting mirror, partial reflecting mirror, and prism).

The varifocal lens, a key device in this embodiment, can change its focal length at high speed and therefore can focus a displayed image of the two-dimensional display at different depth positions. Therefore, by synchronizing a change in the focal length of the varifocal lens driven by a driving device with an image display timing of the two-dimensional display by a synchronizing device and also by writing the images at all depth positions within the after image time, it is possible to provide a three-dimensional representation in a depth sampling manner.

The present invention has been described in detail with respect to preferred embodiments, and it will now be apparent from the foregoing to those skilled in the art that changes and modification may be made without departing from the invention in its broader aspect, and it is the invention, therefore, in the apparent claims to cover all such changes and modification as fall within the true spirit of the invention.

What is claimed is:

1. A three-dimensional representation method, which generates a three-dimensional image by displaying two-dimensional images on each of a plurality of image planes at desired brightness levels, an object being presented as the two-dimensional images displayed on the image planes, and within an after image time of a human eye, the plurality of image planes being located at different depth positions, the three-dimensional representation method comprising the steps of:

controlling a polarization direction of display light of the two-dimensional images; and passing the display light through an optical system that has different focusing positions according to the polarization direction of the passing display light so that the display light of the two-dimensional images is focused on the plurality of image planes located at different depth positions to display the two-dimensional images on the plurality of image planes located at different depth positions, wherein in synchronism with the successive switching of the polarization direction of the display light of the two-dimensional images, the brightness levels of the display light of the two-dimensional images are changed to the desired brightness levels.

2. A three-dimensional representation method, which generates a three-dimensional image by displaying two-dimensional images on each of a plurality of image planes at desired brightness levels, an object being presented of two-dimensional images being projected on to the planes, and within an after image time of a human eye, the plurality of image planes being located at different death positions, the three-dimensional representation method comprising the steps of:

controlling a polarization direction of display light of the two-dimensional images; and passing the display light through an optical system that has different focusing positions according to the polarization direction of the passing display light so that the display light of the two-dimensional images is focused on the plurality of image planes located at different death positions to display the two-dimensional images on the plurality of image planes located at different depth positions, wherein while the two-dimensional images are successively switched, the polarization direction of the display light of the two-dimensional images is successively switched to focus the display light of the two-dimensional images on the plurality of image planes located at different depth positions to generate a three-dimensional moving image, and the polarization direction of the display light of the two-dimensional images is controlled to adjust to desired levels the brightness levels of the two-dimensional images focused on the plurality of image planes located at different depth positions.

* * * * *

UNITED STATES PATENT AND TRADEMARK OFFICE
CERTIFICATE OF CORRECTION

PATENT NO. : 7,002,532 B2
APPLICATION NO. : 10/291404
DATED : February 21, 2006
INVENTOR(S) : Suyama et al.

It is certified that error appears in the above-identified patent and that said Letters Patent is hereby corrected as shown below:

In claim 2, column 58, line 5, "death" should read --depth--.

In claim 2, column 58, line 15, "death" should read --depth--.

Signed and Sealed this

Fourteenth Day of November, 2006

JON W. DUDAS
*Director of the United States Patent and Trademark Office*